United States Patent
Conboy

(10) Patent No.: US 10,430,757 B2
(45) Date of Patent: *Oct. 1, 2019

(54) MASS TIMBER BUILDING FACTORY SYSTEM FOR PRODUCING PREFABRICATED CLASS-A FIRE-PROTECTED MASS TIMBER BUILDING COMPONENTS FOR USE IN CONSTRUCTING PREFABRICATED CLASS-A FIRE-PROTECTED MASS TIMBER BUILDINGS

(71) Applicant: M-Fire Suppression, Inc., Carlsbad, CA (US)

(72) Inventor: Stephen Conboy, Carlsbad, CA (US)

(73) Assignee: N-Fire Suppression, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,874

(22) Filed: Jan. 18, 2018

(65) Prior Publication Data

US 2019/0171998 A1 Jun. 6, 2019

Related U.S. Application Data

(63) Continuation-in-part of application No. 15/866,456, filed on Jan. 9, 2018, and a continuation-in-part of
(Continued)

(51) Int. Cl.
*E04B 1/10* (2006.01)
*G06Q 10/08* (2012.01)
(Continued)

(52) U.S. Cl.
CPC .......... *G06Q 10/087* (2013.01); *E04B 1/942* (2013.01); *E04C 2/24* (2013.01);
(Continued)

(58) Field of Classification Search
CPC .. E04B 1/944; E04B 1/26; E04B 1/94; B27M 1/08
See application file for complete search history.

(56) References Cited

U.S. PATENT DOCUMENTS

| 25,358 A | 9/1859 | Wilder |
|---|---|---|
| 1,185,154 A | 5/1916 | Wilds |

(Continued)

FOREIGN PATENT DOCUMENTS

| AU | 5986501 | 11/2001 |
|---|---|---|
| AU | 2001259865 | 2/2007 |

(Continued)

OTHER PUBLICATIONS

US 8,460,513 B2, 06/2013, Sealey (withdrawn)
(Continued)

*Primary Examiner* — Gisele D Ford
(74) *Attorney, Agent, or Firm* — Thomas J. Perkowski, Esq.

(57) ABSTRACT

Class-A fire-protected mass timber building components, including cross-laminated timber (CLT), glue laminated timber (GLT) and nail-laminated timber (NLT), wherein multiple layers of Class-A fire-protection are provided to the multiple timber lamination layers so as to provided defend the CLT building components against fire, ground movement and high wind loads. Methods, systems and networks are provided for producing and managing the quality of such Class-A fire-protected mass timber building components.

20 Claims, 115 Drawing Sheets

Related U.S. Application Data application No. 15/866,454, filed on Jan. 9, 2018, said application No. 15/866,456 is a continuation-in-part of application No. 15/829,914, filed on Dec. 2, 2017, now Pat. No. 10,260,232, said application No. 15/866,454 is a continuation-in-part of application No. 15/829,914, filed on Dec. 2, 2017, now Pat. No. 10,260,232.

(51) Int. Cl.
| | | |
|---|---|---|
| *E04B 1/94* | (2006.01) | |
| *G06K 19/06* | (2006.01) | |
| *G06K 19/07* | (2006.01) | |
| *E04C 2/24* | (2006.01) | |

(52) U.S. Cl.
CPC ... *G06K 19/06028* (2013.01); *G06K 19/0723* (2013.01); *G06Q 10/083* (2013.01)

(56) References Cited

U.S. PATENT DOCUMENTS

| | | | | |
|---|---|---|---|---|
| 1,293,377 A * | 2/1919 | Donaldson | ............ | E04B 1/2403 52/236.5 |
| 1,504,454 A * | 8/1924 | Calvin | ............ | E04B 1/26 52/236.6 |
| 1,634,462 A | 7/1927 | Hallauer | | |
| 1,978,807 A | 10/1934 | Merritt | | |
| 2,150,188 A | 3/1939 | Fleanor | | |
| 2,336,648 A | 12/1943 | Sparks | | |
| 3,304,675 A * | 2/1967 | Graham-Wood | ......... | E04B 1/24 52/169.9 |
| 3,470,062 A | 9/1969 | Ollinger | | |
| 3,501,419 A | 3/1970 | Bridgeford | | |
| 3,506,479 A | 4/1970 | Breens | | |
| 3,508,872 A | 4/1970 | Stuetz | | |
| 3,509,083 A | 4/1970 | Winebrenner | | |
| 3,511,748 A | 5/1970 | Heeb | | |
| 3,539,423 A | 11/1970 | Simison | | |
| 3,607,811 A | 9/1971 | Hovd | | |
| 3,650,820 A | 3/1972 | Dipietro | | |
| 3,663,267 A | 5/1972 | Moran | | |
| 3,703,394 A | 11/1972 | Hemming | | |
| 3,734,191 A * | 5/1973 | Johnson | ................. | A62C 37/08 169/5 |
| 3,755,448 A | 8/1973 | Merianos | | |
| 3,795,637 A | 3/1974 | Kandler | | |
| 3,934,066 A | 1/1976 | Murch | | |
| 3,935,343 A | 1/1976 | Nuttall | | |
| 3,944,688 A | 3/1976 | Inman | | |
| 3,984,334 A | 10/1976 | Hopper | | |
| 4,013,599 A | 3/1977 | Strauss | | |
| 4,049,849 A | 9/1977 | Brown | | |
| 4,065,413 A | 12/1977 | MacInnis | | |
| 4,092,281 A | 5/1978 | Bertrand | | |
| 4,104,073 A | 8/1978 | Koide | | |
| 4,172,858 A | 10/1979 | Clubley | | |
| 4,176,115 A | 11/1979 | Hartman | | |
| 4,197,913 A | 4/1980 | Korenowski | | |
| 4,198,328 A | 4/1980 | Bertelli | | |
| 4,209,561 A | 6/1980 | Sawko | | |
| 4,228,202 A | 10/1980 | Tjaennberg | | |
| 4,237,182 A | 12/1980 | Fulmer | | |
| 4,248,976 A | 2/1981 | Clubley | | |
| 4,251,579 A | 2/1981 | Lee | | |
| 4,254,177 A | 3/1981 | Fulmer | | |
| 4,265,963 A | 5/1981 | Matalon | | |
| 4,266,384 A | 5/1981 | Orals | | |
| 4,364,987 A | 12/1982 | Goodwin | | |
| 4,382,884 A | 5/1983 | Rohringer | | |
| 4,392,994 A | 7/1983 | Wagener | | |
| 4,514,327 A | 4/1985 | Rock | | |
| 4,530,877 A | 7/1985 | Hadley | | |
| 4,560,485 A | 12/1985 | Szekely | | |
| 4,563,287 A | 1/1986 | Hisamoto | | |
| 4,572,862 A | 2/1986 | Ellis | | |
| 4,578,913 A | 4/1986 | Eich | | |
| 4,659,381 A | 4/1987 | Walters | | |
| 4,661,398 A | 4/1987 | Ellis | | |
| 4,663,226 A | 5/1987 | Vajs | | |
| 4,666,960 A | 5/1987 | Spain | | |
| 4,690,859 A | 9/1987 | Porter | | |
| 4,714,652 A | 12/1987 | Poletto | | |
| 4,720,414 A | 1/1988 | Burga | | |
| 4,724,250 A | 2/1988 | Schubert | | |
| 4,737,406 A | 4/1988 | Bumpus | | |
| 4,740,527 A | 4/1988 | Von Bonin | | |
| 4,743,625 A | 5/1988 | Vajs | | |
| 4,756,839 A | 7/1988 | Curzon | | |
| 4,770,794 A | 9/1988 | Cundasawmy | | |
| 4,810,741 A | 3/1989 | Kim | | |
| 4,824,483 A | 4/1989 | Bumpus | | |
| 4,824,484 A * | 4/1989 | Metzner | ................... | A01N 3/00 106/14.12 |
| 4,861,397 A | 8/1989 | Hillstrom | | |
| 4,871,477 A | 10/1989 | Dimanshteyn | | |
| 4,879,320 A | 11/1989 | Hastings | | |
| 4,888,136 A | 12/1989 | Chellapa | | |
| 4,895,878 A | 1/1990 | Jourquin | | |
| 4,965,296 A | 10/1990 | Hastings | | |
| 5,021,484 A | 6/1991 | Schreiber | | |
| 5,023,019 A | 6/1991 | Bumpus | | |
| 5,032,446 A | 7/1991 | Sayles | | |
| 5,039,454 A | 8/1991 | Policastro | | |
| 5,053,147 A | 10/1991 | Kaylor | | |
| 5,055,208 A | 10/1991 | Stewart | | |
| 5,130,184 A | 7/1992 | Ellis | | |
| 5,156,775 A | 10/1992 | Blount | | |
| 5,162,394 A | 11/1992 | Trocino | | |
| 5,182,049 A | 1/1993 | Von Bonin | | |
| 5,185,214 A | 2/1993 | Levan | | |
| 5,214,894 A | 6/1993 | Glesser-Lott | | |
| 5,250,200 A | 10/1993 | Sallet | | |
| 5,283,998 A | 2/1994 | Jong | | |
| 5,284,700 A | 2/1994 | Strauss | | |
| 5,333,426 A * | 8/1994 | Varoglu | ................... | E04B 1/26 52/236.7 |
| 5,356,568 A | 10/1994 | Levine | | |
| 5,391,246 A | 2/1995 | Stephens | | |
| 5,393,437 A | 2/1995 | Bower | | |
| 5,405,661 A | 4/1995 | Kim | | |
| 5,491,022 A | 2/1996 | Smith | | |
| 5,534,164 A | 7/1996 | Guglielmi | | |
| 5,534,301 A | 7/1996 | Shutt | | |
| 5,605,767 A | 2/1997 | Fuller | | |
| 5,609,915 A | 3/1997 | Fuller | | |
| 5,631,047 A | 5/1997 | Friloux | | |
| 5,709,821 A | 1/1998 | Von Bonin | | |
| 5,729,936 A | 3/1998 | Maxwell | | |
| 5,738,924 A | 4/1998 | Sing | | |
| 5,765,333 A * | 6/1998 | Cunningham | ......... | E04B 1/165 52/281 |
| 5,833,874 A | 11/1998 | Stewart | | |
| 5,834,535 A | 11/1998 | Abu-Isa | | |
| 5,840,413 A | 11/1998 | Kajander | | |
| 5,968,669 A | 10/1999 | Liu | | |
| 6,000,189 A | 12/1999 | Breuer | | |
| 6,024,889 A | 2/2000 | Holland | | |
| 6,029,751 A | 2/2000 | Ford | | |
| 6,042,639 A | 3/2000 | Valsoe | | |
| 6,073,410 A | 6/2000 | Schimpf | | |
| 6,146,544 A | 11/2000 | Guglielmi | | |
| 6,146,557 A | 11/2000 | Inata | | |
| 6,150,449 A | 11/2000 | Valkanas | | |
| 6,153,682 A | 11/2000 | Bannat | | |
| 6,202,755 B1 | 3/2001 | Hardge | | |
| 6,245,842 B1 | 6/2001 | Buxton | | |
| 6,271,156 B1 | 8/2001 | Gleason | | |
| 6,309,746 B1 | 10/2001 | Broutier | | |
| 6,385,931 B1 | 5/2002 | Risser | | |
| 6,398,136 B1 | 6/2002 | Smith | | |
| 6,401,487 B1 | 6/2002 | Kotliar | | |
| 6,401,830 B1 | 6/2002 | Romanoff | | |

(56) References Cited

U.S. PATENT DOCUMENTS

| | | |
|---|---|---|
| 6,415,571 B2 | 7/2002 | Risser |
| 6,423,129 B1 | 7/2002 | Fitzgibbons, Jr. |
| 6,423,251 B1 | 7/2002 | Blount |
| 6,442,912 B1 | 9/2002 | Phillips |
| 6,444,718 B1 | 9/2002 | Blount |
| 6,464,903 B1 | 10/2002 | Blount |
| 6,502,421 B2 | 1/2003 | Kotliar |
| 6,517,748 B2 | 2/2003 | Richards |
| 6,557,374 B2 | 5/2003 | Kotliar |
| 6,560,991 B1 | 5/2003 | Kotlair |
| 6,581,878 B1 | 6/2003 | Bennett |
| 6,608,123 B2 | 8/2003 | Galli |
| 6,613,391 B1 | 9/2003 | Gang |
| 6,706,774 B2 | 3/2004 | Muenzenberger |
| 6,713,411 B2 | 3/2004 | Cox |
| 6,736,989 B2 | 5/2004 | Stewart |
| 6,796,382 B2 | 9/2004 | Kaimart |
| 6,800,352 B1 | 10/2004 | Hejna |
| 6,869,669 B2 | 3/2005 | Jensen |
| 6,881,247 B2 | 4/2005 | Batdorf |
| 6,881,367 B1 | 4/2005 | Baker |
| 6,897,173 B2 | 5/2005 | Bernard |
| 6,930,138 B2 | 8/2005 | Schell |
| 6,982,049 B1 | 1/2006 | Mabey |
| 7,082,999 B2 | 8/2006 | Arnot |
| 7,083,000 B2 | 8/2006 | Edwards |
| 7,147,061 B2 | 12/2006 | Tsutaoka |
| 7,210,537 B1 | 5/2007 | McNeil |
| 7,261,165 B1 | 8/2007 | Black |
| 7,273,634 B2 | 9/2007 | Fitzgibbons, Jr. |
| 7,323,248 B2 | 1/2008 | Ramsey |
| 7,331,399 B2 | 2/2008 | Multer |
| 7,337,156 B2 | 2/2008 | Wippich |
| 7,341,113 B2 | 3/2008 | Fallis |
| 7,478,680 B2 | 1/2009 | Sridharan |
| 7,479,513 B2 | 1/2009 | Reinheimer |
| 7,482,395 B2 | 1/2009 | Mabey |
| 7,504,449 B2 | 3/2009 | Mazor |
| 7,560,041 B2 | 7/2009 | Yoon |
| 7,588,087 B2 | 9/2009 | Cafferata |
| 7,614,456 B2 | 11/2009 | Twum |
| 7,673,696 B1 | 3/2010 | Gunn |
| 7,686,093 B2 | 3/2010 | Reilly |
| 7,744,687 B2 | 6/2010 | Moreno |
| 7,748,662 B2 | 7/2010 | Hale |
| 7,754,808 B2 | 7/2010 | Goossens |
| 7,766,090 B2 | 8/2010 | Mohr |
| 7,767,010 B2 | 8/2010 | Curzon |
| 7,785,712 B2 | 8/2010 | Miller |
| 7,789,165 B1 | 9/2010 | Yen |
| 7,820,736 B2 | 10/2010 | Reinheimer |
| 7,824,583 B2 | 11/2010 | Gang |
| 7,828,069 B2 | 11/2010 | Lee |
| 7,832,492 B2 | 11/2010 | Eldridge |
| 7,837,009 B2 | 11/2010 | Gross |
| 7,849,542 B2 | 12/2010 | Defranks |
| 7,863,355 B2 | 1/2011 | Futterer |
| 7,886,836 B2 | 2/2011 | Haaland |
| 7,886,837 B1 | 2/2011 | Helfgott |
| 7,897,070 B2 | 3/2011 | Knocke |
| 7,897,673 B2 | 3/2011 | Flat |
| 7,900,709 B2 | 3/2011 | Kotliar |
| 7,934,564 B1 | 5/2011 | Stell |
| 8,006,447 B2 | 8/2011 | Beele |
| 8,080,186 B1 | 12/2011 | Pennartz |
| 8,088,310 B2 | 1/2012 | Orr |
| 8,141,649 B2 | 3/2012 | Kotliar |
| 8,148,315 B2 | 4/2012 | Baker |
| 8,206,620 B1 | 6/2012 | Bolton |
| 8,217,093 B2 | 7/2012 | Reinheimer |
| 8,226,017 B2 | 7/2012 | Cohen |
| 8,263,231 B2 | 9/2012 | Mesa |
| 8,273,813 B2 | 9/2012 | Beck |
| 8,276,679 B2 | 10/2012 | Bui |
| 8,281,550 B1 | 10/2012 | Bolton |
| 8,286,405 B1 | 10/2012 | Bolton |
| 8,291,990 B1 | 10/2012 | Mohr |
| 8,344,055 B1 | 1/2013 | Mabey |
| 8,366,955 B2 | 2/2013 | Thomas |
| 8,403,070 B1 | 3/2013 | Lowe |
| 8,409,479 B2 | 4/2013 | Alexander |
| 8,453,752 B2 | 6/2013 | Katsuraku |
| 8,458,971 B2 | 6/2013 | Winterowd |
| 8,465,833 B2 | 6/2013 | Lee |
| 8,534,370 B1 | 9/2013 | Al Azemi |
| 8,586,657 B2 | 11/2013 | Lopez |
| 8,603,231 B2 | 12/2013 | Wagh |
| 8,646,540 B2 | 2/2014 | Eckholm |
| 8,647,524 B2 | 2/2014 | Rueda-Nunez |
| 8,662,192 B2 | 3/2014 | Dunster |
| 8,663,427 B2 | 3/2014 | Sealey |
| 8,663,774 B2 | 3/2014 | Fernando |
| 8,663,788 B2 | 3/2014 | Oh |
| 8,668,988 B2 | 3/2014 | Schoots |
| 8,685,206 B2 | 4/2014 | Sealey |
| 8,698,634 B2 | 4/2014 | Guedes |
| 8,746,355 B2 | 6/2014 | Demmitt |
| 8,746,357 B2 | 6/2014 | Butz |
| 8,778,213 B2 | 7/2014 | Guo |
| 8,789,769 B2 | 7/2014 | Fenton |
| 8,808,850 B2 | 8/2014 | Dion |
| 8,820,421 B2 | 9/2014 | Rahgozar |
| 8,871,053 B2 | 10/2014 | Sealey |
| 8,871,058 B2 | 10/2014 | Sealey |
| 8,893,814 B2 | 11/2014 | Bui |
| 8,944,174 B2 | 2/2015 | Thomas |
| 8,973,669 B2 | 3/2015 | Connery |
| 8,980,145 B2 | 3/2015 | Baroux |
| 9,005,396 B2 | 4/2015 | Baroux |
| 9,005,642 B2 | 4/2015 | Mabey |
| 9,027,303 B2 | 5/2015 | Lichtinger |
| 9,089,730 B2 | 7/2015 | Shalev |
| 9,120,570 B2 | 9/2015 | Hoisington |
| 9,174,074 B2 | 11/2015 | Medina |
| 9,187,674 B2 | 11/2015 | Ulcar |
| 9,199,108 B2 | 12/2015 | Guo |
| 9,249,021 B2 | 2/2016 | Mundheim |
| 9,265,978 B2 | 2/2016 | Klaffmo |
| 9,328,317 B2 | 5/2016 | Peng |
| 9,382,153 B2 | 7/2016 | Fisher |
| 9,409,045 B2 | 8/2016 | Berezovsky |
| 9,498,787 B2 | 11/2016 | Fenton |
| 9,597,538 B2 | 3/2017 | Langselius |
| 9,616,590 B2 | 4/2017 | Birkeland |
| 9,663,943 B2 | 5/2017 | Dimakis |
| 9,776,029 B2 | 10/2017 | Izumida |
| 9,782,944 B2 | 10/2017 | Martin |
| 9,851,718 B2 | 12/2017 | Booher |
| 9,920,250 B1 | 3/2018 | Vuozzo |
| 9,931,648 B2 | 4/2018 | Fenton |
| 9,956,446 B2 | 5/2018 | Connery |
| 2001/0000911 A1 | 5/2001 | Stewart |
| 2001/0025712 A1 | 10/2001 | Pagan |
| 2001/0029706 A1 | 10/2001 | Risser |
| 2001/0029750 A1 | 10/2001 | Kotliar |
| 2002/0005288 A1 | 1/2002 | Haase |
| 2002/0011593 A1 | 1/2002 | Richards |
| 2002/0023762 A1 | 2/2002 | Kotliar |
| 2002/0045688 A1 | 4/2002 | Galli |
| 2002/0079379 A1 | 6/2002 | Cheung |
| 2002/0096668 A1 | 7/2002 | Vandersall |
| 2002/0110696 A1 | 8/2002 | Slimak |
| 2002/0125016 A1 | 9/2002 | Cofield |
| 2002/0139056 A1 | 10/2002 | Finnell |
| 2002/0168476 A1 | 11/2002 | Pasek |
| 2003/0029622 A1 | 2/2003 | Clauss |
| 2003/0047723 A1 | 3/2003 | Santoro |
| 2003/0051886 A1 | 3/2003 | Adiga |
| 2003/0066990 A1 | 4/2003 | Vandersall |
| 2003/0132425 A1 | 7/2003 | Curzon |
| 2003/0136879 A1 | 7/2003 | Grabow |
| 2003/0146843 A1 | 8/2003 | Dittmer |
| 2003/0155133 A1 | 8/2003 | Matsukawa |
| 2003/0159836 A1 | 8/2003 | Kashiki |

(56) References Cited

U.S. PATENT DOCUMENTS

| | | | |
|---|---|---|---|
| 2003/0160111 A1 | 8/2003 | Multer | |
| 2003/0168225 A1 | 9/2003 | Denne | |
| 2003/0170317 A1 | 9/2003 | Curzon | |
| 2004/0003569 A1 | 1/2004 | Frederickson | |
| 2004/0051086 A1 | 3/2004 | Pasek | |
| 2004/0099178 A1 | 5/2004 | Jones | |
| 2004/0109853 A1 | 6/2004 | McDaniel | |
| 2004/0134378 A1 | 7/2004 | Batdorf | |
| 2004/0163825 A1 | 8/2004 | Dunster | |
| 2004/0173783 A1 | 9/2004 | Curzon | |
| 2004/0175407 A1 | 9/2004 | McDaniel | |
| 2004/0194657 A1 | 10/2004 | Lally | |
| 2004/0209982 A1 | 10/2004 | Horacek | |
| 2004/0231252 A1 | 11/2004 | Benjamin | |
| 2005/0009965 A1 | 1/2005 | Schell | |
| 2005/0009966 A1 | 1/2005 | Rowen | |
| 2005/0011652 A1 | 1/2005 | Hua | |
| 2005/0022466 A1* | 2/2005 | Kish | C09K 21/14 52/741.3 |
| 2005/0058689 A1 | 3/2005 | McDaniel | |
| 2005/0066619 A1 | 3/2005 | McDonald | |
| 2005/0103507 A1 | 5/2005 | Brown | |
| 2005/0139363 A1 | 6/2005 | Thomas | |
| 2005/0229809 A1 | 10/2005 | Lally | |
| 2005/0235598 A1* | 10/2005 | Liggins | E04B 2/707 52/745.19 |
| 2005/0263298 A1 | 12/2005 | Kotliar | |
| 2005/0269109 A1 | 12/2005 | Maguire | |
| 2005/0279972 A1 | 12/2005 | Santoro | |
| 2006/0037277 A1 | 2/2006 | Fitzgibbons, Jr. | |
| 2006/0048466 A1 | 3/2006 | Darnell | |
| 2006/0131035 A1 | 6/2006 | French | |
| 2006/0157668 A1 | 7/2006 | Erdner | |
| 2006/0167131 A1 | 7/2006 | Mabey | |
| 2006/0168906 A1 | 8/2006 | Tonyan | |
| 2006/0196681 A1 | 9/2006 | Adiga | |
| 2006/0208236 A1 | 9/2006 | Gang | |
| 2006/0213672 A1 | 9/2006 | Mohr | |
| 2007/0084554 A1 | 4/2007 | Miller | |
| 2007/0090322 A1 | 4/2007 | Yoon | |
| 2007/0119334 A1 | 5/2007 | Atkinson | |
| 2007/0125880 A1 | 6/2007 | Palle | |
| 2007/0176156 A1 | 8/2007 | Mabey | |
| 2007/0193753 A1 | 8/2007 | Adiga | |
| 2007/0194289 A1 | 8/2007 | Anglin | |
| 2007/0197112 A1 | 8/2007 | Mazor | |
| 2007/0227085 A1* | 10/2007 | Mader | E04B 1/26 52/233 |
| 2007/0232731 A1 | 10/2007 | Knocke | |
| 2007/0289709 A1 | 12/2007 | Chong | |
| 2007/0289752 A1 | 12/2007 | Beck | |
| 2008/0000649 A1 | 1/2008 | Guirguis | |
| 2008/0050578 A1 | 2/2008 | Sinclair, Sr. | |
| 2008/0054230 A1 | 3/2008 | Mabey | |
| 2008/0115949 A1 | 5/2008 | Li | |
| 2008/0168798 A1 | 7/2008 | Kotliar | |
| 2008/0179067 A1 | 7/2008 | Ho | |
| 2008/0184642 A1 | 8/2008 | Sebastian | |
| 2009/0107064 A1* | 4/2009 | Bowman | E04B 1/26 52/238.1 |
| 2009/0145075 A1* | 6/2009 | Oakley | E04B 1/10 52/690 |
| 2009/0188567 A1 | 7/2009 | McHugh | |
| 2009/0215926 A1 | 8/2009 | Kozlowski | |
| 2009/0249556 A1 | 10/2009 | Dermeik | |
| 2009/0266025 A1 | 10/2009 | Toas | |
| 2009/0280345 A1 | 11/2009 | Maynard | |
| 2009/0301001 A1 | 12/2009 | Kish | |
| 2009/0313931 A1 | 12/2009 | Porter | |
| 2009/0314500 A1 | 12/2009 | Fenton | |
| 2009/0326117 A1 | 12/2009 | Benussi | |
| 2010/0032175 A1 | 2/2010 | Boyd | |
| 2010/0062153 A1 | 3/2010 | Curzon | |
| 2010/0069488 A1 | 3/2010 | Mabey | |
| 2010/0175897 A1 | 7/2010 | Crump | |
| 2010/0176353 A1 | 7/2010 | Hanna | |
| 2010/0181084 A1 | 7/2010 | Carmo | |
| 2010/0200819 A1 | 8/2010 | Mans | |
| 2010/0267853 A1 | 10/2010 | Edry | |
| 2010/0281784 A1 | 11/2010 | Leo | |
| 2010/0314138 A1 | 12/2010 | Weatherspoon | |
| 2010/0326677 A1 | 12/2010 | Jepsen | |
| 2011/0000142 A1 | 1/2011 | Bui | |
| 2011/0061336 A1 | 3/2011 | Thomas | |
| 2011/0073331 A1 | 3/2011 | Xu | |
| 2011/0089386 A1 | 4/2011 | Berry | |
| 2011/0091713 A1 | 4/2011 | Miller | |
| 2011/0146173 A1 | 6/2011 | Visser | |
| 2011/0203813 A1 | 8/2011 | Fenton | |
| 2011/0266486 A1 | 11/2011 | Orr | |
| 2011/0284250 A1 | 11/2011 | Thomas | |
| 2011/0315406 A1 | 12/2011 | Connery | |
| 2012/0045584 A1 | 2/2012 | Dettbarn | |
| 2012/0073228 A1* | 3/2012 | Fork | B32B 9/046 52/309.13 |
| 2012/0121809 A1 | 5/2012 | Vuozzo | |
| 2012/0145418 A1 | 6/2012 | Su | |
| 2012/0168185 A1 | 7/2012 | Yount | |
| 2012/0199781 A1 | 8/2012 | Rueda-Nunez | |
| 2012/0241535 A1 | 9/2012 | Carriere | |
| 2012/0256143 A1 | 10/2012 | Ulcar | |
| 2012/0258327 A1 | 10/2012 | McArthur | |
| 2012/0295996 A1 | 11/2012 | Wang | |
| 2012/0308631 A1 | 12/2012 | Shirley | |
| 2013/0000239 A1 | 1/2013 | Winterowd | |
| 2013/0101839 A1 | 4/2013 | Dion | |
| 2013/0149548 A1* | 6/2013 | Williams | C09K 21/14 428/532 |
| 2013/0239848 A1 | 9/2013 | Fisher | |
| 2013/0288031 A1 | 10/2013 | Labock | |
| 2014/0079942 A1 | 3/2014 | Lally | |
| 2014/0123572 A1* | 5/2014 | Segall | G09B 9/003 52/79.5 |
| 2014/0202716 A1 | 7/2014 | Klaffmo | |
| 2014/0202717 A1 | 7/2014 | Klaffmo | |
| 2014/0206767 A1 | 7/2014 | Klaffmo | |
| 2014/0239123 A1 | 8/2014 | Hoisington | |
| 2014/0245696 A1 | 9/2014 | Anderson | |
| 2014/0284067 A1 | 9/2014 | Klaffmo | |
| 2014/0284511 A1 | 9/2014 | Klaffmo | |
| 2014/0284512 A1 | 9/2014 | Klaffmo | |
| 2014/0290970 A1 | 10/2014 | Izumida | |
| 2014/0295164 A1 | 10/2014 | Parker | |
| 2014/0299339 A1 | 10/2014 | Klaffmo | |
| 2014/0322548 A1 | 10/2014 | Boldizsar | |
| 2015/0020476 A1 | 1/2015 | Winterowd | |
| 2015/0021053 A1 | 1/2015 | Klaffmo | |
| 2015/0021055 A1 | 1/2015 | Klaffmo | |
| 2015/0147478 A1 | 5/2015 | Shutt | |
| 2015/0224352 A1 | 8/2015 | Klaffmo | |
| 2015/0314564 A1 | 11/2015 | Mancini | |
| 2015/0322668 A1* | 11/2015 | Quinn | E04B 1/24 52/236.9 |
| 2015/0335926 A1 | 11/2015 | Klaffmo | |
| 2015/0335928 A1 | 11/2015 | Klaffmo | |
| 2015/0354199 A1* | 12/2015 | Segall | E04B 1/34315 52/127.6 |
| 2015/0368560 A1 | 12/2015 | Pascal | |
| 2016/0024779 A1* | 1/2016 | Clus | E04B 1/19 52/79.1 |
| 2016/0107014 A1 | 4/2016 | Klaffmo | |
| 2016/0137853 A1 | 5/2016 | Lopez | |
| 2016/0243789 A1 | 8/2016 | Baroux | |
| 2017/0029632 A1 | 2/2017 | Couturier | |
| 2017/0056698 A1 | 3/2017 | Pai | |
| 2017/0081844 A1* | 3/2017 | Dimakis | E04B 1/26 |
| 2017/0120089 A1* | 5/2017 | Fisher | A62C 3/002 |
| 2017/0121965 A1 | 5/2017 | Dettbarn | |
| 2017/0138049 A1 | 5/2017 | King | |
| 2017/0182341 A1 | 6/2017 | Libal | |
| 2017/0210098 A1 | 7/2017 | Moore | |
| 2017/0321418 A1* | 11/2017 | Tremblay | C09K 21/02 |

(56) References Cited

U.S. PATENT DOCUMENTS

| | | | | |
|---|---|---|---|---|
| 2018/0023283 | A1* | 1/2018 | Dunster | E04B 7/024 |
| | | | | 52/220.1 |
| 2018/0087270 | A1* | 3/2018 | Miller | E04B 9/225 |
| 2018/0119421 | A1* | 5/2018 | Pospisil | E04B 1/24 |

FOREIGN PATENT DOCUMENTS

| | | |
|---|---|---|
| AU | 2005220194 | 4/2007 |
| AU | 2005220196 | 4/2007 |
| AU | 2002240521 | 12/2007 |
| AU | 2011244837 | 5/2012 |
| CA | 2212076 | 7/1997 |
| CA | 2593435 | 8/2006 |
| CA | 2653817 | 12/2007 |
| CA | 2811358 | 1/2013 |
| CA | 2846076 | 9/2014 |
| CA | 2862380 | 4/2015 |
| CA | 2868719 | 6/2015 |
| CN | 1397613 | 2/2003 |
| CN | 101293752 | 10/2008 |
| CN | 101434760 | 5/2009 |
| CN | 202045944 | 11/2011 |
| CN | 102337770 | 2/2012 |
| CN | 103562079 | 2/2014 |
| CN | 104540556 | 4/2015 |
| EP | 2898925 | 7/2015 |
| EP | 2902077 | 8/2015 |
| GB | 2301122 | 11/1996 |
| WO | 8704145 | 7/1987 |
| WO | 9010668 | 9/1990 |
| WO | 9100327 | 1/1991 |
| WO | 0166669 | 9/2001 |
| WO | 0243812 | 6/2002 |
| WO | 0244305 | 6/2002 |
| WO | 2005014115 | 2/2005 |
| WO | 2006006829 | 1/2006 |
| WO | 2006010667 | 2/2006 |
| WO | 2006013180 | 2/2006 |
| WO | 2006032130 | 3/2006 |
| WO | 2006056379 | 6/2006 |
| WO | 2006072672 | 7/2006 |
| WO | 2006081596 | 8/2006 |
| WO | 2006097962 | 9/2006 |
| WO | 2006126181 | 11/2006 |
| WO | 2007030982 | 3/2007 |
| WO | 2007048149 | 5/2007 |
| WO | 2007140676 | 12/2007 |
| WO | 2008031559 | 3/2008 |
| WO | 2008150157 | 12/2008 |
| WO | 2009012546 | 1/2009 |
| WO | 2009020251 | 2/2009 |
| WO | 2009057104 | 5/2009 |
| WO | 2010028416 | 3/2010 |
| WO | 2010041228 | 4/2010 |
| WO | 2010046696 | 4/2010 |
| WO | 2010061059 | 6/2010 |
| WO | 2010089604 | 8/2010 |
| WO | 2010139124 | 12/2010 |
| WO | 2011016773 | 2/2011 |
| WO | 2011042609 | 4/2011 |
| WO | 2011054345 | 5/2011 |
| WO | 2011078728 | 6/2011 |
| WO | 2011116450 | 9/2011 |
| WO | 2012031762 | 3/2012 |
| WO | 2012060491 | 5/2012 |
| WO | 2012071577 | 5/2012 |
| WO | 2012076905 | 6/2012 |
| WO | 2012164478 | 12/2012 |
| WO | 2013003097 | 1/2013 |
| WO | 2013062295 | 5/2013 |
| WO | 2013068260 | 5/2013 |
| WO | 2013098859 | 7/2013 |
| WO | 2013179218 | 12/2013 |
| WO | 2014001417 | 1/2014 |
| WO | 2014115036 | 7/2014 |
| WO | 2014115038 | 7/2014 |
| WO | 2014152528 | 9/2014 |
| WO | 2015020388 | 2/2015 |
| WO | 2015051917 | 4/2015 |
| WO | 2015061905 | 5/2015 |
| WO | 2015076842 | 5/2015 |
| WO | 2015126854 | 8/2015 |
| WO | 2015153843 | 10/2015 |
| WO | 2015168456 | 11/2015 |
| WO | 2015172619 | 11/2015 |
| WO | 2016075480 | 5/2016 |
| WO | 2016186450 | 11/2016 |
| WO | 2017014782 | 1/2017 |
| WO | 2017015585 | 1/2017 |
| WO | 2017016143 | 2/2017 |
| WO | 2017094918 | 6/2017 |

OTHER PUBLICATIONS

Office Action dated Jun. 1, 2018 for U.S. Appl. No. 15/829,914 (pp. 1-7).

Underwriters Laboratories Inc., "BPVV R7002 Lumber, Treated", Jan. 2011, (pp. 1-5).

Underwriters Laboratories Inc., BUGV R7003 Treated Plywood, Oct. 2011, (pp. 1-4).

Chemical Specialties Inc., "D-Blaze Fire Retardant Treated Wood, The New Generation Building Material", Mar. 2004, (pp. 1-2).

Treated Wood, "TimberSaver", Nov. 2017, (pp. 1-6).

Reed Construction Data, "Osmose Inc., FirePro Fire Retardant", Jan. 2004, (pp. 1-3).

ICC Evaluation Service Inc., "FirePro", Nov. 2005, (pp. 1-4).

Marketwired, "WoodSmart Solutions, Inc. Tests Hartindo AF21 in BluWood Solution", Nov. 2007, (pp. 1-2).

Marketwired, "Megola Announces AF21 Test Results", Aug. 2007, (pp. 1-2).

Marketwired, Megola Updates on Hartindo AF21, a Total Fire Inhibitor, Aug. 2010, (pp. 1-3).

Treated Wood, "Fire Retardant Treated Wood for Commercial and Residential Structures", Jan. 2012, (pp. 1-73).

Fire Retardant Coatings of Texas, "FX Lumber Guard", Nov. 2015, (pp. 1).

QAI Laboratories, "Test Report #T1003-1: FX Lumber Guard", Apr. 2015, (pp. 1-10).

Treated Wood, "D-Blaze: Fire Retardant Treated Wood", Jan. 2015, (pp. 1-13).

Arch Wood Protection Inc., "Dricon: Application Guide", Jan. 2016, (pp. 1-28).

ICC Evaluation Service Inc., "ICC-ES Listing Report: FX Lumber Guard/FX Lumber Guard XT Fire-Retardant Coatings", Oct. 2016, (pp. 1-3).

ICC Evaluation Service Inc., "ICC-ES Report: Pyro-Guard Fire Retardant-Treated Wood", Dec. 2016, (pp. 1-8).

Intelligent Wood Systems, "Treated Timber—Customer Information", Nov. 2016, (pp. 1-8).

Intelligent Wood Systems, "IWS FR Fire Retardant Treated Wood Corrosion Information", Jan. 2016, (pp. 1).

Intelligent Wood Systems, "Treated Timber—Consumer Information", Nov. 2016, (pp. 1-15).

Nelson Pine, "How LVL is Made", Nov. 2017, (pp. 1).

Eco Building Products Inc, "Eco Red Shield Material Safety Data Sheet : Wood Dust", Jun. 2005, (pp. 1-2).

LSU Agcenter Wood Durability Laboratory, "Eco Red Shield:Technical Specifications—Strength Testing", Aug. 2011, (pp. 1-21).

Eco Building Products, "Technical Bulletin: Corrosive Effects From Eco Red Shield Coatings", Jan. 2011, (pp. 1).

Underwriters Laboratories Inc., "Greenguard Certification Test for Eco Building Products, Inc.: Eco Red Shield—01", Mar. 2015, (pp. 1-21).

Drj, "Technical Evaluation Report: Eco Red Shield Fire Treated Wood Protection Coating", Apr. 2016, (pp. 1-8).

Eco Building Products, "Safety Data Sheet: Eco Red Shield", May 2016, (pp. 1-6).

(56) References Cited

OTHER PUBLICATIONS

CSE Inc, "AC479: Proposed AC for Wood Structural Panels with Factory-Applied Fire-Retardant Coating", Feb. 2017, (pp. 1-101).
ASTM International, "Standard Test Method for Extended Duration Surface Burning Characteristics of Building Materials (30 min Tunnel Test)," Aug. 2011, (pp. 1-4).
American Wood Council, "Design for Code Acceptance: Flame Spread Performance of Wood Products Used for Interior Finish", Apr. 2014, (pp. 1-5).
Glenalmond Timber Company, "IWS FR Fire Retardant Treated Wood: Corrosion Information", Nov. 2017, (pp. 1).
Department of the Navy, "Military Specification: Lumber and Plywood", Jun. 1984, (pp. 1-16).
Bank Insurance, Michael D. White, "How Benjamin Franklin Became the 'Father of Insurance'", Dec. 1998, (pp. 1-3).
ASTM International, "Standard Test Methods for Fire Tests of Building Construction and Materials", Oct. 2000, (pp. 1-24).
ASTM International, "Standard Test Method for Evaluating the Flexural Properties of Fire-retardant Treated Softwood Plywood Exposed to Elevated Temperatures", May 2001, (pp. 1-7).
Treated Wood "D-Blaze Fire Retardant Treated Wood: The New Generation Building Material", Mar. 2004, (pp. 1-2).
Swiss Krono, "Swiss Krono 0SB: Prefabricated Construction" Nov. 2017, (pp. 1-6).
NRC CNRC, "Fire Performance of Houses. Phase I. Study of Unprotected Floor Assemblies in Basement Fire Scenarios. Summary Report", Dec. 2008, (pp. 1-55).
Underwriters Laboratories, "Report on Structural Stability of Engineered Lumber in Fire Conditions", Sep. 2008, (pp. 1-178).
Marketwire, "Megola Updates on Hartindo AF21, a Total Fire Inhibitor", Aug. 4, 2010, (pp. 1-3).
D.G. Fraser, "Break the Flame Chain Reaction", Jun. 1962, (pp. 1-3).
Green Building Advisor, Martin Holladay, "Is OSB Airtight?", Aug. 2015, (pp. 1-4).
National Fire Protection Association, "Standard for Fire Retardant-Treated Wood and Fire-Retardant Coatings for Building Materials", Jan. 2015, (pp. 1-16).
Underwriters Laboratories, "Project 90419—Greenguard and Greenguard Gold Annual Certification Test Results", Mar. 2015, (pp. 1-21).
Structural Building Components Association, "Fire Retardants and Truss Design", Jan. 2015, (pp. 1-48).
Western Wood Preservers Institute, "Fire Retardant Wood and the 2015 International Building Code", Jan. 2015, (pp. 1-2).
Structural Building Components Association, "Research Report: Lumber Use in Type III-A Buildings", Jul. 2016, (pp. 1-8).
ASTM International, "Standard Test Method for Evaluating the Effects of Fire-Retardant Treatments and Elevated Temperatures on Strength Properies of Fire-Retardant treated Lumber", Jul. 2010, (pp. 1-6).
ASTM International, "Standard Practice for Calculating Bending Strength Design Adjustment Factors for Fire-Retardant-Treated Plywood Roof Sheathing", Oct. 2015, (pp. 1-6).
ASTM International, "Standard Practice for Calculating Design Value Treatment Adjustment Factors for Fire-Retardant-Treated Lumber", Apr. 2016, (pp. 1-7).
American Wood Preservers' Association, "Standard Method of Determining Corrosion of Metal in Contact With Treated Wood", Jan. 2015, (pp. 1-4).
Trackabout, "Asset Tracking Industry Selection Guide", Nov. 2017, (pp. 1-8).
Trackabout, "Follow-On Tracking", Jan. 2013, (pp. 1-2).
Marketwired, "Megola Obtains Class a Rating for Hartindo AF31", Nov. 2007, (pp. 1 -2).
Marketwire, "Megola Inc. Signs 'Hartindo AF21' Licensing Agreement with Eco Blu Products, Inc.", Nov. 2009, (Pags 1-2).
Conception R.P. Inc., "The Cutting Edge of Finger Jointing", Feb. 2005, (pp. 1-16).
Marketwired, "Megola Sells Hartindo AF21, a Total Fire Inhibitor, to One of the World's Largest Textile and Chemical Manufactures", Aug. 2010, (pp. 1-3).
Marketwired, "Megola Continues Sales of Hartindo AF21 to EcoBlu Products, Inc.", Dec. 2010, (pp. 1-2).
Woodworking Network, "Megola to Buy Wood-Protecting Hartindo AF21 Fire Inhibitor", Aug. 2011, (pp. 1-2).
Office Action dated Jun. 1, 2018 for U.S. Appl. No. 15/829,948 (pp. 1-13).
Hoover Inc., "Exterior Fire-X Treated Wood: Material Safety Data Sheet", Oct. 2005, (pp. 1-9).
Western Wood Products Association, "Flame-spread Ratings & Smoke-Developed Indices; Conformance with Model Building codes", Nov. 2017, (pp. 1-2).
Forest Products Laboratory, Robert H. White, Mark A. Dietenberger, "Chapter 17: Fire Safety", Feb. 1999, (pp. 1-17).
Hoover Wood Products, "Exterior Fire-X Material Safety Data Sheet", Oct. 2005, (pp. 1-5).
Hardwood Plywood & Veneer Association, "Report on Surface Burning Characteristics Determined by ASTM E 84 Twenty-Five Foot Tunnel Furnace Test Method", Jan. 2008, (pp. 1-7).
Chemical Online, "Mse Enviro-Tech Corp. Introduces Dectan", May 2007, (pp. 1).
MGB Achitecture & Design, "The Case for Tall Wood Buildings: How Mass Timber Offers A Safe, Economical, and Environmentally Friendly Altermative for Tall Building Structures", Feb. 2012, (pp. 1-240).
Jerrold E. Winandy, Qingwen Wang, Robert E. White, "Fire-Retardant-Treated Strandboard: Properties and Fire Performance", May 2007, (pp. 1-10).
Fire Protection Research Foundation, Robert Gerard, David Barber, "Fire Safety Challenges of Tall Wood Buildings", Dec. 2013, (pp. 1-162).
American Wood Council, "2015 NDS Changes", Jul. 2015, (pp. 1-66).
Charlotte Pipe and Foundry Company, "Technincal Bulletin: Understanding Flame Spread Index (FSI) and Smoke Developed Index (SDI) Ratings", Jan. 2016, (pp. 1-2).
Globe Advisors, "Study of Insurance Costs for Mid-Rise Wood Frame and Conrete Residential Buildings", Jan. 2016, (pp. 1-61).
Calgary Herald, Andrea Cox, "Homebuilder Wants Buyers to be in the Pink", Oct. 2011, (pp. 1-6).
Inland Marine Underwriters Association, "CLT and Builder's Risk", May 2017, (pp. 1-26).
Asia Pacific Fire, "Approaching the Flame Fire Fighting", Jun. 2017, (pp. 1-2).
Rubner Holzbau, "Wood Culture 21: Construction Expertise for Architects, Designers and Building Owners", Jul. 2017, (pp. 1-23).
SFPE, Peter Johnson, "Fire Safety Engineering Education—Part of a Certification Framework", Jan. 2012, (pp. 1-11).
Fire Engineeering, Len Garis, Karin Mark, "Tall Wood Buildings: Maximizing Their Safety Potential", Jan. 2018, (pp. 1-12).
AIG, "AIG Global Property Construction Risk Engineering", Nov. 2017, (pp. 1-6).
Firetect, "Safe-T-Guard Product Data Sheet", Apr. 2008, (pp. 1-6).
ICL Performance Products LP, "Material Safety Data Sheet", Jul. 2014, (pp. 1-6).
Treehugger, Lloyd Alter, "Wood Frame Construction is Safe, Really", Dec. 2014, (pp. 1-5).
LP Building Products, "Material Safety Data Sheet", May 2014, (pp. 1-4).
Lon H. Ferguson, Christopher A. Janicak, "Fundamentals of Fire Protection for the Safety Professional", Jul. 2005, (pp. 1-341).
Roseburg Forest Products, "Wood I-Joists", Jan. 2016, (pp. 1-6).
Conrad Forest Products, "Bluwood: The Color of Protection", http://www.conradfp.com/building-products-bluwood.php, Nov. 2017, (pp. 1-8).
The University of Chicago, Salen Churi, Harrison Hawkes, Noah Driggs, "Internet of Things: Risk Manager Checklist, U.S.", Dec. 2016, (pp. 1-23).
DRJ, "AAF21 Fire Treated Wood Protection Coating Applied to Lumber", Sep. 2017, (pp. 1-8).

(56) References Cited

OTHER PUBLICATIONS

Roseburg Forest Products, "Roseburg EWP Commerical Design and Installation Guide", Mar. 2017, http://www.roseburg.com., (pp. 1-48).
Fire Retardant Coatings of Texas, "FX Lumber Guard XT: Technical Data Submittal Sheet", Aug. 2018, (pp. 1).
Fire Retardant Coatings of Texas, M. Mueller, "Residential Home Builders", Oct. 2016, (pp. 1-5).
Fire Retardant Coatings of Texas, M. Mueller, "Architects", Oct. 2016, (pp. 1-5).
Fire Retardant Coatings of Texas, "FX Lumber Guard: Technical Data Submittal Sheet", Aug. 2018, (pp. 1).
Trusjoist, Weyerhauser, "Fire-Rated Assemblies and Sprinkler Systems", May 2017, (pp. 1-24).
Office Action dated Oct. 11, 2018 for U.S. Appl. No. 15/866,454 (pp. 1-12).
NFPA, "Certified Fire Protection Specialist: Candidate Handbook", Apr. 2018, (pp. 1-34).
Hoover Inc., "Pyro-Guard, Exterior Fire-X", Dec. 2017, (pp. 1-12).
Coastal Forest Products, "Multi-Ply CP-LAM Beam Assembly", Nov. 2017, (pp. 1-5).
NFPA Journal, Jesse Roman, "Build. Burn. Repeat?", Feb. 2018, (pp. 1-9).
Hoover, "2hr Fire Resistant Load Bearing Wall", Nov. 2017, (pp. 1).
Osb, "Trust Joist 2JI 210 Screenshot", Jan. 2012, (pp. 1).
Mitsui Home America, "Mitsui Homes Inc. Website and Screenshots", Dec. 2012, (pp. 1-38).
Fire Retardant Coatings of Texas, "FlameStop Screenshots", Nov. 2017, (pp. 1-2).
Fire Retardant Coatings of Texas, "FX Flame Guard Screenshot", Nov. 2017, (pp. 1).
RDR Technologies, "BanFire Screenshot", Nov. 2017, (pp. 1).
RDR Technologies, Fire Retardant Coatings of Texas, "FX Lumber Guard Screenshots", Nov. 2017, (pp. 1-2).
Fire Retardant Coatings of Texas, "Product Certifications & Featured Products Screenshots", Nov. 2017, (pp. 1-4).
Fire Retardant Coatings of Texas, "Product Certifications Screenshot", Nov. 2017, (pp. 1).
Fire Retardant Coatings of Texas, "Safety Data Sheet Screenshot", Nov. 2017, (pp. 1).
Fire Retardant Coatings of Texas, "FX Lumber Guard Screenshot", (pp. 1).
Raute, "LVL Technology Screenshot", (pp. 1).
Newstar Chemicals, Hartindo Anti Fire Products, Nov. 2017, (pp. 1).
Natural Fire Solutions, "Website Screenshots", Nov. 2017, (pp. 1-4).
RFID Journal, Ask the Experts Forum, "How Is RFID Being Used in the Construction Industry ?", Jun. 27, 2013, (2 pages).
Autodesk, Inc., "Autodesk® BIM 360 DOCS: A Cloud-Based Document Management Service for Construction Project and Project Teams," 2017 (3 Pages).
Autodesk, Inc., "Autodesk® BIM 360 DOCS: A Cloud-Based Document Management Service for Construction Project and Project Teams," 2016 (1 Pages).
Autodesk, Inc., "Autodesk® BIM 360 DOCS: A Cloud-Based Document Management Service for Construction Project and Project Teams," 2017 (2 Pages).
Autodesk, Inc., Sander Lijbers, AEC Industry Manager, Presentation at CADAC BIM Congres 2015 on Autodesk® BIM 360®, 2015 (33 Pages).
Procore Technologies, Inc, Brochure for Procore® Cloud-Based Construction Management Software, Nov. 2018, (11 Pages).
Woodworks, "Wood Brings the Savings Home", Jan. 2013, (pp. 1-8).
Procore Technologies, Inc, Brochure for Procore® Construction Operating System and Cloud-Based Construction Management System, 2018, (15 Pages).
Woodworks, "Case Study: UW West Campus Student Housing", Jan. 2013, (pp. 1-8).
Rethink Wood, "Mid-Rise Wood Construction", Apr. 2015, (pp. 1-12).
Woodworks, "Design Example: Five-Story Wood-Frame structure Over Podium Slab", Sep. 2016, (pp. 1-79).
Agacad, "Wood Framing", Jan. 2016 (pp. 1-4).
Weyerhauser, Renee Strand, "Mid-Rise, Wood-Framed, Type III Construction—How to Frame the Floor to Wall Intersection at Exterior Walls", Apr. 2016, (pp. 1-8).
Louisiana-Pacific, "FlameBlock: Assemblies and Applications", Aug. 2017, (pp. 1-8).
Globenewswire, "Shazamstocks.com Announces Profile Launch of MSE Enviro-Tech Corp.", Feb. 2008, (pp. 1-3).
Benzinga, "Megola Inc. Files Application to Underwriter Laboratories for Certification", May 2010, (pp. 1-3).
Intertek, "Report of Testing FX Lumber Guard Fire Retardant for I-Joist, Truss Joist (TJI), FLoor Joist, Ceiling Joist, amd OSB", Mar. 2013, (pp. 1-9).
Intertek, "Report of Testing FX Lumber Guard", Nov. 2014, (pp. 1-9).
Intertek, "Report of Testing FX Lumber guard Fire Retardant Coating Applied to I-Joists in a Floor Celing Assembly", Aug. 2014, (pp. 1-6).
Intertek, "Report of Testing FX Lumber Guard on SPF Lumber", Jun. 2012, (pp. 1-6).
Intertek, "Report of Testing FX Lumber Guard (Dimensional Lumber)", Apr. 2015, (pp. 1-10).
Intertek, "Report of Testing FX Lumber Guard", Aug. 2015, (pp. 1-6).
Fire Retardant Coatings of Texas, "FX Lumber Guard", Sep. 2016, (pp. 1).
Fire Retardant Coatings of Texas, "Safety Data Sheet (SDS)" Mar. 2016, (pp. 1-7).
Intertek, "Building & Construction Information Bulletin: Introduction to ASTM E84 & Frequently Asked Questions", Jun. 2017, (pp. 1-2).
Hoover Inc., "Exterior-Fire X", Nov. 2017, (pp. 1).
Hoover Inc., "Pyro-Guard", Nov. 2017, (pp. 1).
John Packer, NZ Institute of Chemistry, "Chemistry in Fire Fighting", Oct. 2017, (6 Pages).
Flamestop, "Flamestop II: Fire Retardant Spray for Wood", Jan. 2017, (pp. 1-3).
Flamestop, "Learn About Flamestop Inc.", Jan. 2017, (pp. 1-3).
Lousiana-Pacific, "FlameBlock: Assemblies and Applications", Aug. 2017, (pp. 1-8).
Magtech, "MagTech OSB", Nov. 2017, (pp. 1-2).
Hoover Inc., "Fasteners for Pyro-Guard: Interior Fire Retardant Treated Wood Products", Oct. 2013, (pp. 1).
Hoover Inc., "Code References: Fire-Retardant-Treated Wood", Mar. 2014, (pp. 1-2).
Hoover Inc., "Guidelines for Finishing and Use of Adhesives with Pyro-Guard Fire Retardant Treated Wood", Jan. 2014, (pp. 1).
Hoover Inc., "Specification for Pyro-Guard: Interior Fire Retardant Treated Wood", Apr. 2014, (pp. 1).
Hoover Inc., "Pyro-Guard Storage, Handling, and Installation Recommendations", Jan. 2014, (pp. 1).
Ledinek, "X-Press", Nov. 2017, (pp. 1-5).
Nordson Corporation, "Airless Spray Systems: The Efficient Choice for Many Liquid Painting Applications", Jan. 2004 (pp. 1-8).
USDA Forest Service, "Mass Laminated Timber in the United States: Past, Present, and Future", Nov. 2017, (pp. 1-13).
Robert H. White, Erik V. Nordheim, "Charring Rate of Wood for ASTM E 119 Exposure", Feb. 1992, (pp. 1-2).
Studiengemeinschaft Holzleimbau, "Building with Cross Laminated Timber", Jan. 2011, (pp. 1-36).
FP Innovations, M. Mohammad, "Connections in CLT Assemblies", Sep. 2011, (pp. 1-59).
NY Times, "Building with Engineered Timber", Jun. 2012, (pp. 1-3).
2012 CLT Handbook, Christian Dagenais, Robert H. White, Kuma Sumathipala, "Chapter 8—Fire", Nov. 2012, (pp. 1-55).
Fpinnovations, "CLT Handbook: Cross-Laminated Timber", Jan. 2013, (pp. 1-572).
Siemens, "Transforming Timbers into Houses", Jan. 2013, (pp. 1-3).

(56) References Cited

OTHER PUBLICATIONS

Holzforschung Austria, "Construction with Cross-Laminated Timber in Multi-Storey Buildings: Focus on Building Physics", Apr. 2013, (pp. 1-160).
Andrew Buchanan, Birgit Ostman, Andrea Frangi, "Fire Resistance of Timber Structures", Mar. 2014, (pp. 1-20).
Holzforshung Austria, "Short Report: Renewal of the abridged report on the fire resistance REI 60 according to EN 13501-2 of 'Stora Enso CLT as load-carying cross-laminated timber wall elements ≥80 mm unplanked and planked with plaster boards", Dec. 2012, (pp. 1-5).
Drjohnson Lumber Company, "Cross Laminated Timbers: Mass Timber Construction", Jan. 2016, (pp. 1).
Stora Enso, "CLT Engineer: The Stora Enso CLT Design Software User Manual," Jan. 2016, (pp. 1-118).
Stora Enso, "CLT—Cross Laminated Timber: Fire Protection", Jan. 2016, (pp. 1-51).
Wood Works, "The Case for Cross Laminated Timber", Jan. 2016, (pp. 1-212).
Lendlease, Jeff Morrow, "More with Less: An Overview of the 1st CLT Hotel in the U.S.", Apr. 2016, (pp. 1-45).
DCI Engineers, "Cross-Laminate Timber", May 2016, (pp. 1-5).
Andrew Crampton, "Cross Laminated Timber: The Future of Mid-Rise Construction," Jun. 2016, (pp. 1-5).
Callisonrtkl, "Seattle Mass Timber Tower, Feasibility Study: Design and Construction Analysis" Aug. 2016, (pp. 1-34).
Fire Engineering, "Charred Wood and Fire Resistance", Oct. 2016, (pp. 1-6).
Rubner Holzbau, "Timber Engineering in the 21st Century", Jan. 2017, (pp. 1-21).
Metroscape, "Building the Future: New Technology and the Changing Workforce", Jan. 2017, (pp. 1-32).
Stora Enso, "Stora Enso CLT Technical Brochure", Feb. 2017, (pp. 1-32).
Spiritos Properties, "Mass Timber—101 and Beyond", Apr. 2017, (pp. 1-17).
Treehugger, Lloyd Alter, "Katerra to Build Giant New CLT Factory in Spokane, Washington", Sep. 2017, (pp. 1-16).
Fire Engineering, Phillip Paff, "Mass Timber Construction in High-Rise Residential Structures: How Safe is it?", Jan. 2018, (pp. 1-9).
XLam, "Technical: XLam Panel Specifications", Jan. 2018, (pp. 11).
Archpaper, Antonio Pacheco, "Katerra's approach could make factory construction a model for the future", Apr. 2018, (pp. 1-4).
Spraying Systems Co., "Industrial Hydraulic Spray Products", Jan. 2015, (pp. 1-220).
Kallesoe Machinery, "CLT Production Line", Nov. 2017, (pp. 1-5).
Metsawood, "Kerto LVL Screenshot", Nov. 2017, (pp. 1).
Pendu Manufacturing, Inc., North Holland, PA, Slide Show of Youtube Video of a Pendu Automated Wood Board Dip Tank System in Operation, Feb. 8, 2012, (30 Pages).
Rethink Wood, "Designing for Fire Protection: Expanding the Possibilities of Wood Design", Aug. 2015, (pp. 1-8).
Coastal Forest Products, "CP-LAM 2.0E Design Properties & Floor Beams", Nov. 2017, (pp. 1-5).
Kallesoe Machinery A/S, "System Solutions for Laminated Wood Products", Nov. 2017, (pp. 1-3).
Office Action dated Nov. 9, 2018 for U.S. Appl. No. 15/866,456 (pp. 1-11).
Dealer News, "SiteOne Introduces New LESCO Smart Guided Precision Spray System", Nov. 5, 2018, https://www.rurallifestyledealer.com/articles/7715-siteone-introduc , (4 Pages).
Erdal Ozkan, Ohio State University Professor and Extension Agriculture Engineer, "One-of-a-kind Intelligent Sprayer Being Developed in Ohio", Jun. 20, 2018, https://www.michfb.com/MI/Farm-News/One-of-a-kind-Intelligent-sprayer-being-developed-in-Ohio/, (6 Pages).
Chip Tuson, Ohio State News, "World's First "Intelligent" Sprayer", Aug. 2, 2018, https://news.osu.edu/the-worlds-first-intelligent-sprayer/, (4 Pages).
3M, Building and Commerical Services Division, "Brochure for 3M FireDam™ Spray 200 Sealing Agent", 2009,(2 Pages).
Wildfire Defense Systems, Inc., Web Brochure on WDSPRo Mobile Application for Wildfire Hazard Property Assessment, 2017, (3 Pages).
Wildfire Defense Systems, Inc., Web Brochure on WDSFire Wildfire Reporting Dashboard Service for Wildfire Risk During an Active Wildfire, 2017, (2 Pages).

\* cited by examiner

HIGH-RISE MASS TIMBER APARTMENT BUILDING
CONSTRUCTED FROM CLASS-A FIRE-PROTECTED
CROSS-LAMINATED TIMBER (CLT) BUILDING COMPONENTS

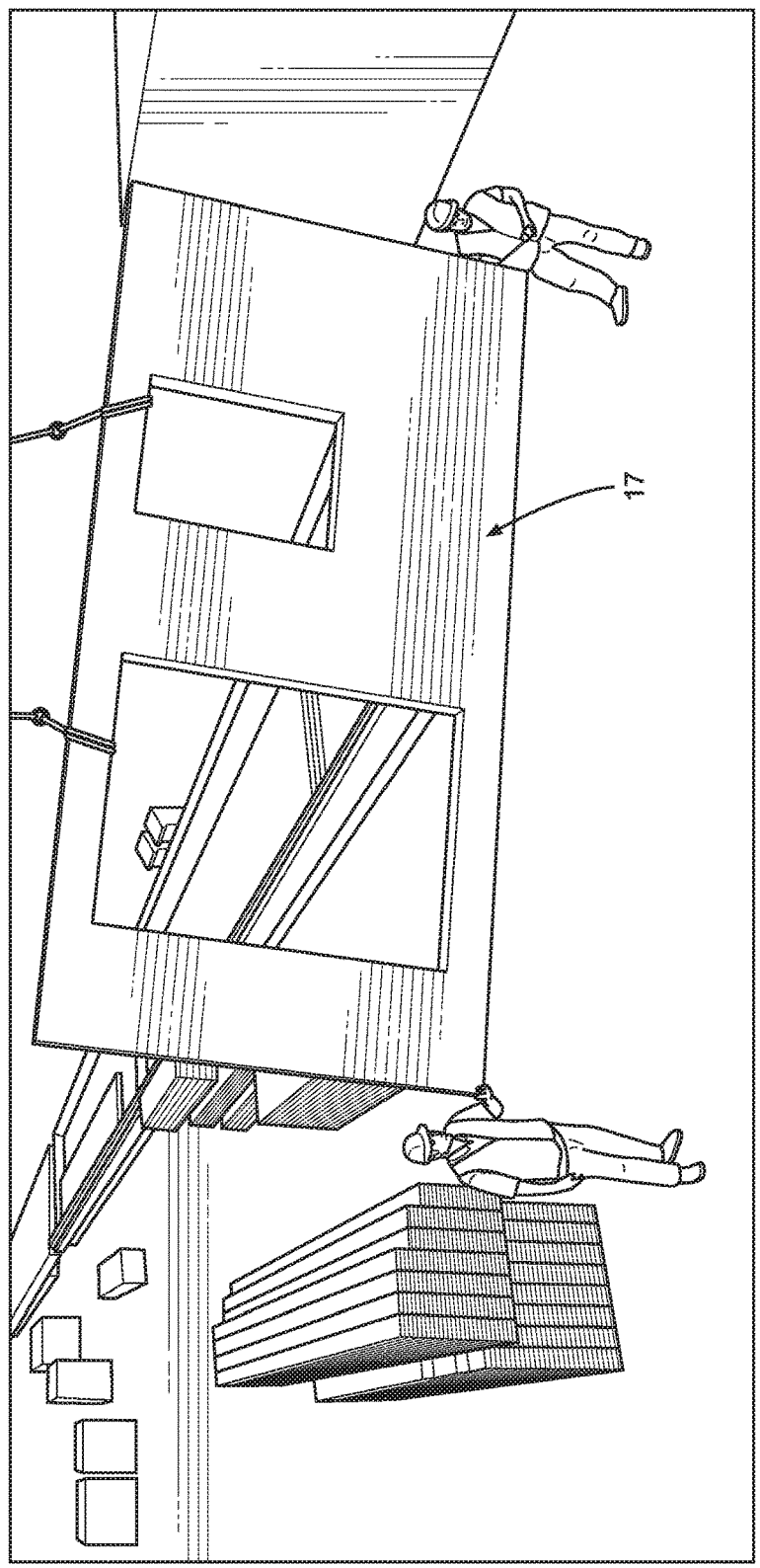

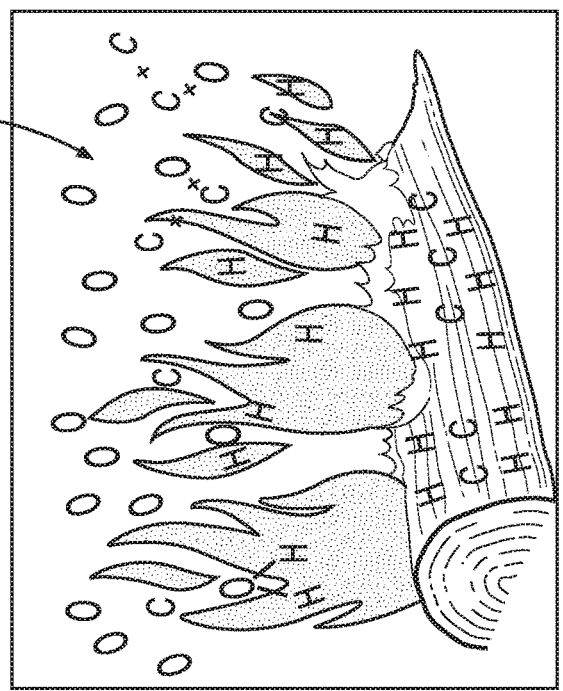
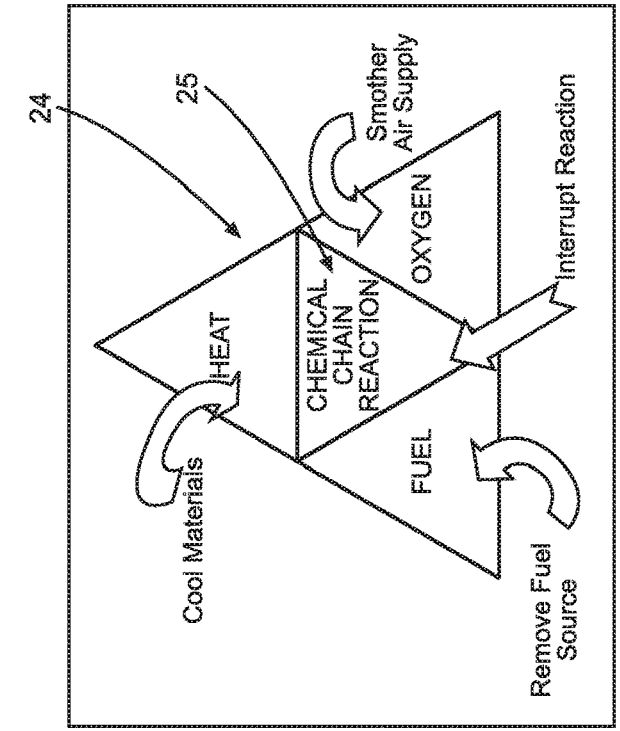
FIG. 6B
(PRIOR ART)

DESIGNING AND CONSTRUCTING A MULTI-STORY MASS TIMBER BUILDING USING CLASS-A FIRE-PROTECTED CROSS-LAMINATED TIMBER (CLT) BUILDING COMPONENTS

PHASE 1: DURING THE ARCHITECTURAL DESIGN PHASE

SPECIFY THE NEW CROSS-LAMINATED TIMBER (CLT) BUILDING TO USE:
CLASS-A FIRE-PROTECTED CROSS-LAMINATED TIMBER (CLT) PANEL COMPONENTS,
AND
ON JOB-SITE CLASS-A FIRE-PROTECTED SPRAY COATING TREATMENT
OF ALL RAW/UNTREATED AND TREATED CLT BUILDING COMPONENTS
SO AS TO ENSURE THE ADEQUATE FIRE-INHIBITING COATING OF ALL WOOD
USED ON THE BUILDING CONSTRUCTION SITE.

PHASE 2: DURING THE CONSTRUCTION PHASE

CONSTRUCT THE BUILDING IN ACCORDANCE WITH THE DESIGN SPECIFICATIONS
SO AS TO PROVIDE A MULTI-STORY MASS TIMBER BUILDING HAVING
CLASS-A FIRE PROTECTION AND IMPROVED RESISTANCE AGAINST TOTAL
FIRE DESTRUCTION.

FIG. 7

FLAME SPREAD AND SMOKE DEVELOPMENT CHARACTERISTICS
OF SPRUCE PINE FIR (SPF) AND DOUGLAS FIR CLASS-A FIRE PROTECTED LUMBER

| Flame Spread & Smoke Developed Indexes of AAF21 (FT) Protected Lumber | Flame Spread | Smoke Developed |
|---|---|---|
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 9

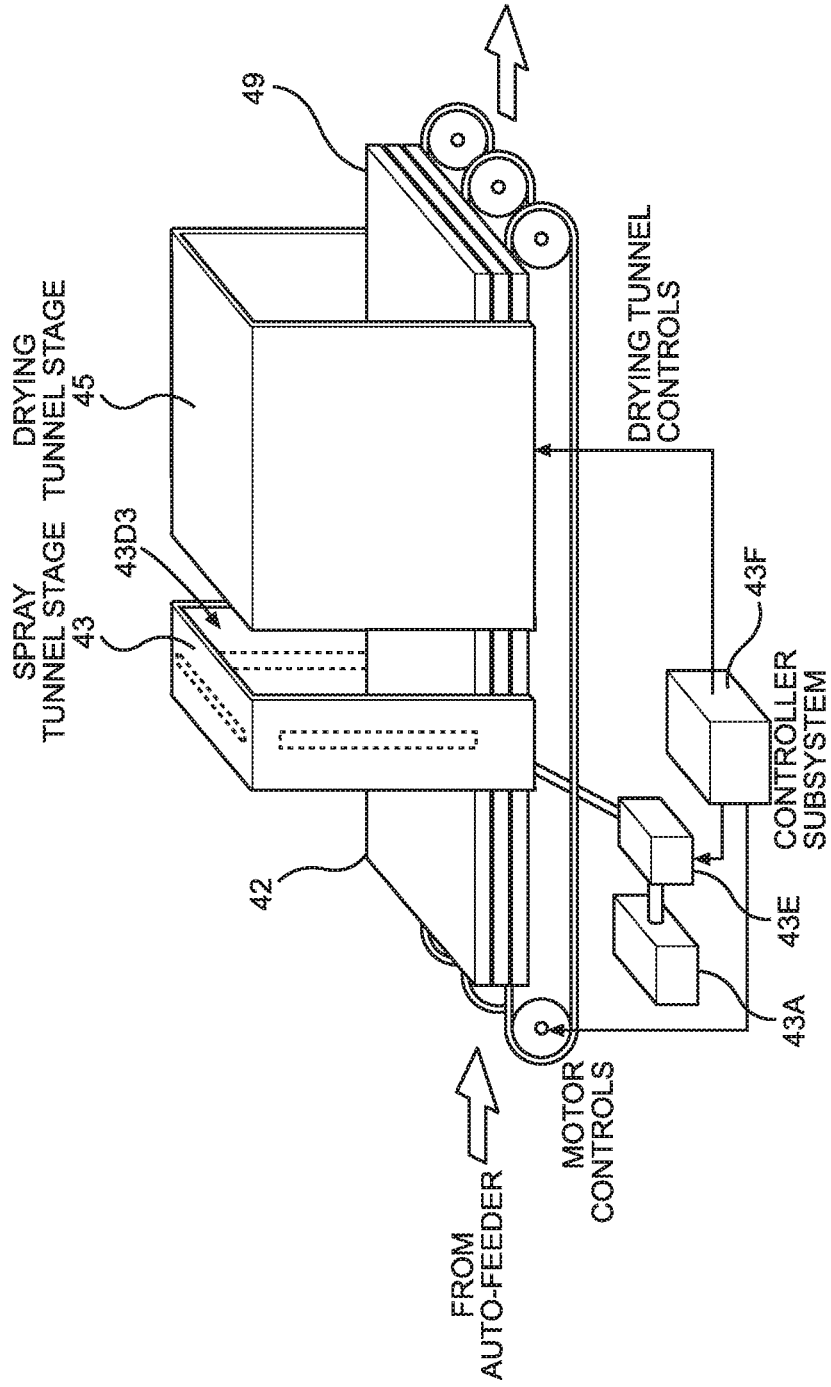

METHOD OF PRODUCING CLASS-A FIRE-PROTECTED CROSS-LAMINATED TIMBER (CLT) IN AN AUTOMATED LUMBER FACTORY

A: IN AN AUTOMATED LUMBER FACTORY, INSTALLING AND OPERATING A HIGH-SPEED FIRE-PROTECTED LUMBER PRODUCTION LINE, PROVIDED WITH A RESERVOIR TANK WITH A LARGE SUPPLY OF CLEAN FIRE-INHIBITING CHEMICAL (CFIC) LIQUID THAT IS CONTINUOUSLY SUPPLIED TO THE AUTOMATED IN-LINE CFIC LIQUID DIP COATING STAGE OF THE LUMBER FACTORY, INSTALLED BEFORE AN ADHESIVE STAGE ALONG THE PRODUCTION LINE

B: LOADING A SUPPLY OF UNTREATED SHORT-LENGTH TIMBER ONTO THE CONVEYOR-CHAIN TRANSPORT MECHANISM INSTALLED ALONG THE PRODUCTION LINE.

C: LOADING THE UNTREATED SHORT-LENGTH LUMBER INTO THE CONTROLLED DRYING STAGE OF THE PRODUCTION LINE SO TO PRODUCE SUITABLY DRIED SHORT-LENGTH LUMBER FOR SUPPLY TO THE FINGER-JOINTING PROCESSING STAGE.

D: SUPPLYING CONTROLLABLY-DRIED SHORT-LENGTH LUMBER INTO THE FINGER-JOINTING PROCESSING STAGE, AND PRODUCING EXTENDED-LENGTH FINGER-JOINTED TIMBER PIECES.

FIG. 11A

FLAME SPREAD AND SMOKE DEVELOPMENT CHARACTERISTICS
OF SPRUCE PINE FIR (SPF) AND DOUGLAS FIR CLASS-A FIRE PROTECTED LUMBER

| Flame Spread & Smoke Developed Indexes of AAF21 (FT) Protected Lumber | Flame Spread | Smoke Developed |
|---|---|---|
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 13

METHOD OF PRODUCING CLASS-A FIRE-PROTECTED GLUE LAMINATED (GLULAM) TIMBER PRODUCTS IN AN AUTOMATED LUMBER FACTORY

A: IN AN AUTOMATED LUMBER FACTORY, INSTALLING AND OPERATING A HIGH-SPEED FIRE-PROTECTED LUMBER PRODUCTION LINE, PROVIDED WITH A RESERVOIR TANK WITH A LARGE SUPPLY OF CLEAN FIRE-INHIBITING CHEMICAL (CFIC) LIQUID THAT IS CONTINUOUSLY SUPPLIED TO THE AUTOMATED IN-LINE CFIC LIQUID DIP COATING STAGE OF THE LUMBER FACTORY, INSTALLED BEFORE AN ADHESIVE STAGE ALONG THE PRODUCTION LINE

B: LOADING A SUPPLY OF UNTREATED SHORT-LENGTH TIMBER ONTO THE CONVEYOR-CHAIN TRANSPORT MECHANISM INSTALLED ALONG THE PRODUCTION LINE.

C: LOADING THE UNTREATED SHORT-LENGTH LUMBER INTO THE CONTROLLED DRYING STAGE OF THE PRODUCTION LINE SO TO PRODUCE SUITABLY DRIED SHORT-LENGTH LUMBER FOR SUPPLY TO THE FINGER-JOINTING PROCESSING STAGE.

D: SUPPLYING CONTROLLABLY-DRIED SHORT-LENGTH LUMBER INTO THE FINGER-JOINTING PROCESSING STAGE, AND PRODUCING EXTENDED-LENGTH FINGER-JOINTED TIMBER PIECES.

1ST

FIG. 15A

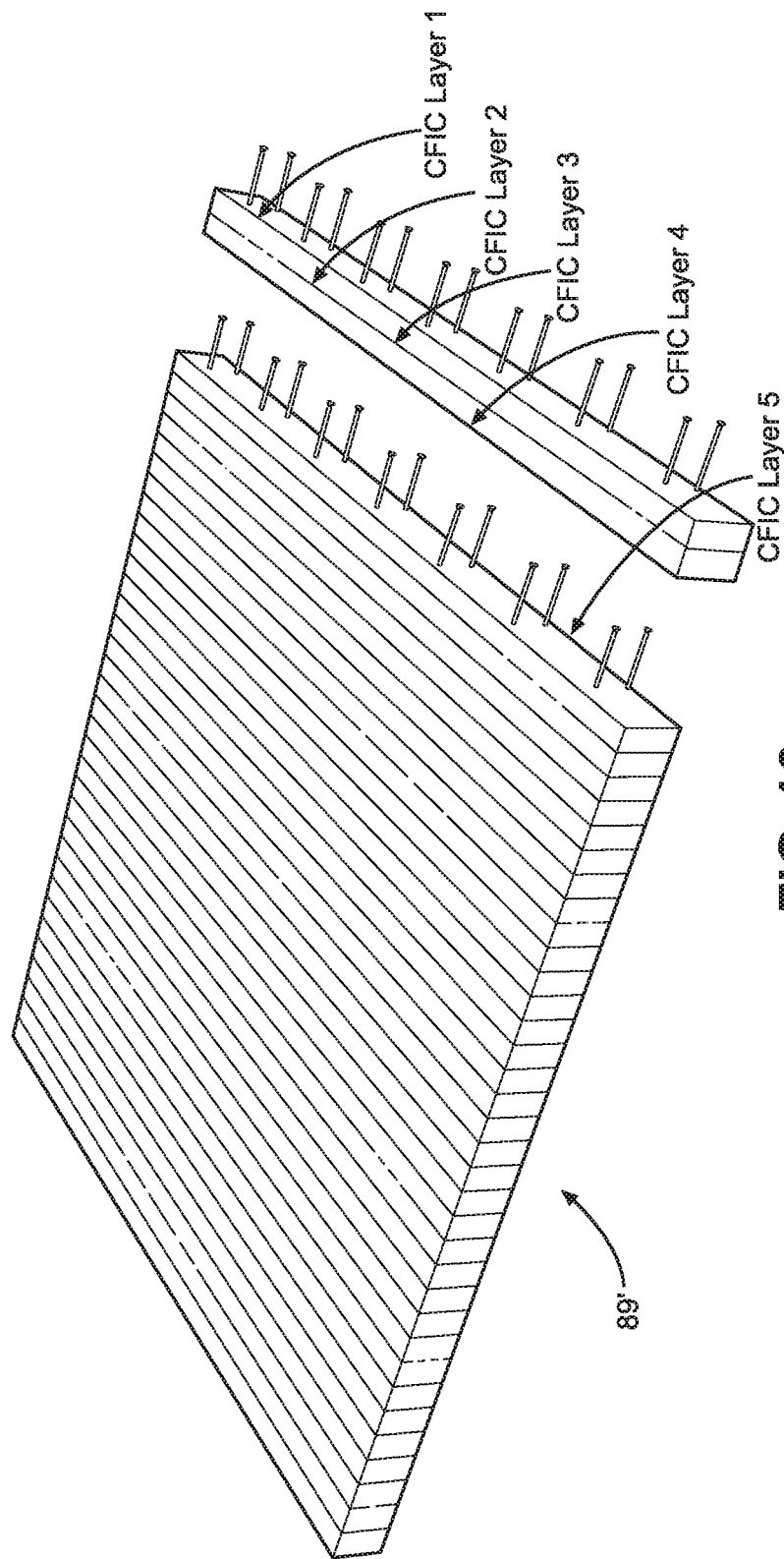

FLAME SPREAD AND SMOKE DEVELOPMENT CHARACTERISTICS OF
SPRUCE PINE FIR (SPF) AND DOUGLAS FIR CLASS-A FIRE-PROTECTED LUMBER

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 17

METHOD OF PRODUCING CLASS-A FIRE-PROTECTED NAIL-LAMINATED TIMBER (NLT) IN AN AUTOMATED LUMBER FACTORY

A: IN AN AUTOMATED LUMBER FACTORY, INSTALLING AND OPERATING A HIGH-SPEED FIRE-PROTECTED LUMBER PRODUCTION LINE, PROVIDED WITH A RESERVOIR TANK WITH A LARGE SUPPLY OF CLEAN FIRE-INHIBITING CHEMICAL (CFIC) LIQUID THAT IS CONTINUOUSLY SUPPLIED TO THE AUTOMATED IN-LINE CFIC LIQUID DIP COATING STAGE OF THE LUMBER FACTORY, INSTALLED BEFORE AN ADHESIVE STAGE ALONG THE PRODUCTION LINE

B: LOADING A SUPPLY OF UNTREATED SHORT-LENGTH TIMBER ONTO THE CONVEYOR TRANSPORT MECHANISM INSTALLED ALONG THE PRODUCTION LINE OF THE PRODUCTION LINE.

C: LOADING THE UNTREATED SHORT-LENGTH LUMBER INTO THE CONTROLLED DRYING STAGE OF THE PRODUCTION LINE SO TO PRODUCE SUITABLY DRIED SHORT-LENGTH LUMBER FOR SUPPLY TO THE FINGER-JOINTING PROCESSING STAGE.

D: SUPPLYING CONTROLLABLY-DRIED SHORT-LENGTH LUMBER INTO THE FINGER-JOINTING PROCESSING STAGE, AND PRODUCING EXTENDED-LENGTH FINGER-JOINTED TIMBER PIECES.

FIG. 19A

METHOD OF PRODUCING MASS TIMBER BUILDINGS HAVING CLASS-A FIRE-PROTECTION AND IMPROVED RESISTANCE AGAINST FIRE DESTRUCTION

A: THE CLEAN FIRE-PROTECTION SPRAY COATING TECHNICIAN RECEIVES A REQUEST FROM A BUILDER TO APPLY CLEAN FIRE-INHIBITING CHEMICAL (CFPC) LIQUID COATING ON ALL EXPOSED INTERIOR SURFACES OF UNTREATED AND/OR TREATED MASS TIMBER CLC COMPONENTS USED TO CONSTRUCT A MASS TIMBER BUILDING AT A PARTICULAR SITE LOCATION

B: THE CLEAN FIRE-PROTECTION SPRAY COATING TECHNICIAN RECEIVES BUILDING CONSTRUCTION SPECIFICATIONS, ANALYZES SAME TO DETERMINE SQUARE FOOTAGE OF CLEAN FIRE-INHIBITING CHEMICAL (CFIC) LIQUID TO BE SPRAY APPLIED TO THE INTERIOR SURFACES OF THE MASS TIMBER CLC BUILDING, COMPUTE THE QUANTITY OF CFIC LIQUID REQUIRED TO DO THE SPRAY JOB SATISFACTORILY, AND GENERATE A JOB PRICE QUOTE FOR THE JOB AND SEND PRICE QUOTE TO THE BUILDER FOR REVIEW AND APPROVAL.

C: AFTER THE BUILDER ACCEPTS THE JOB PRICE QUOTE, THE BUILDER ORDERS THE CLEAN FIRE-PROTECTION SPRAY TEAM TO BEGIN PERFORMING THE ON-SITE WOOD COATING SPRAY JOB IN ACCORDANCE WITH THE BUILDING CONSTRUCTION SCHEDULE.

D: THEN AFTER THE BUILDER COMPLETES EACH PREDETERMINED SECTION OF THE MASS TIMBER BUILDING WHERE MASS TIMBER BUILDING PANELS ARE INSTALLED, BUT BEFORE ANY WALLBOARD HAS BEEN INSTALLED, THE SPRAY TECHNICIAN PROCURES CFIC LIQUID FROM AN AUTHORIZED BLENDER WITH CHAIN OF CUSTODY DOCUMENTATION, AND THEN FILLS THE RESERVOIR TANK OF AN AIRLESS LIQUID SPRAYING SYSTEM WITH THE CFIC LIQUID, AND USES A SPRAY GUN TO SPRAY THE CFIC LIQUID OVER ALL EXPOSED INTERIOR WOOD SURFACES IN THE COMPLETED SECTION OF THE MASS TIMBER BUILDING.

E: WHEN THE COMPLETED SECTION OF THE BUILDING IS SPRAY COATED WITH CFIC LIQUID, THE COMPLETED BUILDING SECTION IS CERTIFIED AND MARKED AS CERTIFIED, WITH A BARCODED/RFID-TAGGED CERTIFICATE OF SPRAYING AND INSPECTION, FOR CERTIFICATION, VERIFICATION AND DOCUMENTATION PURPOSES.

F: AS EACH SECTION OF THE MASS TIMBER CLC BUILDING IS CONSTRUCTED ACCORDING TO THE CONSTRUCTION SCHEDULE, THE SPRAY COATING TEAM CONTINUES TO SPRAY COAT THE COMPLETED SECTION, AND CERTIFY AND MARK, WITH BARCODED/RFID-TAGGED CERTIFICATE OF SPRAYING AND INSPECTION, AS CERTIFIED EACH SUCH COMPLETED SPRAY COATED SECTION OF THE BUILDING.

G: WHEN ALL SECTIONS OF THE MASS TIMBER BUILDING UNDER CONSTRUCTION HAVE BEEN COMPLETELY SPRAY COATED WITH CLEAN FIRE INHIBITING CHEMICAL (CFIC) LIQUID, AND CERTIFIED AS SUCH, THE SPRAY TECHNICIANS REMOVE SPRAY EQUIPMENT FROM THE BUILDING, AND BUILDER PROCEEDS TO THE NEXT STAGES OF CONSTRUCTION AND COMPLETES THE CONSTRUCTION ACCORDING TO ARCHITECTURAL AND BUILDING SPECIFICATIONS AND PLANS.

H: THE SPRAY TECHNICIAN THEN ISSUES A CERTIFICATE OF COMPLETION WITH RESPECT TO THE APPLICATION OF CLEAN FIRE INHIBITING CHEMICAL (CFIC) LIQUID TO ALL EXPOSED WOOD SURFACES ON THE INTERIOR OF THE MASS TIMBER BUILDING DURING ITS CONSTRUCTION PHASE, THEREBY PROTECTING THE BUILDING FROM RISK OF TOTAL DESTRUCTION BY FIRE.

FIG. 25B

FLAME SPREAD AND SMOKE DEVELOPMENT CHARACTERISTICS OF
SPRUCE PINE FIR (SPF) AND DOUGLAS FIR, AFTER BEING SPRAY-COATED WITH CFIC LIQUID

| Flame Spread & Smoke Developed Indexes of AAF31 (FT) Protected Lumber | | |
|---|---|---|
| | Flame Spread | Smoke Developed |
| Spruce Pine Fir | 5 | 70 |
| Douglas Fir | 5 | 50 |
| 1. Tested in accordance with ASTM E84 and UL 723<br>2. Additionally, the flame front did not progress more than 10.5 feet beyond the centerline of the burners at any time during the test. | | |

FIG. 27

GRAPHICAL USER INTERFACE OF THE MOBILE APPLICATION FOR USE BY BUILDING/PROPERTY OWNERS, INSURANCE COMPANIES, AND OTHER STAKEHOLDERS TO REVIEW AND MONITOR THE SPRAY TREATMENT PROJECT AT A PARTICULAR MASS TIMBER BUILDING

GRAPHICAL USER INTERFACE OF THE MOBILE APPLICATION FOR USE BY BUILDING/PROPERTY OWNERS, INSURANCE COMPANIES, AND OTHER STAKEHOLDERS TO REVIEW WHEN A PLANNED ONSITE MASS TIMBER BUILDING SPRAY TREATMENT PROJECT IS PLANNED

**GRAPHICAL USER INTERFACE OF THE MOBILE APPLICATION FOR
USE BY ON-SITE FIRE-PROTECTION SPRAY ADMINISTRATORS AND TECHNICIANS
TO GENERATE AND REVIEW REPORTS ON REGISTERED USERS ASSOCIATED WITH
PARTICULAR ON-SITE CLASS-A FIRE-PROTECTION SPRAY PROJECTS**

METHOD OF VERIFYING AND DOCUMENTING ON-SITE SPRAY-APPLIED CLASS-A FIRE-PROTECTION OVER EXTERIOR WOOD SURFACES IN A MASS TIMBER BUILDING DURING CONSTRUCTION

A: AFTER A BUILDER COMPLETES EACH PREDETERMINED SECTION OF A MASS TIMBER BUILDING WHERE MASS TIMBER BUILDING COMPONENTS ARE USED, BUT BEFORE ANY WALLBOARD HAS BEEN INSTALLED, THE SPRAY TECHNICIAN USES AN AIRLESS LIQUID SPRAYING SYSTEM FILLED WITH CLEAN FIRE INHIBITING CHEMICAL (CFIC) LIQUID TO SPRAY THE CFIC LIQUID OVER ALL EXPOSED INTERIOR WOOD SURFACES IN THE COMPLETED SECTION OF THE BUILDING.

↓

B: WHEN THE COMPLETED SECTION OF THE BUILDING IS SPRAY COATED WITH CFIC LIQUID, THE COMPLETED BUILDING SECTION IS CERTIFIED AND MARKED AS CERTIFIED FOR VISUAL INSPECTION AND INSURANCE DOCUMENTATION PURPOSES.

↓

C: AS EACH SECTION OF THE MASS TIMBER CLC BUILDING IS CONSTRUCTED ACCORDING TO THE CONSTRUCTION SCHEDULE, THE SPRAY COATING TEAM CONTINUES TO SPRAY COAT THE COMPLETED SECTION, AND CERTIFY AND MARK (USING CERTIFICATES OR STAMPING) EACH SUCH COMPLETED SPRAY-COATED SECTION OF THE MASS TIMBER BUILDING UNDER CONSTRUCTION

↓

D: THE SPRAY TECHNICIAN THEN ISSUES A CERTIFICATE OF COMPLETION WITH RESPECT TO THE APPLICATION OF CLEAN FIRE INHIBITING CHEMICAL (CFIC) LIQUID TO ALL EXPOSED WOOD SURFACES ON THE INTERIOR OF THE MASS TIMBER BUILDING DURING ITS CONSTRUCTION PHASE, THEREBY PROTECTING THE BUILDING FROM RISK OF TOTAL DESTRUCTION BY FIRE.

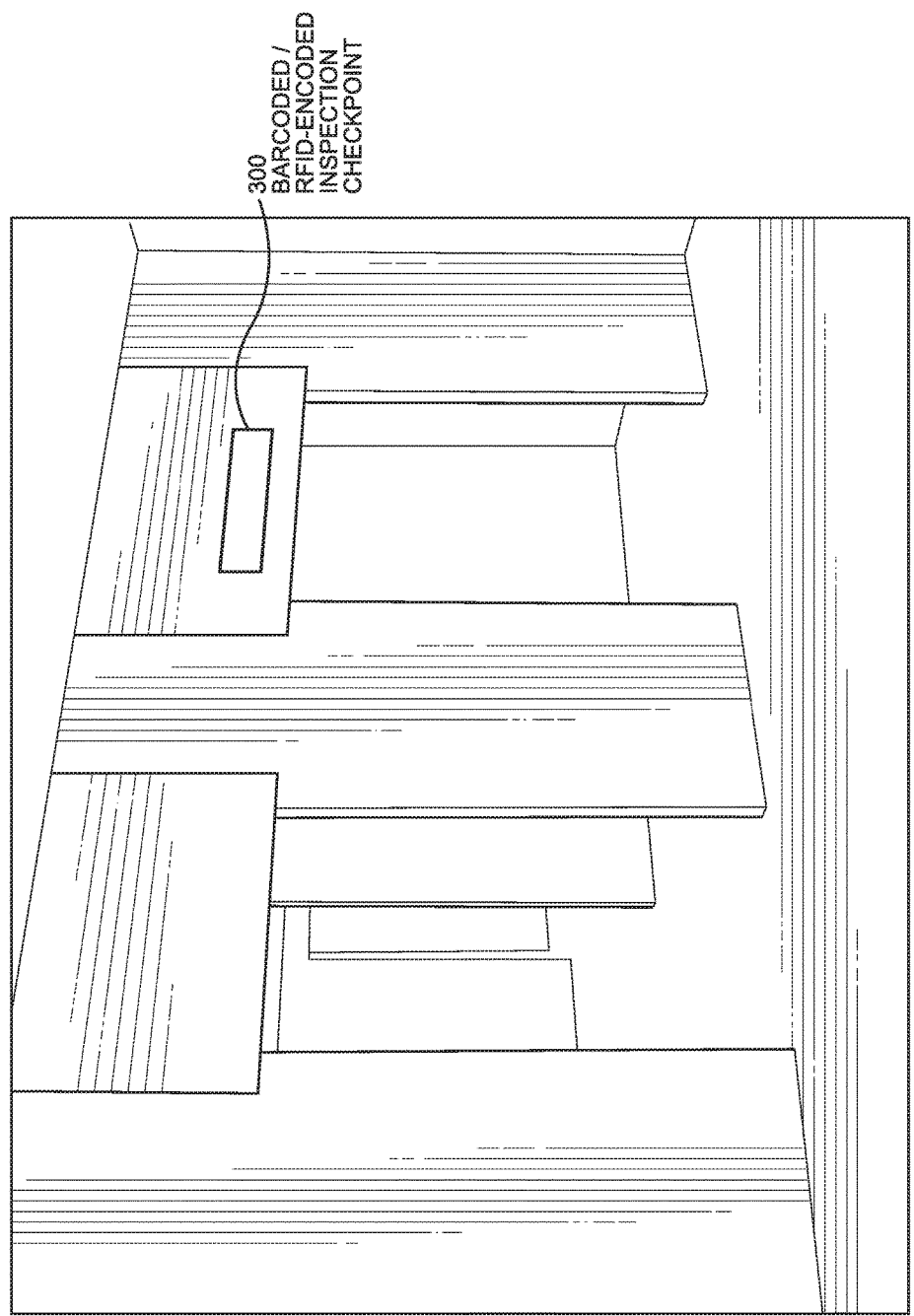

BARCODED/RFID-TAG ENCODED INSPECTION CHECKPOINT WITH INTEGRATED
CERTIFICATIONS BY SPRAY TECHNICIAN AND SPRAY SUPERVISOR

PROJECT #: _____
LOCATION: _____
BUILDING #: _____
SECTION #: _____
FLOOR #: _____
SUITE/ROOM #: _____
DATE: _____
SPRAY TECH: _____
SPRAY SUPERVISOR: _____
SITE SUPERVISOR: _____

CERTIFICATION BY SPRAY TECHNICIAN

I, _____, a Certified M-Fire Suppression Spray Technician, hereby certify that I sprayed the above-specified Section of the named Building on the date specified above, using Clean Fire Inhibiting Chemical (CFIC) Liquid so as to provide with Building Section with Class-A Fire-Protection as certified by QAI Laboratories on _____ following ASTM E84 Engineering Test Standards.

Spray Technician Signature _____ Date: _____

CERTIFICATION BY SPRAY SUPERVISOR

I, _____, a Certified M-Fire Suppression Spray Supervisor, hereby certify that, under my direct supervision, the above-specified Building has been sprayed on the date specified above, using Clean Fire Inhibiting Chemical (CFIC) Liquid to provide with Building Section with Class-A Fire-Protection as Certified By QAI Laboratories on _____ following ASTM E84 Engineering Test Standards.

Spray Supervisor Signature _____ Date: _____

FIG. 37

GRAPHICAL USER INTERFACE OF THE MOBILE APPLICATION FOR USE BY CUSTOMERS SHOWING DETAILS FOR AN ORDER FOR A CUSTOM PREFABRICATED MASS TIMBER BUILDING, OR MASS TIMBER BUILDING COMPONENT

GRAPHICAL USER INTERFACE OF THE MOBILE APPLICATION FOR USE BY PROJECT ADMINISTRATOR SHOWING DETAILS FOR AN ORDER FOR A PRE-SPECIFIED PREFABRICATED MASS TIMBER BUILDING, OR MASS TIMBER BUILDING COMPONENT

GRAPHICAL USER INTERFACE OF THE MOBILE APPLICATION FOR USE BY PROJECT ADMINISTRATOR SHOWING PROGRESS DETAILS FOR A PROJECT RELATING TO THE FACTORY-FABRICATION OF A MASS TIMBER BUILDING, OR COMPONENT

GRAPHICAL USER INTERFACE OF THE MOBILE APPLICATION FOR USE BY PROJECT ADMINISTRATOR SHOWING THE STATUS OF A PURCHASE ORDER FOR A PREFABRICATED MASS TIMBER BUILDING, OR COMPONENT

METHOD OF QUALIFYING MASS TIMBER BUILDING FOR REDUCED PROPERTY INSURANCE BASED ON VERIFIED AND DOCUMENTED CLEAN FIRE INHIBITING CHEMICAL (CFIC) LIQUID DIP-COATING OF WOOD PIECES DURING FABRICATION OF CLASS-A FIRE-PROTECTED WOOD BUILDING COMPONENTS FOR PREFABRICATED WOOD-FRAMED BUILDINGS

A: DIP-COATING ALL WOOD IN A CLEAN FIRE INHIBITING CHEMICAL (CFIC) LIQUID DURING THE FABRICATION OF CLASS-A FIRE-PROTECTED MASS TIMBER BUILDING COMPONENTS FOR CONSTRUCTING AN ORDERED PREFABRICATED BUILDING WITHIN A PREFABRICATED MASS TIMBER BUILDING FACTORY

↓

B: VERIFYING AND DOCUMENTING THE CFIC LIQUID DIP-COATING AND CLASS-A FIRE PROTECTION TREATMENT OF ALL WOOD PIECES USED TO CONSTRUCT MASS TIMBER BUILDING COMPONENTS FOR THE PREFABRICATED MASS TIMBER BUILDING, BY CAPTURING TIME/DATE STAMPED DIGITAL IMAGES AND VIDEOS OF CFIC LIQUID DIP-COATING OF WOOD PIECES, AND CERTIFICATES OF CFIC LIQUID DIP-COATING WITHIN THE FACTORY.

↓

C: WIRELESSLY TRANSMITTING THE FACTORY-COLLECTED CLASS-A FIRE-PROTECTION TREATMENT DATA TO A CENTRAL NETWORK DATABASE ON THE SYSTEM NETWORK TO UPDATE THE CENTRAL NETWORK DATABASE.

↓

D: A COMPANY UNDERWRITING PROPERTY INSURANCE FOR THE MASS TIMBER BUILDING ACCESSING THE CENTRAL NETWORK DATABASE ON THE SYSTEM NETWORK, TO VERIFY THE DATABASE RECORDS MAINTAINED FOR EACH PREFABRICATED CLASS-A FIRE-PROTECTED MASS TIMBER BUILDING, TO QUALIFY THE BUILDING OWNER FOR LOWER PROPERTY INSURANCE PREMIUMS, BASED ON THE VERIFIED AND DOCUMENTED CLASS-A FIRE-PROTECTION STATUS OF THE PREFABRICATED MASS TIMBER BUILDING, AND ITS CLASS-A FIRE-PROTECTED WOOD-FRAME BUILDING COMPONENTS

↓

E: UPON THE OUTBREAK OF A FIRE IN THE INSURED MASS TIMBER BUILDING, THE LOCAL FIRE DEPARTMENTS INSTANTLY AND REMOTELY ASSESSING THE CENTRAL NETWORK DATABASE USING A MOBILE APPLICATION, SO AS TO QUICKLY DETERMINE THE CLASS-A FIRE-PROTECTED STATUS OF THE MASS TIMBER BUILDING BY VIRTUE OF MANUFACTURING PROCESS RECORDS ON THE SPECIFIC MASS TIMBER BUILDING, AND INFORM FIREMAN TASKED WITH FIGHTING THE FIRE THAT THE MASS TIMBER BUILDING HAS BEEN TREATED WITH CLASS-A FIRE-PROTECTION DEFENSE AGAINST FIRE.

FIG. 47

MASS TIMBER BUILDING FACTORY SYSTEM FOR PRODUCING PREFABRICATED CLASS-A FIRE-PROTECTED MASS TIMBER BUILDING COMPONENTS FOR USE IN CONSTRUCTING PREFABRICATED CLASS-A FIRE-PROTECTED MASS TIMBER BUILDINGS

RELATED CASES

The present patent application is a Continuation-in-Part (CIP) of copending patent application Ser. No. 15/866,454 filed Jan. 9, 2018 which is a Continuation-in-Part (CIP) of copending patent application Ser. No. 15/829,914 filed Dec. 2, 2017; and copending patent application Ser. No. 15/866,456 filed Jan. 9, 2018 which is a Continuation-in-Part (CIP) of copending patent application Ser. No. 15/829,914 filed Dec. 2, 2017, each said patent application being commonly owned by M-Fire Suppression, Inc., and incorporated herein by reference as if fully set forth herein.

BACKGROUND OF INVENTION

Field of Invention

The present invention is directed toward improvements in mass timber building construction, and more particularly, the procurement, prefabrication and construction of multi-story mass timber buildings made from fire-protected laminated timber products, offering improved defense against the ravaging and destructive forces of fire.

Brief Description of the State of Knowledge in the Art

Over the past few decades, there has been a movement towards using engineering wood products (EWPs) based on young immature timber growth, for reasons of sustainability, and the fact that old mature timber is either not available or too expensive to meet current market demands in the wood-framed building industry. When using engineered wood products EWPs, it is possible to fabricate wood beams, panels and assemblies that can span great lengths and support great loads, while being manufactured from small, young and immature trees, such as Fir, Spruce and Pine.

Among the many different kinds of EWP innovations developed over the years, mass timber products have been receiving growing interest. This interest is due primarily on the capacity of certain mass timber products (e.g. cross-laminated timber or CLT) to replace structural steel and concrete and many applications, and allow architects to design and construct high-rise and multi-story buildings 1 from mass timber CLT, as illustrated in FIG. 1A.

As shown in FIG. 1B, conventional mass timber building products can be organized into two product categories comprising: (i) glued products, including glue laminated timber (GLT) 2, structural composite lumber (SCL) 3, and cross-laminated timber (CLT) 4; and (ii) non-glued products, including dowel laminated timber (DLT) 5, nail laminated timber (NLT) 6, cross nail laminated timber (CNLT) 7, and interlocking cross laminated timber (ICLT) 8.

For over 20 years, conventional CLT products have been widely used in Europe, and in recent years, CLT products have been gaining ground in North America. The reasons for this growing interest is that CLT technology enables architects to design and construct buildings having great height and the capacity to sustain great loads presented during Earthquakes and other natural disasters. The environmental and construction benefits of CLT make it a growth industry, with more manufacturing plants opening each year.

Cross-laminated timber (CLT) is a promising wood-based structural component and has potential to provide cost-effective building solutions for residential, commercial and institutional buildings as well as large industrial facilities. Market acceptance of CLT requires that it meets the applicable building code requirements. CLT elements are used in building systems in a similar manner to concrete slabs and solid wall elements, as well as those from heavy timber construction, by avoiding concealed spaces due to the use of massive timber elements, thus reducing the risk of fire spread beyond its point of origin. Moreover, CLT construction typically uses CLT panels for floor and load-bearing walls, which allow fire-rated compartmentalization, thus again reducing the risk of fire spread beyond its point of origin.

In general, each CLT panel is custom built to the designer's specification. CLT panel size is governed by the press which typically measures 15 m×3.5 m. Panel thickness depends on the intended load and span. The most CLT panels have common configurations of 3, 5 or 7 layers, with cumulative panel thicknesses between 60 mm and 250 mm. The cross lamination feature of CLT panels provides dimensional stability, strength and rigidity. This makes CLT a viable alternative to conventional wood-framing, concrete, masonry and steel in many applications. CLT panels can be used to construct an entire mass timber building, as both the lateral and vertical load resisting system, or for select elements such as the roof, floors or walls. The CLT panel as a structural panel element is also used as a superior industrial matting, bridging and retaining wall product that replaces heavy timbers, steel, and concrete.

Below are some reasons why CLT has the potential to redefine construction around the world:

CLT panels can be produced in large size (up to 15 m×3.5 m and beyond), and fit together quickly on site making building construction much faster and easier.

For both large and small buildings, CLT panels connect together as a complete engineered wood building solution.

Each CLT panel is custom-made to suit the structural needs of the project and required appearance.

CLT panels are manufactured using the latest CNC machining technology to ensure high precision and eliminate site waste.

CLT panels are safe to erect, weighing only 20% as much as concrete.

CLT panels are safe to inhabit, being strong and flexible under load.

CLT is sustainable, as wood stores carbon to help our planet environmentally.

CLT panel construction out-performs conventional wood-framed construction in air-tightness, thermal insulation, internal moisture management, acoustic insulation and fire resistance.

For many building types, CLT construction systems out-perform steel and concrete on a basis of cost.

Also, CLT can be manufactured to customized dimensions and in varying panel sizes, while panel length is typically limited by transportation restrictions.

FIG. 2 is shows a 3D CAD-based model 9 of the conventional multi-story high-rise mass-timber building being constructed from cross-laminated-timber (CLT) building components, supported on a concrete foundation.

FIG. 2A shows a cross-laminated timber (CLT) panel 10 being assembled, for use in the mass timber building shown in FIG. 2, shown constructed of layers of Spruce, Fir or Pine boards glued together, to provide maximum strength and durability, wherein the direction of wood grain in each layer is laid orthogonal to the direction of the grain of neighboring wood layers.

FIG. 2B shows a CLT element or panel 11, wherein factory-based computer-controlled (CNC) machinery is used to trim the CLT panel to exact dimensions, cut openings for windows and other installations, and support fabrication of the finished CLT panel destined for installation in a particular location in a specific mass timber building design.

FIG. 3 shows the various stages of processing supported within a conventional factory for producing cross-laminated timber (CLT) construction components. In general, a conventional CLT panel factory 12 comprises many stages including: a controlled drying stage 12A for drying structural timber 12B to a humidity of 12% + or − 2% or less and then visual or machine strength grading of boards; a finger jointing stage 12C for producing finger-jointed laminations from graded boards or board sections; a lamination planing stage 12D for planing and dimensioning finger-jointed laminations; a stacking and adhesive stage 12E for applying adhesive to the planed laminations; a stacking, pressing and curing stage 12F for pressing and curing the finger-jointed laminations with adhesive into a cross-laminated timber (CLT) piece using a hydraulic or vacuum process; a CNC fabrication stage 12G for trimming the dimensions of the CLT element, including cutting widows, doorways and other apertures required by the design; and a packaging stage 12H for packaging the CLT elements 12I for shipping to a building destination.

FIG. 3A shows a conventional CLT production line supporting a hydraulic press 13 for pressing and curing cross-laminated laminations (i.e. boards) with applied adhesive coatings, under great pressure, to product CLT elements. FIG. 3B shows a conventional CLT panel production line including an overhead crane 14 for picking up product CLT panels and moving them to the CNC machining stage, where CLT panels are carefully dimensioned and apertures are formed using CNC sawing and drilling operations. FIG. 3C is a conventional overhead CNC bridge 15 that moves along a CLT production line over a mounted CLT panel 17, in which apertures are carefully dimensioned and formed using CNC sawing and drilling operations. FIG. 3D shows a conventional display screen 16 on a computer workstation, displaying a model of the CNC bridge system used to fabricate a specific CLT panel from a standard CLT element, for use in a specific mass timber building project.

FIG. 4A shows a conventional CLT factory, in which a CLT panel 17 has been fabricated for a prefabricated mass timber building project, and shown being moved to temporary storage for shipping to a mass timber building construction site. FIG. 4B shows a conventional CLT factory, in which a set of CLT panels 18 have been fabricated and stored before shipment to the construction site of the prefabricated mass timber building.

FIG. 5A shows a 3D model 19 a conventional high-rise mass timber building with its crane 19A moving a prefabricated CLT panel 21 into position during the construction phase of the high-rise mass timber building. FIG. 5B shows the conventional CLT panel 22 being lifted off the ground for placement on the high-rise mass timber building being constructed in the background. FIG. 5C shows the conventional CLT panel 21 being lowered into position on a mass timber building being constructed, using the crane 20 shown in FIG. 5A.

Conventional CLT Panel Technology Falls Significantly Short on Providing Fire Protection Despite performing well in standard ASTM E119 structural fire performance tests, and offering great promise as a cost-effective building solution for residential, commercial and institutional buildings as well as large industrial facilities, conventional CLT panels and assemblies generally fall short on fire protection and safety and can only offer a Class-B fire-protection rating based on ASTM E84 test standards. Such low fire-protection ratings are because conventional raw CLT has high flame spread rate (FSR) and high smoke development (SD) characteristics when a CLT panel burns in the presence of fire, ultimately producing a thick layer of char 23A from pyrolysis, as illustrated in the massive solid-wood CLT panel sample 23 shown in FIG. 6A. This charring of a CLT panel 23 can slow down the fire and protect the inner core from heating, while keeping CLT panels structurally sound, so that CLT panels, having more layers of wood, will last longer in a fire. However, as all CLT buildings rely on its Class B char value, architects are forced to specify that every CLT column and CLT panel is made thick and wide enough in size, from built up layers of laminated timber, so that the CLT panels will support fire longer than steel beams and columns, much like a tree in a forest fire. This overdesign requirement with conventional CLT panels increases the cost of CLT construction.

Moreover, conventional raw CLT does not offer any defense against "flashover" during a building fire. A flashover is the near-simultaneous ignition of most of the directly exposed combustible material in an enclosed area. When certain organic materials are heated, they undergo thermal decomposition and release flammable gases. Flashover occurs when the majority of the exposed surfaces in a space are heated to their auto-ignition temperature and emit flammable gases. Flashover normally occurs at 500° C. (932° F.) or 590° C. (1,100° F.) for ordinary combustibles, and an incident heat flux at floor level of 20 kilowatts per square meter (2.5 hp/sq ft). Firemen know this fact about raw conventional CLT building materials, and therefore will not defend a burning mass timber CLC building unless they are attempting to save human lives because of the dangerous condition raw CLT building material presents.

Therefore, there is a great need in the art to raise the bar on the limited fire-protection that Class-B charring offers to CLT building materials, and provide true Class-A fire-protection for tenants, fireman, police, first responders, building owners and visitors, and raise the standards of safety for humans who live and work in affordable buildings constructed using sustainable renewable resources, such as cross-laminated timber (CLT), and other engineered timber products.

In effort to prevent fire destruction of mass timber buildings, it is essential to understand the nature of the fire cycle before understanding how flame retardants, inhibitors and extinguishers work to suppress and extinguish building fires.

In FIG. 6B, the fire cycle 24 is graphically illustrated as having four essential components: (i) an ignition source (e.g., heat, incandescent material, a small flame); (ii) fuel material (e.g., wood, wax, fuel, etc.); (iii) oxygen; and (iv) free radicals (H+, OH−, O−) 25 associated with the combustion process.

In general, the ignition source can be any energy source (e.g. heat, incandescent material, a small flame, a spark, etc.). The function of the ignition source is to start the material to burn and decompose (pyrolysis), releasing flammable gases. If solid materials in the ignition source do not break down into gases, they remain in a condensed phase. During this condensed phase, the material will slowly smolder and, often, self-extinguish, especially if the material beings to "char," meaning that the material creates a carbonated barrier between the flame and the underlying material.

In the gas phase, flammable gases released from the burning and decomposing material are mixed with oxygen, which is supplied from the ambient air. In the combustion zone, or the burning phase, fuel, oxygen and free radicals (i.e. H+, OH−, O−) combine to create chemical reactions that produce visible flames to appear. The fire then becomes self-sustaining because, as it continues to burn the material, more flammable gases are released, feeding the combustion process.

In general, flame retardants, or fire inhibitants, act in three ways to stop the burning process, and consequently, can be classified by how these agents work to stop a burning flame. These three methods of flame retardation/inhibition/extinguishing are described below:

(i) Disrupting the combustion stage of a fire cycle, including avoiding or delaying "flashover," or the burst of flames that engulfs a room and makes it much more difficult to escape;

(ii) Limiting the process of decomposition by physically insulating the available fuel sources from the material source with a fire-resisting "char" layer; and (iii) Diluting the flammable gases and oxygen concentrations in the flame formation zone by emitting water, nitrogen or other inert gases.

One effective family of prior art clean fire inhibiting chemical (CFIC) liquid has been supplied by PT. Hartindo Chemicatamata Industri of Jakarta, Indonesia (a/k/a Hartindo Anti Fire Chemicals) for many years now, and used by many around the world in diverse anti-fire applications. Current chemical formulations marketed by Hartindo under AF11, AF21 and AF31 product designations, disrupt the combustion stage of the fire cycle by combining with the free radicals (H+, OH−, O−) that are produced during combustion.

Most prior art intumescent coatings, whether applied as paint or coatings on engineered wood products (EWPs), work differently from Hartindo's fire-inhibiting (anti-fire) chemicals, in that prior art intumescent coatings form a char layer when heated, acting as an insulating layer to the substrate of fuel source, to prevent the fuel source from burning. Prior art Pyrotite® magnesium-based cementitious coatings, as used in LP's FlameBlock® fire-rated OSB sheathing (i.e. sheeting), FlameBlock® I-Joists, and other FlameBlock® EWPs, release water when exposed to the heat of a fire, and thereby dilute the flammable gases and oxygen concentrations in the flame formation zone.

Another problem plaguing the mass timber market is that mass timber buildings are also vulnerable to mold and insects such as termites.

While various prior art methods have been proposed for providing fire-protection to engineered wood products (EWPs), such proposals have been generally inadequate, and there still exists a great need in the art for new and improved ways of providing EWPs with higher levels of fire protection, in the health and safety interests of building tenants and fireman.

Further, there is a growing demand for higher performance, fire-rated CLT building products for use in mass timber buildings in the single-family, multi-family and light commercial construction markets.

Also, there is a great need for better ways of designing and constructing high-rise and multi-story mass timber buildings that demonstrate improved defense against fire destruction, while overcoming the shortcomings and drawbacks of prior art methods and apparatus.

OBJECTS AND SUMMARY OF THE PRESENT INVENTION

Accordingly, a primary object of the present is to provide new and improved method of and system for designing, prefabricating and constructing multi-story mass timber buildings so that such mass timber building demonstrates Class-A fire-protection and defense against fire destruction, while overcoming the shortcomings and drawbacks of prior art methods and apparatus.

Another object of the present invention is to provide a new and improved, safe and economical, methods of producing mass timber building components, constructed from timber laminations, with Class-A fire-protection under ASTM E84 and UL 723 test standards, while creating new value within the construction industry by helping to bring mass timber to the mainstream building construction.

Another object of the present invention is to provide a new and improved Class-A fire-protected mass timber building components that are sprayed with clean fire inhibiting chemical (CFIC) liquid to provide Class-A fire-protection under ASTM 84E and UL 723 test standards.

Another object of the present invention is to provide a new and improved Class-A fire-protected cross-laminated timber (CLT) building components that are sprayed with clean fire inhibiting chemical (CFIC) liquid to provide Class-A fire-protection under ASTM 84E test standards, without changing the color of the CLT building components.

Another object of the present invention is to provide a new and improved Class-A fire-protected cross-laminated timber (CLT) building components that are produced by a process involving (a) dip-coating timber laminations with clean fire inhibiting chemical (CFIC) liquid, (ii) drying the dip-coated timber laminations, (iii) stacking and gluing the dip-coated timber laminations in a cross-laminated manner to produce a Class-A fire-protected CLT building component, and optionally (iv) drying the Class-A fire-protected CLT building component, and (v) spray-coating the CLT building component with a blended liquid solution to provide added fire-protection, moisture protection (to exteriorly exposed wood), UV protection (against sunlight), and optionally mold and termite protection, to the Class-A fire-protected CLT building component.

Another object of the present invention is to provide a new and improved Class-A fire-protected glue-laminated timber (GLT) building components that are produced by a process involving (a) dip-coating timber laminations with clean fire inhibiting chemical (CFIC) liquid, (ii) drying the dip-coated timber laminations, (iii) stacking and gluing the dip-coated timber laminations to produce a Class-A fire-protected GLT building component, (iv) drying the Class-A fire-protected GLT building component, and optionally (v) spray-coating the GLT panel with a blended liquid solution to provide added fire-protection, moisture protection (to exteriorly exposed wood), UV protection (against sunlight), and optionally mold and termite protection, to the Class-A fire-protected GLT building component.

Another object of the present invention is to provide a new and improved Class-A fire-protected nailed-laminated timber (NLT) building components that are produced by a process involving (a) dip-coating timber laminations with clean fire inhibiting chemical (CFIC) liquid, (ii) drying the dip-coated timber laminations, (iii) stacking and nailing the dip-coated timber laminations to produce a Class-A fire-protected NLT building components, (iv) drying the Class-A fire-protected NLT building components, and optionally (v) spray-coating the NLT building components with a blended liquid solution to provide added fire-protection, moisture protection (to exteriorly exposed wood), UV protection (against sunlight), and optionally mold and termite protection, to the Class-A fire-protected NLT building components.

Another object of the present invention is to provide such a new and improved Class-A fire-protected cross-laminated timber (CLT) building component, wherein after the Class-A fire-protected CLT building components has been installed on a mass timber or other wood-framed building site, the Class-A fire-protected CLT building components is sprayed with a clean fire inhibiting chemical (CFIC) liquid to provide an added layer of Class-A fire-protection before the Class-A fire-protected laminations of the CLT building components, so as to absorb the energy of an incident fire, to stall its advance, and prevent significantly less charring of timber on the exterior surfaces of each Class-A fire-protected CLT building components.

Another object of the present invention is to provide such a new and improved Class-A fire-protected glue-laminated timber (GLT) building component, wherein after the Class-A fire-protected CLT building component has been installed on a mass timber or other wood-framed building site, the Class-A fire-protected CLT building component is sprayed with a clean fire inhibiting chemical (CFIC) liquid to provide an added layer of Class-A fire-protection before the Class-A fire-protected laminations of the GLT building component, so as to absorb the energy of an incident fire, to stall its advance, and prevent significantly less charring of timber on the exterior surfaces of each Class-A fire-protected GLT building component.

Another object of the present invention is to provide such a new and improved Class-A fire-protected nailed-laminated timber (NLT) building component, wherein after the Class-A fire-protected NLT building component has been installed on a mass timber or other wood-framed building site, the Class-A fire-protected NLT building component is sprayed with a clean fire inhibiting chemical (CFIC) liquid to provide an added layer of Class-A fire-protection over and around the Class-A fire-protected laminations of the NLT building component, so as to absorb the energy of an incident fire, to stall its advance, and prevent significantly less charring of timber on the exterior surfaces of each Class-A fire-protected NLT building component.

Another object of the present invention is to provide such a new and improved Class-A fire-protected cross-laminated timber (CLT) building component, wherein multiple layers Class-A fire-protection are provided to the multiple timber lamination layers so as defend the engineering value of the CLT building component against fire, ground movement and high wind loads.

Another object of the present invention is to provide such a new and improved Class-A fire-protected cross-laminated timber (CLT) building component, wherein advanced chemical coatings are applied over the multiple layers of timber laminations prior to the cross-lamination of each CLT building components, so as to provide multiple Class-A fire-protected timber laminations that are engineered to remove the energy of an advancing fire, and provide an unprecedented level of fire protection and safety to high-rise and low-rise multi-apartment mass timber buildings constructed from the Class-A fire-protected CLT building components of the present invention.

Another object of the present invention is to provide a new and improved Class-A fire-protected mass timber building components that are sprayed with clean fire inhibiting chemical (CFIC) liquid to provide Class-A fire-protection under ASTM 84E and UL 723 test standards.

Another object of the present invention is to provide a new and improved Class-A fire-protected cross-laminated timber (CLT) building components that are sprayed with clean fire inhibiting chemical (CFIC) liquid to provide Class-A fire-protection under ASTM 84E test standards, without changing the color of the CLT building components.

Another object of the present is to provide higher performance Class-A fire-rated building products for use in single-family, multi-family, and multi-story mass timber buildings, as well as in light commercial construction markets.

Another object of the present invention is to provide new and improved engineered wood products (EWP) using clean fire suppression technologies to protect mass timber, without the shortcomings and drawbacks associated with pressure treatment methods which are well known to destroy wood fibers, and lower the strength and performance of such wood products.

Another object of the present invention is to provide a new and improved system for defending high-density multi-story mass timber buildings from fire during the design and construction phase, so that the risks of mass timber building burning down due to fire during construction is substantially mitigated to the benefit of all parties.

Another object of the present is to provide a novel method of designing and constructing multi-story mass timber buildings so that such mass timber buildings demonstrate Class-A fire-protection and resistance against fire destruction.

Another object of the present is to provide a method of producing Class-A fire-protected cross-laminated timber (CLT) panels in an automated factory having a production line with a plurality of stages, the method comprising the steps of: (a) loading a supply of untreated short-length lumber onto a conveyor transport mechanism installed along a production line; (b) loading the untreated short-length lumber into a controlled-drying stage so to produce suitably dried short-length lumber for supply to a finger-jointing stage; (c) supplying controllably-dried short-length lumber into the finger-jointing stage for producing pieces of extended-length finger-jointed lumber; (d) transporting produced pieces of extended-length finger-jointed lumber into the planing/dimensioning stage, so that the finger-jointed lumber is planed/dimensioned into pieces of dimensioned finger-jointed lumber, and outputted onto the conveyor transport mechanism; (e) transporting and submerging the dimensioned extended length finger-jointed lumber pieces through a dipping tank for sufficient coating in clean fire inhibiting liquid (CFIC) liquid, while being transported on the conveyor transport mechanism, to produce Class-A fire-protected laminations; (f) drying the Class-A fire protected laminations as the Class-A fire-protected laminations are passed through a drying tunnel; (g) cross stacking and applying adhesive to the Class-A fire-protected laminations as the Class-A fire-protected laminations are being cross stacked and applied with adhesive; (h) pressing and curing the cross stacked Class-A fire protected laminations to produce a cross-laminated timber (CLT) panel; (i) using CNC fabrication machinery to trim the CLT panel and provide with required features including openings, holes and grooves and other features; and (j) applying a barcoded/RFID-tagged label to each fabricated CLT panel identifying the CLT panel as a building component in a specific project relating to the prefabrication of a mass timber building ordered for purchase by a customer, wherein the barcoded/RFID-tagged label is linked to certifications of Class-A fire-protection treatment according to specific standards.

Another object of the present invention is to provide an Internet-based (i.e. cloud-based) system for verifying and documenting Class-A fire-protection treatment of a mass timber building using on-site spraying of a clean fire inhibiting chemical (CFIC) liquid, comprising (i) a data center with web, application and database servers for supporting a web-based site for hosting images of certificates mounted on spray-treated wood surfaces, and other certification documents by spray technicians and supervisors, and (ii) mobile smart-phones used to capture digital photographs and audio-video recordings of spray-treated mass timber building sections, and technician personnel performing such professional services, during the on-site fire-protection spray process, and uploading the captured digital images to the data center, for each spray treatment project, so that insurance companies, builders, and other stakeholders can review such on-site spray completion certifications during the building construction phase of the mass timber building.

Another object of the present invention is to provide such an Internet-based system for verifying and documenting Class-A fire-protection spray-applied treatment of a mass timber building, wherein mobile client computing systems provided with a mobile application are used by on-site class-A fire-protection spray administrators and technicians capturing audio-video (AV) recordings of completed sections of the mass timber building relating to projects during the construction phase so as to verify and document proper Class-A fire-protection of the sprayed timber/wood surfaces employed therein.

Another object of the present invention is to provide such an Internet-based system for verifying and documenting Class-A fire-protection spray-applied treatment of a mass timber building, wherein mobile client computing systems provided with a mobile application are used by property owners/building, insurance companies, and other stakeholders for tracking and managing projects involving on-site clean fire inhibiting chemical (CFIC) liquid spray treatment of mass timber buildings during the construction phase so as to ensure Class-A fire-protection of the timber/wood employed therein.

Another object of the present invention is to provide a just-in-time (JIT) cross-laminated timber (CLT) building factory system for prefabricating mass timber buildings constructed using CLT building components and elements (e.g. panels) in response to customer purchase orders, wherein the factory system supports multiple production lines for producing Class-A fire-protected CLT building components including wall panels, floor panels, stair panels, roof panels, and prefabricated panel sections, as needed, for use in constructing the custom or specified CLT building, and delivering such prefabricated CLT components in an RFID-tagged shipping container, to a destination property location where the prefabricated mass timber building is to be constructed.

Another object of the present invention is to provide an Internet-based system network supporting a just-in-time (JIT) mass timber building factory system, comprising (i) the just-in-time cross-laminated timber (CLT) building factory with multiple production lines for producing Class-A fire-protected CLT building components, (ii) GPS-tracked ISO-shipping containers and code symbol/RFID tag reading mobile computing systems, and (iii) a data center for the factory system and supporting a network of mobile computing devices running a mobile application adapted to help track and manage orders for prefabricated Class-A fire-protected CLT buildings, and projects involving the same.

Another object of the present invention is to provide such an Internet-based system network for a just-in-time prefabrication CLT building factory system, wherein mobile client computing systems, supporting a mobile application are used by project administrators to track and manage customer orders for prefabricated CLT buildings, and related projects involving just-in-time fabrication of Class-A fire-protected CLT building components for these ordered CLT buildings.

Another object of the present invention is to provide such an Internet-based system network for a just-in-time prefabrication CLT building factory system, wherein mobile client computing systems, supporting a mobile application are used by customers to track and manage their orders and related projects involving just-in-time fabrication of Class-A fire-protected CLT building components for ordered prefabricated CLT buildings.

Another object of the present invention is to provide a new and improved method of protecting and defending multi-story and high-rise mass timber CLT buildings from fire by chemically defending from fire, 100% of the lumber used in CLT buildings.

Another object of the present invention is provide a new and improved method of fire protecting multi-story CLT buildings from fire, by spraying coating, on the job site, before gypsum and wall board is installed over the CLT panels, a clean fire inhibiting chemical (CFIC) liquid over all exposed surfaces of all lumber and wood products used in the construction of the mass timber building, so that the treated mass timber becomes Class-A fire-protected.

Another object of the present invention is to provide such a new and improved method of reducing charring of mass timber building components in a mass timber building by spraying the exteriorly exposed surfaces of the mass timber building components with a clean fire inhibiting chemical (CFIC) liquid to so as to form an added layer of CFIC providing Class-A fire-protection to the sprayed surface, and in the presence of a fire in the mass timber building, the layer of CFIC interfering with the free radical chemical reactions in the combustion phase of the fire, thereby preventing significantly less charring of timber on the exterior surfaces of the sprayed mass timber building components.

Another object of the present is to provide a new and improved method of protecting CLT buildings from interior fires by spraying all exposed wood surfaces with clean fire inhibiting chemical (CFIC) liquid so as to achieve A-Class fire-protection throughout the entire CLT building.

Another object of the present invention is to provide a novel system and method of protecting multi-story mass timber buildings against fire, when such CLT structures are most vulnerable during the construction stage, involving the spraying of clean fire inhibiting chemical (CFIC) liquid over all interior surfaces of a mass timber building being treated, including CLT panels, raw untreated lumber, EWPs, OSB sheathing, plywood, composite boards, structural composite lumber and other materials, and tracking and certifying that each completed section of the CLT building was properly spray coated with the environmentally clean fire inhibiting chemical, and has achieved Class-A fire-protection.

Another object of the present invention is to provide a novel method of spray treating all surfaces of CLT panels used to construct mass timber multi-story and high-rise buildings, using clean fire inhibiting chemical (CFIC) liquid that clings to the surface of wood (e.g. mass timber) during spray application and inhibit the start or ignition of a fire as well as fire progression and flame spread, wherein the clean fire inhibiting chemical (CFIC) liquid can be sprayed using a mobile battery-operated or pump-operated back-pack liquid sprayer system, or mobile floor-supported liquid pump sprayer system.

Another object of the present invention is to provide a novel method of spray treating all surfaces of timber used to construct multi-story mass timber CLT buildings, during construction operations, floor by floor, with minor impact to the construction schedule, while minimizing the builder's risk of fire, making protecting 100% of the timber in a building affordable.

Another object of the present is to provide an on-job-site spray system for coating of clean fire inhibiting liquid chemical (CFIC) liquid all over the interior surfaces of raw and treated timber used in a completed section of a CLT assemblies in a mass timber building during its construction phase, wherein the on-job-site spray system comprises: a liquid spray pumping subsystem including a reservoir tank for containing a supply of CFIC liquid for spray-coating and treating wood surfaces to provide Class-A fire-protection within the CLT building; a hand-held liquid spray gun, operably connected to the reservoir tank using a sufficient length of flexible tubing, for holding in the hand of a spray-coating technician, and spraying CFIC liquid from the reservoir tank onto the exposed interior wood surfaces of lumber and sheathing used to construct each completed section of a CLT building construction, so as to form a CFIC coating on the treated interior wood surfaces providing Class-A fire-protection; and a spray-certification system for visually marking and certifying the exposed interior wood surfaces of each completed section of the CLT building construction has been properly spray-coated to provide Class-A fire-protection within each completed section of the mass timber building.

Another object of the present invention is to provide a new and improved wireless information storage and retrieval system network for remotely managing the spray-based Class-A fire-protection of mass timber buildings by capturing and storing in a central network database system, under the spray project, (i) digital images and videos of certificates of completion stamped on completed CLT building sections of the job-site that have been sprayed with Class-A fire-protective coating, and (ii) various kinds of documentation of events relating to the chain-of-custody of clean fire inhibiting chemical (CFIC) liquid materials blended at a remote location, shipped to the job-site, and then mixed with water to produce an aqueous-based CFIC liquid solution for use in on-site spraying of all exposed wood surfaces on the interior of the mass timber building being spray-protected against fire.

Another object of the present invention is to provide such as a new and improved wireless information storage and retrieval system network, wherein mobile applications are installed and run on a network of mobile computing devices to support a wide array of services provided to project administrators, spray-technicians and building owners, managers and insurance underwriters to help manage, monitor and review on-site Class-A fire-protection spray processes under mass timber building-specific projects managed by the system network of the present invention.

Another object of the present invention is to provide such as a new and improved wireless information storage and retrieval system network, wherein the mobile application can be used by mass timber building/property owners, insurance companies, and other stakeholders, showing a menu of high-level services supported by the system network of the present invention.

Another object of the present invention is to provide such as a new and improved wireless information storage and retrieval system network, wherein the mobile application supports a high-level menu of services for use by on-site fire-protection spray administrators and technicians supported by the system network of the present invention.

Another object of the present invention is to provide such as a new and improved wireless information storage and retrieval system, wherein the mobile application can be used by customers who place orders for prefabricated Class-A fire-protected mass timber CLT buildings using the system network of the present invention, with the option of also ordering on-site spraying of CFIC liquid over all exposed interior surfaces of Class-A fire-protected prefabricated CLT building after construction, so as to provide a double-layer of fire-protection and defense.

Another object of the present invention is to provide such as a new and improved wireless information storage and retrieval system, wherein the mobile application can be used by project administrators, managers, fabricators and technicians showing a high-level menu of services supported by the system network of the present invention.

Another object of the present is to providing new and improved methods of and apparatus for protecting mass timber buildings from wild fires by automatically spraying water-based environmentally clean fire inhibiting chemical (CFIC) liquid over the exterior surfaces of the building, surrounding ground surfaces, shrubs, decking and the like, prior to wild fires reaching such buildings.

These and other benefits and advantages to be gained by using the features of the present invention will become more apparent hereinafter and in the appended Claims to Invention.

BRIEF DESCRIPTION OF THE DRAWINGS

The following Objects of the Present Invention will become more fully understood when read in conjunction of the Detailed Description of the Illustrative Embodiments, and the appended Drawings, wherein:

FIG. 4A is a perspective view of a conventional CLT factory, in which a CLT panel has been fabricated for a prefabricated mass timber building and being move for storage and shipping to construction;

FIG. 6B is a schematic representation of the process of fire showing its four primary components and illustrating various pathways available for suppressing fire within a mass timber building and protecting the same from total destruction by fire;

FIG. 7 is high-level flow chart describing the primary steps involved in the method of designing and constructing multi-story and high-rise mass timber buildings using Class-A fire-protected cross-laminated timber (CLT) building components, comprising the steps of (i) during the architectural design phase of a new multi-story mass timber building, specifying the use of Class-A fire-protected CLT building components, and the use of Class-A fire-protection on-job-site spray coating treatment of all lumber used on the CLT building construction site; and (ii) during the construction phase, constructing the mass timber building in accordance with the design specifications indicated in step (i) so as to provide a multi-story mass timber building having Class-A fire-protection against fire destruction;

FIG. 9 shows flame spread and smoke development characteristics of Spruce Pine Fir (SPF) and douglas Fir Class-A fire-protected lumber, after being dip-coated with clean fire inhibiting chemical (CFIC) liquid as generally shown in FIGS. 10 and 10A, and tested in accordance with ASTM E84 and UL 723 test standards;

FIG. 10B is a schematic representation and model of schematic representation and model of the automated spray-coating stage and drying stage supported along the production lines of the automated factory system shown in FIG. 10;

FIGS. 11A, 11B and 11C, taken together, set forth a flow chart describing the high level steps carried out when practicing the method of producing Class-A fire-protected cross-laminated timber (CLT) products in the automated Class-A fire-treated CLT factory illustrated in FIGS. 14, 14A and 14B;

FIG. 13 shows flame spread and smoke development characteristics of Spruce Pine Fir (SPF) and douglas Fir Class-A fire-protected lumber, after being dip-coated with clean fire inhibiting chemical (CFIC) liquid as generally shown in FIGS. 14 and 14A, and tested in accordance with ASTM E84 and UL 723 test standards;

FIGS. 15A, 15B and 15C, taken together, set forth a flow chart describing the high level steps carried out when practicing the method of producing Class-A fire-protected cross-laminated timber (CLT) products in the automated Class-A fire-treated CLT factory illustrated in FIGS. 14, 14A and 14B;

FIG. 16 a perspective view of a section of multi-ply Class-A fire-protected nail laminated timber (NLT) panel produced in accordance with the principles of the present invention, offering many layers of Class-A fire-protection and defense against fire;

FIG. 17 shows flame spread and smoke development characteristics of Spruce Pine Fir (SPF) and Douglas Fir Class-A fire-protected lumber, after being dip-coated with clean fire inhibiting chemical (CFIC) liquid as generally shown in FIGS. 18 and 18A, and tested in accordance with ASTM E84 and UL 723 test standards;

FIGS. 19A, 19B and 19C, taken together, set forth a flow chart describing the high level steps carried out when practicing the method of producing Class-A fire-protected NLT products in the automated Class-A fire-treated NLT factory illustrated in FIGS. 18, 18A and 18B;

FIGS. 25A and 25B, taken together, set forth a flow chart describing a method of producing mass timber buildings having Class-A fire-protection and improved resistance against fire destruction;

FIG. 27 is a table showing the flame spread and smoke development characteristics of Spruce Pine Fir (SPF) and Douglas Fir species of Class-A fire-protected lumber after being spray-coated with clean fire inhibiting chemical (CFIC) liquid as generally shown in FIGS. 22A and 22B, and tested in accordance with ASTM E84 and UL 723 test standards;

FIGS. 34A and 34B, set forth a flow chart describing the primary steps involved in carrying out the method of verifying and documenting on-site spray-applied Class-A fire-protection over mass timber buildings during construction;

FIG. 36 is a schematic representation of a completed section in a mass timber building, in which a barcoded/RFID-tag encoded inspection checkpoint, realized on a piece of flexible plastic material and supporting a barcode symbol and RFID tag, and certification by a spray technician and spray supervisor, is mounted;

FIG. 37 is a schematic representation of the barcoded/RFID-tag encoded inspection checkpoint shown in FIG. 36, with integrated certifications made by the spray technician liquid and spray supervisor on the job site;

FIG. 47 is a flow chart describing the high-level steps involved in carrying out the method of qualifying a prefabricated mass timber building for reduced property insurance based on verified and documented dip-coating of wood pieces in clean fire inhibiting chemical (CFIC) liquid during fabrication of Class-A fire-protected CLT and/or NLT components for prefabricated mass timber buildings.

DETAILED DESCRIPTION OF THE ILLUSTRATIVE EMBODIMENTS OF THE PRESENT INVENTION

Figure 1A:
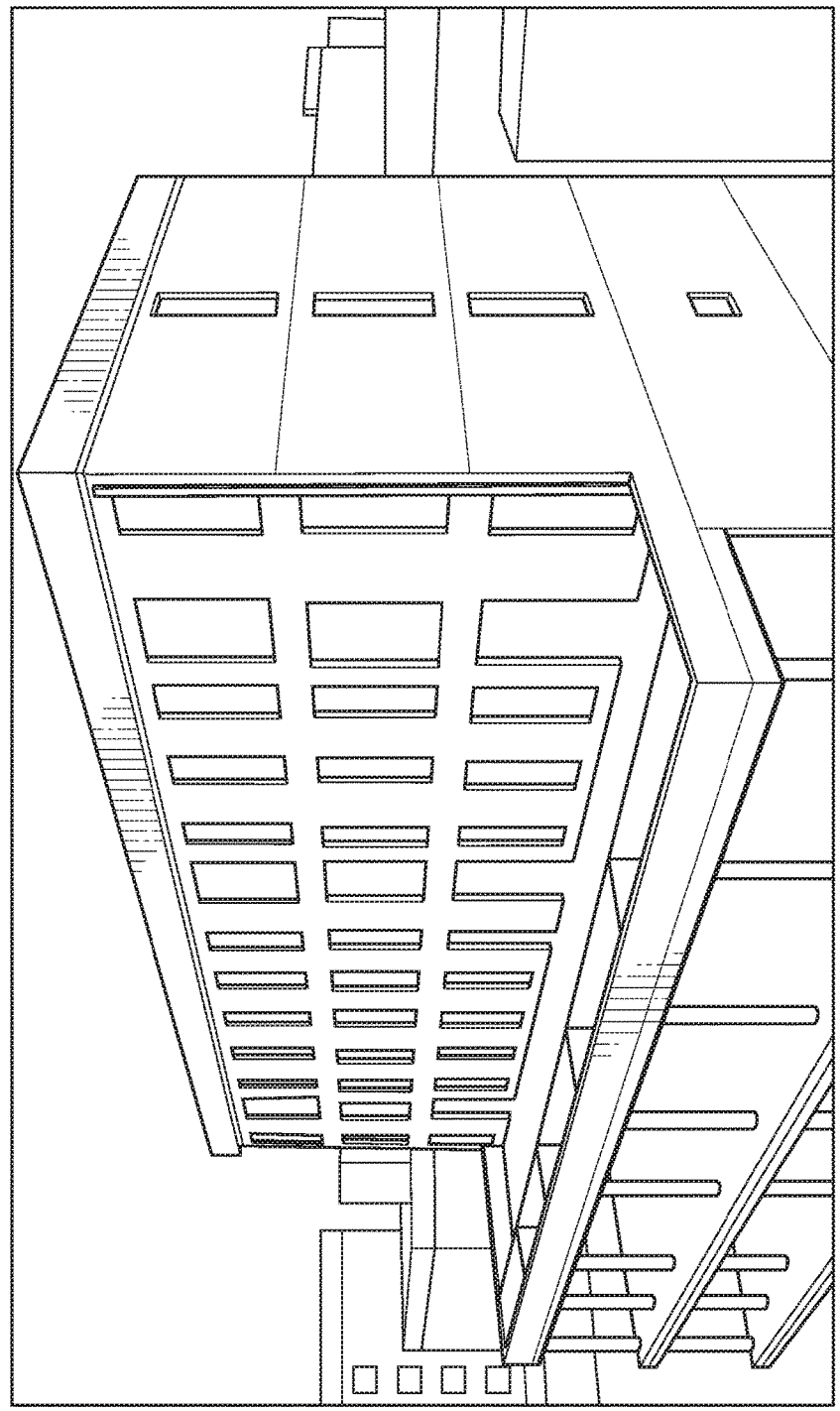
FIG. 1A is a perspective view of a conventional multi-story mass timber building being constructed from cross-laminated timber (CLT) building components (e.g. CLT panels), and steel and concrete materials, during the construction phase.
Figure 1B:
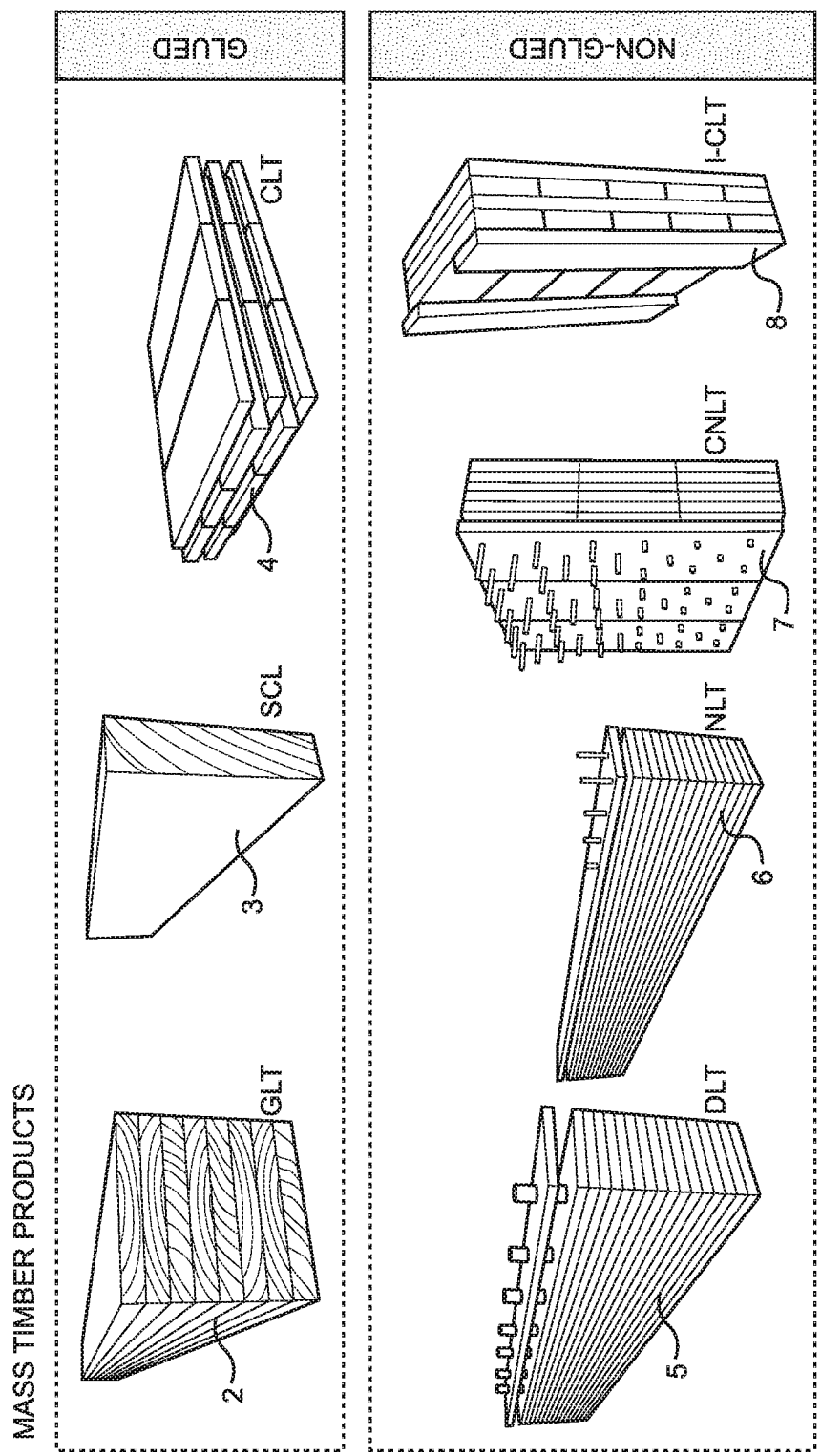
FIG. 1B is a table of conventional mass timber building products organized into two categories of products comprising (i) glued products including glue laminated timber (GLT), structural composite lumber (SCL), and cross-laminated timber (CLT), and (ii) non-glued products including dowel laminated timber (DLT), nail laminated timber (NLT), cross nail laminated timber (CNLT), and interlocking cross laminated timber (ICLT)

Referring to the accompanying Drawings, like structures and elements shown throughout the figures thereof shall be indicated with like reference numerals.

Specification of Method of Designing and Constructing Multi-Story Mass Timber Buildings in Accordance with the Principles of the Present Invention so that Such Mass Timber Buildings Demonstrate Class-A Fire-Protection and Improved Resistance Against Fire Destruction FIG. 7 describes the primary steps involved in the method of designing and constructing multi-story mass timber buildings in accordance with the principles of the present invention so that such mass timber building demonstrate Class-A fire-protection and resistance against fire destruction. As shown, the method comprises the two phases: an architectural design phase; and a building construction phase.

During the architectural design phase of a new multi-story mass timber building, the architect specifies the use of (i) Class-A fire-protected CLT building components, and (i) on-job-site Class-A fire-protected spray coating treatment of all raw/untreated and treated lumber using CFIC liquid after each completed section of the mass timber building, so as to ensure that a Class-A fire-protection coating is deposited or otherwise formed on the interior surface of all exposed wood surfaces within the mass timber building under construction.

As shown in FIG. 7, during the design phase, the building architect specifies the use of the on-job-site spray method and system of the present invention so that all (100%) of new construction lumber used on the building is Class-A fire-protected with a CFIC coating or film, to prevent fire ignition and flame spread in the building, during the construction phase, as well as after construction of the building is completed. According to the present invention, the building architect also specifies that factory-applied Class-A fire-protective CLT building components be used on exterior walls, exterior face of the roof, walls and floor sheathing, as it offers extra UV and moisture protection, against the natural elements.

Figure 39A:
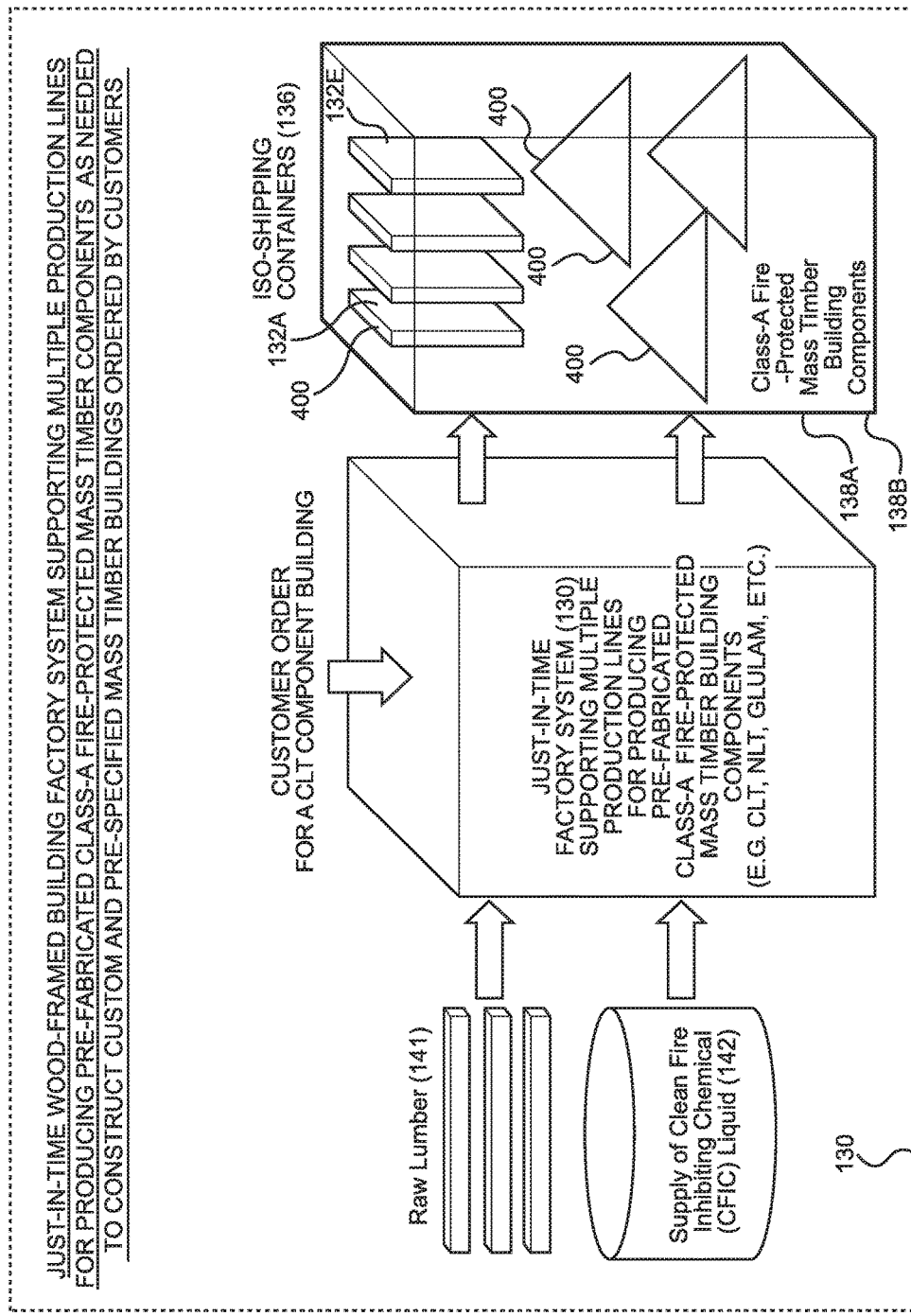
FIG. 39A is a schematic representation of a just-in-time mass timber building factory system supporting multiple production lines for producing pre-fabricated Class-A fire-protected mass timber building components as needed to construct custom and pre-specified mass timber buildings ordered by customers.
Figure 39B:
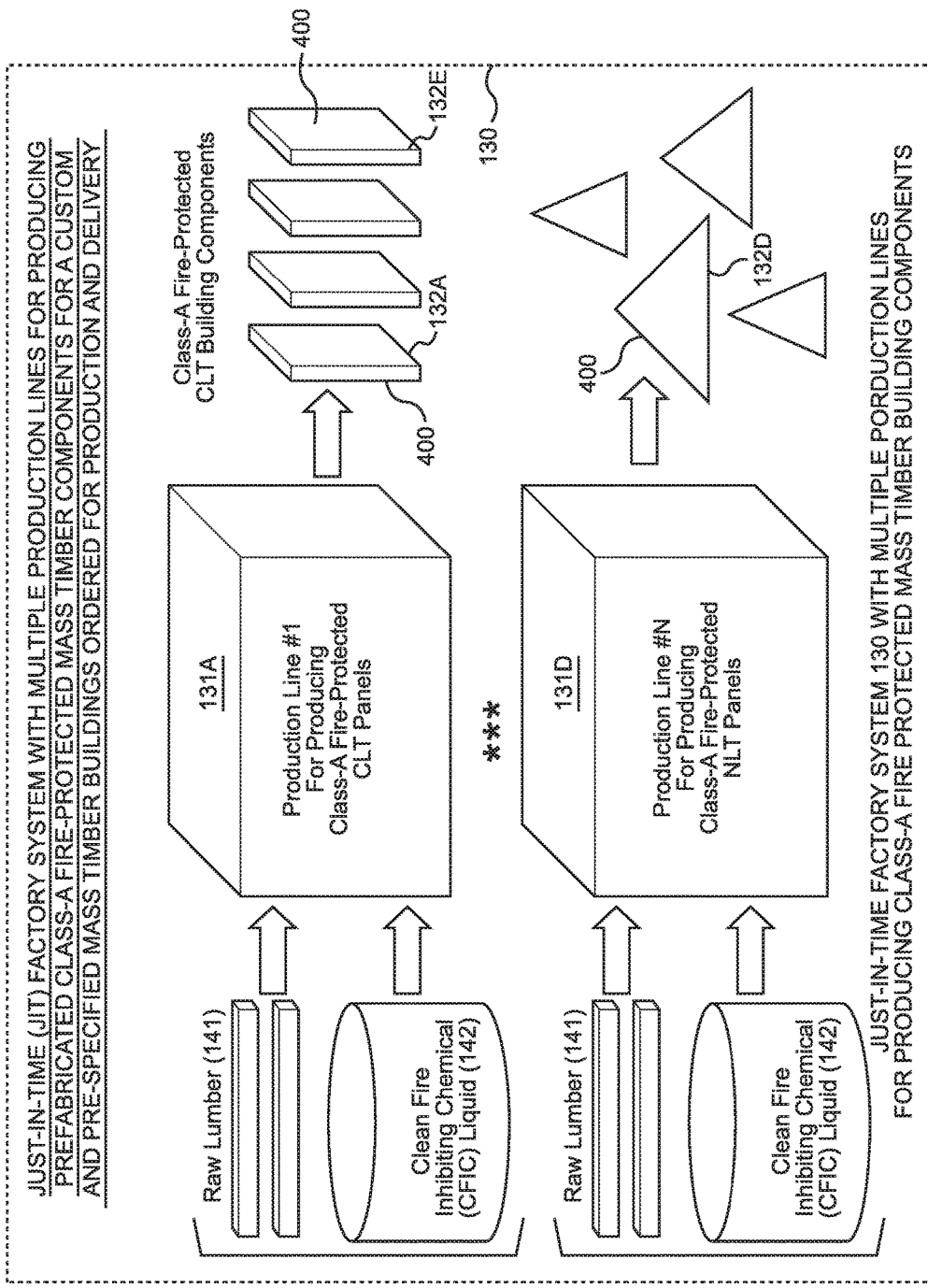
FIG. 39B is a schematic representation of a just-in-time (JIT) factory system with multiple production lines for producing prefabricated Class-A fire-protected mass timber components (e.g. CLT walls, staircases, roof panels, floor panel, etc.) for use in constructing custom and pre-specified mass timber buildings ordered by customers for production and delivery.
Figure 40:
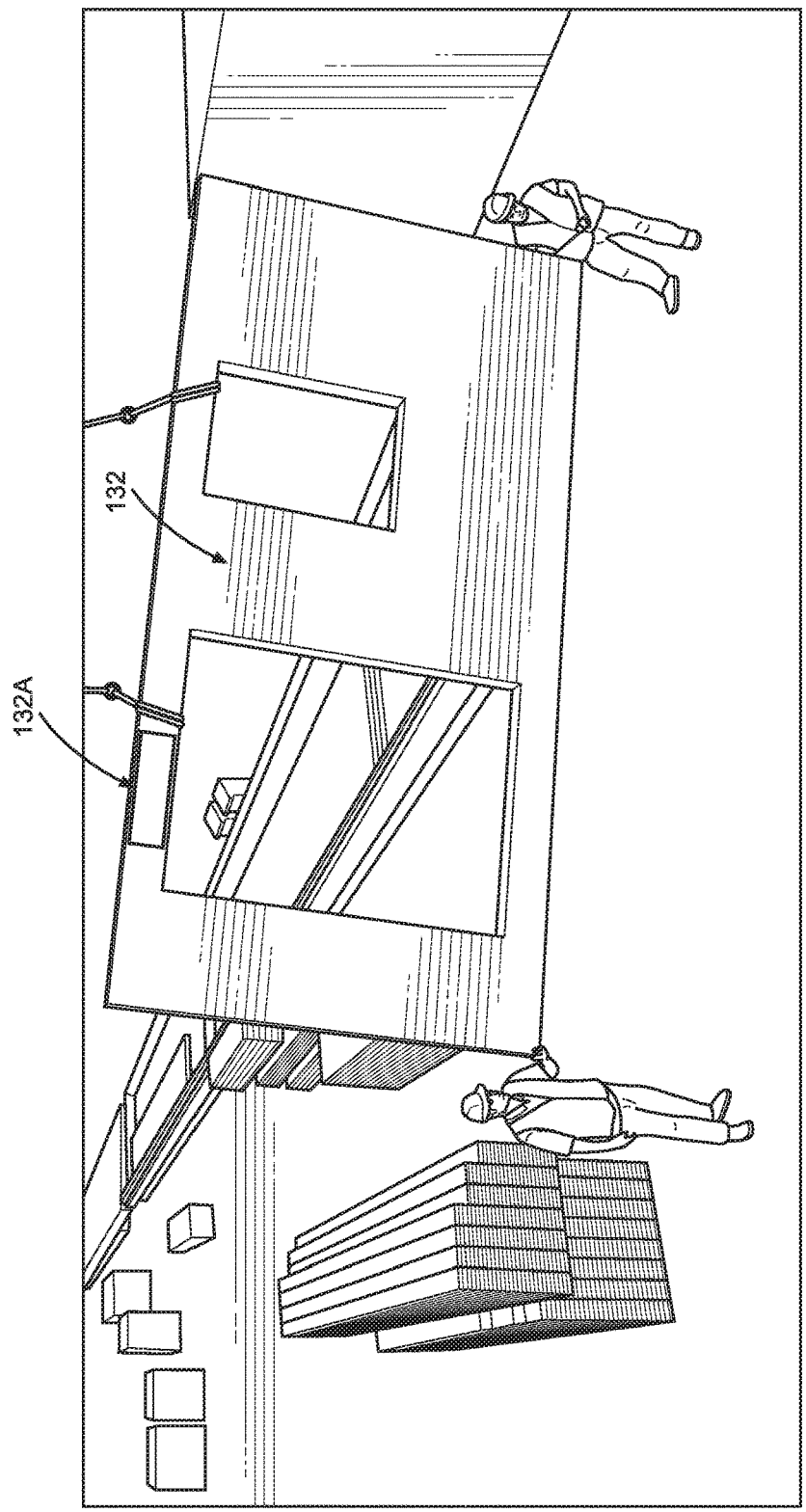
FIG. 40 is a perspective view of a barcoded/RFID-tagged CLT panel completed in the factory, and being moved for shipping to its final destination for use on a specific mass timber building project.
Figure 41:
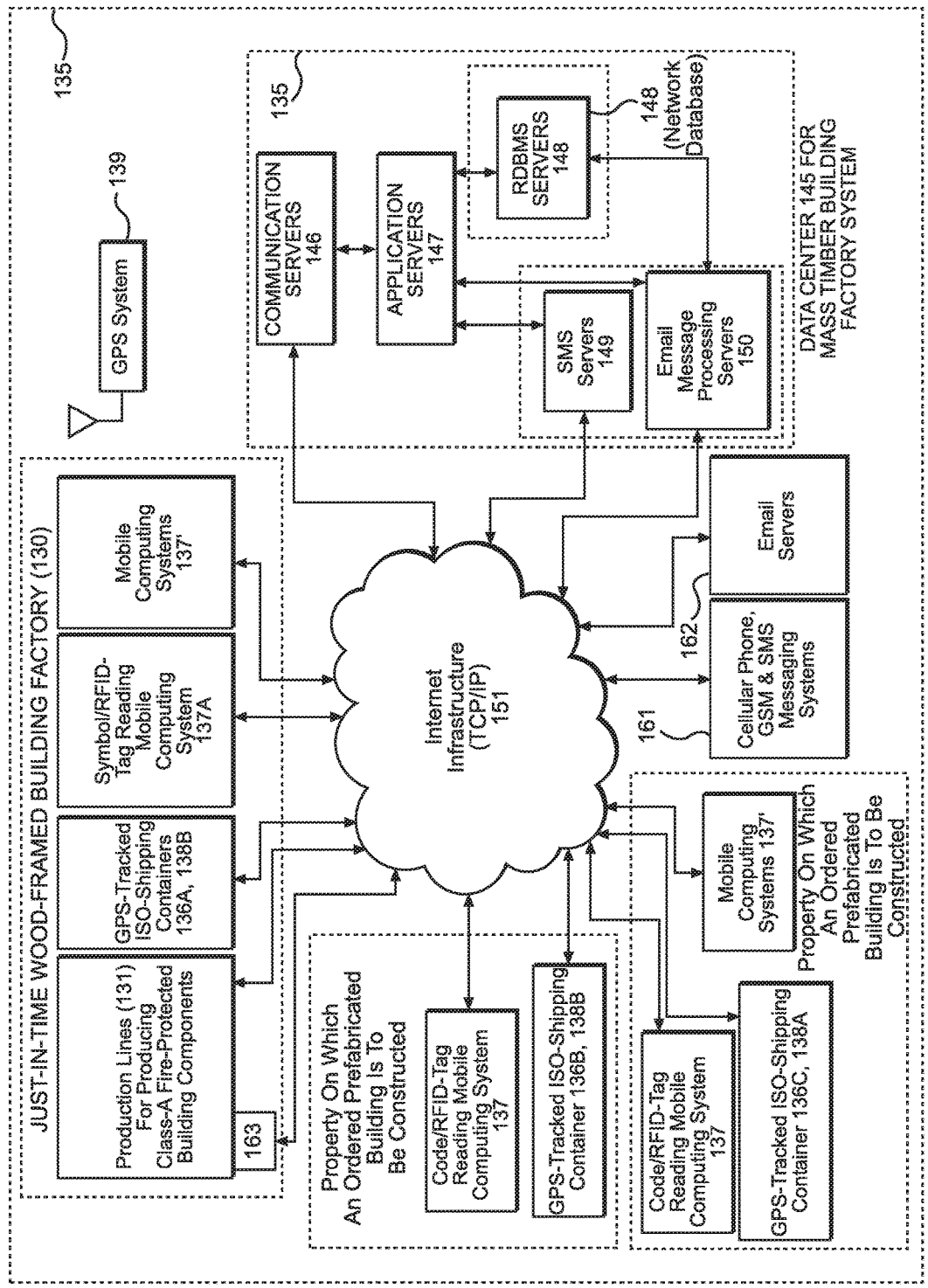
FIG. 41 is a schematic system network representation of the just-in-time factory system shown in FIGS. 39A and 39B, shown comprising (i) a just-in-time mass timber building factory with multiple production lines for producing Class-A fire-protected CLT building components, (ii) GPS-tracked ISO-shipping containers and code symbol/RFID tag reading mobile computing system, and (iii) a data center for factory system and supporting a network of mobile computing devices running a mobile application adapted to help track and manage orders, projects and supplies for prefabricating Class-A fire-protected mass timber buildings, and Class-A fire-protected CLT building components for use in constructing the same.

During the prefabrication/production phase shown in FIG. 7, in a prefabricated mass timber building factory system supporting multiple production lines, as illustrated in FIGS. 39A and 39B, prefabricated Class-A fire-protected mass timber building components are produced for use in constructing a pre-specified Class-A fire-protected mass timber building, managed and tracked using the system network 135 illustrated in FIG. 41.

During the construction phase shown in FIG. 7, the builder constructs the building in accordance with the architect's design specifications so as to provide a single-story or multi-story mass timber building having Class-A fire-protection and improved resistance against fire destruction.

In order to carry out the method described above, it will be helpful to describe several new and improved methods of producing Class-A fire-protected CLT and/or NLT building products in accordance with the principles of the present invention. Each of these improved Class-A fire-protected CLT/NLT building products can be used in the practice of the method described in FIG. 7, in combination with the practice of the method of spray-treating lumber and sheathing inside a prefabricated mass timber building under construction, as described in FIGS. 39A through 45J, so as to construct and provide a prefabricated mass timber building with "double" Class-A fire-protection, having received in-factory and on-site Class-A fire-protection.

Specification of the Method of and Apparatus for Producing Class-A Fire-Protected Mass Timber Building Components in Accordance with the Principles of the Present Invention While most fires start small, they often spread rapidly onto surrounding flammable surfaces. Before long, the phenomenon of flash over occurs, where superheated gases cause a whole room to erupt into flame within minutes. To prevent this dangerous event from occurring in a mass timber building, the present invention provides Class-A fire-protected mass timber building components, as shown in FIGS. 8 through 19C, which bear multiple clear (i.e. transparent) surface coatings formed or other deposited by a number of processes including:

(i) dip-coating kiln dried timber pieces (i.e. timber laminations) in a clean fire inhibiting chemical (CFIC) liquid, preferably Hartindo AF21 Total Fire Inhibitor, developed by Hartindo Chemicatama Industri of Jakarta, Indonesia (commercially-available from Newstar Chemicals (M) SDN. BHD of Selangor Darul Ehsan, Malaysia http://newstarchemicals.com/products.html), then laminating these Class-A fire-protected timber laminations together (in different ways) to form mass timber building components in a particular configuration; and/or (ii) spray coating a CFIC liquid (preferably Hartindo AF21 or AF31 Total Fire Inhibitor, and optionally containing a polymer, and anti-mold and anti-termite agents) over the exterior surfaces of the Class-A fire-protective mass timber building components; and optionally, (iii) on-site spraying of the exterior wood surfaces of mass timber building components, with a CFIC liquid (e.g. preferably Hartindo AF31 Total Fire Inhibitor) after the (Class-A fire-protected) mass timber building components have been installed in a mass timber building architecture.

When so treated as taught and disclosed herein, these Class-A fire-protected mass timber building products will (i) prevent flames from spreading and flash over from occurring within a mass timber building, and (ii) confine a fire outbreak to the ignition source so that it can be readily extinguished, or allowed to go out by itself.

The preferred CFIC liquid for use in practicing the present invention is Hartindo AF21 Total Fire Inhibitor. The primary chemical constituents of Hartindo AF21 Total Fire Inhibitor include: monoammonium phosphate (MAP) ($NH_4H_2PO_4$); diammonium phosphate (DAP) $(NH_4)_2HPO_4$; ammonium sulphate $(NH_4)_2SO_4$; urea ($CH_4N_2O$); ammonium bromide ($NH4Br$); and tripotassium citrate $C_6H_5K_3O_7$. These chemicals are mixed together with water to form a clear aqueous solution that is environmentally-friendly (i.e. clean) non-toxic, but performs extremely well as a total fire inhibitor. In the presence of a flame, the chemical molecules in the CFIC-coating formed with Hartindo AF21 liquid on the surface of the fire-protected lumber, interferes with the free radicals (H+, OH−, O) involved in the free-radical chemical reactions within the combustion phase of a fire, and breaks these free-radical chemical reactions and extinguishes the fire's flames.

Figure 8:
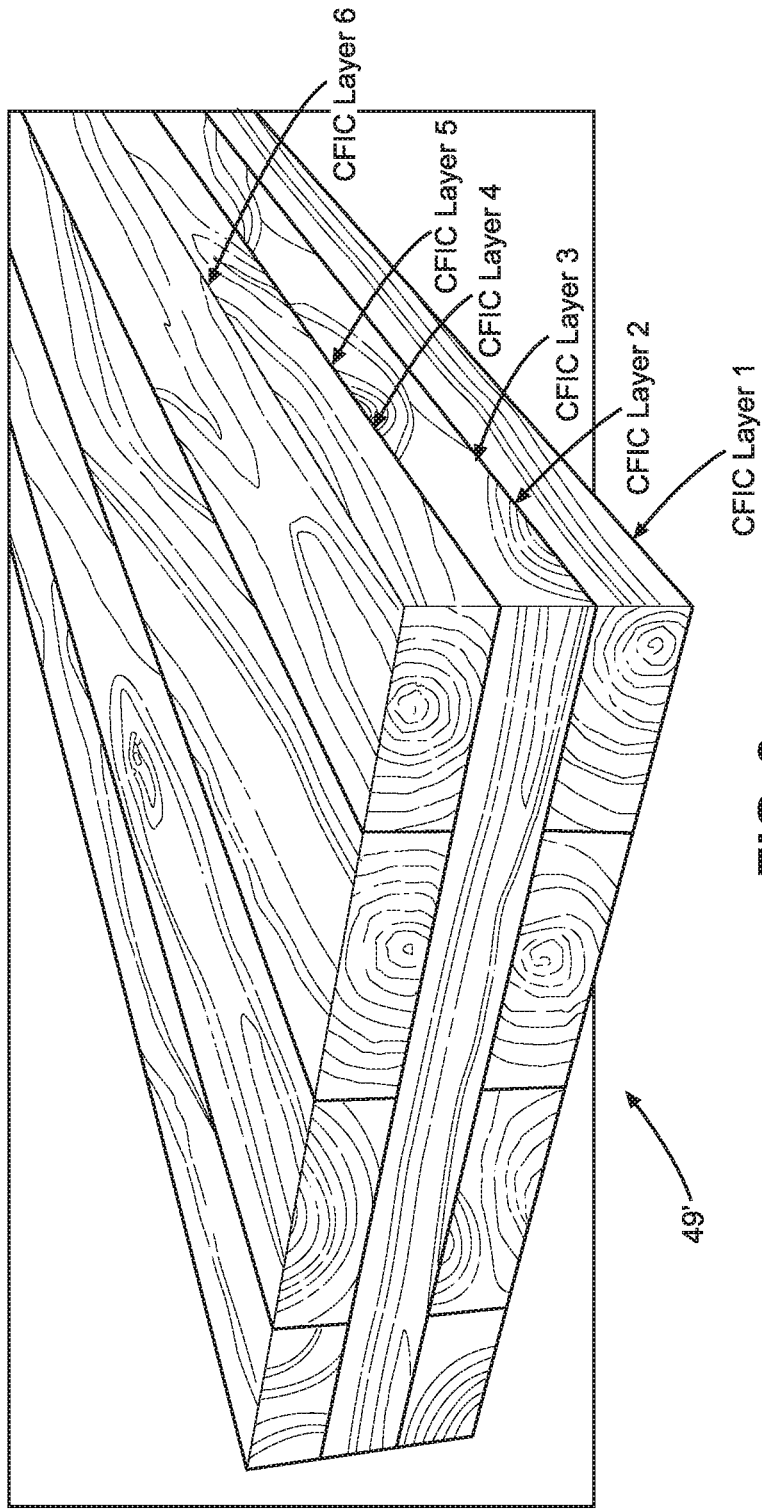
FIG. 8 is a perspective view of a section of three-ply Class-A fire-protected CLT panel produced in accordance with the principles of the present invention, offering six (6) layers of Class-A fire-protection and defense against fire.

Specifying the Method of and System for Producing Class-A Fire-Protective Cross-Laminated Timber (CLT) Building Components According to the Present Invention FIG. 8 shows a section of a three-ply Class-A fire-protected cross-laminated timber (CLT) panel produced in accordance with the principles of the present invention, offering 6 layers of Class-A fire-protection and defense against fire. Typically, Douglas Fir, Western Larch & SPF Grade 2 are used to make CLT panels. Defects such as large knots and resin or bark pockets are removed from the timber used for the CLT production process, based on the strength and final visual quality.

Figure 10:
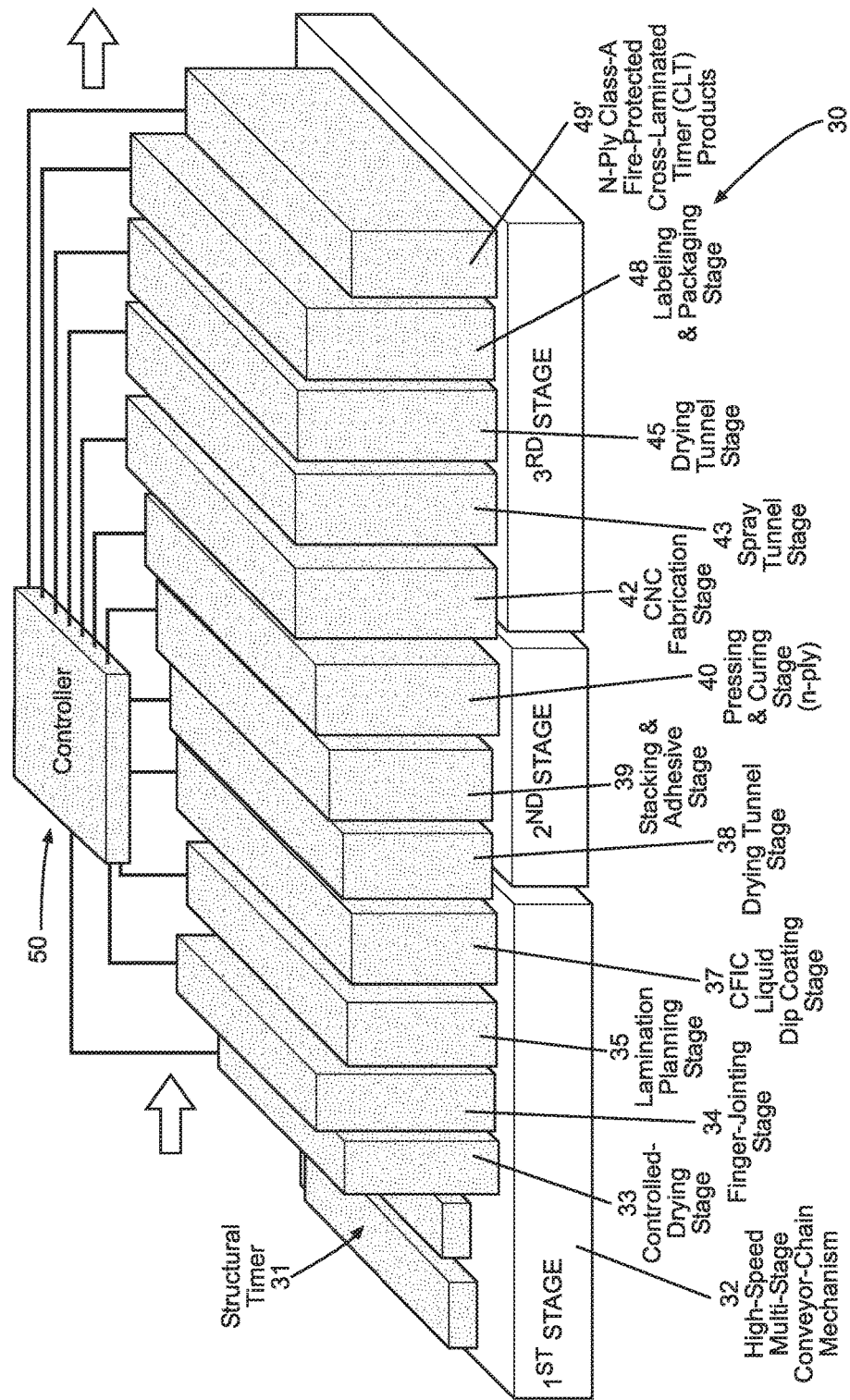
FIG. 10 is a block schematic representation and model of an automated factory system for producing Class-A fire-protected cross-laminated timber (CLT) products, wherein after planing and dimensioning, the timber laminations are automatically dip-coated in clean fire inhibiting chemical (CFIC) liquid, then tunnel dried, and thereafter stacked, glued, pressed and cured into Class-A fire-protected CLT panels in accordance with the principles of the present invention.
Figure 10A:
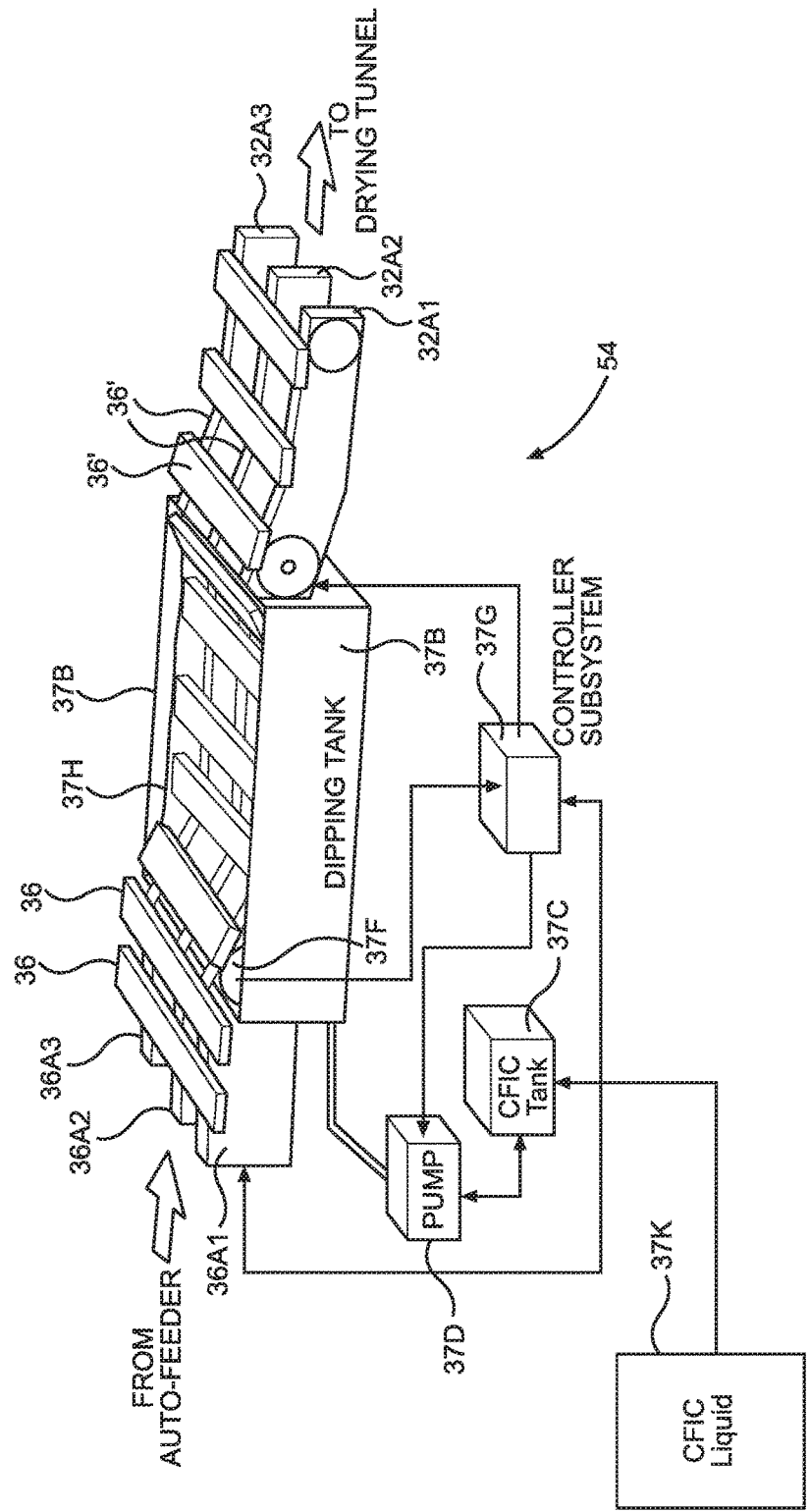
FIG. 10A is schematic representation and model of the automated CFIC liquid dip-coating stage for timber laminations supported along the production lines of the automated factory system shown in FIG. 10.

FIG. 9 shows the flame spread and smoke development characteristics of Spruce Pine Fir (SPF) and Douglas Fir Class-A fire-protected lumber, after being dip-coated with clean fire inhibiting chemical (CFIC) liquid as generally shown in FIGS. 10 and 10A, and tested in accordance with ASTM E84 and UL 723 test standards. Based on these measured flame spread and smoke development indices for Spruce Pine Fir (SPF) and Douglas Fir Class-A fire-protected lumber, it is expected that CLT products of the present invention, when constructed using substantially the same kinds of lumber and treated in substantially the same manner using the CFIC liquid dip-coating methods disclosed in FIGS. 10 and 10A and described herein, will consistently produce flame spread index and smoke development index test results, entitling the CLT products according to the present invention to "Class-A fire-protected" status under ASTM E84 and UL 723 test standards.

FIG. 10 shows an automated factory system 30 for prefabricating mass timber buildings using Class-A fire-protected cross-laminated timber (CLT) products 49' produced from production lines supported within the automated factory system. In the case of CLT panels, after the planning and dimensioning stage, the timber laminations are automatically dip-coated in clean fire inhibiting chemical (CFIC) liquid, then tunnel dried, and thereafter cross-stacked, glued, pressed and cured into Class-A fire-protected CLT panels 49'. The Class-A fire-protected CLT building components of the present invention can be used to build high-rise, low-rise, single apartment and multi-apartment mass timber buildings, in a manner well known in the art.

In accordance with the principles of the present invention, a three-ply Class-A fire-protected cross-laminated timber (CLT) panel 49' bears six (6) surface coatings of clean fire inhibiting chemical (CFIC) liquid (e.g. Hartindo AF21 Total Fire Inhibitor). This set of CFIC surface coatings prevents flames from spreading by breaking the free radical chemical reaction within the combustion phase of fire, and confining the fire to the ignition source which can be readily extinguished, or go out by itself. When practicing the present invention, it is important that other fungicides, biocides, wood preservatives, and/or mildew agents are not added to the CFIC solution 37H (i.e. Hartindo AF21) in the CFIC dip coating tank 37B because it has been discovered that such agents will chemically interfere with and adversely effect the fire-inhibiting properties and characteristics of the Hartindo AF21 fire-inhibiting chemicals, proven by ASTM E84 flame spread test results. However, such agents can be added during the spray coating processes of the present invention, at the spray tunnel stage 43, described in greater technical hereinbelow.

As shown in FIG. 10, the factory system 30 comprises a number of automated stages integrated together under automation and control, namely: a conveyor-chain transport mechanism 32 having various stages in the illustrative embodiment shown in FIGS. 10A and 10B; a controlled-drying stage 33 receiving short pieces of structural timber or lumber 31 from a supply warehouse maintained in or around the factory and drying them in a controlled manner well known in the art; a finger-jointing stage 34, for processing short-length pieces of dried timber (i.e. lumber) and automatically fabricating extended-length finger-jointed pieces of timber, as output from this stage; a lamination planing stage 35 for planing finger-jointed pieces of timber (i.e. laminations) to produce finger-jointed timber laminations 36; an in-line CFIC liquid dip-coating stage 37, as further detailed in FIG. 10A, supporting an elongated dipping tank 37B through which the chain-driven conveyor 32 transports the laminations 36 into the dipping tank 37B and along its length while submerged under CFIC liquid (e.g. Hartindo AF21 Total Fire Inhibitor) 37K during dip-coating operations, to form a CFIC coating on the surfaces of the dip-coated laminations, and removing the CFIC-coated laminations from the dipping tank and transport it to the next stage along the production line; a drying tunnel stage 38, for controllably drying the dip-coated laminations to a desired degree of moisture content; a cross-stacking and adhesive stage 39 for stacking timber laminations 36 and applying an adhesive coating to the finger-jointed timer laminations 36; a pressing and curing stage 40 where the stacked and glued finger-jointed laminations are stacked in a cross-directional manner, provided with adhesive coating, and then placed in a pressing machine where the adhesive is cured under pressure to produce a cross-laminated timber (CLT) panel, beam or other product; CNC trimming and fabrication stage 42 for trimming the cross-laminated timber (CLT) panels into CLT products 41, and fabricating the CLT panels 49 to include apertures, and other interfaces and grooves formed therein; a spray tunnel 43 for spraying a clean fire inhibiting chemical (CFIC) liquid (with e.g. Hartindo AF21 or AF31), with polymer, mold/biocide and termite/DOT agents 44 over the surfaces of the worked CLT panel 49 to produce a coated CLT panel 49' to be worked on by the CNC fabrication stage 42; a drying tunnel 45 for controllably drying the CLT panel to a particular moisture content (e.g. 12%+/−3%); a labeling stage 46 for applying a barcoded/RFID-tagged inspection checkpoint 47 to each CLT panel 49 produced on the production line; a packaging and wrapping stage 48 for packaging and wrapping CLT product 42A; a chain-driven transport conveyor 32 for conveying the final barcoded/RFID-tagged CLT product 49' along the next few stages of the production line.

As illustrated in FIG. 10, the controlled-drying stage 33 will include drying room with heaters that can be driven by electricity, natural or propane gas, or other combustible fuels which produce heat energy required to dry short-length lumber prior to the finger-joint wood processing stage. The boards are kiln dried to a moisture content of 12%+/−3%. Proper moisture content provides for proper adhesion and prevents dimensional variations and surface cracking. Some alternative embodiments, the controlled-drying stage 33 might be installed on the front end of the production line as shown in FIG. 10, and having input and output ports, with one stage of the conveyor-chain mechanism 32 passing through the heating chamber, from its input port to output port, allowing short-length lumber to be kiln-dried as it passes through the chamber along its conveyor mechanism. Other methods and apparatus can be used to realize this stage of the lumber production line of the present invention, provided that the desired degree of moisture within the wood is removed with heat or radiant energy at this stage of the process.

As illustrated in FIG. 10, the finger-jointing lumber processing stage 34 can be configured as generally disclosed in US Patent Application Publication Nos. US20070220825A1 and US20170138049A1, incorporated herein by reference. At this this finger jointing stage, boards are trimmed and finger jointed to obtain the desired lengths and quality of lumber.

In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 34 may be the CRP 2500, CRP 2750 or CRP 3000 Finger Jointing System from Conception R.P., Inc., Quebec, Canada http://www.conceptionrp.com/fingerjointing-systems.

As illustrated in FIG. 10, the laminating planing stage 35 includes wood lamination planing equipment, such industrial band or rotary saws designed to cut, plane and dimension finger-jointed lumber pieces (i.e. laminations) 36 produced from the finger-jointing stage 34, into finger-jointed timber laminations of a specified dimension and thickness. The lamination planing stage 35 can be realized using a band or radial saw as may be required to produce finger-jointed laminations.

As shown in FIG. 10A, the CFIC liquid dip-coating stage 37 of the production line comprises a number of components integrated together, with suitable automation and controls, namely: a chain-driven conveyor subsystem 32 supporting several parallel sets of chain-driven transport rails 32A1, 32A2 and 32A3, as shown, extending from the pressing and curing stage 40 towards a dipping tank 37B, and then running inside and along the bottom of the dipping tank 37B, and having the capacity of transporting finger-jointed timber laminations 36 having a length up to 30 or so feet.

In the illustrative embodiment, the dipping tank 37B has a width dimension up to 32 or so feet to accommodate the width of the timber lamination 36 being transported on chain-driven conveyor rails 32A1, 32A2 and 32A3 mounted and running outside of and also within the dipping tank 37B, as shown. As shown, the timber laminations 36 are supported upon the chain driven rails 32A1, 32A2 and 32A3 while the timber laminations 36 are transported through the dipping tank 37B while fully immersed and submerged at least 6 inches deep in CFIC liquid 39H contained in the dipping tank 37B, moving lumber in and out of the dipping tank 39B in just a few seconds during the CFIC dip-coating process of the present invention. Electrically-powered driven motors are provided for the purpose of driving the chain-driven conveyors 32A1, 32A2 and 32A3 under computer control to transport dip-coated timber laminations 36' from stage to stage along the production line. A level sensor 37F is used for real-time sensing and control of the liquid level of CFIC liquid 37H in the dipping tank 37B at any moment in time during production line operation. A reservoir tank 37C is provided for containing a large volume or supply of made up CFIC liquid solution (e.g. Hartindo AF21 Total Fire Inhibitor). Also, a computer controller 37G is used for controlling the conveyor subsystem 32, and an electric pump 37D for pumping CFIC liquid into the dipping tank 37B to maintain a constant supply level during system operation in response to the liquid level measured by the level sensor 37F and supplied to the control computer 37G.

The dip-coating subsystem 37 may also include additional apparatus including, for example, liquid heaters, circulation pumps and controls for (i) maintaining the temperature of CFIC liquid solution in the dipping tank 37B, and (ii) controlling the circulation of CFIC liquid around submerged timber 36 being transported through the dipping tank in a submerged manner during a CFIC coating process. Controlling such dip coating parameters may be used to control the amount and degree of absorption of CFIC liquid within the surface fibers of the CLT product, as it is rapidly transported through the dipping tank 37B. Notably, the dip coating process allows for the rapid formation a surface coating, or surface barrier, on the surface of each piece of dipped timber 36, and in the presence of a surfactant in the CFIC liquid in the dipping tank 37B, shallow impregnation of CFIC liquid 37H (e.g. Hartindo AF21) can occur into the surface fibers of each timber lamination 36 near atmospheric pressure (i.e. below 6 inches of liquid CFIC in the dipping tank 37B). It is understood that drip pans may also be provided beyond the dipping tank 37B, installed beneath the chain-driven conveyor subsystem 32 arranged between the dipping tank 37B and the labeling and packaging stage 48, so as to recover excess CFIC liquid dripping from the dip-coated lumber pieces and returning this recovered CFIC liquid to the dipping tank 37B after appropriate filtering of the CFIC liquid if and as necessary.

As illustrated in FIG. 10, the stacking and adhesive application stage 39 can be realized using automated adhesive applicators well known in the art to apply a predetermined controlled amount of adhesive to each finger-jointed timber lamination 36 during the automated finger-jointing process. Each layer is sprayed with adhesive and the entire "sandwich" of layers is then pressed vertically and horizontally in a large hydraulic press 40. Typically, adhesives are waterproof and fire-resistant polyurethane; solvent-free and formaldehyde-free.

As illustrated in FIG. 10, the pressing and curing stage 40 can be realized using an automated pressing and curing machine well known in the art to apply a predetermined controlled amount of pressure to the timber laminations after they have been cross-configured, stacked, and placed into the machine for pressing and subsequent curing operations.

As illustrated in FIG. 10, fabricated assembled CLT panels 41 are cut to size, milled to spec, and finished as required using a Honegger CNC Panel Fabricator, or CNC bridge fabricator WMP240 by Weinmann, from Homag Machinery. The Honegger CNC Panel Fabricator supports a 4 head/5 axis CNC Fabricator capable of milling nearly any design specification.

LEDINEK Engineering, do.o.o, of Hoce, Slovenia, offers complete turnkey CLT production lines for high-volume automated production of cross-laminated timber (CLT) panels. Such systems comprise: lamination planers; finger jointing machines; presses & curing machines; and automation and controllers. Such technologies and machines can be used to implement many of the stages described above in the CLT panel production line of the present invention. https://www.ledinek.com/engineered-timber As shown in FIG. 10B, the fire, a blended liquid solution 43B of fire-protection, moisture and UV protection, mold and termite agents is provided to the spray tunnel stage 43 deployed after CNC fabrication stage 42. As shown, the spray tunnel stage 43 comprises: a storage tank 43A for storing a large supply of moisture/fire/UV-protective liquid chemical 43B; a spray tunnel 43C for supporting an array of spray nozzles 43D arranged about the conveyor rails, operably connected to a liquid pump 43E connected to the storage tank 43A under the controller 43F, to provide a 360 degrees of spray coverage in the tunnel 43, for spray-coating dip-coated CLT panels (e.g. elements) within a controlled plane of moisture/fire/UV-protection liquid sprayed to cover 100% of surfaces of such CLT panels 49 as they are being transported through the spray tunnel 43 at high-speed; and a drying tunnel stage 45 installed after the spray tunnel stage 43, for quick drying of spray-coated Class-A fire-protected CLT panel 49', as they move through the drying tunnel 45 towards the labeling and packaging stage 48 under the control of the controller 50. In the preferred embodiment, the blended moisture/fire/UV/mold/termite protection liquid 43B sprayed in the spray tunnel 43 is formulated as follows: 70% by volume Hartindo AF21 liquid (or Hartindo AF31); 10% by volume, polymer; 10% by volume, a biocide; and 10% by volume, termite agent, Disodium Octaborate Tetrahydrate (DOT).

As shown, the Class-A fire-protective CLT panels 49 are continuously feed through the spray tunnel stage 43 for spray coating a moisture/fire/UV-protective liquid coating over the entire surface as each dip-coated Class-A fire-protected CLT panel 49 is feed through the spray tunnel 43. Then, the Class-A fire-protected CLT panel 49' is quick-dried while being passed through the drying tunnel 45 disposed immediately after the spray tunnel 45. This produces a Class-A fire-protective CLT product 49' with a moisture/fire/UV/mold/termite protective coating as it exits the production line, improving the durability of the Class-A fire-protective CLT product when exposed to outdoor weather conditions during the construction phase.

In the presence of a flame, the chemical molecules in the CFIC-coating on the surface of the Class-A fire-protected CLT panel interferes with the free radicals (H+, OH, O−) produced during the combustion phase of a fire, and breaks the fire's free-radical chemical reactions and extinguishes its flame. This is a primary fire suppression mechanism implemented by the CFIC-coatings deposited on wood surfaces in accordance with the principles of invention, disclosed and taught herein.

Figure 11B:
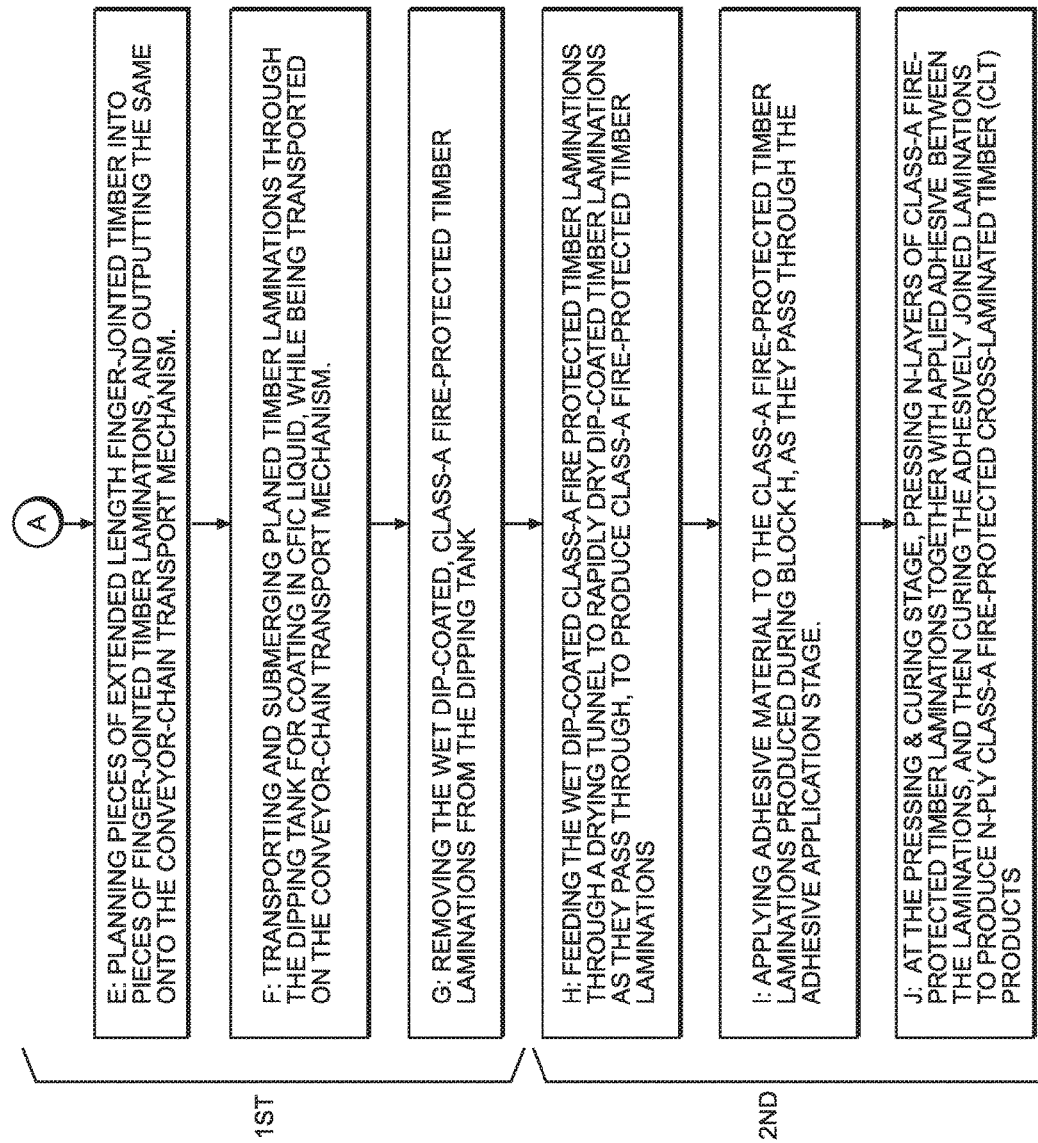
Figure 11C:
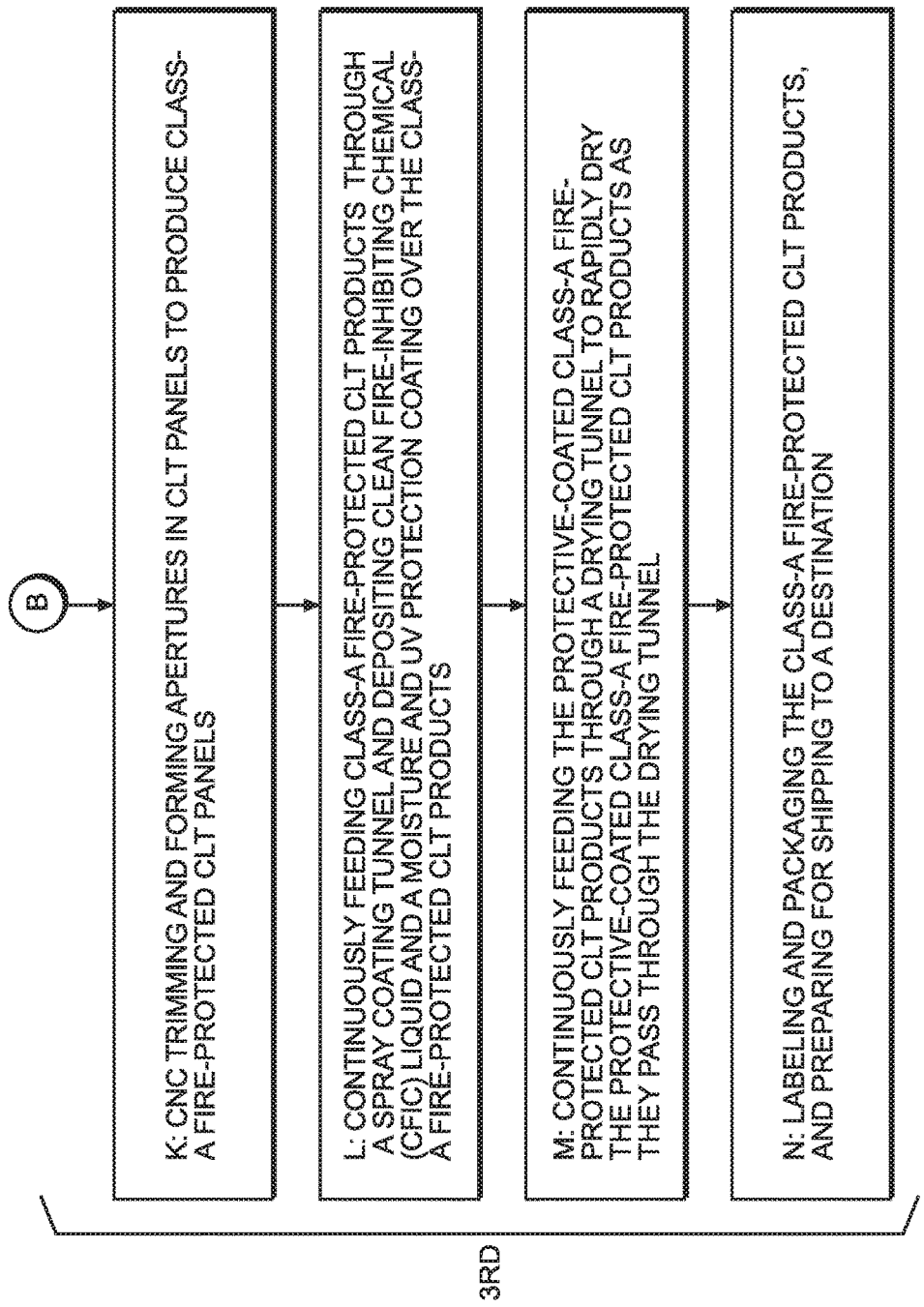

Method of Producing Class-A Fire-Protected Cross-Laminated Timber (CLT) Panels and Other Elements for Use in Class-A Fire-Protected Mass Timber Building Construction FIGS. 11A, 11B and 11C describe the high level steps carried out when practicing the method of producing Class-A fire-protected cross-laminated timber (CLT) panels 49' for use in Class-A fire-protected mass timber building construction.

As indicated at Block A in FIG. 11A, in an automated lumber factory, a high-speed Class-A fire-protected lumber production line is installed and operated, with a reservoir tank 37B containing a large supply of clean fire inhibiting chemical (CFIC) liquid 37H that is continuously supplied to the automated high-speed CFIC liquid dip-coating stage 37 of the lumber factory, installed before the adhesive application stage during CLT production in the factory.

As indicated at Block B in FIG. 11A, a supply of untreated short-length lumber is loaded onto the conveyor-chain transport mechanism 32 installed along and between the stages of the production line. The term "short" is relative to the length of the timber product to be produced along the production line.

As indicated at Block C in FIG. 11A, the untreated short-length lumber is loaded into the controlled-drying stage of the production line so to produce suitably dried short-length lumber for supply to the finger-jointing processing stage 34. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a drying tunnel-like chamber, through which chain-driven conveyor mechanism 32 passes, like other stages along the lumber production line of the present invention, while the temperature and humidity of the environment is controlled using electric-driven or gas-combusting space heaters under computer control in a manner well known in the art. The goal of this stage is to drive off moisture in the timber until it reaches 12% humidity, plus or minus 2%

As indicated at Block D in FIG. 11A, the controllably-dried short-length lumber is continuously supplied into the finger-jointing stage 34, for producing pieces of extended-length finger-jointed timber (lumber) 36 in a highly automated manner.

As indicated at Block E in FIG. 11B, pieces of extended length finger-jointed timber are planed and dimensioned into pieces of finger-jointed timber laminations 36, and outputting the same onto the conveyor-chain transport mechanism 32.

As indicated at Block F in FIG. 11B, the planed and dimensioned finger-jointed timber laminations 36 are continuously transported and submerged through the dipping tank 37B of the dip coating stage 37 for sufficient coating in CFIC liquid (e.g. Hartindo AF21 Total Fire Inhibitor) 37K, while being transported on the conveyor-chain transport mechanism 32.

As indicated at Block G in FIG. 11B, continuously removing the wet dip-coated timber lamination timber 36 as they are continuously removed from the dipping tank 39B, and automatically move through the drying tunnel 38 at the subsequent stage along the production line.

In the illustrative embodiment, Hartindo AF21 Total Fire Inhibitor is used as the CFIC liquid solution 34H to form the CFIC surface coating onto treated wood/lumber products produced on the production line of the factory described above. The surfactants in the Hartindo AF21 CFIC liquid enable its chemical molecules to impregnate ever so slightly the surface of the treated wood. This way, in the presence of a flame, the chemical molecules in the CFIC-coating on the surface of the fire-protected lumber, interferes with the free radicals (H+, OH−, O−) of the chemical reaction produced within the combustion phase of a fire, and breaks the fire's chemical reaction and extinguishes its flame. This is a primary fire suppression mechanism deployed or rather implemented by the CFIC-coatings deposited on wood surfaces in accordance with the various principles of invention, disclosed and taught herein.

As indicated at Block H in FIG. 11B, feeding the wet dip-coated Class-A fire protected timber laminations 36 through a drying tunnel 38 to rapidly dry dip-coated timber laminations 36 as they pass through, to produce Class-A fire-protected timber laminations 36'.

Figure 2:
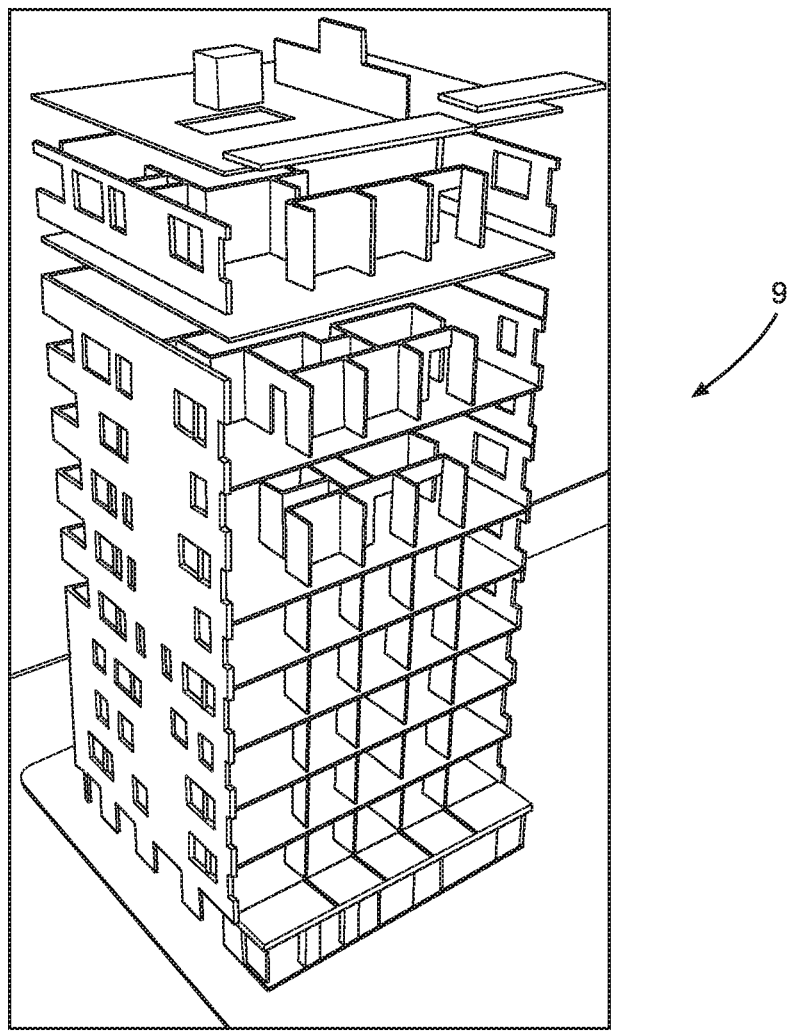
FIG. 2 is a perspective view of a 3D CAD-based geometrical building model of the conventional multi-story high-rise mass-timber building constructed from cross-laminated-timber (CLT) building components supported on a concrete foundation.
Figure 2A:
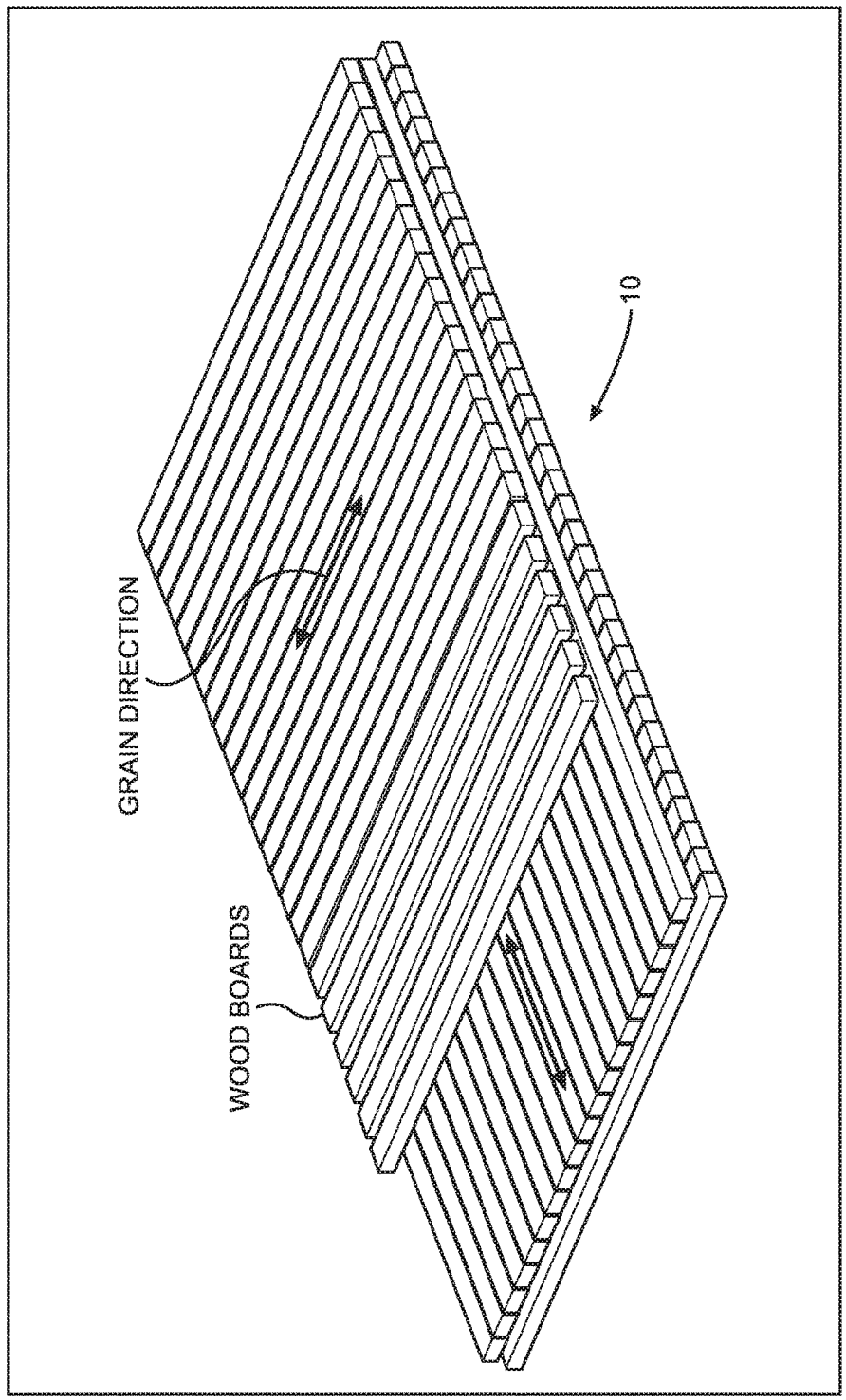
FIG. 2A is a perspective view of a cross-laminated timber (CLT) panel used in the mass timber building shown in FIG. 2, constructed of layers of Spruce or Fir laminations (i.e. boards) glued together to provide maximum strength and durability, wherein the direction of grain in each lamination layer is laid orthogonal to the direction of the grain of neighboring lamination layers.
Figure 2B:
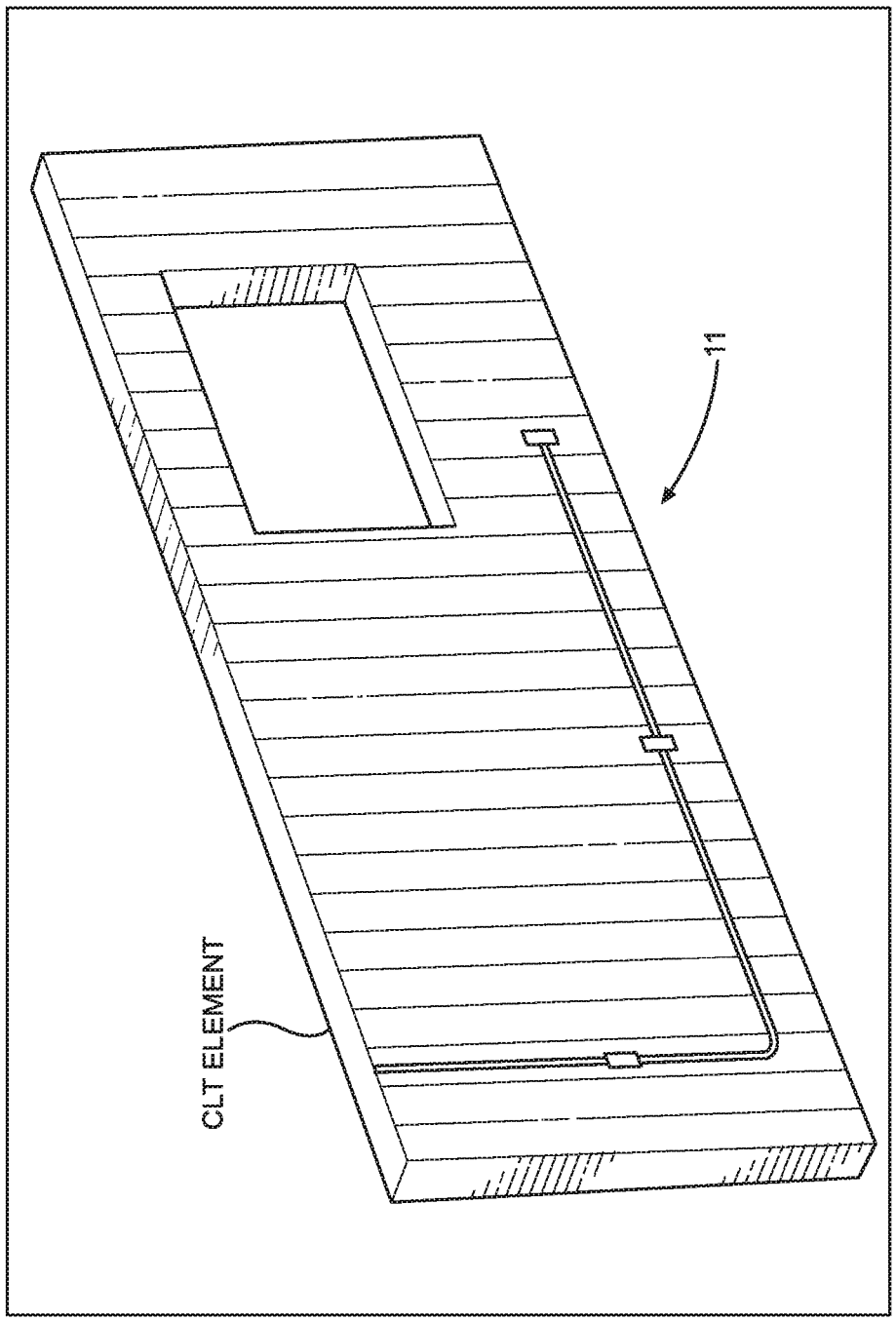
FIG. 2B is a perspective view of a CLT element (e.g. panel), wherein a computer-controlled (CNC) machinery in a factory is used to trim the CLT panel to exact dimensions, and cut openings for windows and other installations, and fabricate holes and grooves and features required by the finished CLT panel, destined for installation in a particular location in a specific mass timber building design.
Figure 3:
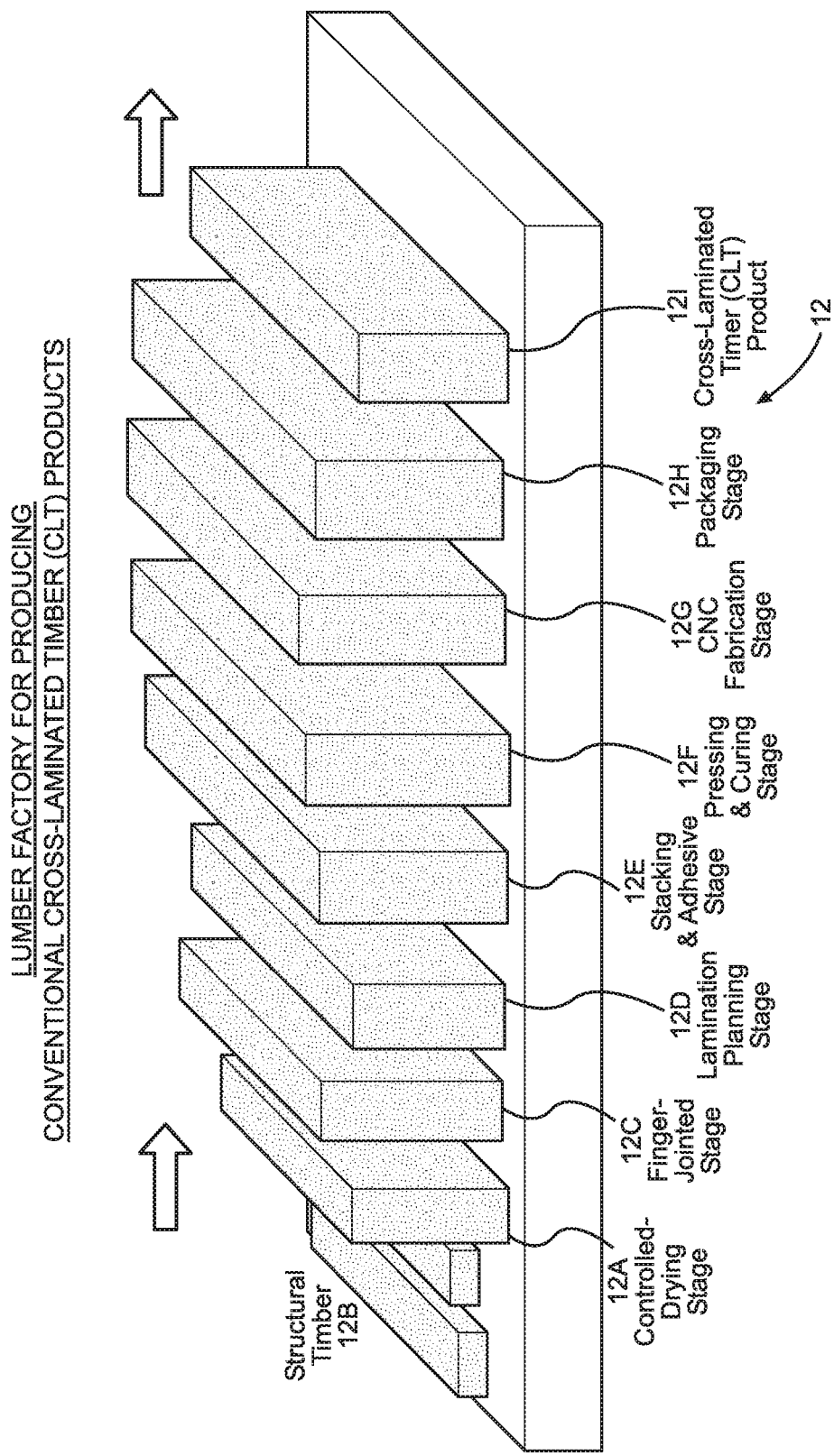
FIG. 3 is a schematic diagram showing the various stages of processing supported within a conventional factory system for producing cross-laminated timber (CLT) construction components, including a controlled drying stage for drying structural timber to a humidity of 12% + or − 2% or less and then visual or machine strength grading of boards, a finger jointing stage for producing finger-jointed laminations from graded boards or board sections, a lamination planing stage for planing and dimensioning finger-jointed laminations, an adhesive stage for applying adhesive to the planed laminations, a stacking, pressing and curing stage for stacking, pressing and curing the finger-jointed laminations with adhesive into a cross-laminated timber (CLT) piece using a hydraulic or vacuum process, a CNC fabrication stage for trimming the dimensions of the CLT element, including cutting widows, doorways and other apertures required by the design, and a packaging stage for packaging the CLT elements for shipping to their destination.
Figure 3A:
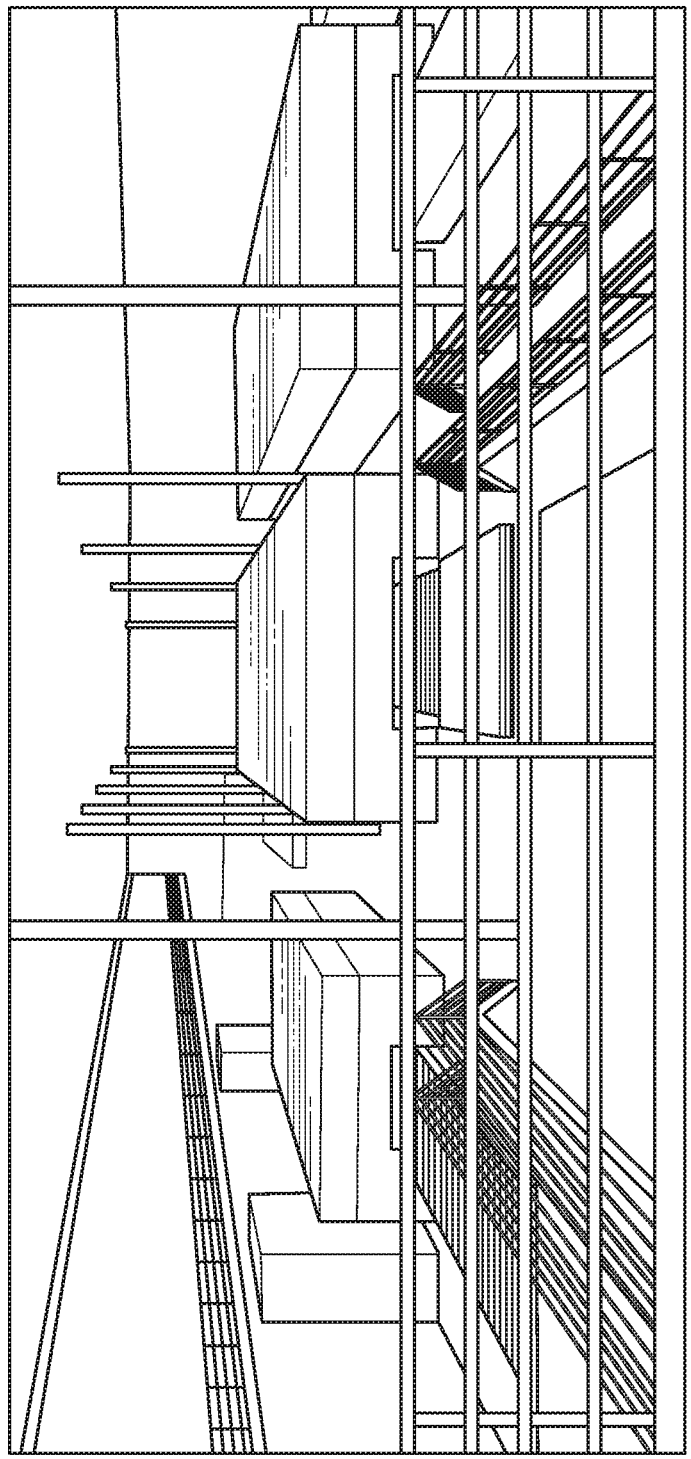
FIG. 3A is a perspective view of a conventional CLT production line showing a hydraulic press for pressing and curing cross-laminated laminations (i.e. boards) with applied adhesive coatings, under great pressure, to product CLT elements.
Figure 3B:
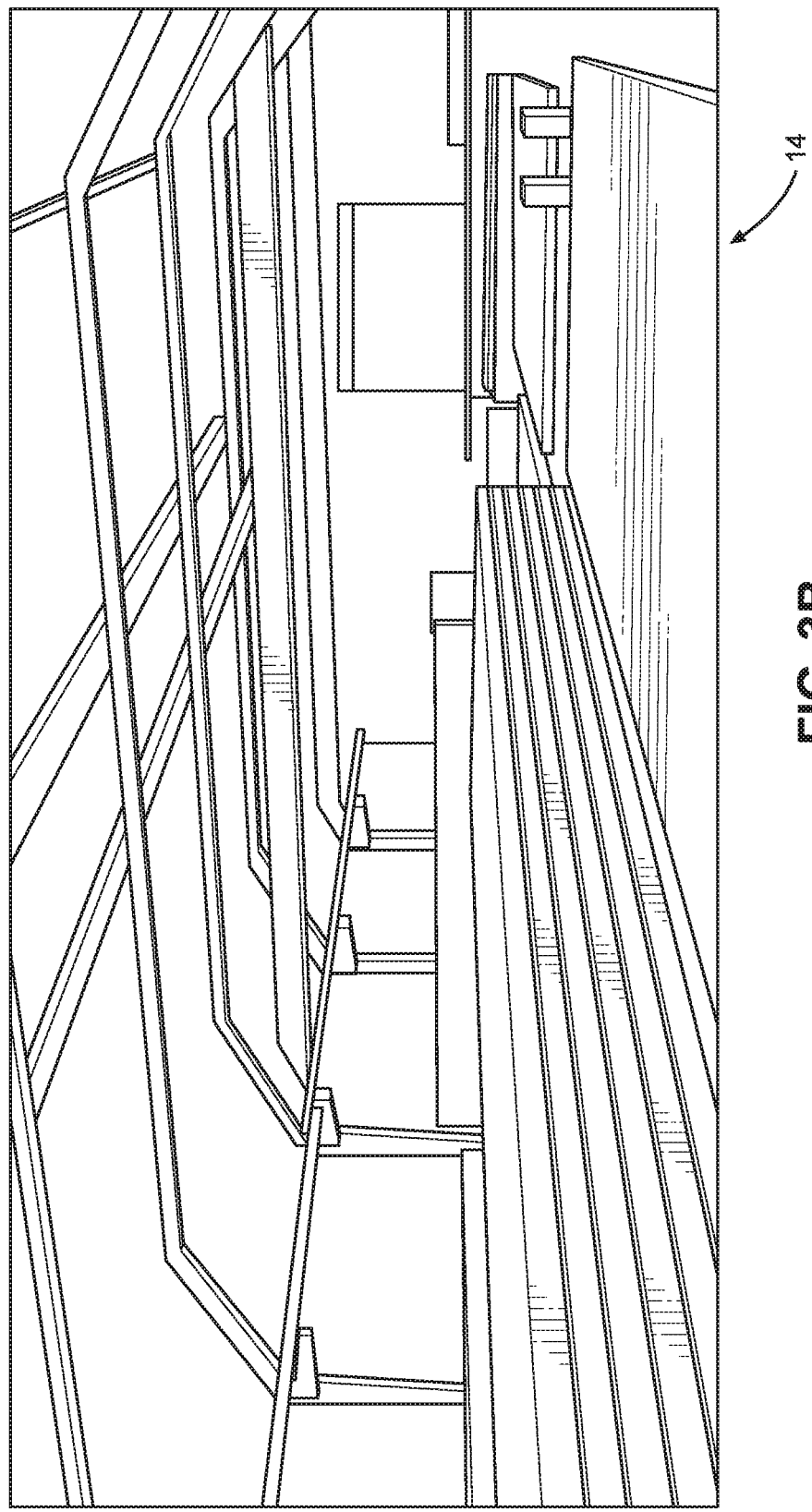
FIG. 3B is a perspective view of a conventional CLT panel production line including an overhead crane for picking up product CLT panels and moving them to the CNC machining stage, where CLT panels are carefully dimensioned and apertures are formed using CNC sawing and drilling operations.
Figure 3C:
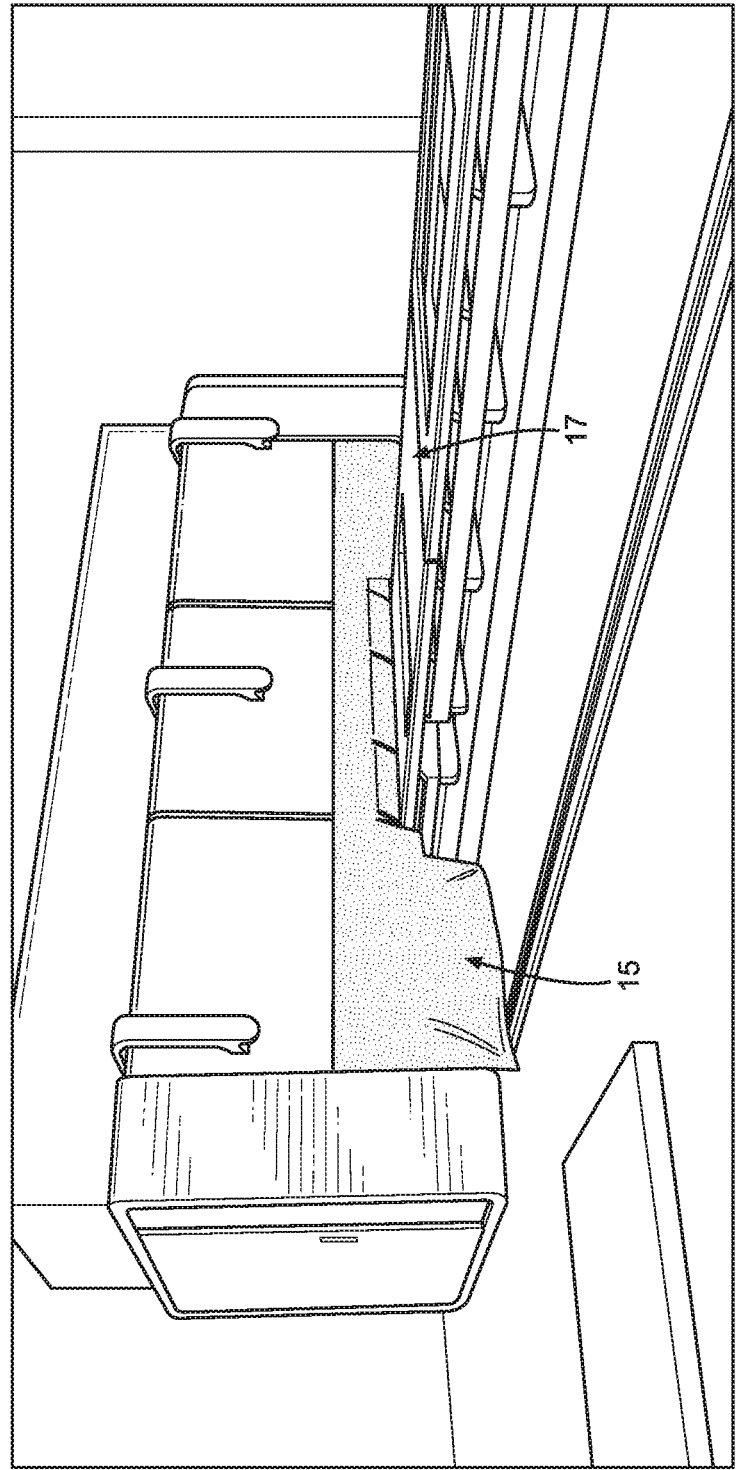
FIG. 3C is a perspective view of a conventional overhead CNC bridge that moves along a CLT production line over a mounted CLT panel, in which apertures are carefully dimensioned and formed using CNC sawing and drilling operations.
Figure 3D:
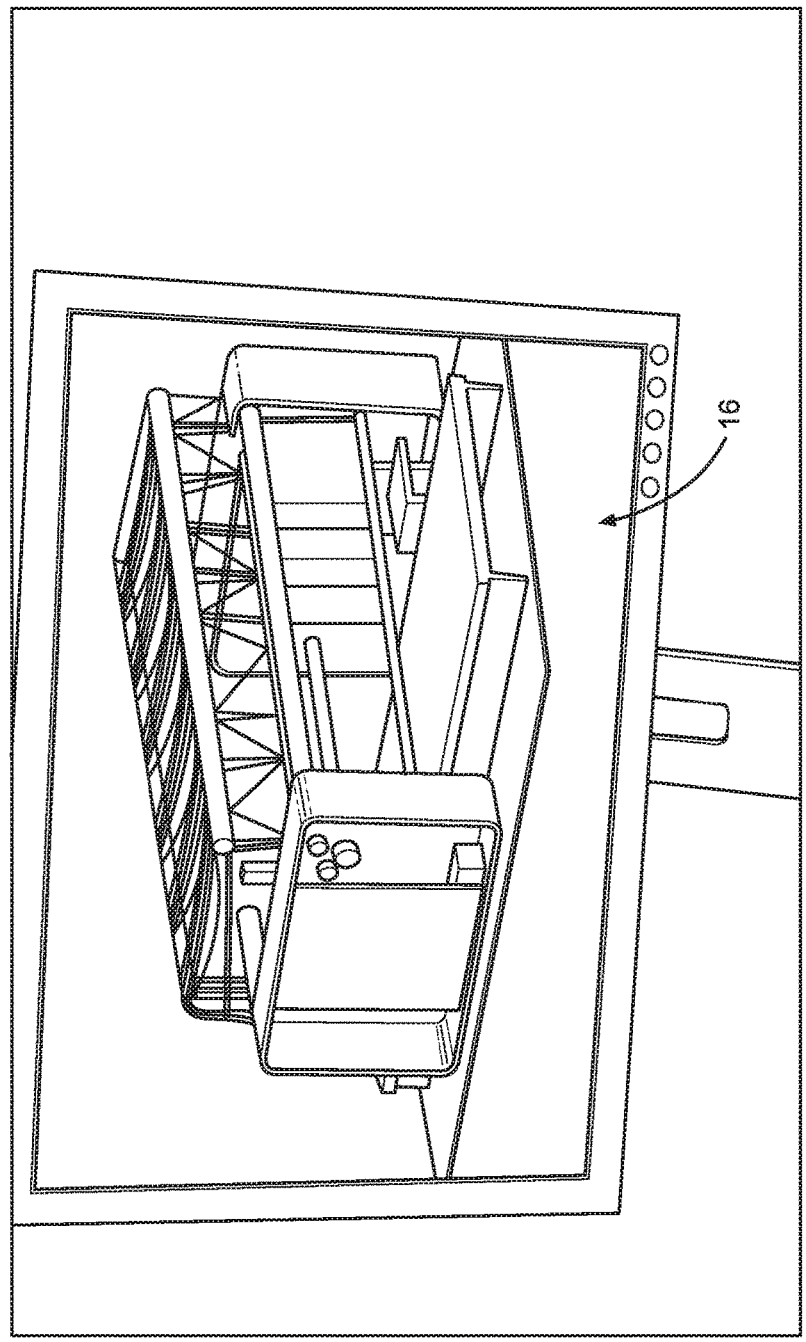
FIG. 3D is a conventional display screen showing a configuration of the CNC bridge system required to fabricate a specific CLT panel, from a standard CLT element, for use in a specific mass timber building project.
Figure 4B:
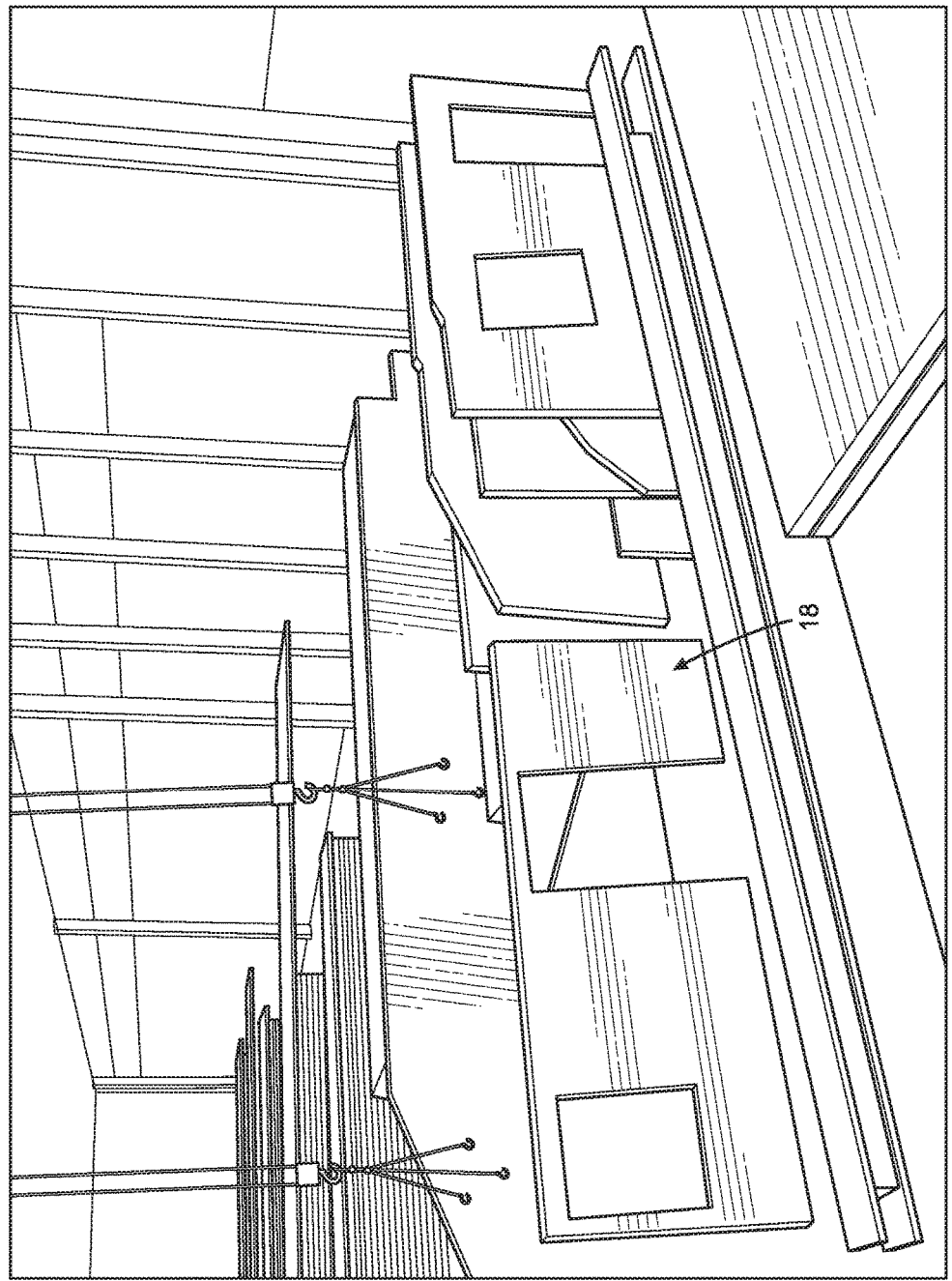
FIG. 4B is a perspective view of a conventional CLT factory, in which a set of CLT panel have been fabricated and stored for shipment to the construction site of the prefabricated mass timber building.
Figure 5A:
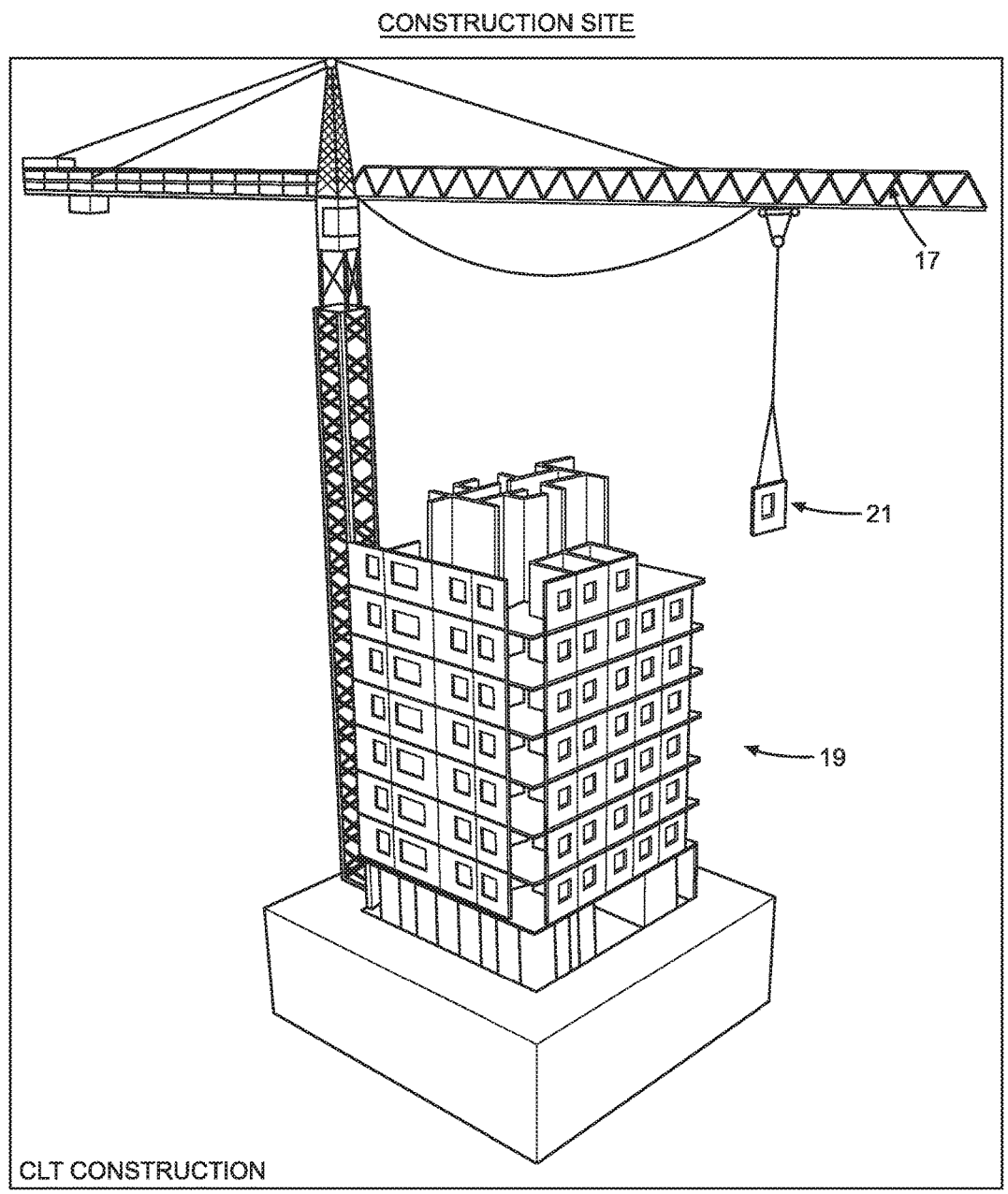
FIG. 5A is a perspective view of a conventional high-rise mass timber building showing a crane lowering a CLT panel into position during the construction phase.
Figure 5B:
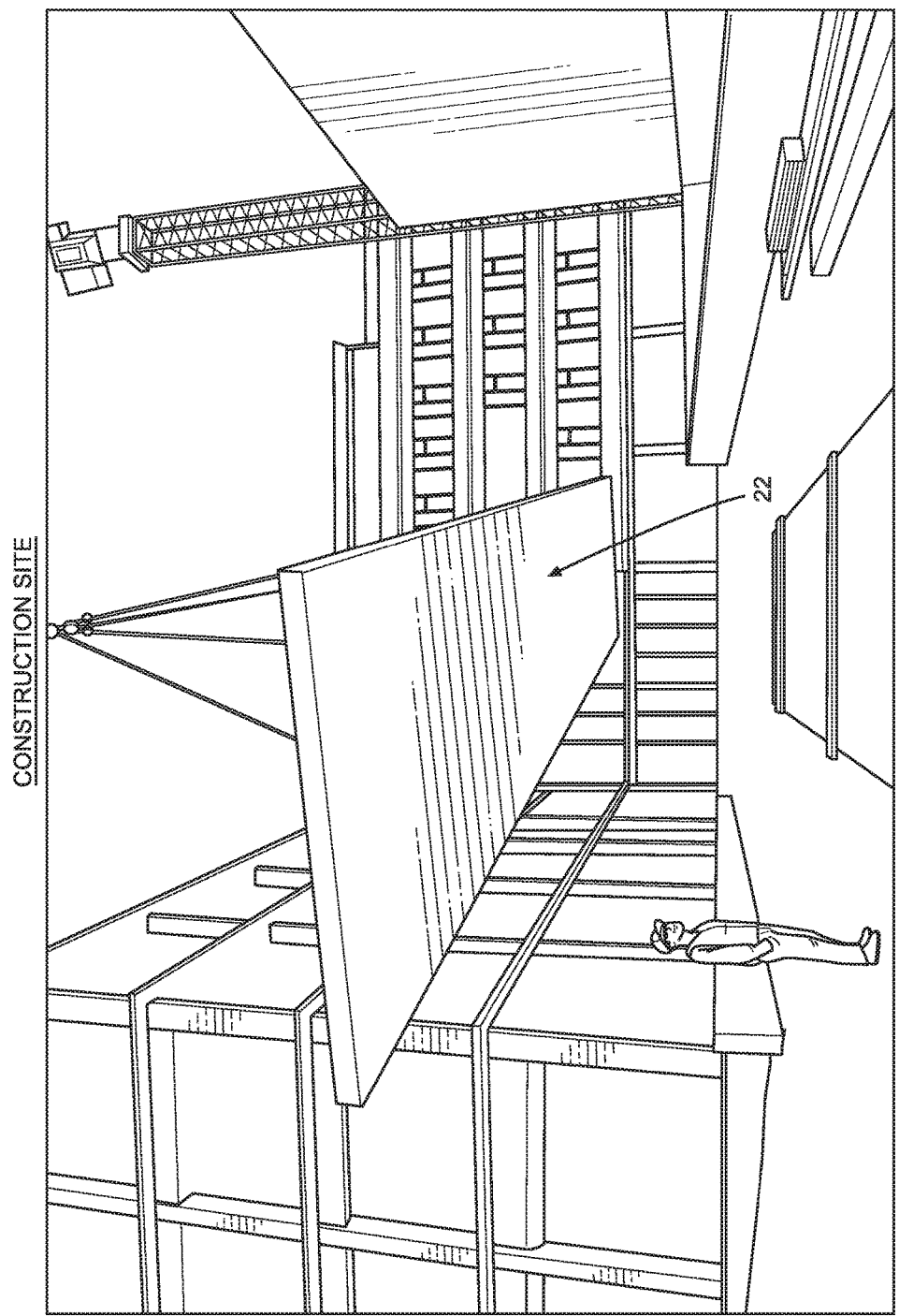
FIG. 5B is a perspective view of a conventional CLT panel being lifted off the ground for placement on the building being constructed.
Figure 5C:
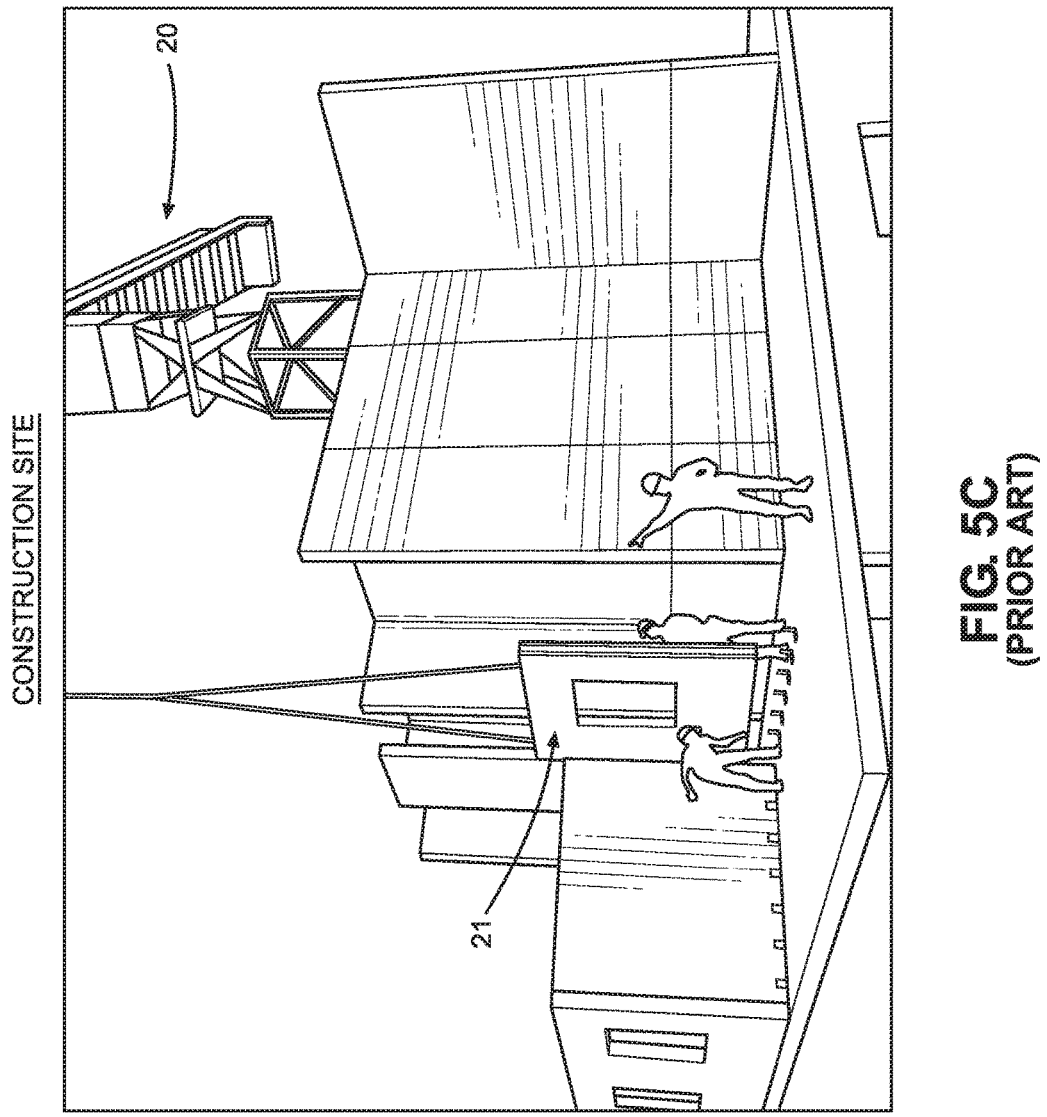
FIG. 5C is a perspective view of a conventional CLT panel being lowered into position on a mass timber building being constructed, using the crane shown in FIG. 5A.
Figure 6A:
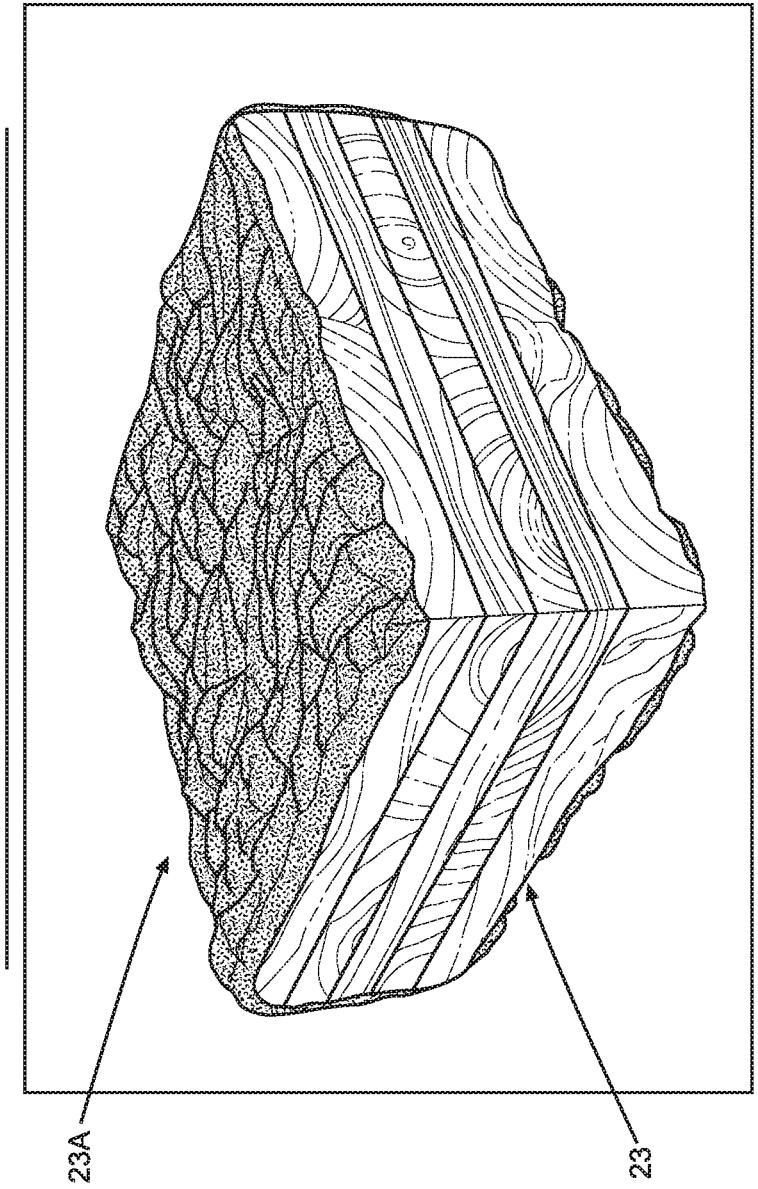
FIG. 6A is a perspective view of a conventional prior art CLT panel showing how, when a massive solid-wood CLT panel burns, its surface becomes charred from pyrolysis, and that the charring can slow the fire and protect the inner core from heating, keeping it structurally sound, so that CLT panels having more layers of wood can last longer in a fire.

As indicated at Block I in FIG. 11B, applying adhesive material to the Class-A fire-protected timber laminations 36' produced during Block H, as they pass through the stacking and adhesive stage 39, where the dip-coated timber laminations 36' are cross-stacked according to cross-laminated stacking principles illustrated in FIG. 2A, to form n layers of Class-A fire-protected timber laminations 36' stacked together with applied adhesive on the laminations.

As indicated at Block J in FIG. 11B, at the pressing & curing stage 40, pressing p-layers of Class-A fire-protected timber laminations 36' together with applied adhesive on the laminations, and then curing the adhesively joined laminations to produce n-ply Class-A fire-protected cross-laminated timber (CLT) products 41.

As indicated at Block K in FIG. 11C, use CNC machining at CNC fabrication stage 42 to trim and form apertures in CLT panels 41 to produce fabricated Class-A fire-protected CLT panels 41' with apertures, mounting holes, grooves and other surface features.

As indicated at Block L in FIG. 11C, continuously feeding Class-A fire-protected CLT products through a spray coating tunnel 43, spraying Class-A fire-protective CLT product 41 and depositing clean fire-inhibiting chemical (CFIC) liquid, and a moisture and UV (and optionally mold and termite) protection coating over the Class-A fire-protected CLT panels 41 while the CLT panel 41 is being passed through the spraying tunnel 43 in a high-speed manner.

As indicated at Block M in FIG. 11C, continuously feeding the protective-coated Class-A fire-protected CLT products 44 through a drying tunnel 45 to rapidly dry the protective-coated Class-A fire-protected CLT products as they pass through the drying tunnel 45.

As indicated at Block N in FIG. 11C, labeling and packaging the Class-A fire-protective CLT products 49' at the labeling and packaging stage 48, and preparing for shipping to a destination. At the labeling stage 48, a unique barcoded/RFID-tagged inspection checkpoint 300 is mounted on each Class-A fire-protective CLT products 49' in a conspicuous manner, containing certifications of Class-A fire-protecting by CFIC liquid dip-coating and spray-coating operations, by particular technicians under particular supervisions, who certify as to the quality of services provided to the CLT building product/component 49' on certain dates. Each barcoded/RFID-tag 182 will be encoded with an unique product identifier that relates to a mass timber building project, and customer, and identifies where all information for the CLT product 49' is stored on the network database 113C on the system network 135. Such information on the barcode/RFID-tagged inspection checkpoint 300 will be uploaded and stored in the network database 113A of the system network 135 to be described in greater detail hereinafter.

Figure 12:
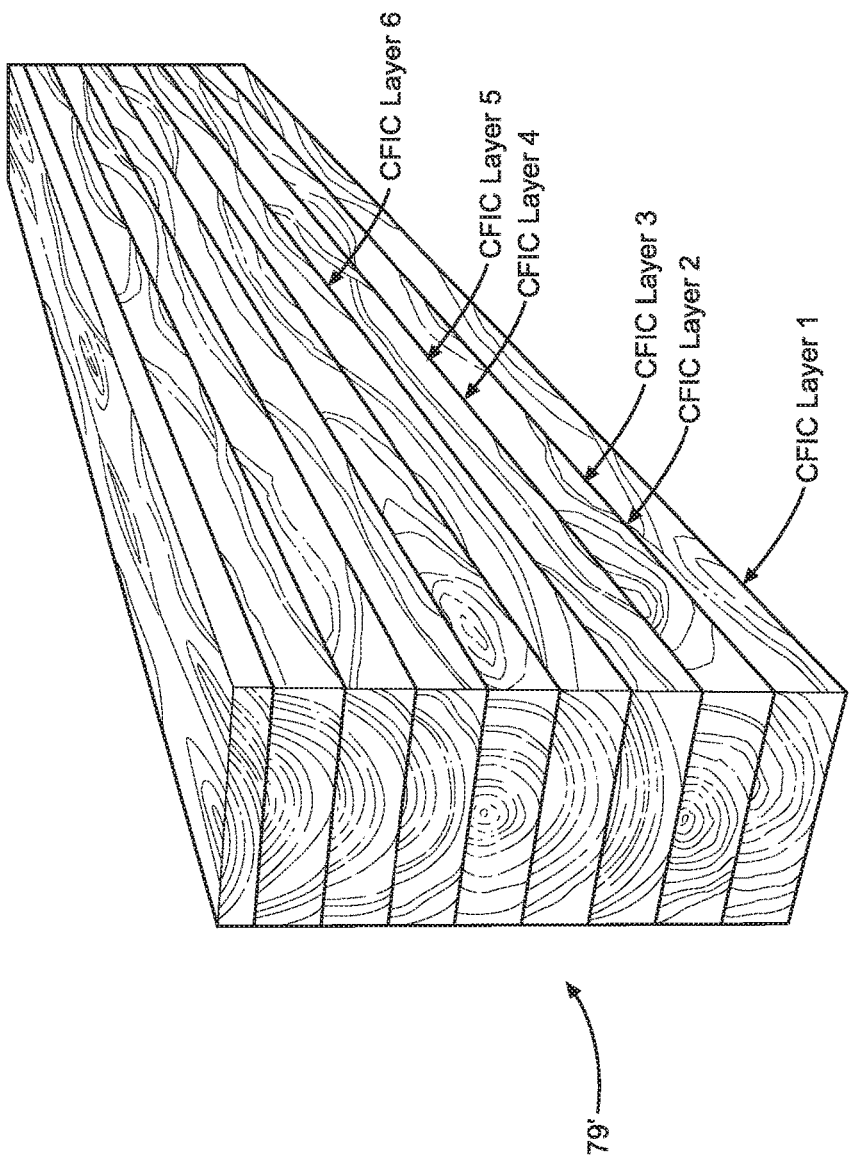
FIG. 12 a perspective view of a section of ten-ply (10-ply) Class-A fire-protected glue laminated timber (GLT) panel produced in accordance with the principles of the present invention, offering 20 layers of Class-A fire-protection and defense against fire.

Specifying the Method of and System for Producing Class-A Fire-Protective Glue Laminated Timber (GLT) Building Components According to the Present Invention FIG. 12 shows a section of a ten-ply (10-ply) Class-A fire-protected GLT beam produced in accordance with the principles of the present invention, offering 10 layers of Class-A fire-protection and defense against fire. Typically, Douglas Fir, Western Larch & SPF Grade 2 are typically used for making GLT panels. Defects such as large knots and resin or bark pockets are removed from the timber used for the GLT production process, based on the strength and final visual quality.

Figure 14:
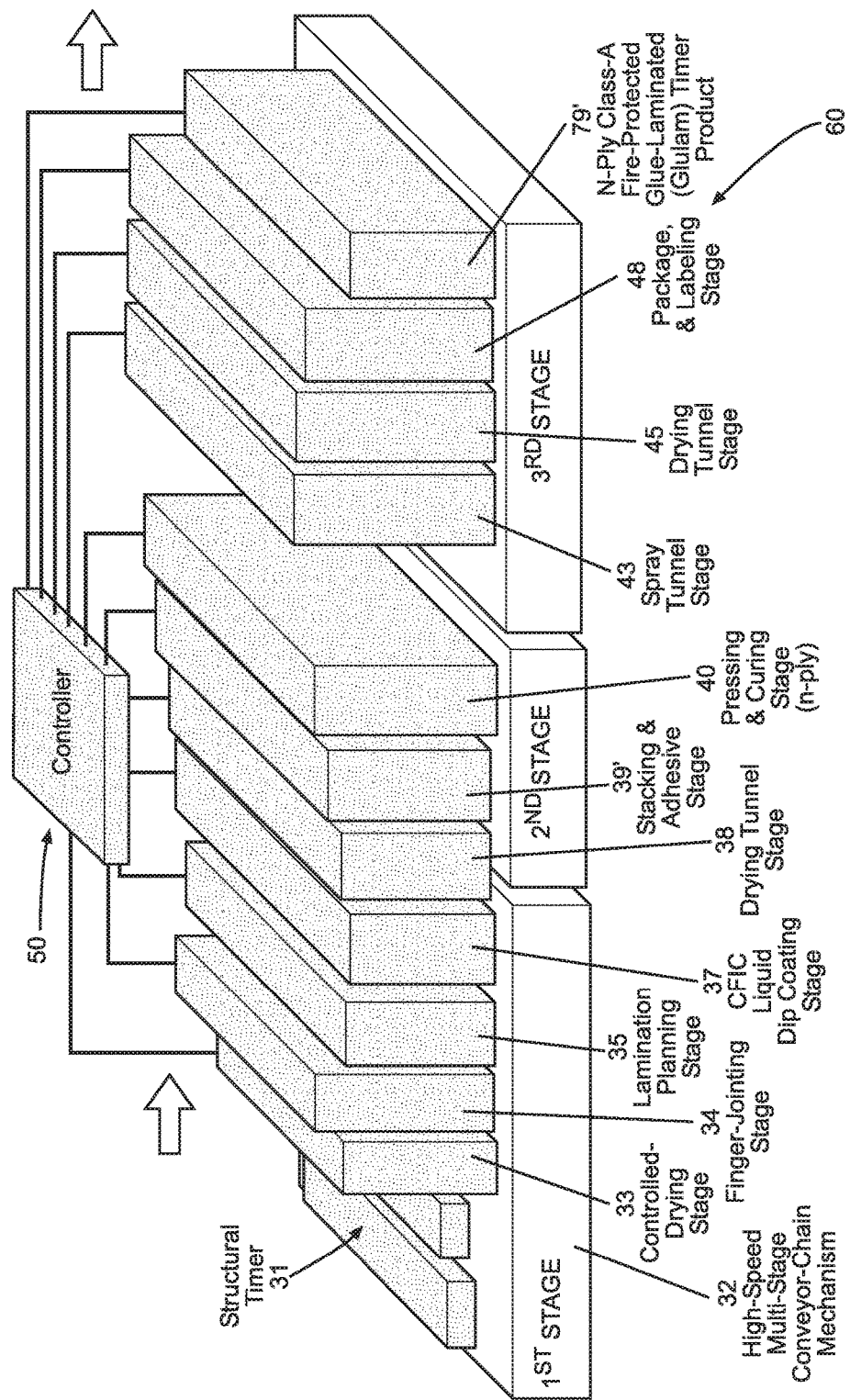
FIG. 14 is a block schematic representation and model of an automated factory system for producing Class-A fire-protected cross-laminated timber (CLT) products, wherein after planing and dimensioning, the timber laminations are automatically dip-coated in clean fire inhibiting chemical (CFIC) liquid, then tunnel dried, and thereafter cross-stacked following CLT stacking principles, glued with adhesive, pressed and cured into Class-A fire-protected CLT panels in accordance with the principles of the present invention.
Figure 14A:
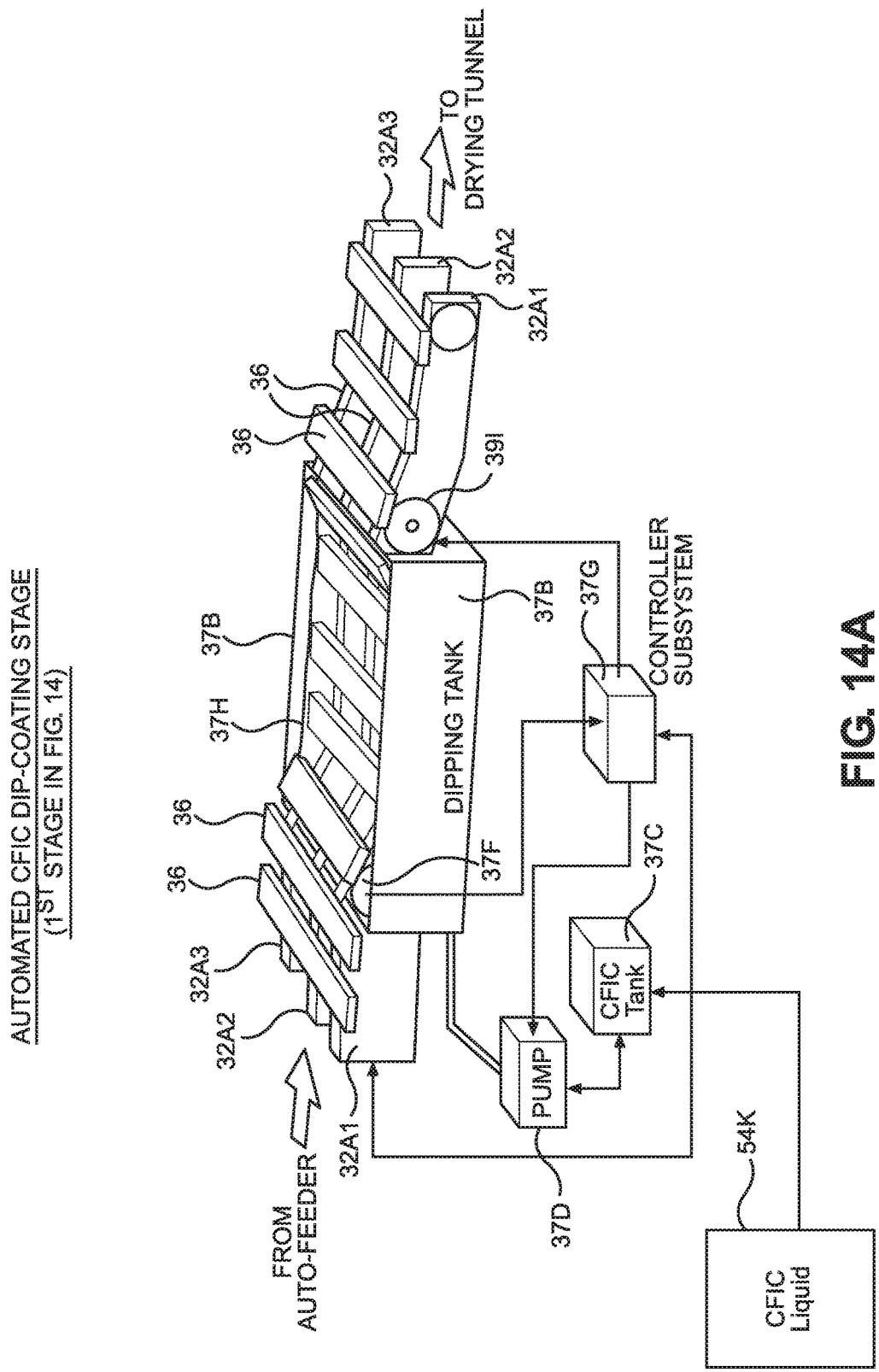
FIG. 14A is schematic representation and model of the automated CFIC liquid dip-coating stage for timber laminations supported along the production lines of the automated factory system shown in FIG. 14.

FIG. 13 shows the flame spread and smoke development characteristics of Spruce Pine Fir (SPF) and Douglas Fir Class-A fire-protected lumber, after being dip-coated with clean fire inhibiting chemical (CFIC) liquid as generally shown in FIGS. 14 and 14A, and tested in accordance with ASTM E84 and UL 723 test standards. Based on these measured flame spread and smoke development indices for Spruce Pine Fir (SPF) and Douglas Fir Class-A fire-protected lumber, it is expected that GLT products of the present invention, when constructed using substantially the same kinds of lumber and treated in substantially the same manner using the CFIC liquid dip-coating methods disclosed in FIGS. 14 and 14A and described herein, will consistently produce flame spread index and smoke development index test results, entitling the GLT products according to the present invention to "Class-A fire-protected" status under ASTM E84 and UL 723 test standards.

FIG. 14 shows an automated factory system 60 for prefabricating mass timber buildings using Class-A fire-protected glue-laminated timber (GLT) products 79' produced from production lines supported within the automated factory system. In the case of GLT panels, after the planning and dimensioning stage, the timber laminations are automatically dip-coated in clean fire inhibiting chemical (CFIC) liquid, then tunnel dried, and thereafter stacked, glued, pressed and cured into Class-A fire-protected GLT beams, panels and other building products. The Class-A fire-protected GLT building components of the present invention 79' can be used to build high-rise, low-rise, single apartment and multi-apartment mass timber buildings, in a manner well known in the art.

In accordance with the principles of the present invention, a ten-ply Class-A fire-protected glue laminated timber (GLT) panel 79' bears ten (10) surface coatings of clean fire inhibiting chemical (CFIC) liquid (e.g. Hartindo AF21 Total Fire Inhibitor). This set of CFIC surface coatings prevents flames from spreading by breaking the free radical chemical reaction within the combustion phase of fire, and confining the fire to the ignition source which can be readily extinguished, or go out by itself. When practicing the present invention, it is important that other fungicides, biocides, wood preservatives, and/or mildew agents are not added to the CFIC solution 37H (i.e. Hartindo AF21) in the CFIC dip coating tank 37B because it has been discovered that such agents will chemically interfere with and adversely effect the fire-inhibiting properties and characteristics of the Hartindo AF21 fire-inhibiting chemicals, proven by ASTM E84 flame spread test results. However, such agents can be added during the spray coating processes of the present invention, at the spray tunnel stage 43, described below.

Figure 14B:
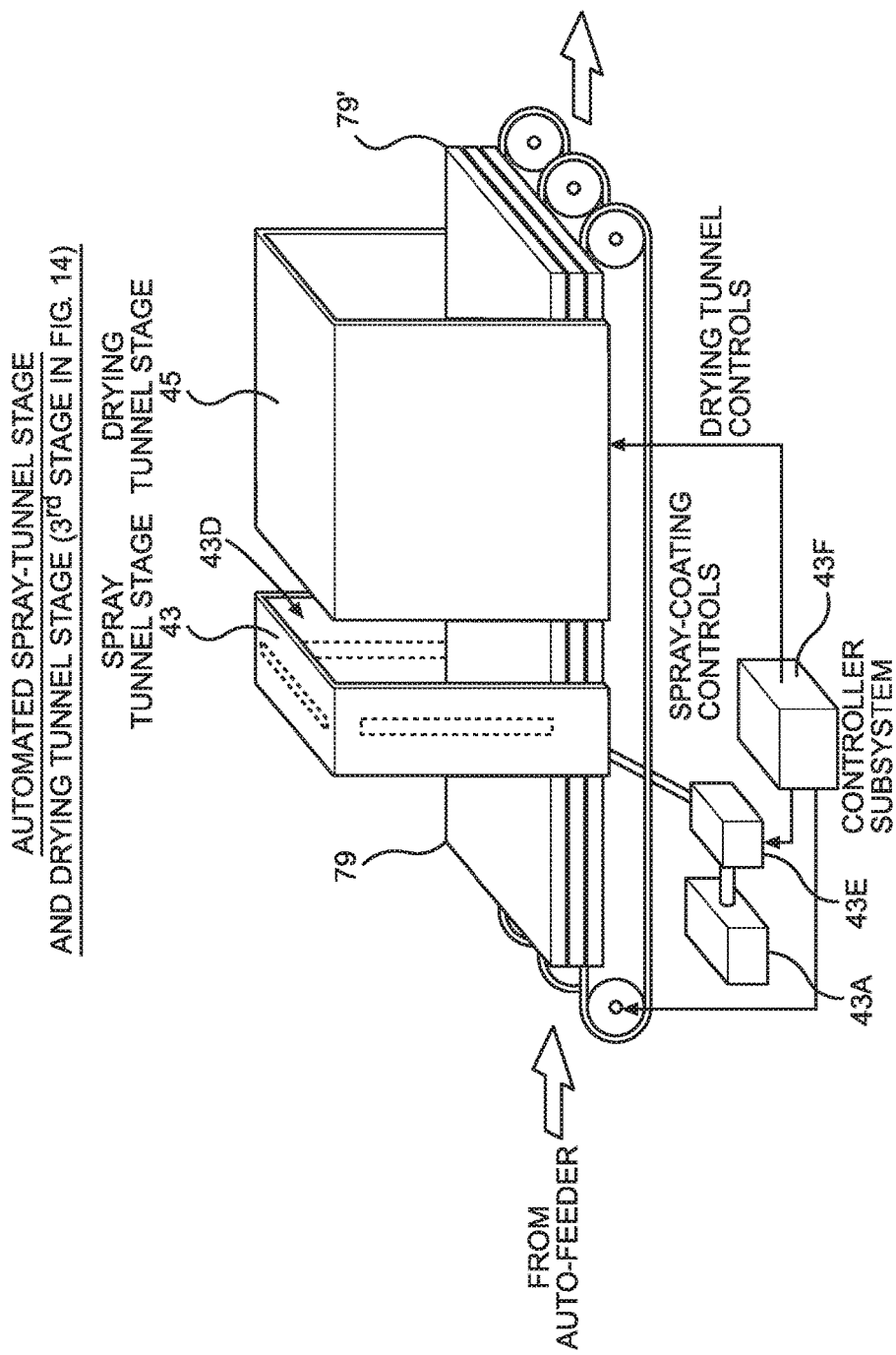
FIG. 14B is a schematic representation and model of schematic representation and model of the automated spray-coating stage and drying stage supported along the production lines of the automated factory system shown in FIG. 14.

As shown in FIG. 14, the factory 60 comprises a number of automated stages integrated together under automation and control, namely: a conveyor-chain transport mechanism 32 having various stages in the illustrative embodiment shown in FIGS. 14A and 14B; a controlled-drying stage 33 receiving short pieces of structural timber or lumber 31 from a supply warehouse maintained in or around the factory and drying them in a controlled manner well known in the art; a finger-jointing stage 34, for processing short-length pieces of dried timber (i.e. lumber) and automatically fabricating extended-length finger-jointed pieces of timber, as output from this stage; a lamination planing stage 35 for planing finger-jointed pieces of timber (i.e. laminations) to produce finger-jointed timber laminations 36; an in-line CFIC liquid dip-coating stage 37, as further detailed in FIG. 14A, supporting an elongated dipping tank 37B through which the chain-driven conveyor 32 transports the laminations 36 into the dipping tank 37B and along its length while submerged under CFIC liquid (e.g. Hartindo AF21 Total Fire Inhibitor) 37K during dip-coating operations, to form a CFIC coating on the surfaces of the dip-coated laminations 36', and removing the CFIC-coated laminations 36' from the dipping tank and transport it to the next stage along the production line; a drying tunnel stage 38, for controllably drying the dip-coated laminations 36' to a desired degree of moisture content; an stacking and adhesive stage 39' for stacking dip-coated finger-jointed timber laminations 36' and applying an adhesive (e.g. glue) coating to the timer laminations 36'; a pressing and curing stage 40 where the stacked and glued finger-jointed laminations are stacked in a linear-directional (grains aligned) manner, provided with adhesive coating, and then placed in pressing machine where the adhesive is cured under pressure to produce a Class-A fire-protected glue-laminated timber (GLT) panel, beam or other product 79; a spray tunnel 43 for spraying a clean fire inhibiting chemical (CFIC) liquid (with blended polymer, and mold and terminate agents) 44 over the surfaces of the Class-A fire-protected GLT panel 79 to produce a coated Class-A fire-protected GLT panel 79'; a drying tunnel 45 for controllably drying the GLT panel to a particular moisture content (e.g. 12%+/−3%); a labeling and packaging stage 48 for applying a barcoded/RFID-tagged 300 to each Class-A fire-protected GLT panel 79' produced on the production line; a chain-driven transport conveyor 32 for conveying the final barcoded/RFID-tagged GLT product 79' along the next few stages of the production line.

As illustrated in FIG. 14, the controlled-drying stage 33 will include drying room with heaters that can be driven by electricity, natural or propane gas, or other combustible fuels which produce heat energy required to dry short-length lumber prior to the finger-joint wood processing stage. The boards are kiln dried to a moisture content of 12%+/−3%. Proper moisture content provides for proper adhesion and prevents dimensional variations and surface cracking. Some alternative embodiments, the controlled-drying stage 33 might be installed on the front end of the production line as shown in FIG. 14, and having input and output ports, with one stage of the conveyor-chain transport mechanism 32 passing through the heating chamber, from its input port to output port, allowing short-length lumber to be kiln-dried as it passes through the chamber along its conveyor mechanism. Other methods and apparatus can be used to realize this stage of the lumber production line of the present invention, provided that the desired degree of moisture within the wood is removed with heat or radiant energy at this stage of the process.

As illustrated in FIG. 14, the finger-jointing lumber processing stage 34 can be configured as generally disclosed in US Patent Application Publication Nos. US20070220825A1 and US20170138049A1, incorporated herein by reference. At this this finger jointing stage, boards are trimmed and finger jointed to obtain the desired lengths and quality of lumber.

In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 34 may be the CRP 2500, CRP 2750 or CRP 3000 Finger Jointing System from Conception R.P., Inc., Quebec, Canada http://www.conceptionrp.com/fingerjointing-systems.

As illustrated in FIG. 14, the laminating planing stage 35 includes wood lamination planing equipment, such industrial band or rotary saws designed to cut, plane and dimension finger-jointed lumber pieces produced from the finger-jointing stage 34, into finger-jointed timber laminations of a specified dimension and thickness. The lamination planing stage 35 can be realized using a band or radial saw as may be required to produce finger-jointed laminations.

As shown in FIG. 14A, the CFIC liquid dip-coating stage 37 of the production line comprises a number of components integrated together, with suitable automation and controls, namely: a chain-driven conveyor subsystem 32 supporting several parallel sets of chain-driven transport rails 32A1, 32A2 and 32A3, as shown, extending from the pressing and curing stage 40 towards a dipping tank 37B, and then running inside and along the bottom of the dipping tank 37B, and having the capacity of transporting finger-jointed timber laminations 36 having a length up to 30 or so feet.

In the illustrative embodiment, the dipping tank 37B has a width dimension of 32 or so feet to accommodate the width of the timber laminations 36 being transported on chain-driven conveyor rails 32A1, 32A2 and 32A3 mounted and running outside of and also within the dipping tank 37B, as shown. As shown, the timber laminations 36 are supported upon the chain driven rails 32A1, 32A2 and 32A3 while the timber laminations 36 are transported through the dipping tank 37B while fully immersed and submerged at least 6 inches deep in CFIC liquid 37H contained in the dipping tank 37B, moving lumber in and out of the dipping tank 37B in just a few seconds during the CFIC dip-coating process of the present invention. Electrically-powered driven motors are provided for the purpose of driving the chain-driven conveyors 32A1, 32A2 and 32A3 under computer control to transport timber laminations 36 from stage to stage along the production line. A level sensor 37F is used for real-time sensing and control of the liquid level of CFIC liquid 37H in the dipping tank 37B at any moment in time during production line operation. A reservoir tank 37C is provided for containing a large volume or supply of made up CFIC liquid solution (e.g. Hartindo AF21 Total Fire Inhibitor). Also, a computer controller 37G is used for controlling the conveyor subsystem 32, and an electric pump 37D for pumping CFIC liquid into the dipping tank 37B to maintain a constant supply level during system operation in response to the liquid level measured by the level sensor 37F and supplied to the control computer 37G.

The dip-coating subsystem 37 may also include additional apparatus including, for example, liquid heaters, circulation pumps and controls for (i) maintaining the temperature of CFIC liquid solution in the dipping tank 37B, and (ii) controlling the circulation of CFIC liquid around submerged timber 36 being transported through the dipping tank in a submerged manner during a CFIC coating process. Controlling such dip coating parameters may be used to control the amount and degree of absorption of CFIC liquid within the surface fibers of the timber laminations 36, as it is rapidly transported through the dipping tank 37B. Notably, the dip coating process allows for the rapid formation a surface coating, or surface barrier, on the surface of each piece of dipped timber 36, and in the presence of a surfactant in the CFIC liquid in the dipping tank 37B, shallow impregnation of CFIC liquid 37H (e.g. Hartindo AF21) can occur into the surface fibers of each timber lamination 36 near atmospheric pressure (i.e. below 6 inches of liquid CFIC in the dipping tank 37B). It is understood that drip pans may also be provided beyond the dipping tank 37B, installed beneath the chain-driven conveyor subsystem 32 arranged between the dipping tank 37B and the labeling and packaging stage 48, so as to recover excess CFIC liquid dripping from the dip-coated lumber pieces and returning this recovered CFIC liquid to the dipping tank 37B after appropriate filtering of the CFIC liquid if and as necessary.

As illustrated in FIG. 14, the stacking and adhesive application stage 39' can be realized using automated adhesive applicators well known in the art to apply a predetermined controlled amount of adhesive to each finger-jointed timber lamination 36 during the automated finger-jointing process. Each layer is sprayed with adhesive and the entire "sandwich" of layers is then pressed vertically and horizontally in a large hydraulic press 40. Typically, adhesives are waterproof and fire-resistant polyurethane; solvent-free and formaldehyde-free.

As illustrated in FIG. 14, the pressing and curing stage 40 can be realized using an automated pressing and curing machine well known in the art to apply a predetermined controlled amount of pressure to the timber laminations 36 after they have been stacked and placed into the machine for pressing and subsequent curing operations.

LEDINEK Engineering, do.o.o, of Hoce, Slovenia, offers complete turnkey production lines that can be modified for high-volume automated production of glue-laminated timber (GLT) beams. Such systems comprise: lamination planers; finger jointing machines; presses & curing machines; and automation and controllers. Such technologies and machines can be used to implement many of the stages described above in the GLT panel production line of the present invention.

As shown in FIG. 14B, the fire, moisture and UV protection, mold and termite agents is provided using the spray tunnel stage 43 deployed after the drying stage 38. As shown, the spray tunnel stage 43 comprises: a storage tank 43A for storing a large supply of moisture/fire/UV-protective liquid chemical 43B; a spray tunnel 43C for supporting an array of spray nozzles 43D arranged about the conveyor rails, operably connected to a liquid pump 43E connected to the storage tank 43A under the controller, to provide a 360 degrees of spray coverage in the tunnel 43, for spray-coating dip-coated GLT panels (e.g. elements) 79 within a controlled plane of moisture/fire/UV-protection liquid sprayed to cover 100% of surfaces of such GLT panel 79 as they are being transported through the spray tunnel 43 at high-speed; and a drying tunnel stage 45 installed after the spray tunnel stage 43, for quick drying of spray-coated Class-A fire-protected GLT panel 79', as they move through the drying tunnel 45 towards the labeling and packaging stage 48 under the control of the controller. In the preferred embodiment, the moisture/fire/UV protection liquid 43B sprayed in the spray tunnel 43 is formulated as follows: 70% by volume Hartindo AF21 liquid (or Hartindo AF31 liquid); 10% by volume, polymer; 10% by volume, a biocide; and 10% by volume, termite agent, Disodium Octaborate Tetrahydrate (DOT).

As shown, the Class-A fire-protective GLT panels 79 are continuously feed through the spray tunnel stage 43 for spray coating a moisture/fire/UV-protective liquid coating 43B over the entire surface as each Class-A fire-protected GLT panel 79 is feed through the spray tunnel 43. Then, the Class-A fire-protected GLT panel 41 is quick-dried while being passed through the drying tunnel 45 disposed immediately after the spray tunnel 45. This produces a Class-A fire-protective GLT product 79' with a moisture/fire/UV protective coating as it exits the production line, improving the durability of the Class-A fire-protective GLT product 79' when exposed to outdoor weather conditions during the construction phase.

In the presence of a flame, the chemical molecules in the CFIC-coating on the surface of the Class-A fire-protected GLT panel interferes with the free radicals (H+, OH−, O−) produced during the combustion phase of a fire, and breaks the fire's free-radical chemical reactions and extinguishes its flame. This is a primary fire suppression mechanism implemented by the CFIC-coatings deposited on wood surfaces in accordance with the principles of invention, disclosed and taught herein.

Figure 15B:
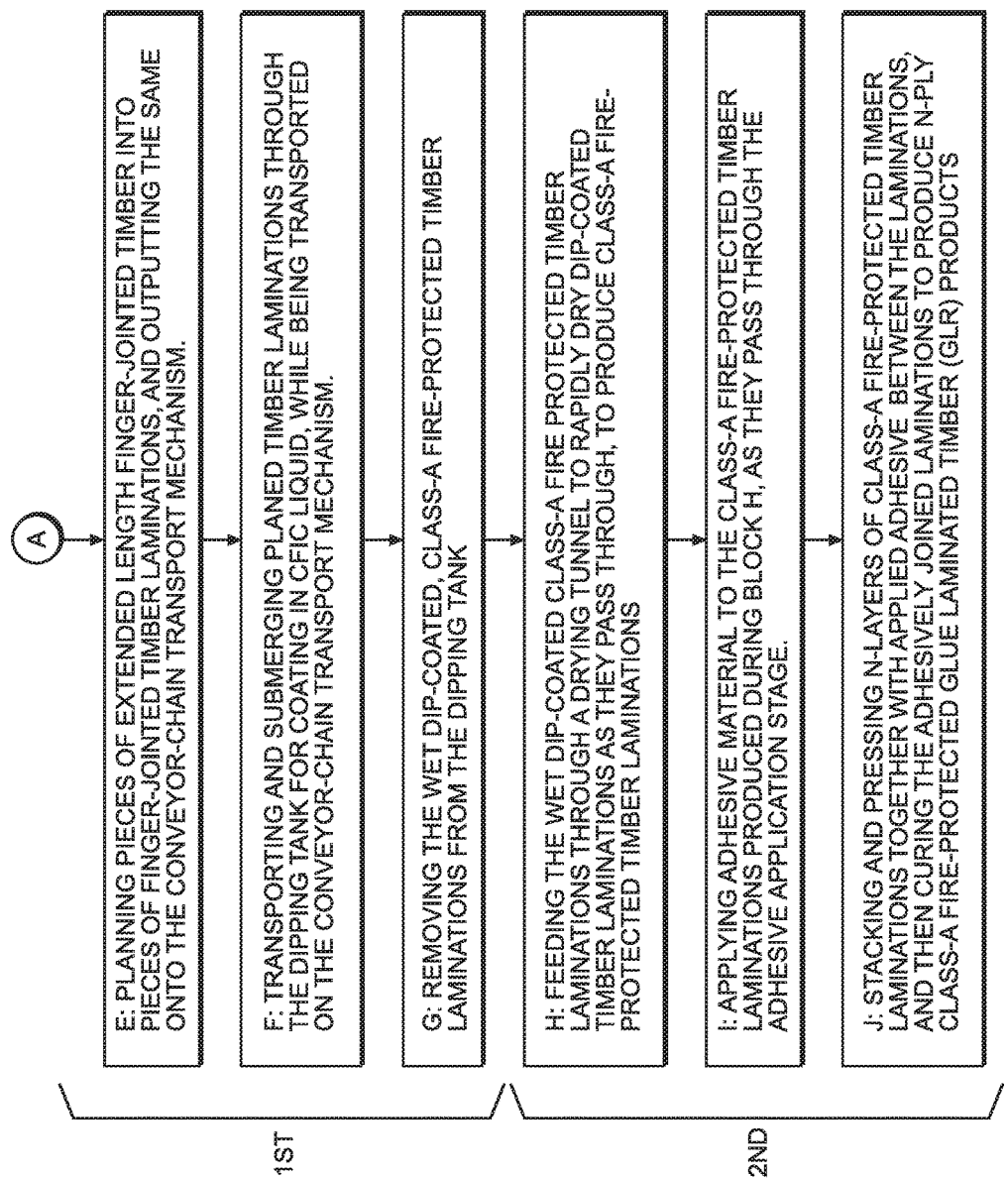
Figure 15C:
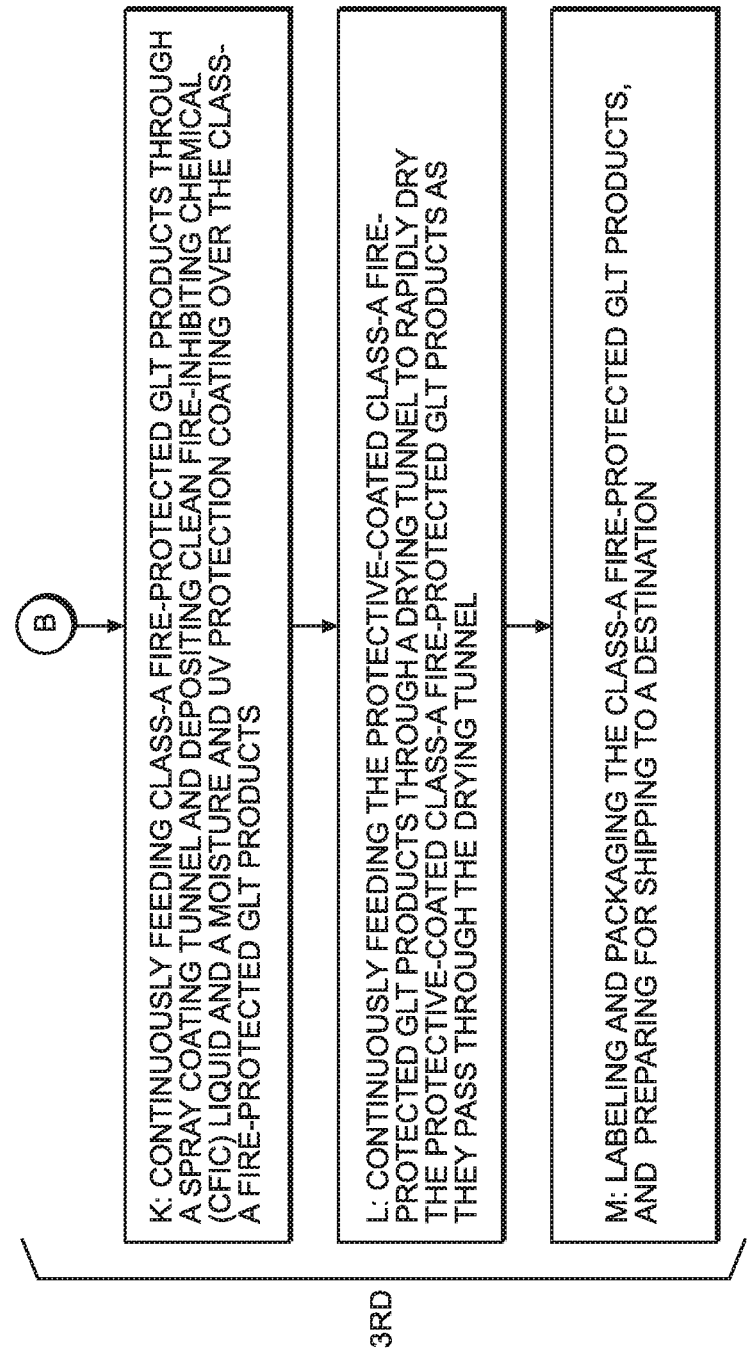

Method of Producing Class-A Fire-Protected Glue-Laminated Timber (GLT) Panels and Other Elements for Use in Fire-Protected Mass Timber Building Construction FIGS. 15A, 15B and 15C describe the high level steps carried out when practicing the method of producing Class-A fire-protected glue-laminated timber (GLT) panels 79' for use in Class-A fire-protected mass timber building construction.

As indicated at Block A in FIG. 15A, in an automated lumber factory, a high-speed Class-A fire-protected lumber production line is installed and operated, with a reservoir tank 37B containing a large supply of clean fire inhibiting chemical (CFIC) liquid 37H that is continuously supplied to the automated high-speed CFIC liquid dip-coating stage 37 of the lumber factory, installed before the adhesive application stage during GLT production in the factory.

As indicated at Block B in FIG. 15A, a supply of untreated short-length lumber is loaded onto the conveyor-chain transport mechanism 32 installed along and between the stages of the production line. The term "short" is relative to the length of the timber product to be produced along the production line.

As indicated at Block C in FIG. 15A, the untreated short-length lumber is loaded into the controlled-drying stage of the production line so to produce suitably dried short-length lumber for supply to the finger-jointing processing stage 34. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a drying tunnel-like chamber, through which chain-driven conveyor mechanism 32 passes, like other stages along the lumber production line of the present invention, while the temperature and humidity of the environment is controlled using electric-driven or gas-combusting space heaters under computer control in a manner well known in the art. The goal of this stage is to drive off moisture in the timber until it reaches 12% humidity, plus or minus 2%.

As indicated at Block D in FIG. 15A, the controllably-dried short-length lumber is continuously supplied into the finger-jointing stage 34, for producing pieces of extended-length finger-jointed timber laminations (lumber pieces) 36 in a highly automated manner.

As indicated at Block E in FIG. 15B, pieces of extended length finger-jointed timber are planed and dimensioned into pieces of finger-jointed timber laminations 36, and outputting the same onto the conveyor-chain transport mechanism 32.

As indicated at Block F in FIG. 15B, the planed and dimensioned finger-jointed timber laminations 36 are continuously transported and submerged through the dipping tank 37B of the dip coating stage 37 for sufficient coating in CFIC liquid (e.g. Hartindo AF21 Total Fire Inhibitor) 37H, while being transported on the conveyor-chain transport mechanism 32.

As indicated at Block G in FIG. 15B, continuously removing the wet dip-coated timber laminations 36 are continuously removed from the dipping tank 39B.

In the illustrative embodiment, Hartindo AF21 Total Fire Inhibitor is used as the CFIC liquid solution 34H to form the CFIC surface coating onto treated wood/lumber products produced on the production line of the factory described above. The surfactant in the Hartindo AF21 CFIC liquid enables its chemical molecules to break the surface tension and allow chemical molecules to impregnate ever so slightly the surface of the treated wood. This way, in the presence of a flame, the chemical molecules in the CFIC-coating on the surface of the fire-protected lumber, interferes with the free radicals (H+, OH−, O−) of the chemical reaction produced within the combustion phase of a fire, and breaks the fire's chemical reaction and extinguishes its flame. This is a primary fire suppression mechanism deployed or rather implemented by the CFIC-coatings deposited on wood surfaces in accordance with the various principles of invention, disclosed and taught herein.

As indicated at Block H in FIG. 15B, the wet dip-coated Class-A fire protected timber laminations 36 are continuously feed through a drying tunnel 38 to rapidly dry dip-coated timber laminations 36 as they pass through, to produce Class-A fire-protected timber laminations 36'.

As indicated at Block I in FIG. 15B, adhesive material is applied to the Class-A fire-protected timber laminations 36' produced during Block H, as they pass through the stacking and adhesive stage 39.

As indicated at Block J in FIG. 15B, n-layers of Class-A fire-protected timber laminations 36' are stacked together, in an end-to-end manner, with applied adhesive on the laminations, and then the stack is pressed together and cured to produce n-ply Class-A fire-protected glue-laminated timber (GLT) products 79.

As indicated at Block K in FIG. 15C, the Class-A fire-protected CLT products 79 are continuously feed through a spray coating tunnel 43, spraying Class-A fire-protective GLT product 79 and depositing clean fire-inhibiting chemical (CFIC) liquid, and a moisture and UV protection coating over the Class-A fire-protected GLT panels 79 while the GLT panel is being passed through the spraying tunnel 43 in a high-speed manner.

As indicated at Block L in FIG. 15C, the protective-coated Class-A fire-protected GLT products 79' is continuously feed through a drying tunnel 45 to rapidly dry the protective-coated Class-A fire-protected GLT products 79' as they pass through the drying tunnel 45.

As indicated at Block M in FIG. 15C, the Class-A fire-protective CLT products 79' are labeled and packaged at the labeling and packaging stage 48, and prepared for shipping to a destination. At the labeling stage 48, a unique barcoded/RFID-tagged inspection checkpoint 300 is mounted on each Class-A fire-protective GLT products 79' in a conspicuous manner, containing certifications of Class-A fire-protecting by CFIC liquid dip-coating and spray-coating operations, by particular technicians under particular supervisions, who certify as to the quality of services provided to the CLT building product/component 79' on certain dates. Each barcoded/RFID-tag will encoded an unique product identifier that relates to a mass timber building project, and the customer, and identifies where all information for the Class-A fire-protected GLT product 79' is stored on the network database 113C on the system network 135. Such information encoded at the barcode/RFID-tagged inspection checkpoint 300 will be uploaded and stored in the network database 113A of the system network 135 to be described in greater detail hereinafter.

Specifying the Method of and System for Producing Class-A Fire-Protective Nail-Laminated Timber (NLT) Building Components According to the Present Invention FIG. 16 shows a section of multi-ply Class-A fire-protected NLT panel 89' produced in accordance with the principles of the present invention, offering 6 layers of Class-A fire-protection and defense against fire. Typically, Douglas Fir, Western Larch & SPF Grade 2 are typically used for making Class-A fire-protected NLT panels 89'. Defects such as large knots and resin or bark pockets are removed from the timber used for the NLT production process, based on the strength and final visual quality.

FIG. 17 shows the flame spread and smoke development characteristics of Spruce Pine Fir (SPF) and Douglas Fir Class-A fire-protected lumber, after being dip-coated with clean fire inhibiting chemical (CFIC) liquid as generally shown in FIGS. 10 and 10A, and tested in accordance with ASTM E84 and UL 723 test standards. Based on these measured flame spread and smoke development indices for Spruce Pine Fir (SPF) and Douglas Fir Class-A fire-protected lumber, it is expected that NLT products of the present invention, when constructed using substantially the same kinds of lumber and treated in substantially the same manner using the CFIC liquid dip-coating methods disclosed in FIGS. 18 and 18A and described herein, will consistently produce flame spread index and smoke development index test results, entitling the NLT products according to the present invention to "Class-A fire-protected" status under ASTM E84 and UL 723 test standards.

Figure 18:
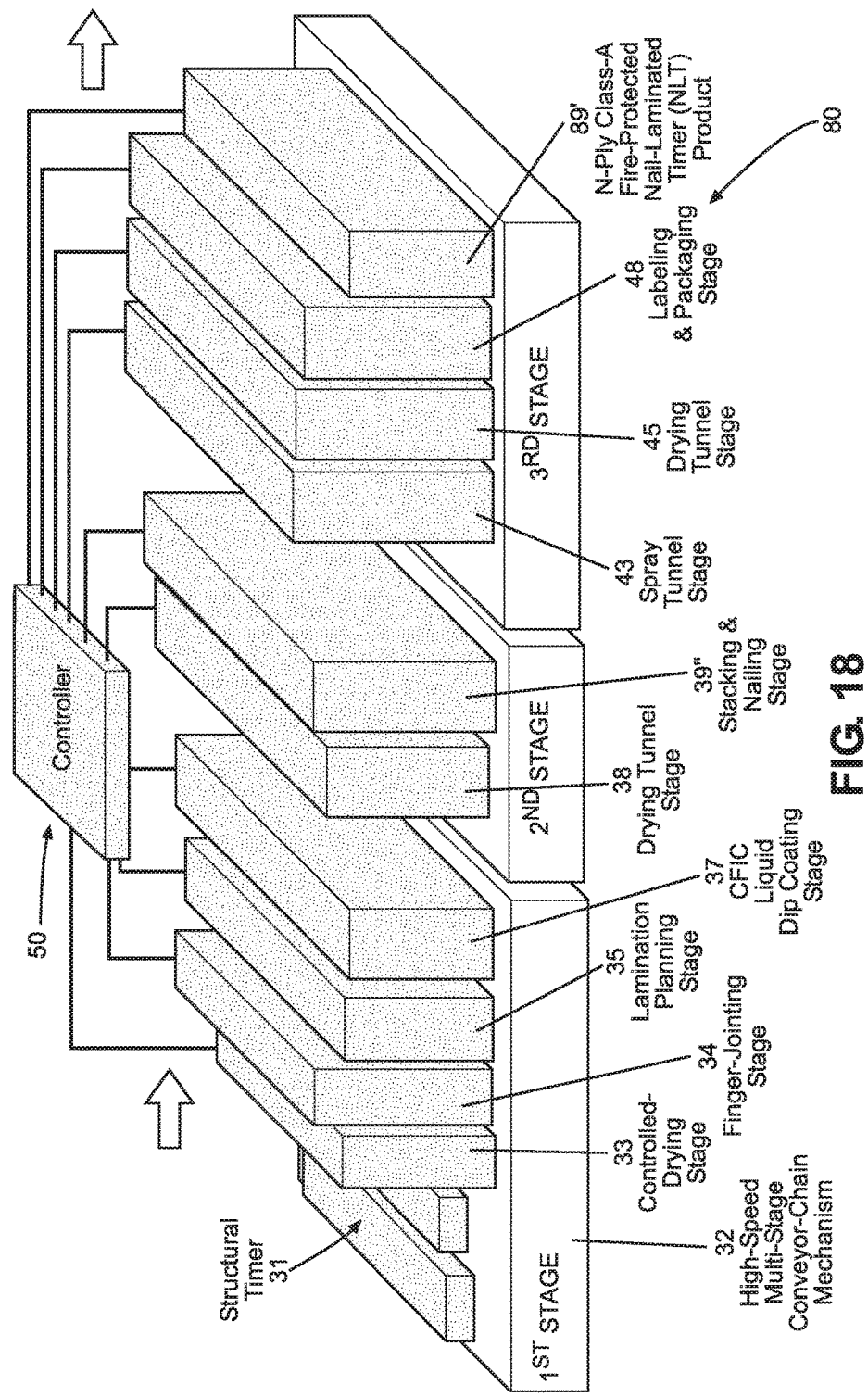
FIG. 18 is a block schematic representation and model of an automated factory system for producing Class-A fire-protected NLT products, wherein after planing and dimensioning, the timber laminations are automatically dip-coated in clean fire inhibiting chemical (CFIC) liquid, then tunnel dried, and thereafter stacked following NL stacking principles, and nailed into Class-A fire-protected NLT panels in accordance with the principles of the present invention.

FIG. 18 shows an automated factory system 80 for prefabricating mass timber buildings using Class-A fire-protected nail-laminated timber (NLT) products 89' produced from production lines supported within the automated factory system. In the case of NLT panels, after the planning and dimensioning stage, the timber laminations are automatically dip-coated in clean fire inhibiting chemical (CFIC) liquid, then tunnel dried, and thereafter stacked and nailed into Class-A fire-protected NLT panels. The Class-A fire-protected NLT building components of the present invention can be used to build high-rise, low-rise, single apartment and multi-apartment mass timber buildings, in a manner well known in the art.

In accordance with the principles of the present invention, a multi-ply Class-A fire-protected nail-laminated timber (NLT) panel 89' bears multiple surface coatings of clean fire inhibiting chemical (CFIC) liquid (e.g. Hartindo AF21 Total Fire Inhibitor). This set of CFIC surface coatings prevents flames from spreading by breaking the free radical chemical reaction within the combustion phase of fire, and confining the fire to the ignition source which can be readily extinguished, or go out by itself. When practicing the present invention, it is important that other fungicides, biocides, wood preservatives, and/or mildew agents are not added to the CFIC solution 37H (i.e. Hartindo AF21) in the CFIC dip coating tank 37B because it has been discovered that such agents will chemically interfere with and adversely effect the fire-inhibiting properties and characteristics of the Hartindo AF21 fire-inhibiting chemicals, proven by ASTM E84 flame spread test results. However, such agents can be added during the spray coating processes of the present invention, at the spray tunnel stage 43, described in greater detail below.

FIG. 18 shows an automated factory system 80 for producing Class-A fire-protected nail-laminated timber (NLT) panels, beams, and other products in a high volume manner. As shown in FIG. 18, the factory 80 comprises a number of automated stages integrated together under automation and control, namely: a multi-stage conveyor-chain mechanism 32 having numerous primary stages in the illustrative embodiment shown in FIGS. 18A and 18B; a controlled-drying stage 33 receiving short pieces of structural timber or lumber 31 from a supply warehouse maintained in or around the factory and drying them in a controlled manner well known in the art (e.g. Douglas Fir, Western Larch & SPF Grade 2 is typically used for making CLT panels); a finger-jointing stage 34, for processing short-length pieces of dried timber (i.e. lumber) and automatically fabricating extended-length finger-jointed pieces of timber, as output from this stage; a lamination planing stage 35 for planing finger-jointed pieces of timber (i.e. laminations) to produce finger-jointed timber laminations 36; an in-line CFIC liquid dip-coating stage 37, as further detailed in FIG. 18A, supporting an elongated dipping tank 37B through which the chain-driven conveyor 32 transports the laminations 36 into the dipping tank 37B and along its length while submerged under CFIC liquid (e.g. Hartindo AF21 Total Fire Inhibitor) 37K during dip-coating operations, to form a CFIC coating on the surfaces of the dip-coated laminations, and removing the CFIC-coated laminations from the dipping tank and transport it to the next stage along the production line; a drying tunnel stage 38, for controllably drying the dip-coated laminations to a desired degree of moisture content; a stacking and nailing stage 39" for stacking timber laminations and driving nails into the finger-jointed timer laminations 36' to produce a nail-laminated timber (NLT) panel, beam or other product 89; a spray tunnel 43 for spraying a clean fire inhibiting chemical (CFIC) liquid (blended with liquid polymer, and mold/ biocide and termite/DOT agents) 44 over the surfaces of the Class-A fire-protected NLT panel 89 to produce a spray-coated Class-A fire-protected NLT panel 89'; a drying tunnel 45 for controllably drying the Class-A fire-protected NLT panel 89' to a particular moisture content (e.g. 12%+/−3%); and a labeling and package stage 46 for applying a barcoded/RFID-tagged 300 to each Class-A fire-protected NLT panel 89' produced on the production line.

As illustrated in FIG. 18, the controlled-drying stage 33 will include drying room with heaters that can be driven by electricity, natural or propane gas, or other combustible fuels which produce heat energy required to dry short-length lumber prior to the finger-joint wood processing stage. The boards are kiln dried to a moisture content of 12%+/−3%. Proper moisture content provides for proper adhesion and prevents dimensional variations and surface cracking. Some alternative embodiments, the controlled-drying stage 33 might be installed on the front end of the production line as shown in FIG. 18, and having input and output ports, with one stage of the conveyor-chain mechanism 32 passing through the heating chamber, from its input port to output port, allowing short-length lumber to be kiln-dried as it passes through the chamber along its conveyor mechanism. Other methods and apparatus can be used to realize this stage of the lumber production line of the present invention, provided that the desired degree of moisture within the wood is removed with heat or radiant energy at this stage of the process.

As illustrated in FIG. 18, the finger-jointing lumber processing stage 34 can be configured as generally disclosed in US Patent Application Publication Nos. US20070220825A1 and US20170138049A1, incorporated herein by reference. At this this finger jointing stage, boards are trimmed and finger jointed to obtain the desired lengths and quality of lumber.

In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 34 may be the CRP 2500, CRP 2750 or CRP 3000 Finger Jointing System from Conception R.P., Inc., Quebec, Canada http://www.conceptionrp.com/fingerjointing-systems.

As illustrated in FIG. 18, the laminating planing stage 35 includes wood lamination planing equipment, such industrial band or rotary saws designed to cut, plane and dimension finger-jointed lumber pieces produced from the finger-jointing stage 34, into finger-jointed timber laminations of a specified dimension and thickness. The lamination planing stage 35 can be realized using a band or radial saw as may be required to produce finger-jointed laminations.

Figure 18A:
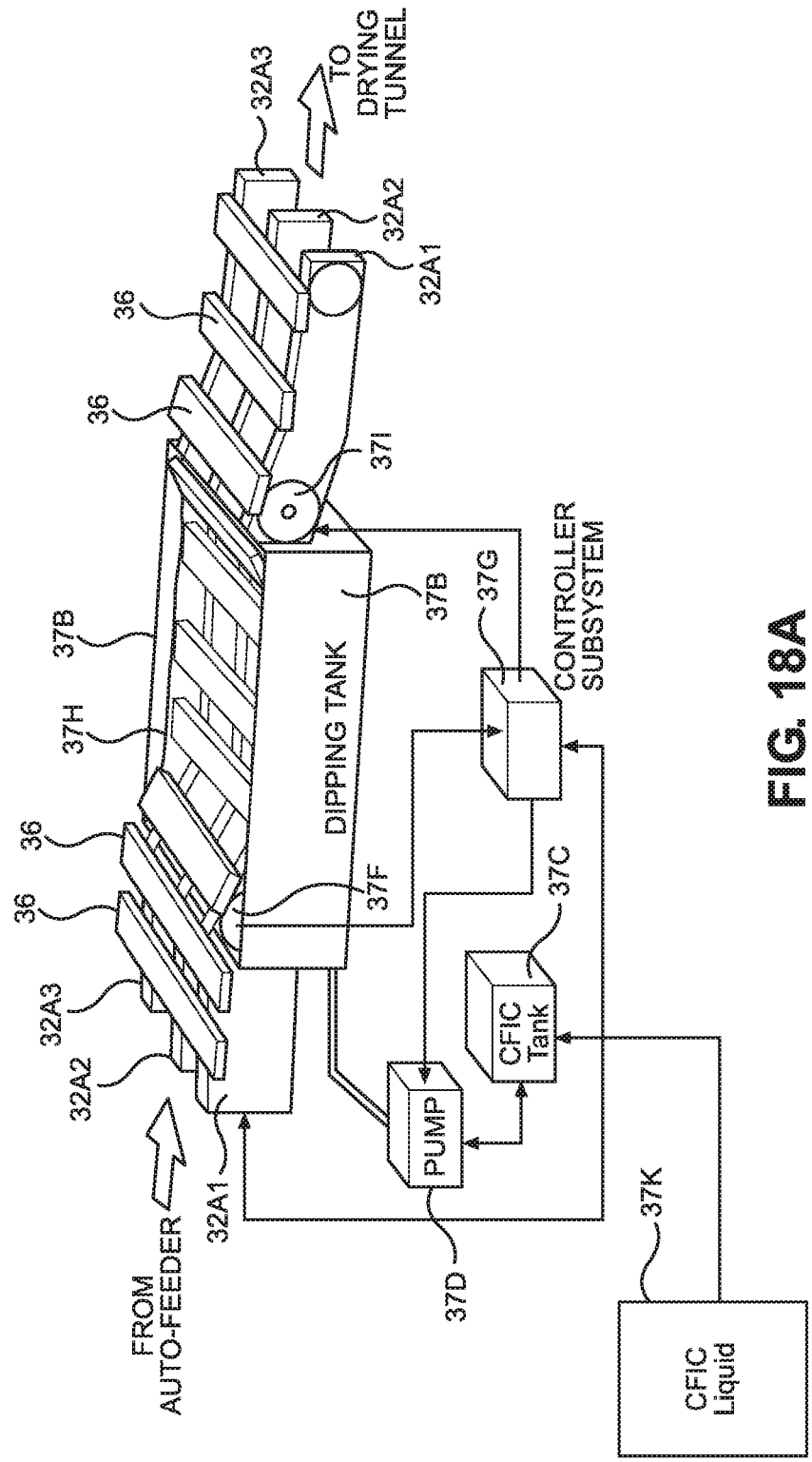
FIG. 18A is schematic representation and model of the automated CFIC liquid dip-coating stage for timber laminations supported along the production lines of the automated factory system shown in FIG. 18.

As shown in FIG. 18A, the CFIC liquid dip-coating stage 37 of the production line comprises a number of components integrated together, with suitable automation and controls, namely: a chain-driven conveyor subsystem 32 supporting several parallel sets of chain-driven transport rails 32A1, 32A2 and 32A3, as shown, extending towards a dipping tank 37B, and then running inside and along the bottom of the dipping tank 37B, and having the capacity of transporting finger-jointed timber laminations 36 having a length up to 30 or so feet.

In the illustrative embodiment, the dipping tank 37B has a width dimension of 32 or so feet to accommodate the width of the finger-jointed timber laminations 36 being transported on chain-driven conveyor rails 32A1, 32A2 and 32A3 mounted and running outside of and also within the dipping tank 37B, as shown. As shown, the timber laminations 36 are supported upon the chain driven rails 32A1, 32A2 and 32A3 while the timber laminations 36 are transported through the dipping tank 37B while fully immersed and submerged at least 6 inches deep in CFIC liquid 37H contained in the dipping tank 37B, moving lumber in and out of the dipping tank 39B in just a few seconds during the CFIC dip-coating process of the present invention. Electrically-powered driven motors are provided for the purpose of driving the chain-driven conveyors 32A1, 32A2 and 32A3 under computer control to transport timber laminations 36 from stage to stage along the production line. A level sensor 37F is used for real-time sensing and control of the liquid level of CFIC liquid 37H in the dipping tank 37B at any moment in time during production line operation. A reservoir tank 37C is provided for containing a large volume or supply of made up CFIC liquid solution (e.g. Hartindo AF21 Total Fire Inhibitor). Also, a computer controller 37G is used for controlling the conveyor subsystem 32, and an electric pump 37D for pumping CFIC liquid into the dipping tank 37B to maintain a constant supply level during system operation in response to the liquid level measured by the level sensor 37F and supplied to the control computer 37G.

The dip-coating subsystem 37 may also include additional apparatus including, for example, liquid heaters, circulation pumps and controls for (i) maintaining the temperature of CFIC liquid solution in the dipping tank 37B, and (ii) controlling the circulation of CFIC liquid around submerged timber 36 being transported through the dipping tank in a submerged manner during a CFIC coating process. Controlling such dip coating parameters may be used to control the amount and degree of absorption of CFIC liquid within the surface fibers of the finger-jointed timber laminations 36, as it is rapidly transported through the dipping tank 37B. Notably, the dip coating process allows for the rapid formation a surface coating, or surface barrier, on the surface of each piece of dipped timber 36, and in the presence of a surfactant in the CFIC liquid in the dipping tank 37B, shallow impregnation of CFIC liquid 37H (e.g. Hartindo AF21) can occur into the surface fibers of each timber lamination 36 near atmospheric pressure (i.e. below 6 inches of liquid CFIC in the dipping tank 37B). It is understood that drip pans may also be provided beyond the dipping tank 37B, installed beneath the chain-driven conveyor subsystem 32 arranged between the dipping tank 37B and the labeling and packaging stage 48, so as to recover excess CFIC liquid dripping from the dip-coated lumber pieces and returning this recovered CFIC liquid to the dipping tank 37B after appropriate filtering of the CFIC liquid if and as necessary.

As illustrated in FIG. 18, the stacking and nailing stage 39" can be realized using automated nail gun system well known in the art.

LEDINEK Engineering, do.o.o, of Hoce, Slovenia, offers complete turnkey production lines which can be modified for high-volume automated production of nail-laminated timber (NLT) panels. Such systems comprise: lamination planers; finger jointing machines; and automation and controllers. Such technologies and machines can be used to implement many of the stages described above in the NLT beam production line of the present invention.

Figure 18B:
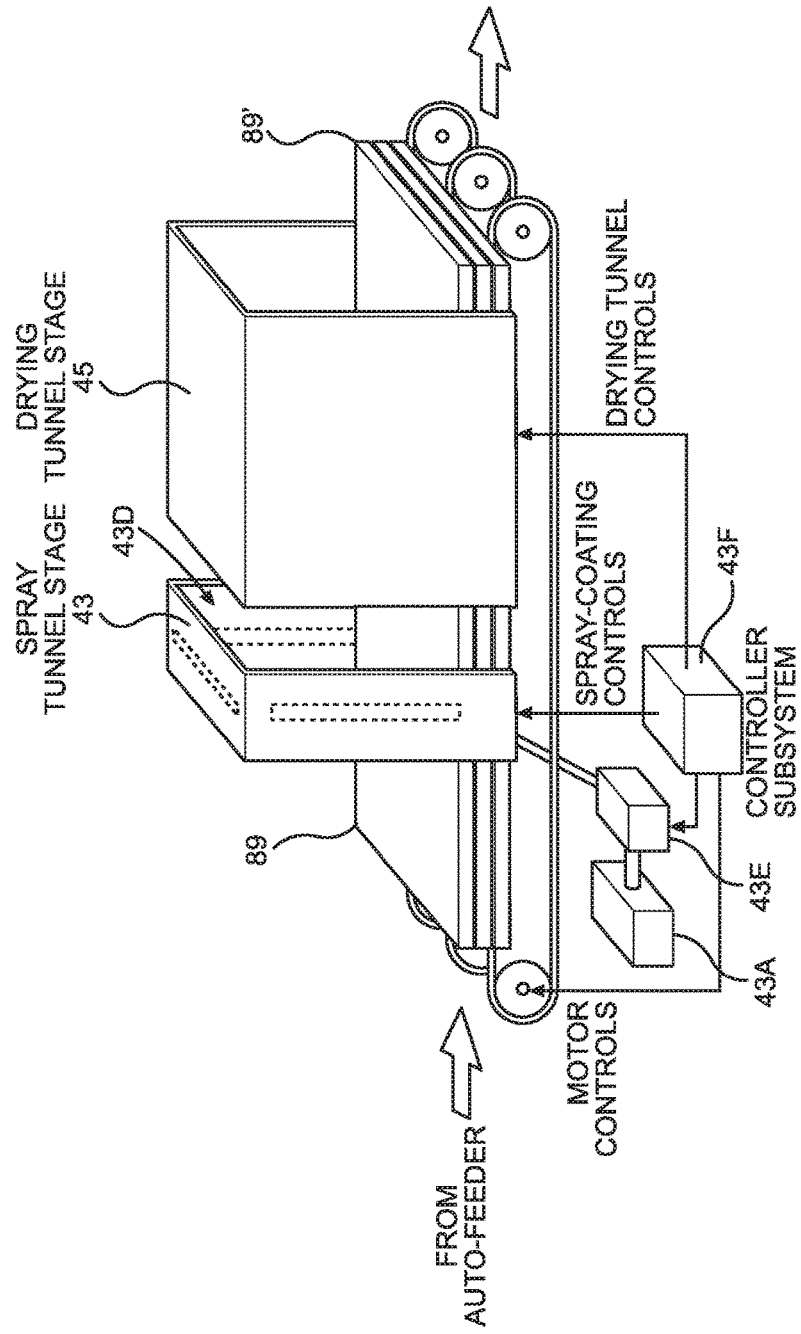
FIG. 18B is a schematic representation and model of schematic representation and model of the automated spray-coating stage and drying stage supported along the production lines of the automated factory system shown in FIG. 18.

As shown in FIG. 18B, the fire, moisture and UV protection, mold and termite agents is provided using the spray tunnel stage 43 deployed after the drying stage 38. As shown, the spray tunnel stage 43 comprises: a storage tank 43A for storing a large supply of blended moisture/fire/UV-protective liquid chemical 43B; a spray tunnel 43C for supporting an array of spray nozzles 43D arranged about the conveyor rails, operably connected to a liquid pump 43E connected to the storage tank 43A under the controller, to provide a 360 degrees of spray coverage in the tunnel 43, for spray-coating Class-A fire-protected panels (e.g. elements) 89 within a controlled plane of moisture/fire/UV-protection liquid sprayed to cover 100% of the surfaces as they are being transported through the spray tunnel 43 at high-speed; and a drying tunnel stage 45 installed after the spray tunnel stage 43, for quick drying of spray-coated Class-A fire-protected NLT panel 89', as they move through the drying tunnel 45 towards the labeling and packaging stage 48 under the control of the controller 50. In the preferred embodiment, the moisture/fire/UV protection liquid 43B sprayed in the spray tunnel 43 is formulated as follows: 70% by volume Hartindo AF21 liquid (or Hartindo AF31 liquid); 10% by volume, polymer; 10% by volume, a biocide; and 10% by volume, termite agent, Disodium Octaborate Tetrahydrate (DOT).

As shown, the Class-A fire-protective CLT panels 89 are continuously feed through the spray tunnel stage 43 for spray coating a moisture/fire/UV-protective liquid coating 43B over the entire surface as each Class-A fire-protected NLT beam or panel 89 is feed through the spray tunnel 43. Then, the Class-A fire-protected NLT beam 89' is quick-dried while being passed through the drying tunnel 45 disposed immediately after the spray tunnel 45. This produces a Class-A fire-protective NLT product 89' with a moisture/fire/UV protective coating as it exits the production line, improving the durability of the Class-A fire-protective NLT product when exposed to outdoor weather conditions during the construction phase.

In the presence of a flame, the chemical molecules in the CFIC-coating on the surface of the Class-A fire-protected NLT panel 89' interferes with the free radicals (H+, OH−, O−) produced during the combustion phase of a fire, and breaks the fire's free-radical chemical reactions and extinguishes its flame. This is a primary fire suppression mechanism implemented by the CFIC-coatings deposited on wood surfaces in accordance with the principles of invention, disclosed and taught herein.

Figure 19B:
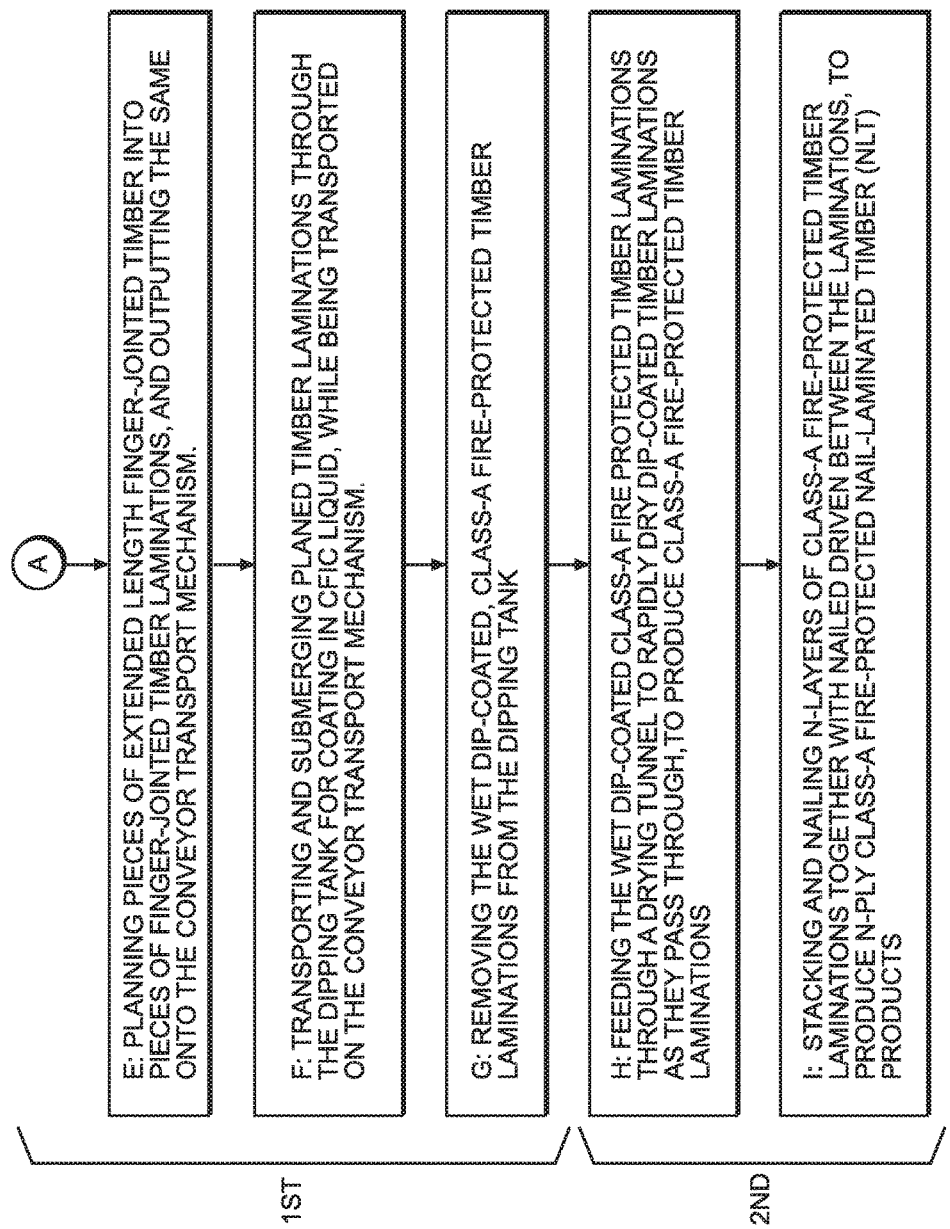
Figure 19C:
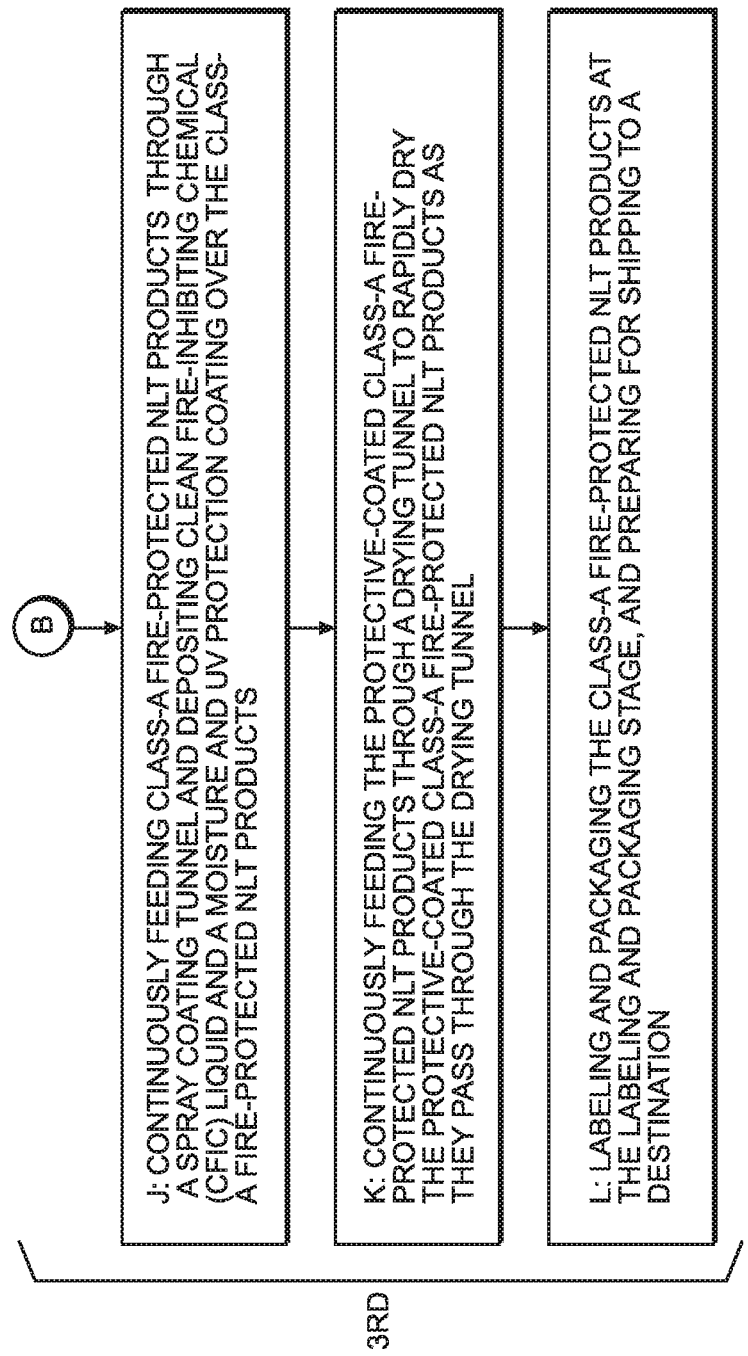

Method of Producing Class-A Fire-Protected Nail-Laminated Timber (NLT) Panels and Other Elements for Use in Class-A Fire-Protected Mass Timber Building Construction FIGS. 19A, 19B and 19C describe the high level steps carried out when practicing the method of producing Class-A fire-protected nail-laminated timber (NLT) panels 89' for use in Class-A fire-protected mass timber building construction.

As indicated at Block A in FIG. 19A, in an automated lumber factory, a high-speed Class-A fire-protected lumber production line is installed and operated, with a reservoir tank 37B containing a large supply of clean fire inhibiting chemical (CFIC) liquid 37H that is continuously supplied to the automated high-speed CFIC liquid dip-coating stage 37 of the lumber factory, installed before the stacking and nailing stage 39'' during NLT production in the factory.

As indicated at Block B in FIG. 19A, a supply of untreated short-length lumber is loaded onto the conveyor-chain transport mechanism 32 installed along and between the stages of the production line. The term "short" is relative to the length of the timber product to be produced along the production line.

As indicated at Block C in FIG. 19A, the untreated short-length lumber is loaded into the controlled-drying stage of the production line so to produce suitably dried short-length lumber for supply to the finger-jointing processing stage 34. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a drying tunnel-like chamber, through which chain-driven conveyor mechanism 32 passes, like other stages along the lumber production line of the present invention, while the temperature and humidity of the environment is controlled using electric-driven or gas-combusting space heaters under computer control in a manner well known in the art. The goal of this stage is to drive off moisture in the timber until it reaches 12% humidity, plus or minus 2%

As indicated at Block D in FIG. 19A, the controllably-dried short-length lumber is continuously supplied into the finger-jointing stage 34, for producing pieces of extended-length finger-jointed timber (lumber) 36 in a highly automated manner.

As indicated at Block E in FIG. 19B, pieces of extended length finger-jointed timber are planed and dimensioned into pieces of finger-jointed timber laminations 36, and outputting the same onto the conveyor-chain transport mechanism 32.

As indicated at Block F in FIG. 19B, the planed and dimensioned finger-jointed timber laminations 36 are continuously transported and submerged through the dipping tank 37B of the dip coating stage 37 for sufficient coating in CFIC liquid (e.g. Hartindo AF21 Total Fire Inhibitor) 37H, while being transported on the conveyor-chain transport mechanism 32.

As indicated at Block G in FIG. 19B, continuously removing the wet dip-coated timber laminations 36' are continuously removed from the dipping tank 39B, and automatically move through the drying tunnel 38 at the subsequent stage along the production line.

In the illustrative embodiment, Hartindo AF21 Total Fire Inhibitor is used as the CFIC liquid solution 37H to form the CFIC surface coating onto treated wood/lumber products produced on the production line of the factory described above. The surfactants in the Hartindo AF21 CFIC liquid helps to break the surface tension and allow its chemical molecules to impregnate ever so slightly the surface of the treated wood. This way, in the presence of a flame, the chemical molecules in the CFIC-coating on the surface of the fire-protected lumber, interferes with the free radicals (H+, OH−, O−) of the chemical reaction produced within the combustion phase of a fire, and breaks the fire's chemical reaction and extinguishes its flame. This is a primary fire suppression mechanism deployed or rather implemented by the CFIC-coatings deposited on wood surfaces in accordance with the various principles of invention, disclosed and taught herein.

As indicated at Block H in FIG. 19B, feeding the wet dip-coated Class-A fire protected timber laminations 36 through a drying tunnel 38 to rapidly dry dip-coated timber laminations 36 as they pass through, to produce Class-A fire-protected timber laminations 36'.

As indicated at Block I in FIG. 19B, n-layers of Class-A fire-protected timber laminations 36 are stacked and automatically nailed together with nails driven between the lamination 36, to produce n-ply Class-A fire-protected nail-laminated timber (NLT) products 89.

As indicated at Block J in FIG. 19B, the Class-A fire-protected NLT products 89 are continuously feed through a spray coating tunnel 43 and coated with clean fire-inhibiting chemical (CFIC) liquid and a moisture and UV protection coating (and optionally mold/biocide and termite/DOT) agents) over the Class-A fire-protected NLT products 89'.

As indicated at Block K in FIG. 19C, the protective-coated Class-A fire-protected NLT products 89' are continuously feed through a drying tunnel 45 to rapidly dry the protective-coated Class-A fire-protected NLT products 89' as they pass through the drying tunnel 45.

As indicated at Block L in FIG. 19C, the Class-A fire-protective NLT products 89' are labeled and packaged at the labeling and packaging stage 48, and prepared for shipping to a destination.

At the labeling stage 48, a unique barcoded/RFID-tagged inspection checkpoint 300 is mounted on each Class-A fire-protective NLT products 89' in a conspicuous manner, containing certifications of Class-A fire-protecting by CFIC liquid dip-coating and spray-coating operations, by particular technicians under particular supervisions, who certify as to the quality of services provided to the NLT building product/component 89' on certain dates. Each barcoded/RFID-tag will be encoded a unique product identifier that relates to a mass timber building project, and the customer, and identifies where all information for the NLT product 89' is stored on the network database 113C on the system network 135. Such information on the barcode/RFID-tagged inspection checkpoint 300 will be uploaded and stored in the network database 113A of the system network 135 to be described in greater detail hereinafter.

Figure 20A:
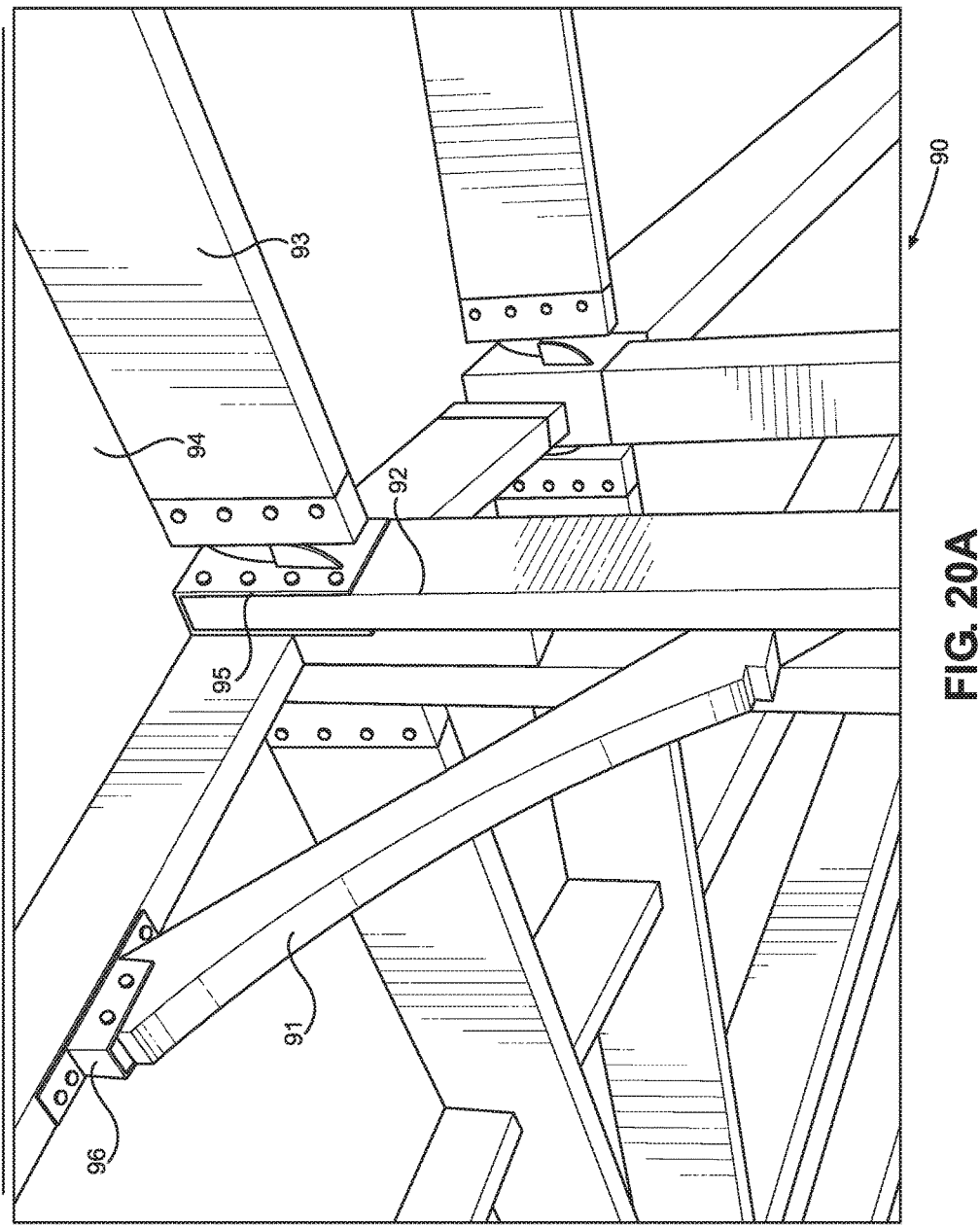
FIG. 20A is a perspective view of a section of a mass timber building constructed using mass timber building components that are connected together in an architectural structure using heat-resistant coated metal connector plates and brackets produced in accordance with the principles of the present invention, so that to provide Class-A fire-protection status to such mass timber building assemblies.

Specification of a Mass Timber Building Constructed Using Mass Timber Building Components that are Connected Together in an Architectural Structure Using Heat-Resistant Coated Metal Connector Plates and Brackets Produced in Accordance with the Principles of the Present Invention FIG. 20A shows a section of a mass timber building 90 constructed using mass timber building components 91, 92, 93 and 94 connected together in an architectural structure using heat-resistant coated metal connector plates and brackets 95 and 96 produced in accordance with the principles of the present invention, so as to provide Class-A fire-protection status to such mass timber building assemblies.

Figure 20B:
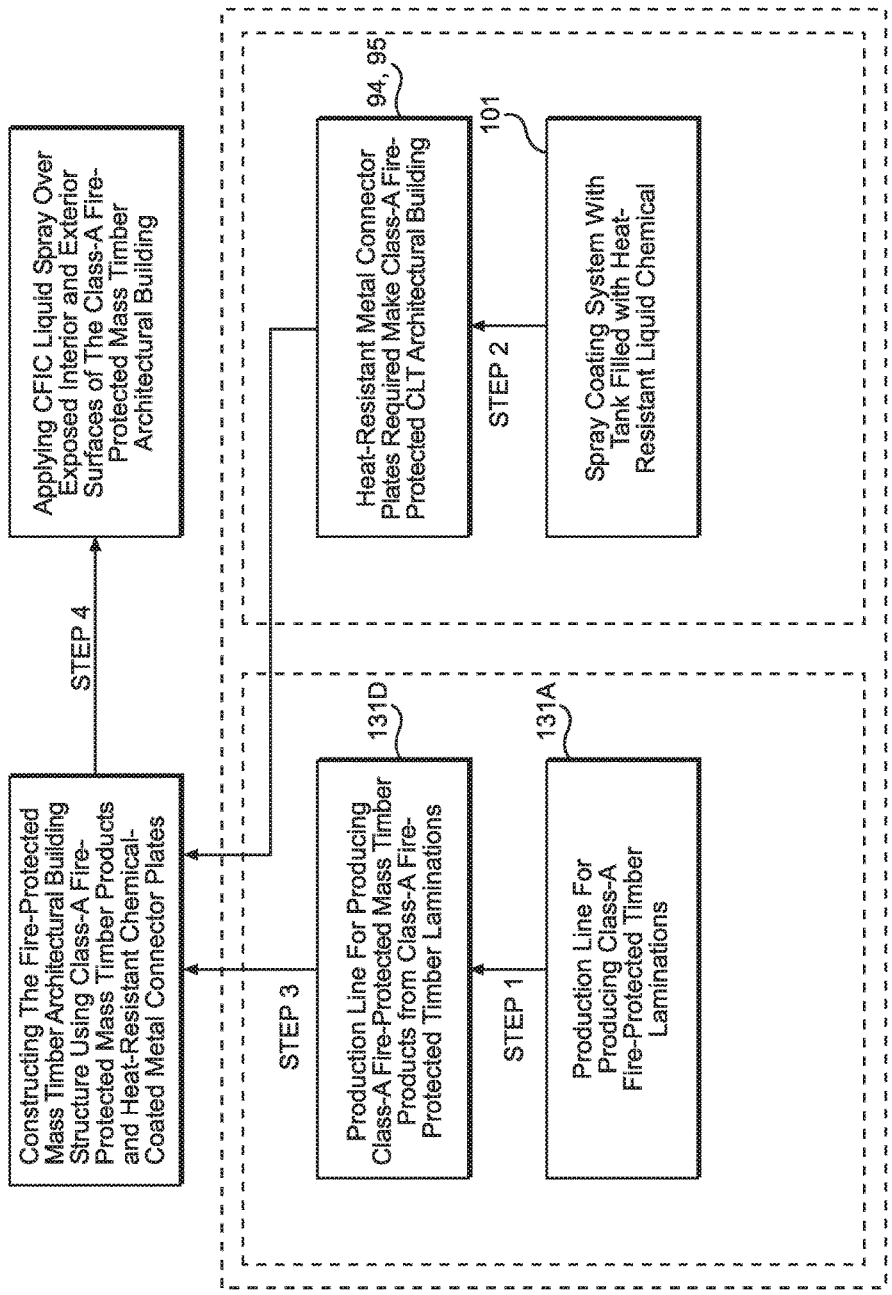
FIG. 20B is a factory and method for making Class-A fire-protected mass timber building components and heat-resistant metal connector plates in accordance of the principles of the present invention.

FIG. 20B shows a factory for making Class-A fire-protected mass timber building components and heat-resistant metal connector plates in accordance of the principles of the present invention. The factory comprises the components: (a) a first stage for automated dipping of untreated lumber components in a dipping tank filled with clean fire inhibiting chemical (CFIC) liquid (e.g. Hartindo AF21 Total Fire Inhibitor from Newstar Chemicals of Malaysia) using automated dip-coating technology 37 described hereinabove; (b) a second stage for automated spraying metal connector plates 94 and 95 with DecTan chemical from Hartindo Chemicatama Industri using spray-coating technology described hereinabove; and (c) a third stage for automated or semi-automated assembly of the Class-A fire-protected mass timber building components 91, 92 and 92, with the DecTan-coated heat-resistant metal connector plates 94 and 95 to form Class-A fire-protected mass timber building components in a high-volume manner.

The first stage may include a production line 131A shown in FIG. 39B for producing Class-A fire-protected timber laminations 36 and CLT products made therefrom; and a production line 131D for producing Class-A fire-protected mass timber products (e.g. NLT products) from Class-A fire-protected timber laminations 36.

The second stage may include a spray coating system 100 with a tank filled with a heat-resistant liquid chemical (e.g. Dectan chemical from Hartindo), and spraying nozzle 101D for spraying the heat-resistant chemical on metal connector plates to produce coating heat-resistant metal connector plates 94 and 95 required to make a Class-A fire-protected mass timber building assemblies shown in FIG. 20A.

The third stage includes means for constructing a Class-A fire-protected mass timber building 90 using Class-A fire-protected mass timber products 91, 92 and 93 and heat-resistant chemical-coated metal connector plates 94 and 95.

Thereafter, the mobile spray system 100 can be used to spray CFIC liquid over exposed interior and exterior surfaces of Class-A fire-protected mass timber building 90, to provide additional levels of Class-A fire-protection, above and beyond the Class-A fire-protection provided to the timber laminations used to produce Class-A fire-protected mass timber building components described above, and fire, moisture, (mold and termite) protection spray coated onto the Class-A fire-protected mass timber building components.

Figure 21:
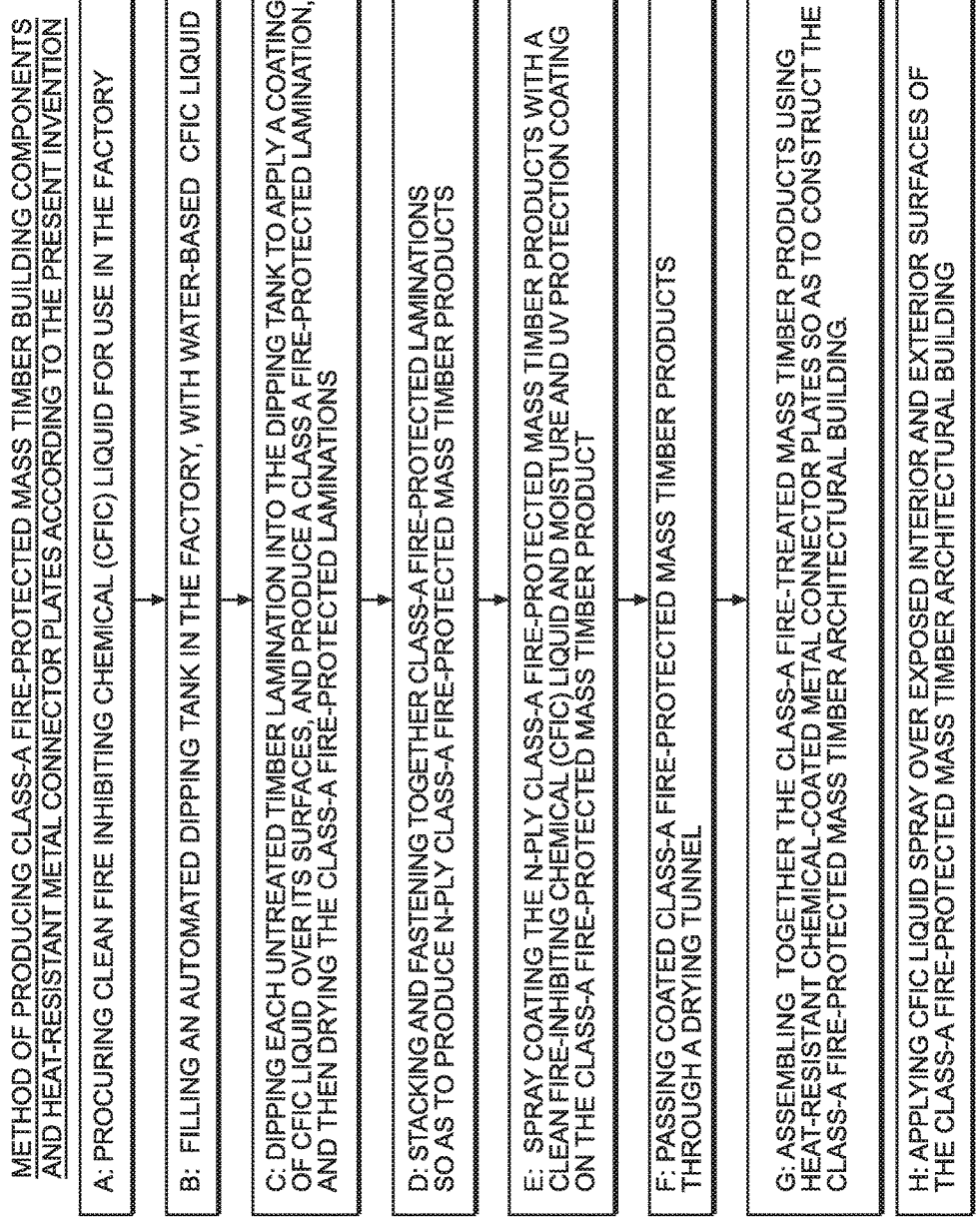
FIG. 21 is a method of making Class-A fire-protected mass timber building components and heat-resistant metal connector plates according to the present invention.

FIG. 21 describes a preferred method of making Class-A fire-protected mass timber building components 91, 92, and 93, and heat-resistant metal connector plates 94, 95, for connecting the same, as shown in FIG. 20A, to construct a mass timber building 90.

As shown in FIG. 21, the method of making Class-A fire-protected mass timber building components 91, 92, and 93, and heat-resistant metal connector plates 94, 95, for connecting the same, comprises the steps of: (a) procuring clean fire inhibiting chemical (CFIC) liquid for use in the factory; (b) filling an automated dipping tank 37B in the factory, with water-based CFIC liquid (i.e. Hartindo AF21); (c) dipping each untreated timber lamination 36 into the dipping tank 37B to apply a coating of CFIC liquid over its surfaces, and produce a Class-A fire-protected lamination 36', and then drying the Class-A fire-protected laminations 36'; (d) stacking and fastening together Class-A fire-protected laminations so as to produce n-ply Class-A fire-protected mass timber products (using any one of the methods shown in FIGS. 8, 12 and 16); (e) spray coating the n-ply Class-A fire-protected mass timber products with a clean fire-inhibiting chemical (CFIC) liquid and moisture and up protection coating on the Class-A fire-protected mass timber product; (f) passing coated Class-A fire-protected mass timber products through a drying tunnel 45; (g) assembling together the Class-A fire-treated mass timber products 49', 79', 89' using heat-resistant chemical-coated metal connector plates 94 and 95 so as to construct the class-A fire-protected mass timber architectural building structure; and (h) using the spray system 100 for applying CFIC liquid spray over exposed interior and exterior surfaces of the Class-A fire-protected mass timber building 90.

Figure 22A:
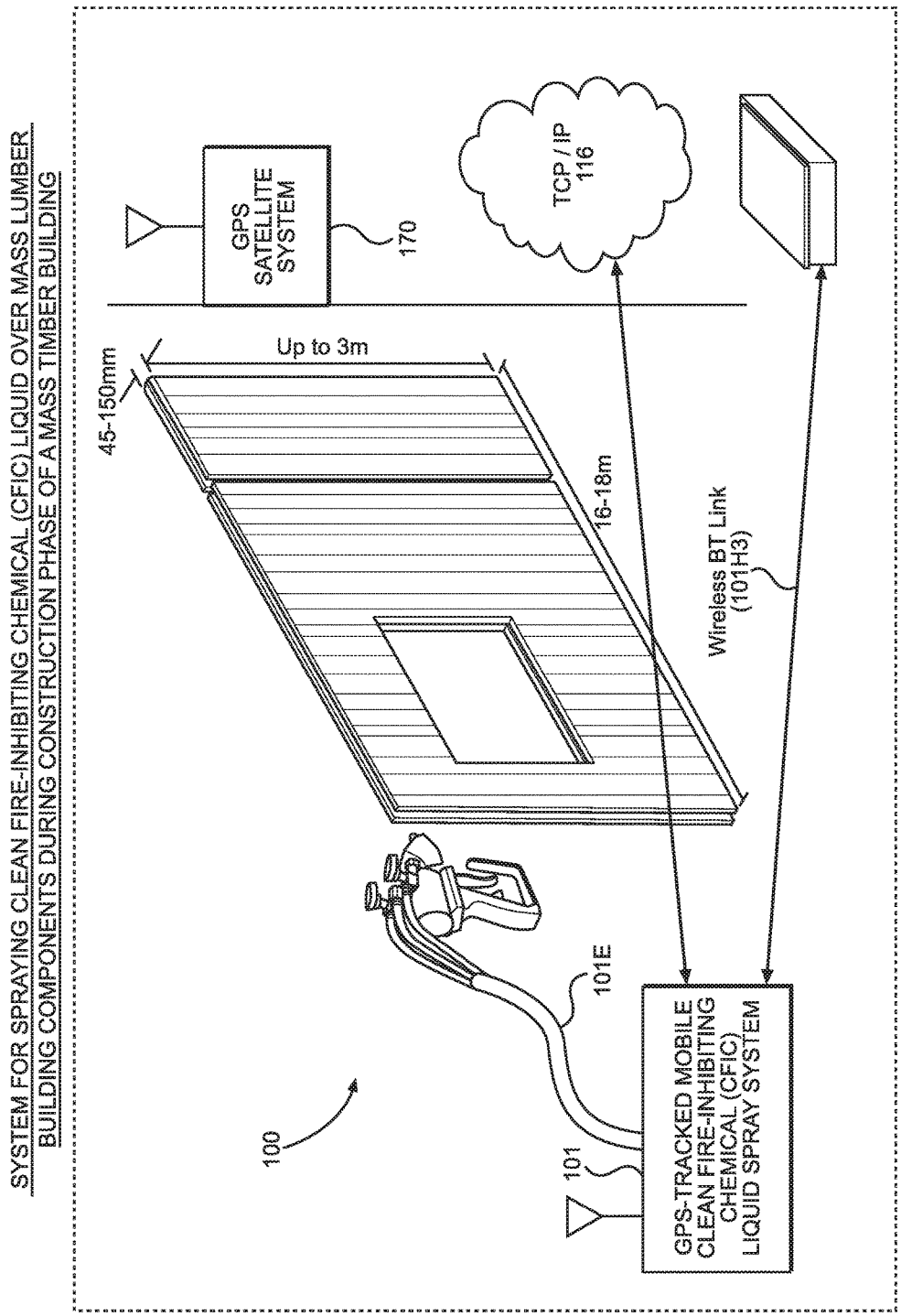
FIG. 22A is a schematic representation of a system for illustrating spraying clean fire-inhibiting chemical (CFIC) liquid over the exterior surfaces of mass timber building components during construction phase of a mass timber building, and tracking and documenting the on-job-site spraying operations over a wireless communications network, wherein a GPS-tracked mobile clean fire-inhibiting chemical (CFIC) liquid spraying system, and the system network illustrated in FIG. 28, are used to apply and document the spraying of a thin CFIC film or coating deposited over all exposed interior wood surfaces, and thereby provide Class-A fire-protection to all mass timber building construction, along with a complete chain of evidence and documentation to qualify the owner of the Class-A fire-protected mass timber building for lower property insurance premiums, and provide local fire and police departments with valuable building information when fighting fires in such Class-A fire-protected mass timber buildings, and rescuing occupants therefrom.

Specification of the On-Job-Site Spray-Coating Based Method, System and Network for Class-A Fire-Protection of all Exposed Interior Surfaces of Mass Timber Buildings During the Construction Phase FIG. 22A illustrates an on-job-site process of spray coating clean fire inhibiting chemical (CFIC) liquid all over the exposed interior surfaces of mass timber used in a completed section of a mass timber building during its construction phase.

Figure 22B:
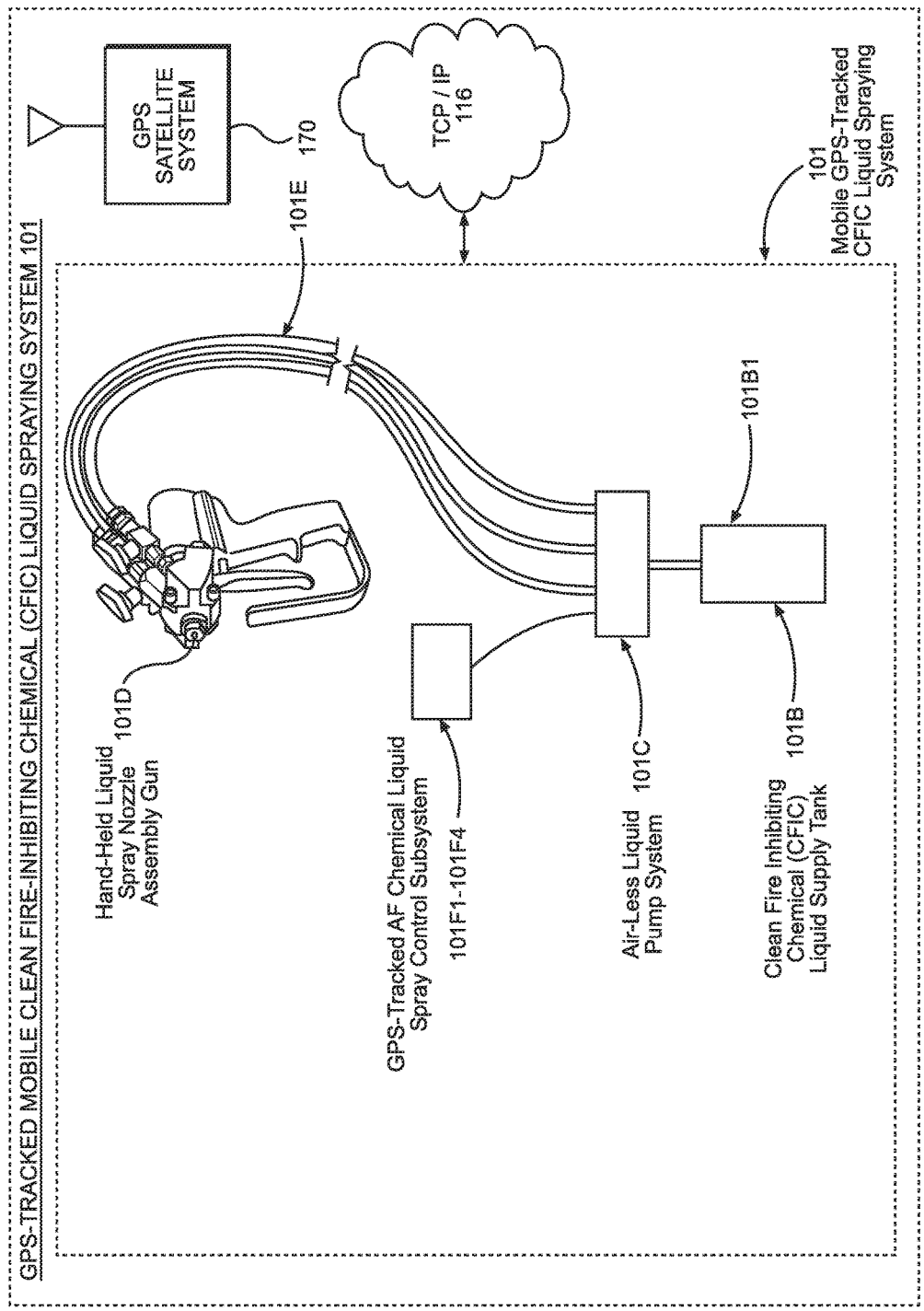
FIG. 22B is a schematic representation of the mobile GPS-tracked clean fire-inhibiting chemical (CFIC) liquid spraying system deployed on the wireless communication network shown in FIG. 22A, with integrated a CFIC liquid supply tank and rechargeable-battery operated electric spray pump, for deployment in building structures, for spraying the same with CFIC liquid in accordance with the principles of the present invention.
Figure 23A:
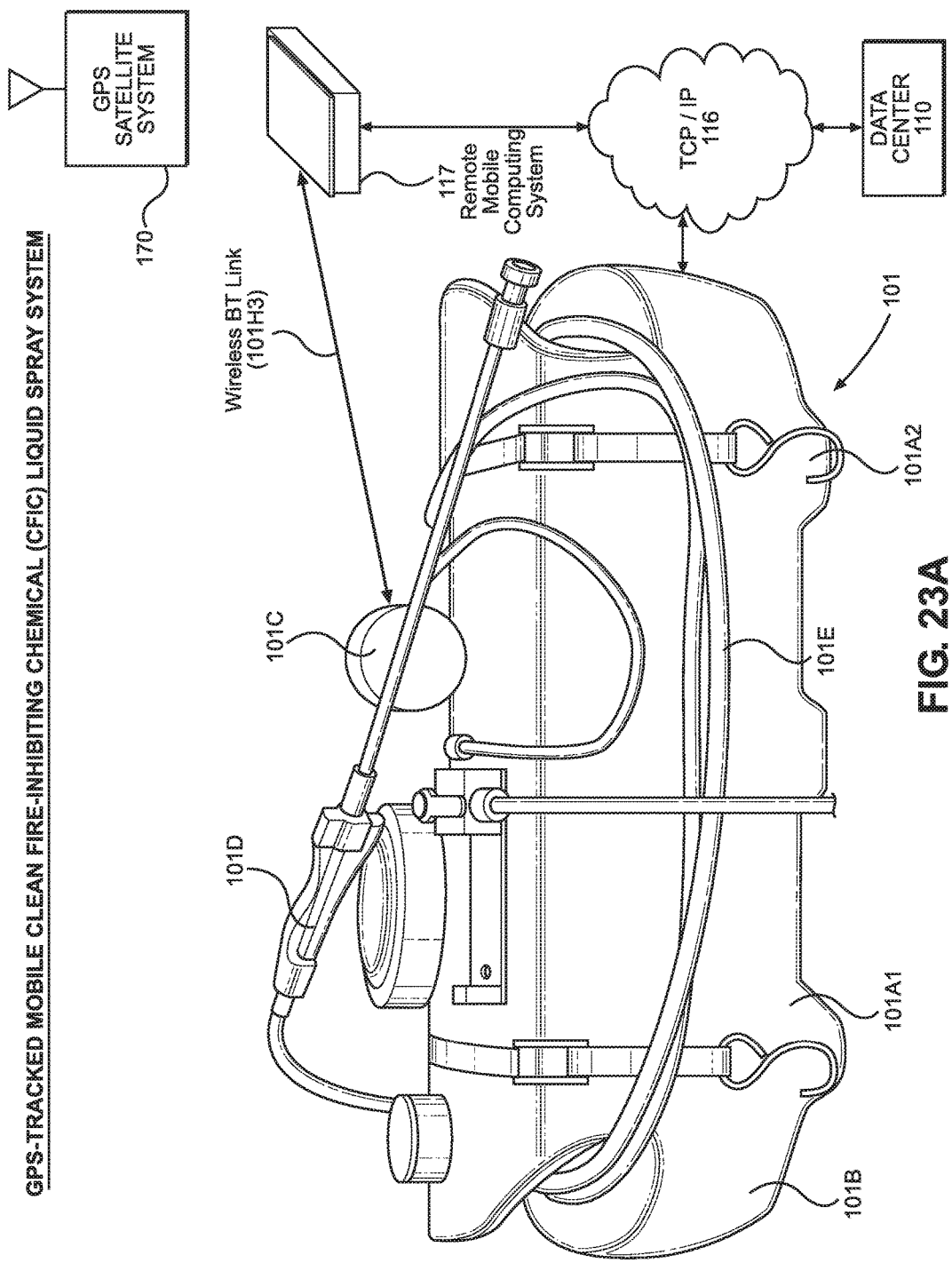
FIG. 23A is a perspective view of a first illustrative embodiment of the mobile GPS-tracked mobile clean fire-inhibiting chemical (CFIC) liquid spraying system shown in FIG. 22B.

As shown in FIGS. 22A and 22B, the primary components of the mobile GPS-tracked clean fire inhibiting chemical (CFIC) air-less liquid spraying system 100 comprises: (i) an air-less liquid spray pumping subsystem 101 including a reservoir tank 101B for containing a supply of CFIC liquid 101C (i.e. AAF31 from Hartindo Chemicatama Industri), (ii) a hand-held liquid spray nozzle gun 101D for holding in the hand of a spray coating technician, and (iii) a sufficient length of flexible tubing 101E, on a carry-reel assembly, if necessary, for carrying liquid CFIC solution from the reservoir tank 101B of the air-less liquid pumping system 101C to the hand-held liquid spray nozzle gun 101D during spraying operations carried out in the mass timber building construction. While it is expected that a human technician will be trained to use system 100 to spray each completed section in the mass timber building, it is understood that robotic systems, with machine-vision and AI-programming, may be used to spray CFIC liquid over mass timber surfaces in accordance with the principles of the present invention.
Specification of the Mobile GPS-Tracked CFIC Spraying System of the Present Invention FIG. 23A shows a GPS-tracked mobile CFIC liquid spraying system 101 in communication with data center 110, via the TCP/IP infrastructure of the Internet 116. The system 101 is also in communication with the mobile computing system 117 with the mobile application 120 installed thereon. The system 101 includes a spray nozzle assembly 101D that connected to the spray pump 101C by way of a flexible 101E for use in spraying CFIC liquid over wood surfaces of a mass timber building.

Figure 23B:
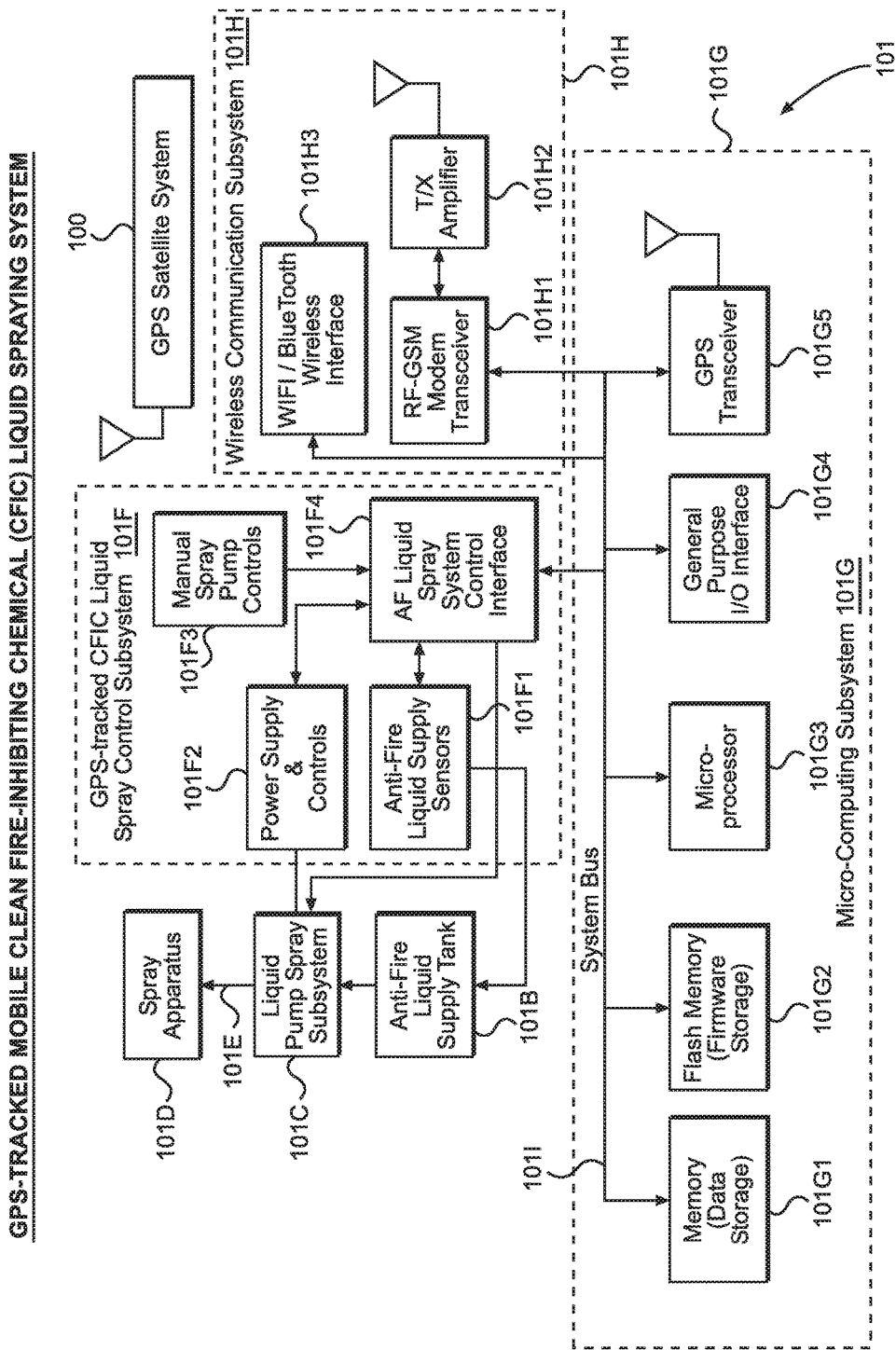
FIG. 23B is a schematic block diagram of the mobile GPS-tracked mobile clean fire-inhibiting chemical (CFIC) liquid spraying system shown in FIG. 23A, comprising a GPS-tracked and remotely-monitored CFIC liquid spray control subsystem interfaced with a micro-computing platform for monitoring the spraying of CFIC liquid from the system when located at specific GPS-indexed location coordinates, and automatically logging and recording such CFIC liquid spray application operations within the network database system of the system network shown in FIG. 28.

As shown in FIG. 23B, the GPS-tracked mobile anti-fire liquid spraying system 101 of FIG. 23A comprises a number of subcomponents, namely: a GPS-tracked and remotely-monitored CFIC liquid spray control subsystem 101F; a micro-computing platform or subsystem 101G interfaced with the GPS-tracked and remotely-monitored AF chemical liquid spray control subsystem 101F by way of a system bus 101I; and a wireless communication subsystem 101H interfaced to the micro-computing platform 101G via the system bus 20I. As configured, the GPS-tracked mobile CFIC liquid spraying system 2101 enables and supports (i) the remote monitoring of the spraying of CFIC liquid from the system 101 when located at specific GPS-indexed location coordinates, and (ii) the logging of all such GPS-indexed spray application operations, and recording the data transactions thereof within a local database maintained within the micro-computing platform 101G, as well as in the remote network database 9C1 maintained at the data center 110 of the system network 109.

As shown in FIG. 23B, the micro-computing platform 101G comprises: data storage memory 2101G1; flash memory (firmware storage) 2101G2; a programmable microprocessor 2101G3; a general purpose I/O (GPIO) interface 101G4; a GPS transceiver circuit/chip with matched antenna structure 2101G5; and the system bus 101I which interfaces these components together and provides the necessary addressing, data and control signal pathways supported within the system 101.

As shown in FIG. 23B, the wireless communication subsystem 101H comprises: an RF-GSM modem transceiver 101H1; a T/X amplifier 101H2 interfaced with the RF-GSM modem transceiver 101H1; and a WIFI and Bluetooth wireless interfaces 101H3.

As shown in FIG. 18B, the GPS-tracked and remotely-controllable CFIC liquid spray control subsystem 101F comprises: anti-fire chemical liquid supply sensor(s) 101F1 installed in or on the anti-fire chemical liquid supply tank 101B to produce an electrical signal indicative of the volume or percentage of the CFIC liquid supply tank containing CFIC liquid at any instant in time, and providing such signals to the CFIC liquid spray system control interface 101F4; a power supply and controls 101F2 interfaced with the liquid pump spray subsystem 101C, and also the CFIC liquid spray system control interface 101F4; manually-operated spray pump controls interface 101F3, interfaced with the CFIC liquid spray system control interface 101F4; and the CFIC liquid spray system control interface 101F4 interfaced with the micro-computing subsystem 101G, via the system bus 101I. The flash memory storage 101G2 contains microcode that represents a control program that runs on the microprocessor 101G3 and realizes the various GPS-specified CFIC chemical liquid spray control, monitoring, data logging and management functions supported by the system 101.

In the preferred embodiment, the CFIC liquid is preferably Hartindo AF31 Total Fire Inhibitor, developed by Hartindo Chemicatama Industri of Jakarta, Indonesia, and commercially-available from Newstar Chemicals (M) SDN. BHD of Selangor Darul Ehsan, Malaysia, http://newstarchemicals.com/products.html. When so treated, combustible products will prevent flames from spreading, and confine fire to the ignition source which can be readily extinguished, or go out by itself. In the presence of a flame, the chemical molecules in both dry and wet coatings, formed with Hartindo AF31 liquid, interferes with the free radicals (H+, OH-, O) involved in the free-radical chemical reactions within the combustion phase of a fire, and breaks these free-radical chemical reactions and extinguishes the fire's flames.

In general, any commercially-grade airless liquid spraying system may be used and adapted to construct the GPS-tracked mobile system 101 for spraying Class-A fire-protective liquid coatings on mass timber building construction sites, and practice the method and system of the present invention, with excellent results. Many different kinds of commercial spray coating systems may be used to practice the present invention, and each may employ an electric motor or air-compressor to drive its liquid pump. For purposes of illustration only, the following commercial spray systems are identified as follows: the Xtreme XL™ Electric Airless Spray System available from Graco, Inc. of Minneapolis, Minn.; and the Binks MX412 Air-Assisted/Compressor-Driven Airless Spray System from Carlisle Fluid Technologies, of Scottsdale, Ariz.

Figure 24A:
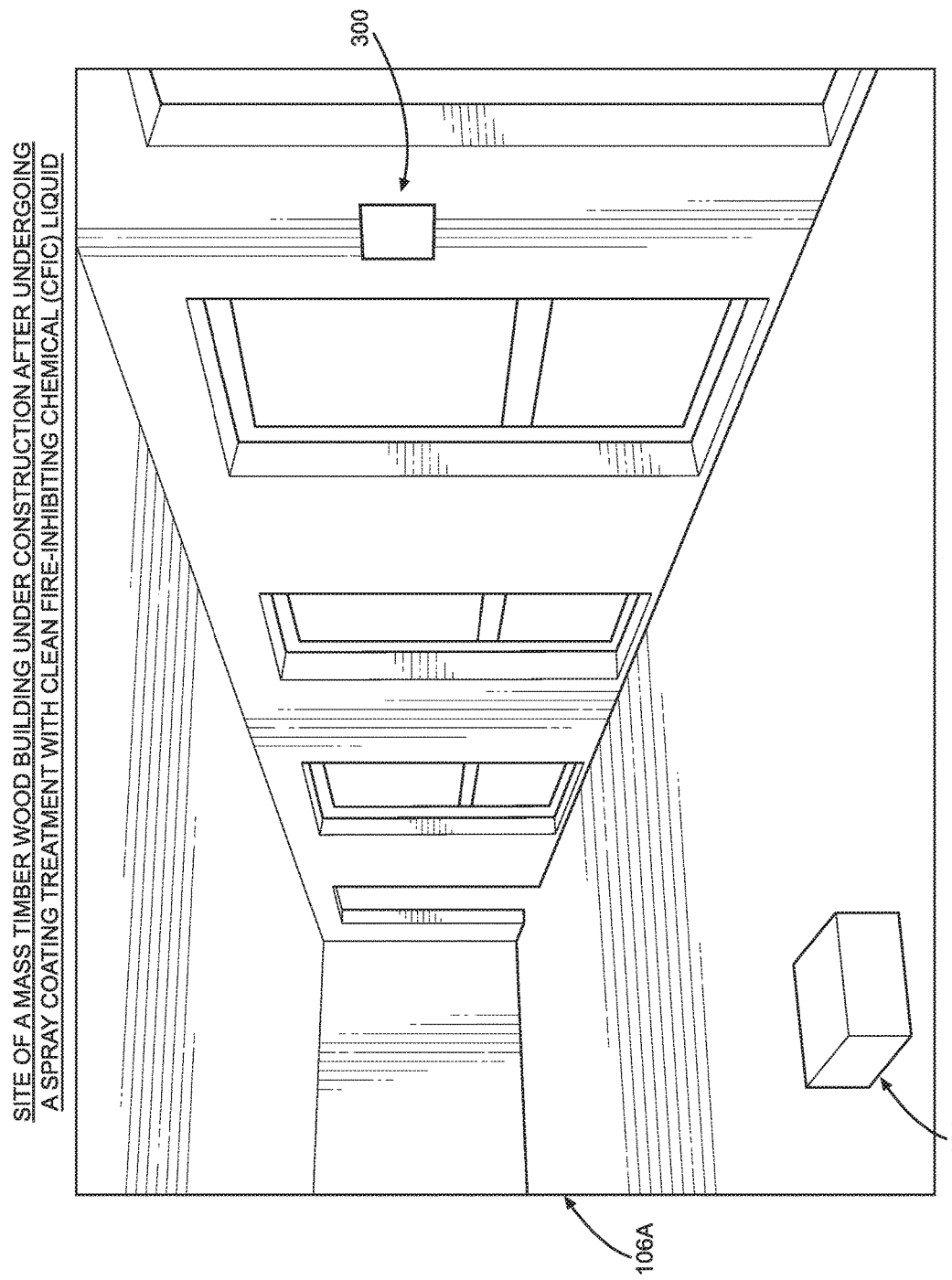
FIG. 24A is a perspective view of a first job-site of a mass timber wood building under construction after undergoing spray coating treatment with clean fire-inhibiting chemical (CFIC) liquid, in accordance with the principles of the present invention.
Figure 24B:
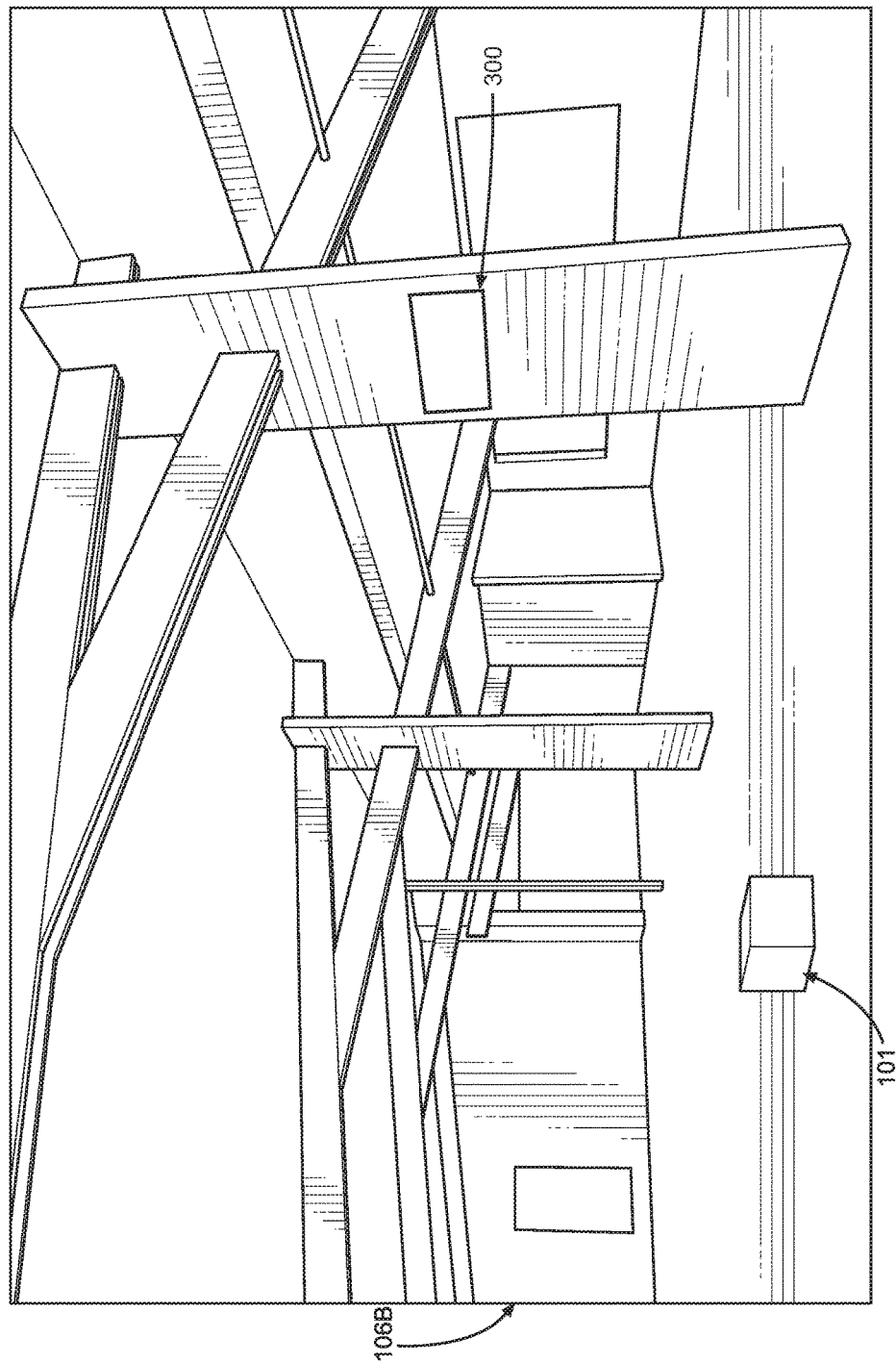
FIG. 24B is a perspective view of a second job-site of a mass timber wood building under construction after undergoing spray coating treatment with clean fire-inhibiting chemical (CFIC) liquid in accordance with the principles of the present invention.
Figure 26:
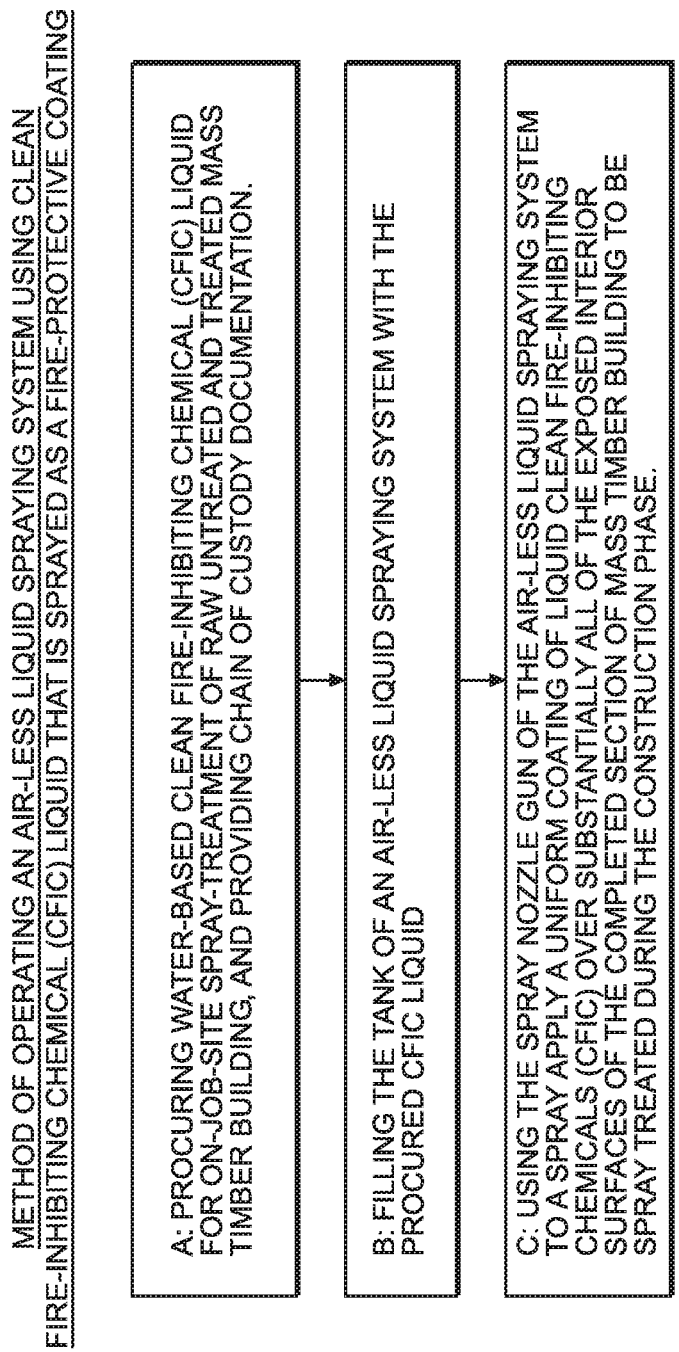
FIG. 26 is a flow chart describing a method of operating an air-less liquid spraying system as shown in FIGS. 22A through 23B to spray clean fire-inhibiting chemical (CFIC) liquid, as a fire-protective coating, over all exposed interior surfaces of mass timber used in a completed section of a mass timber building under construction.

Countless on-site locations will exist having various sizes and configurations requiring the on-job-site spray-based fire-protection method of the present invention. FIG. 24A illustrates a first job-site of multi-apartment mass timber building under construction which has undergone clean fire inhibiting chemical spray coating treatment in accordance with the principles of the present invention. FIG. 24B illustrates a second job-site of multi-apartment mass timber building under construction which has undergone clean fire inhibiting chemical spray coating treatment in accordance with the principles of the present invention.

The on-job-site spray method and system involves spraying a clean fire inhibiting chemical (CFIC) liquid on all new construction lumber and sheathing to prevent fire ignition and flame spread. The method also recommends spraying exterior walls or the exterior face of the roof, wall and floor sheathing with CFIC liquid. The method further recommends that factory-applied fire-protective lumber be used on exterior walls, and fire-protected sheathing be used on the exterior face of the roof, wall and floor sheathing, as it offers extra UV and moisture protection. As disclosed herein, there are many different options available to architects and builders to meet such requirements within the scope and spirit of the present invention disclosed herein.

In the illustrative embodiment, Hartindo AF31 Total Fire Inhibitor (from Hartindo Chemicatama Industri of Jakarta, Indonesia http://hartindo.co.id, or its distributor Newstar Chemicals of Malaysia) is used as the CFIC liquid 101C to spray-deposit the CFIC surface coating onto treated wood/lumber and sheathing products inside the mass timber building under construction. A liquid dye of a preferred color from Sun Chemical Corporation http://www.sunchemical-.com can be added to Hartindo AF31 liquid to help the spray technicians visually track where CFIC liquid has been sprayed on wood surfaces during the method of treatment. The clinging agent in this CFIC liquid formulation (i.e. Hartindo AF31 liquid) enables its chemical molecules to cling to the surface of the CFIC-coated wood so that it is quick to defend and break the combustion phase of fires (i.e. interfere with the free radicals driving combustion) during construction and before drywall and sprinklers can offer any defense against fire. However, a polymer liquid binder, available from many manufacturers (e.g. BASF, Polycarb, Inc.) can be added as additional cling agent to Hartindo AF31 liquid, in a proportion of 1-10% by volume to 99-90% Hartindo AF31 liquid, so as to improve the cling factor of the CFIC liquid when being sprayed in high humidity job-site environments. Alternatively, liquid DecTan Chemical from Hartindo Chemicatama Industri, which contains a mixture of vinyl acrylic copolymer and tannic acid, can be used a cling agent as well when mixed the same proportions, as well as an additional UV and moisture defense on exterior applications. These proportions can be adjusted as required to achieve the cling factor required in any given building environment where the spray coating method of the present invention is being practiced. This way, in the presence of a flame, the chemical molecules in the CFIC-coating on the surface of the fire-protected lumber, interfere with the chemical reactions involving the free radicals (H+, OH–, O–) produced during the combustion phase of a fire, and break the fire's chemical reaction and extinguish its flame. This is a primary fire suppression mechanism deployed or rather implemented by the CFIC-coatings deposited on wood surfaces in accordance with the various principles of invention, disclosed and taught herein.

Specification of Method of Producing Multi-Story Mass Timber Buildings Having Class-A Fire-Protection and Improved Resistance Against Fire Destruction FIGS. 25A, 25B and 25C, taken together, set forth a high-level for chart describing the steps carried out when practicing the method of producing multi-story mass timber buildings having improved fire resistance rating and protection against fire destruction. The method comprises a series of steps described below which effectively results in the coating of substantially all exposed interior wood surfaces of the raw untreated as well as fire-treated lumber and sheathing used during the construction phase of the mass timber building, to protect and defend its wood, lumber and sheathing from ravage of fire and prevent total destruction by fire. The method recommends use of the Class-A fire-protected mass timber building components shown and described herein for use in mass timber building structures.

The spray-coating fire-treatment process of the present invention may be carried out as follows. Spray-coating technicians (i) appear on the new construction job-site after each floor (i.e. mass timber building section) has been constructed with wood framing and sheathing; (ii) spray liquid CFIC solution over substantially all of the exposed interior surfaces of the wood, lumber and sheathing used in the completed mass timber building section; and then (iii) certify that each such mass timber building section has been properly spray-coat protected with CFIC liquid chemicals in accordance with the principles of the present invention. Details of this method will be described in greater detail below in a step-by-step manner.

As indicated at Block A in FIG. 25A, the first step of the method involves fire-protection spray-coating technician to receives a request from a builder to spray a clean fire inhibiting chemical (CFIC) liquid coating over substantially all exposed interior surfaces of the untreated and/or treated wood lumber and sheathing used to construct a completed wood-framed section of a building under construction at a particular site location. This order could come in the form of a written work order, and email message, or other form of communication, with appropriate documentation.

As indicated at Block B in FIG. 25A, the second step of the method involves the fire-protection spray-coating technician (i) receiving building construction specifications from the builder, architect and/or building owner, (ii) analyzing same to determine the square footage of clean fire inhibiting chemical (CFIC) liquid coating to be spray applied to the interior surfaces of the wood-frame building, (iii) computing the quantity of clean fire inhibiting chemical material required to do the spray job satisfactorily, and (iv) generating a price quote for the spray job and sending the quote to the builder for review and approval.

As indicated at Block C in FIG. 25A, the third step of the method involves, after the builder accepts the price quote, the builder orders the clean fire-protection spray team to begin performing the on-site wood coating spray job in accordance with the building construction schedule.

As indicated at Block D in FIG. 25A, the fourth step of the method involves, after the builder completes each completed section of wood framing with wood sheathing installed, but before any wallboard has been installed, the spray technician (i) procures a supply of clean fire-protection chemicals (CFIC) liquid solution, (ii) fills the reservoir tank of an airless liquid spraying system with the supply of CFIC liquid, and (iii) then uses a spray gun to spray CFIC liquid in the reservoir tank, over all exposed interior wood surfaces of the completed section of the mass timber building under construction. FIGS. 49 and 50 show an air-less liquid spraying system 101 for spraying CFIC liquid over all exposed interior surfaces of lumber and wood sheathing used in a completed section of the mass timber building under construction, so as to form a Class-A fire-protective coating over such treated surfaces.

As indicated at Block A in FIG. 25C, the first stage of this step involves procuring water-based CFIC liquid for on-job-site spray-treatment of raw untreated and treated lumber and sheathing used inside a mass timber building. In the preferred embodiment, Hartindo AF31 from Hartindo Chemicatama Industri (and available from its distributor Newstar Chemical of Malaysia) is used as the CFIC liquid employed by the method of the present invention. Hartindo AF31 CFIC is an environmentally-friendly water-based, biodegradable and non-toxic solution that is non-ozone depleting and does not require cleanup procedures after usage. Hartindo AF31 CFIC is also effective for all classes of fires: involving solid, carbonaceous materials; flammable fuels, thinners, etc.; gas, electricity fires, and energy fires; and metal fire and oxidizing fires.

As indicated at Block B in FIG. 25C, the second stage of this step involves filling the tank of the air-less liquid spraying system 101 with the procured supply of CFIC liquid.

As indicated at Block C in FIG. 25C, the third stage of this step involves using the spray nozzle gun 103 of the air-less liquid spraying system 101 as shown in FIGS. 16 and 17, to a spray apply a uniform coating of liquid clean fire inhibiting chemical (CFIC) liquid over all of the interior surfaces of the completed section of mass timber building being spray treated during the construction phase of the building, in accordance with the principles of the present invention. In the illustrative embodiment, the liquid CIFC (i.e. Hartindo AF31) is applied at a rate (i.e. coating coverage density) of about 590 square feet per gallon, although it is understood that this rate may vary from illustrative embodiment, to illustrative embodiment.

The CFIC liquid used in the present invention clings to the wood on which it is sprayed, and its molecules combine with the (H+, OH−, O−) free radicals in the presence of fire, during combustion, to eliminate this leg of the fire triangle so that fire cannot exist in the presence of such a CFIC based coating.

FIGS. 24A and 24B shows a few illustrative examples of building construction job site locations where the spray-based fire protective method of the present invention might be practiced with excellent results. It is understood that such examples are merely illustrative, and no way limiting with regard to the present invention.

As indicated at Block E in FIG. 25B, during the fifth step of the method, when the completed section of the building has been spray coated with clean fire inhibiting chemical (CFIC) liquid, the completed building section is certified and marked as certified for visual inspection and insurance documentation purposes, preferably using barcoded/RFID-tagged inspection checkpoints 300 shown in FIGS. 24A, 24B, 36 and 37, and the system network 100 described in FIGS. 28 through 38.

Alternatively, such marking of completed sprayed building sections can involving posting a spray-coating check-board, with a seal or certificate using an indelible ink, with date, job ID #, sprayer #, and other information related to specific spray-coat fire-protection job that have been certified as a completed at that mass timber building section. Preferably, the architectural plans for the building, as well as building schematics used on the job site, will have building section identification numbers or codes, which will be used on the certificate of completion stamped onto the spray-coated fire-protected sheathing and lumber on the job site. Typically, the on-job-site spray project information sheet will contain numerous basic information items, including, for example: Date; Customer Name; Weather Description and Temperature; Building Address; Customer Address: Customer Supervisor; Units of Part of the Building Sprayed; Sprayer Used; Spray Technician Supervisor; and Notes.

As part of the certification process, an on-job-site spray project information sheet is maintained in the network database system 113A, supported on the system network 100, using the system network 100 and mobile application 120 described in FIGS. 28 through 38. Photographic and video recordings can also be made and stored in a database as part of the certification program, as will be described in greater detail below.

As indicated at Block F in FIG. 25B, during sixth step of the method, as each section of the mass timber building is constructed according to the construction schedule, the spray coating team continues to spray coat the completed section, and certify and mark as certified each such completed spray coated section of the building under construction, using barcoded/RFID-tagged inspection checkpoints 300, shown in FIGS. 24A, 24B, 36 and 37, and the system network 100 described in FIGS. 28 through 38.

As indicated at Block G in FIG. 25B, during the seventh step of the method, when all sections of the building under construction have been completely spray coated with clean fire inhibiting chemical (CFIC) materials, suppressing fire ignition and suppression by capturing free radicals (H+, OH−, O−) during the combustion phase, and certified as such, the spray technicians remove the spray equipment from the building, and the builder proceeds to the next stages of construction and completes the building construction according to architectural and building plans and specifications.

As indicated at Block H in FIG. 25B, during the eighth step of the method, the spray technician then issues a certificate of completion with respect to the application of clean fire-protection chemicals to all exposed wood surfaces on the interior of the mass timber building during its construction phase, thereby protecting the building from risk of total destruction by fire. Preferably, the certificate of completion should bear the seal and signature of a professional engineer (PE) and the building architect who have been overseeing and inspecting the building construction project.

FIG. 27 shows the flame spread and smoke development characteristics of Spruce Pine Fir (SPF) and Douglas Fir species of Class-A fire-protected lumber, after being spray-coated with clean fire inhibiting chemical (CFIC) liquid as generally shown in FIGS. 22A and 22B, and tested in accordance with ASTM E84 and UL 723 test standards. Based on these measured flame spread and smoke development indices for Spruce Pine Fir (SPF) and Douglas Fir species of lumber, it is expected that on-site sprayed mass timber surfaces, when constructed using substantially the same kinds of lumber and treated in substantially the same manner using the CFIC liquid dip-coating methods disclosed in FIGS. 22A and 22B and described herein, will consistently produce flame spread index and smoke development index test results that will entitle CFIC-liquid sprayed mass timber surfaces (e.g. associated CLT, GLT and NLT products) to "Class-A fire-protected" status under ASTM E84 and UL 723 test standards.

Advantages and Benefits of the On-Job-Site Method of Mass Timber Treatment and Fire-Protection by Way of Spray Coating of CFIC Liquid Over the Surface of Exposed Interior and Exterior Wood Used in Mass Timber Buildings The on-site spray coating method of the present invention described above involves the use of CFIC liquid having the property of clinging onto the surface of the wood to which it is applied during on-job-site spray-coating operations, and then inhibiting the ignition of a fire and its progression by interfering with the free-radicals (H+, OH−, O−) involved in the combustion phase of any fire. Hartindo AF31 liquid fire inhibitor meets these design requirements.

In general, CFIC liquids that may be used to practice the on-site fire-protection method of the present invention suppresses fire by breaking free radical (H+, OH−, O−) chemical reactions occurring within the combustion phase of fire, quickly and effectively suppressing fire in a most effective manner, while satisfying strict design requirements during the construction phase of a mass timber building construction project. At the same time, the spray-based method of wood treatment and fire-protection will not degrade the strength of the wood materials (i.e. Modulus of Elasticity (MOE) and the Modulus of Rupture (MOR)) when treated with the CFIC-based liquid spray chemicals applied during the method of treatment.

The on-site wood lumber/sheathing spraying method of the present invention overcomes the many problems associated with pressure-treated fire retardant treated (FRT) lumber, namely: "acid hydrolysis" also known as "acid catalyzed dehydration" caused by FRT chemicals; significant losses in the Modulus of Elasticity (MOE), the Modulus of Rupture (MOR) and impact resistance of pressure-treated wood.

Figure 28:
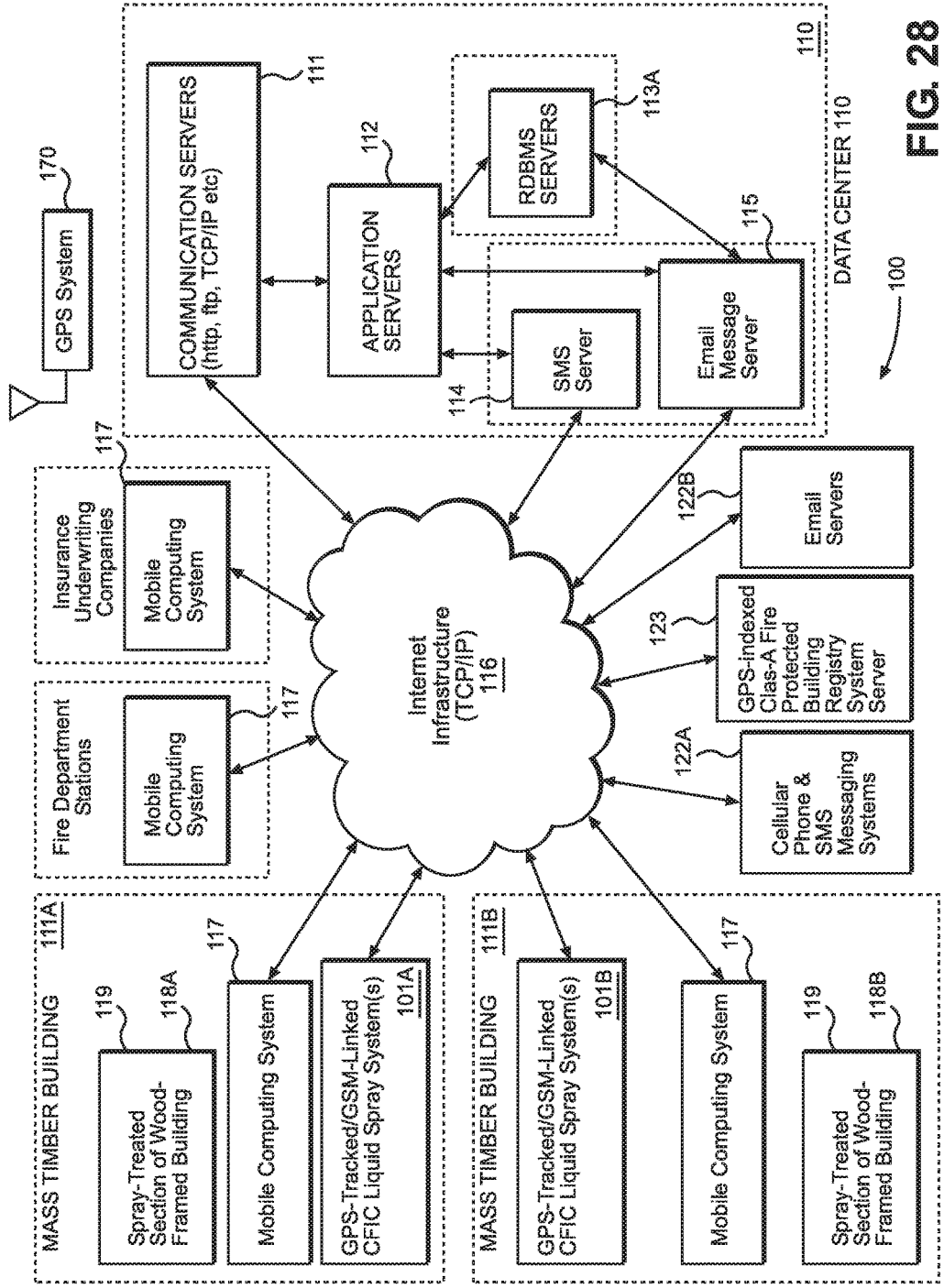
FIG. 28 is a schematic system diagram showing the Internet-based (i.e. cloud-based) system for verifying and documenting Class-A fire-protection spray-treatment of a mass timber building as generally shown in FIGS. 22A through 26, comprising (i) a data center with web, application and database servers for supporting a web-based site for hosting images of certificates stamped on spray-treated wood surfaces, and other certification documents, and (ii) mobile smart-phones used for capturing digital photographs and audio-video (AV) recordings of spray-treated mass timber building sections and completed certificates of spraying and supervision during the on-site fire-protection spray process supported using mobile GPS-tracked CFIC liquid spraying systems, and uploading the captured digital images and AV recordings to the data center, for each spray treatment project, so that insurance companies, builders, and other stakeholders can review such on-site spray completion certifications, and other information relating to the execution and management of such fire-protection spray-treatment projects during the building construction phase of mass timber buildings.

Internet-Based Cloud-Based System for Verifying and Documenting Class-A Fire-Protection Treatment of a Wood-Framed Building Using On-Site Spraying of a Clean Fire Inhibiting Chemical (CFIC) Liquid FIG. 28 shows Internet-based (i.e. cloud-based) system 100 for verifying and documenting Class-A fire-protection treatment of a mass timber building using on-site spraying of a clean fire inhibiting chemical (CFIC) liquid, as described in FIGS. 49 through 54, comprising: (i) a data center 110 with web servers 111, application servers 112 and database servers 113, with SMS servers 114 and email message servers 115, each operably connected to the TCP/IP infra-structure 114 of the Internet 116 for supporting a web-based site for hosting images/videos of certificates of completion 119 stamped or printed on spray-treated wood surfaces, at registered inspection checkpoints, often with other certification documents; and (ii) mobile computing systems 117 (117A, 117B, 117C) (e.g. smart-phones such as the Apple iPhone and Samsung Android phone) with either a mobile application 120 installed, and a web-browser application, as discussed further hereinafter.

In the preferred embodiment, each mobile computing system 117 is configured for: (i) capturing digital photographs and video recordings of completed spray-treated wood-framed sections with barcoded/RFID-tagged certificates of inspection 300 posted in buildings under construction 118 (118A, 118B, 118C), as illustrated in FIGS. 51A and 51B, upon completion of the on-site fire-protection spray process at specific building sections; (ii) recording notes and averments by the spray technicians who applied the CFIC liquid spray and supervisors who supervised the same; and (iii) uploading such time-date-stamped digital audio-video (AV) recordings and 121 to the servers 111, 112, 113 in the data center 110, providing documented evidence of barcoded/RFID-tagged certificates of inspection (at inspection checkpoints) 300 stamped/printed or otherwise posted on the surfaces of sprayed wood surfaces, for each fire-protection spray-treatment project, so that insurance companies, builders, and other stakeholders (who are registered users of the system) can access and review such on-site spray completion certifications during and after the construction phase of a mass timber building, for various purposes.

As shown in FIG. 28, the system network 100 also includes a GPS satellite system 170 for transmitting GPS reference signals transmitted from a constellation of GPS satellites deployed in orbit around the Earth, to GPS transceivers installed aboard each GPS-tracking mobile image capturing and computing system 117, as part of the illustrative embodiments. From the GPS signals it receives, each GPS transceiver is capable of computing in real-time the GPS location of its host system, in terms of longitude and latitude. In the case of the Empire State Building in NYC, N.Y., its GPS location is specified as: N40° 44.9064', W073° 59.0735'; and in number only format, as: 40.748440, −73.984559, with the first number indicating latitude, and the second number representing longitude (the minus sign indicates "west").

Figure 29A:
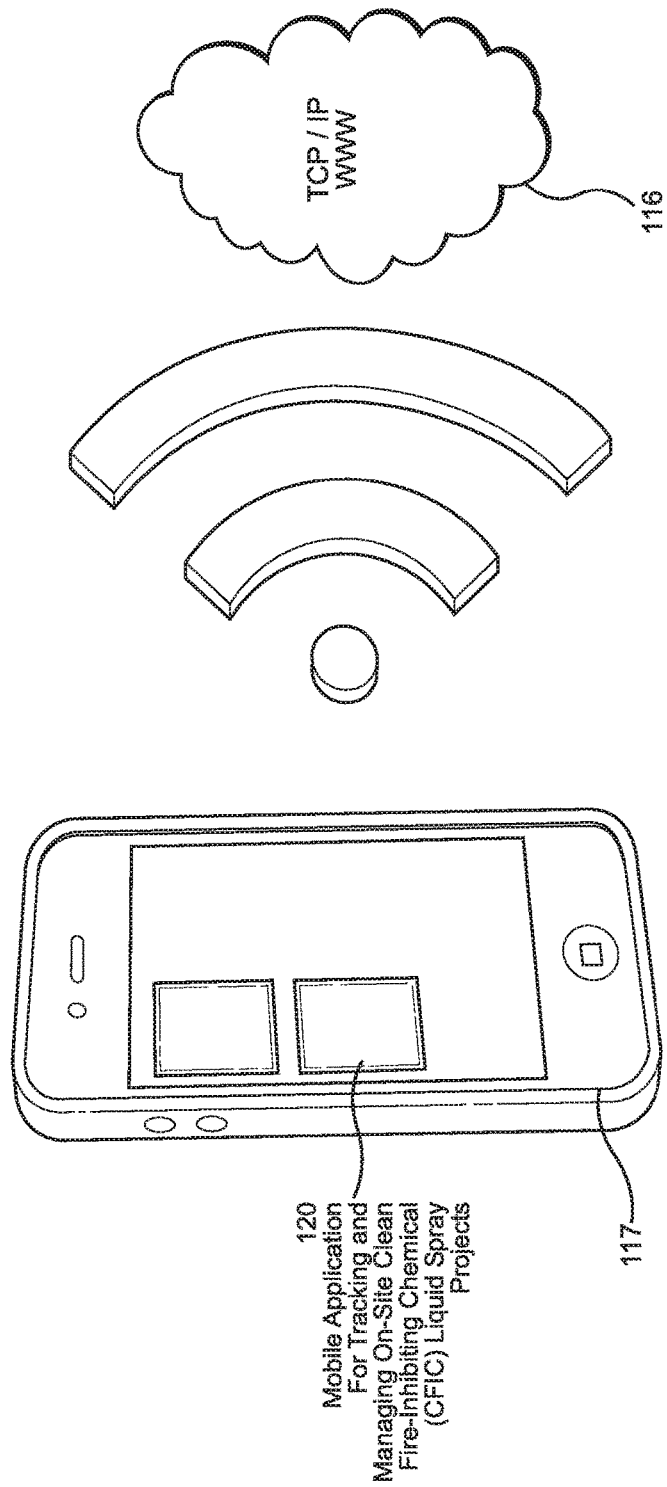
FIG. 29A is perspective view of a mobile client computing system used in the system network shown in FIG. 28, supporting a mobile application installed on the mobile computing system for the purpose of tracking and managing projects involving on-site clean fire inhibiting chemical (CFIC) liquid spray treatment of mass timber buildings during the construction phase to ensure Class-A fire-protection of the mass timber building products and components employed therein.

FIG. 29A shows the mobile client computing system 117 (117A, 117B, 117C) deployed on the system network 100 shown in FIG. 28, supporting the mobile application 120 installed on each mobile computing system 117. The purpose of the mobile application 120 is to provide the mobile computing system 117 with a convenient tool for tracking and managing projects involving on-site clean fire inhibiting chemical (CFIC) liquid spray treatment of mass timber buildings during the construction phase, and the logistics associated therewith, to ensure the provision of Class-A fire-protection of all exposed interior wood surfaces in the mass timber building. All stakeholders (e.g. building owners, architects, builders, property insurance underwriters, local fire departments and firemen, and others such as project coordinators, spray technicians, site superintendents, site spray managers and others who are involved in the logistics, management and application of CFIC liquid spray onto and over all exposed interior surfaces of the building) will benefit from the system network 100 and its deployed mobile application 120, and the services it supports across the enterprise.

Using the custom-designed mobile application 120, property/building owners, architects, builders, insurance companies and other stakeholders can (i) track the progress being made while a mass timber building is being spray-treated with CFIC liquid during the construction project schedule, and (ii) review all collected pdf documents, digital images and audio-video recordings collected as visual evidence of "certificates of completion" by trained personnel, at predetermined inspection checkpoints in the mass timber building, during the course of the construction project.

The purpose of such digital evidence, collected on-site at each inspection checkpoint and remotely stored in the network database 113A, is to verify and document proper application of CFIC liquid spray to each indexed inspection checkpoint designated at the commencement of the Project, and located throughout the interior of the mass timber building to ensure that 100% of all exposed interior surfaces within the mass timber building have been provided with Class-A fire-protection.

Preferably, each inspection checkpoint 300 will be identified by Project ID # with a unique coding to identify the Building #, Floor #, Section #, and optionally Panel # at which the inspection checkpoint is located, and where certificates of completion (for the specified section) will be stamped, signed and AV-recorded, and actual wood samples sprayed with CFIC liquid at the time of the certified spray application are AV-recorded and collected and archived for verification and documentation purposes. The AV-recording of certifications made at each registered inspection checkpoint 300 in the mass timber building should help to ensure that Class-A fire-protected wood-samples will be available in the future in the event there might be a need to investigate the Class-A fire-protection spray treatment process.

Specification of the Network Architecture of the System Network of the Present Invention FIG. 28 illustrates the network architecture of the system network of the present invention 135 for the case where the system of the present invention is implemented as a stand-alone platform deployed on the Internet.

As shown in FIG. 28, the Internet-based system network comprises: cellular phone and SMS messaging systems 122A; email servers 122B; a network of mobile computing systems 117 (117A, 117B) running enterprise-level mobile application software; and one or more industrial-strength data center(s) 110, preferably mirrored with each other and running Border Gateway Protocol (BGP) between its router gateways.

As shown in FIG. 28, each data center 110 comprises: a cluster of communication servers 111 for supporting http and other TCP/IP based communication protocols on the Internet (and hosting Web sites); a cluster of application servers 112; a cluster of RDBMS servers 113 configured within a distributed file storage and retrieval ecosystem/system, and interfaced around the TCP/IP infrastructure of the Internet well known in the art; an SMS gateway server 114 supporting integrated email and SMS messaging, handling and processing services that enable flexible messaging across the system network, supporting push notifications; and a cluster of email processing servers 115.

Referring to FIG. 28, the cluster of communication servers 111 is accessed by web-enabled clients (e.g. smart phones, wireless tablet computers, desktop computers, computer workstations, etc) 117 (117A, 117B) used by stakeholders accessing services supported by the system network. The cluster of application servers 112 implement many core and compositional object-oriented software modules supporting the system network 100. The cluster of RDBMS servers 113 use SQL to query and manage datasets residing in its distributed data storage environment.

Figure 32:
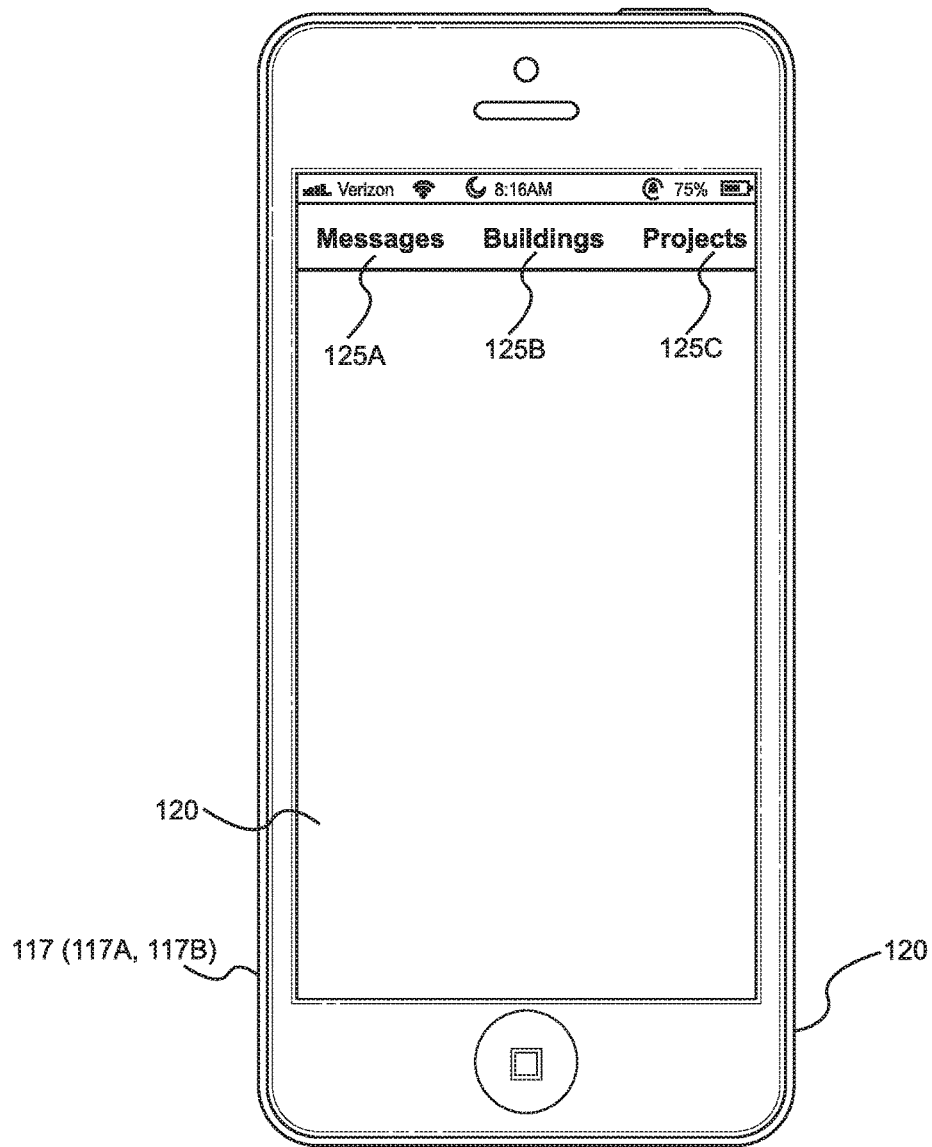
FIG. 32 is an exemplary wire frame model of a graphical user interface of a mobile application configured for use by building/property owners, insurance companies, and other stakeholders, showing a menu of high-level services supported by the system network of the present invention.
Figure 33:
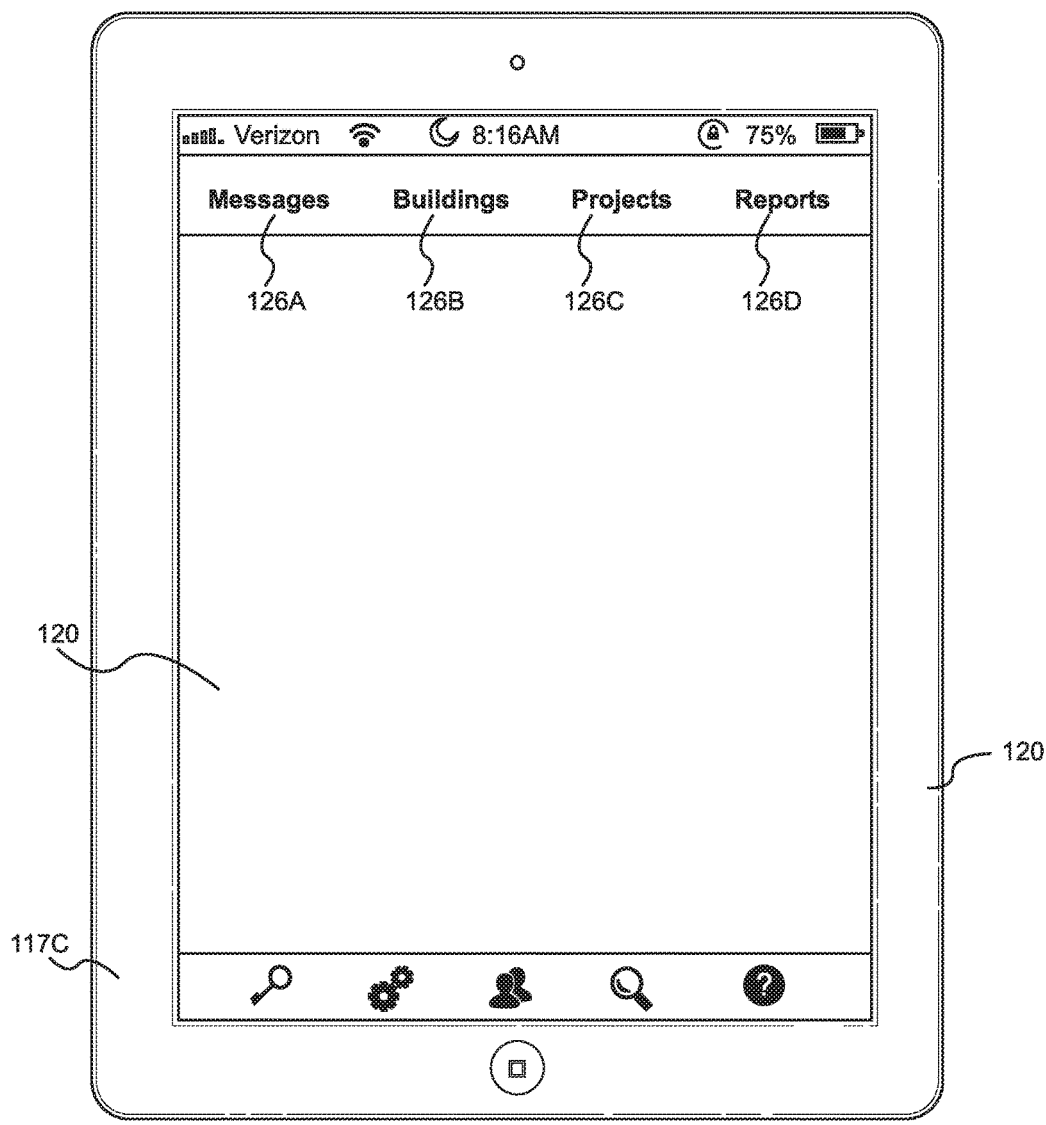
FIG. 33 is an exemplary wire frame model of a graphical user interface of the mobile application showing a high-level menu of services configured for use by on-site fire-protection spray administrators and technicians supported by the system network of the present invention.
Figure 33A:
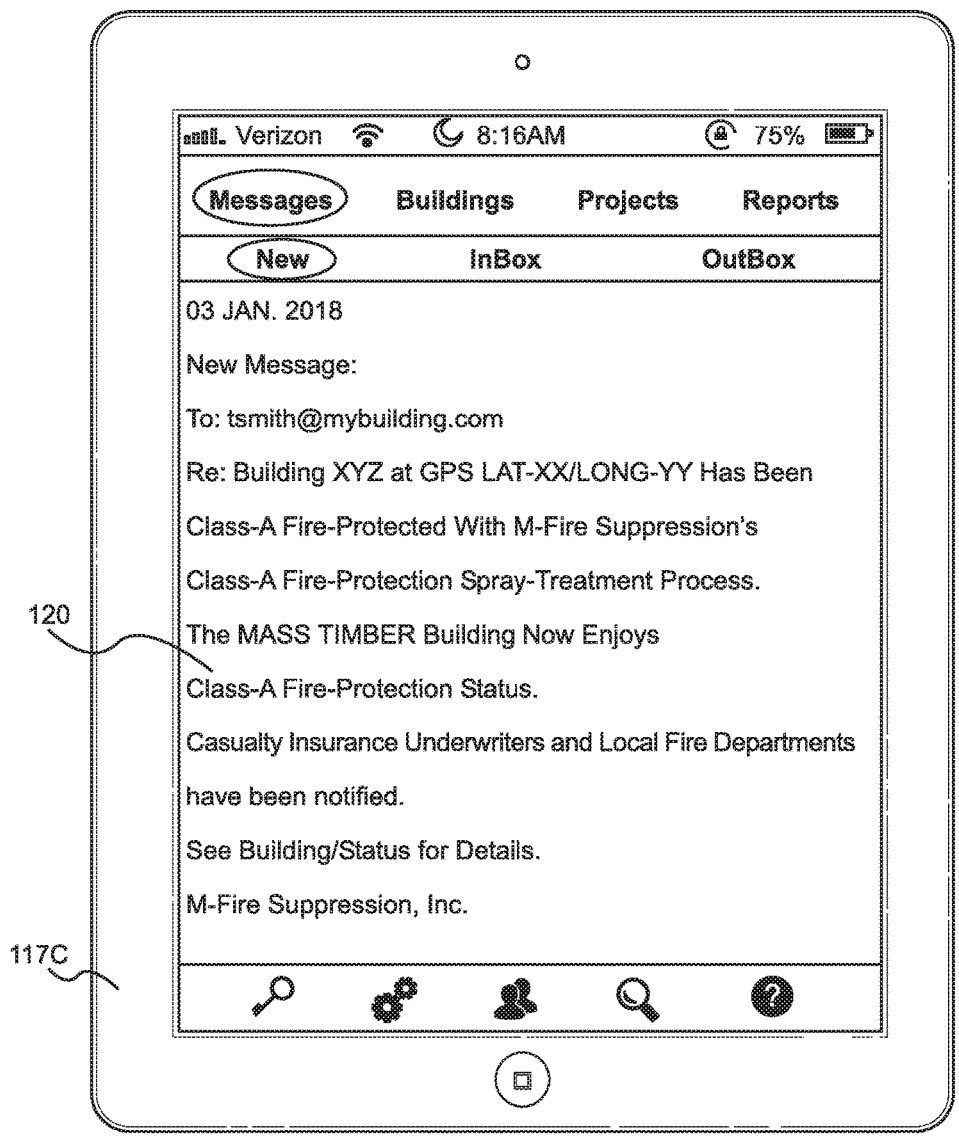
FIG. 33A is an exemplary wire frame model of a graphical user interface of the mobile application configured for use by on-site fire-protection spray administrators and technicians to send and receive messages (via email, SMS messaging and/or push-notifications) with registered users, using messaging services supported by the system network of the present invention.
Figure 33B:
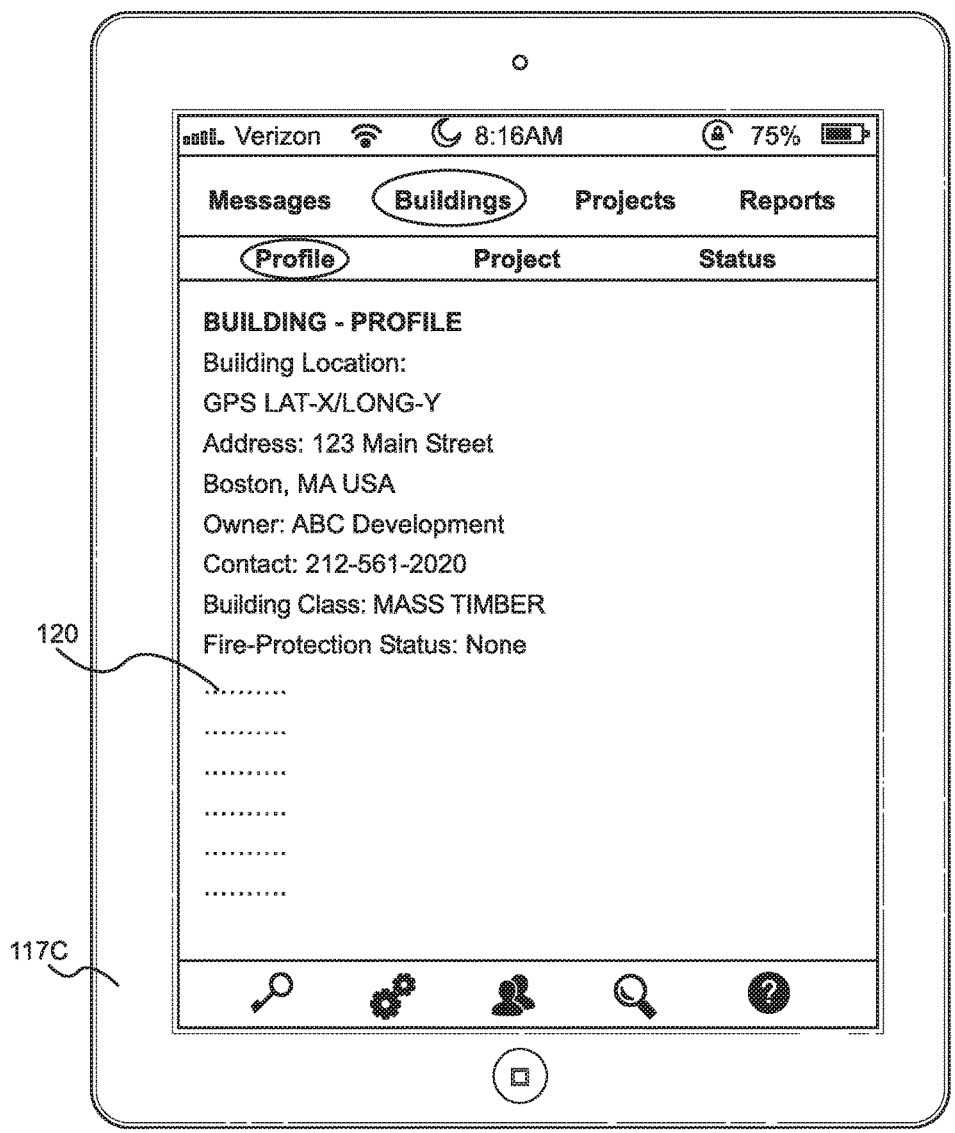
FIG. 33B is an exemplary wire frame model of a graphical user interface of the mobile application configured for use by on-site fire-protection spray administrators and technicians to update a building information profile using the building profile services supported by the system network of the present invention.
Figure 33C:
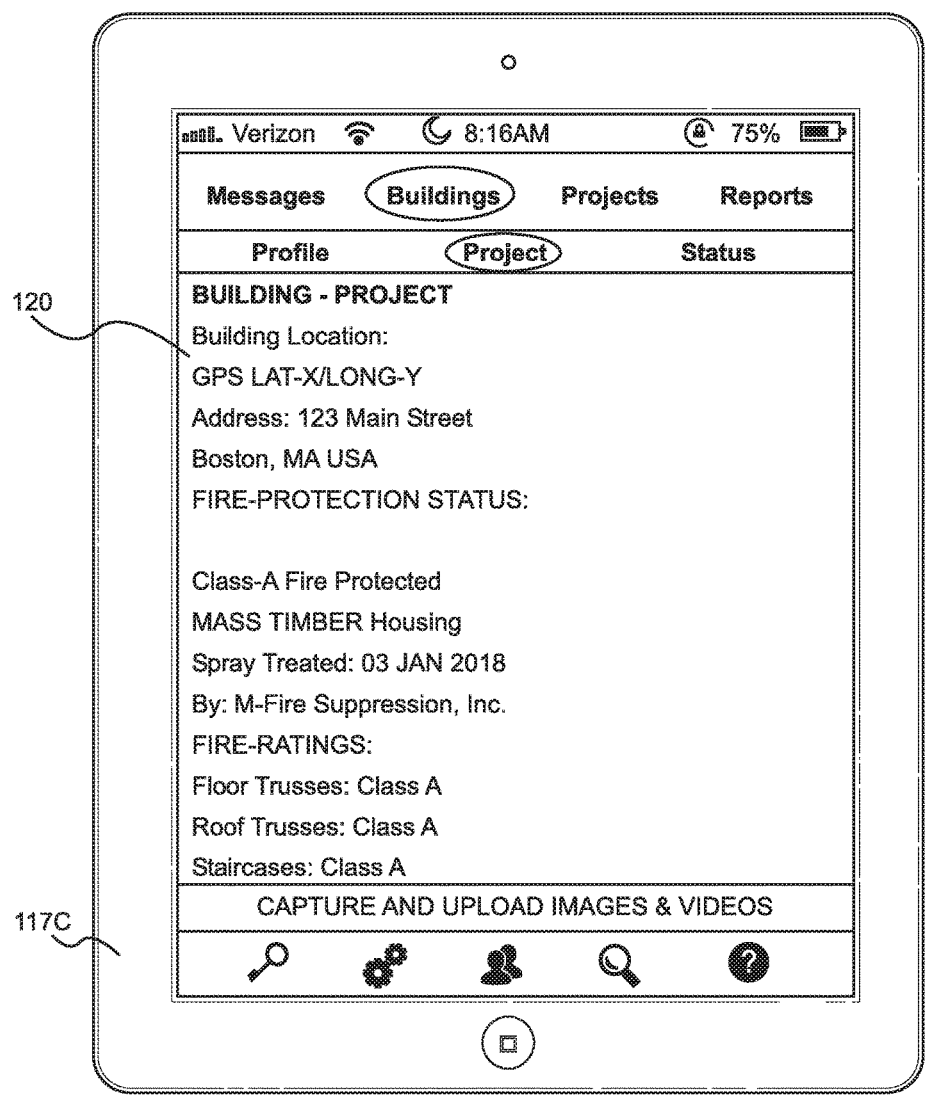
FIG. 33C is an exemplary wire frame model of a graphical user interface of the mobile application configured for use by on-site fire-protection spray administrators and technicians to review a building spray-based fire-protection project using services supported by the system network of the present invention.
Figure 33D:
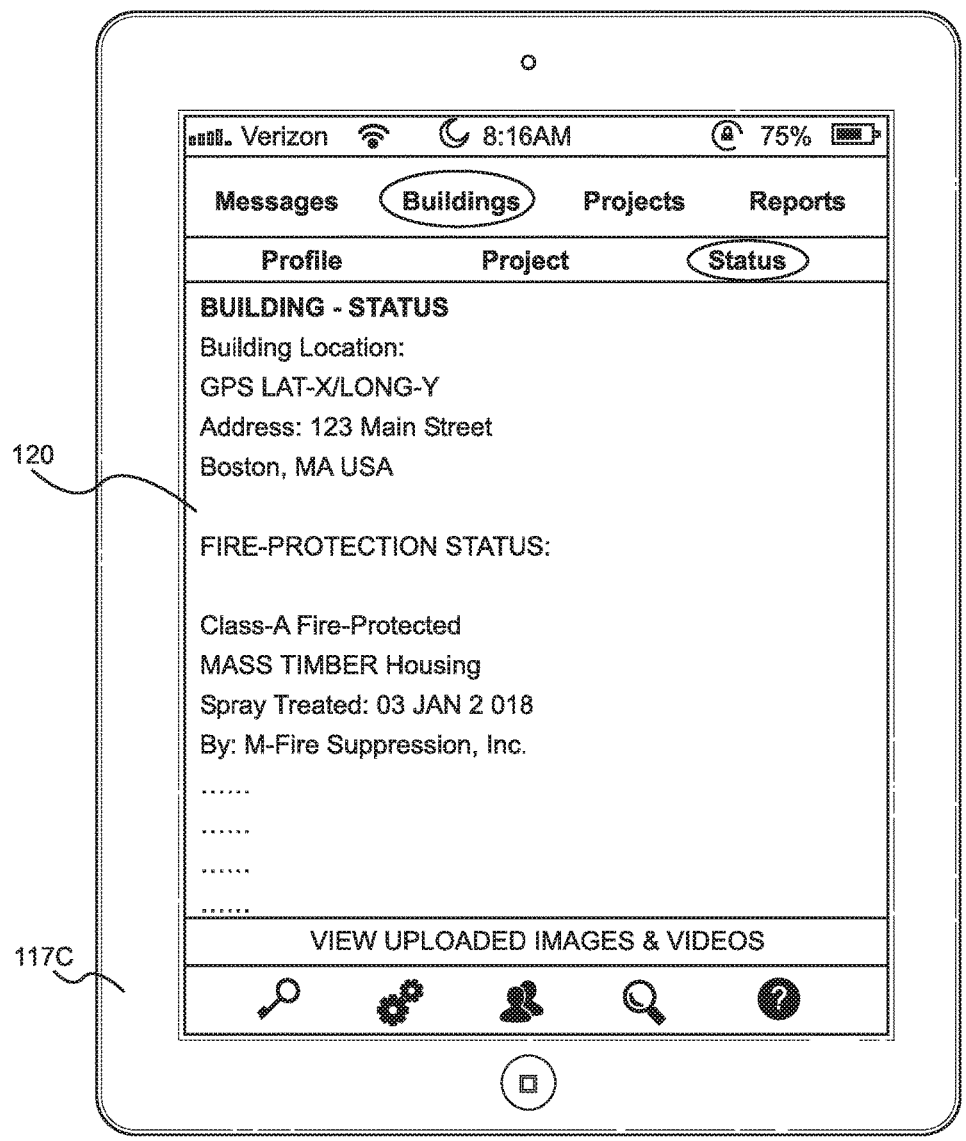
FIG. 33D is an exemplary wire frame model of a graphical user interface of the mobile application configured for use by on-site fire-protection spray administrators and technicians to review the status of any building registered with the system network using services supported by the system network of the present invention.
Figure 33E:
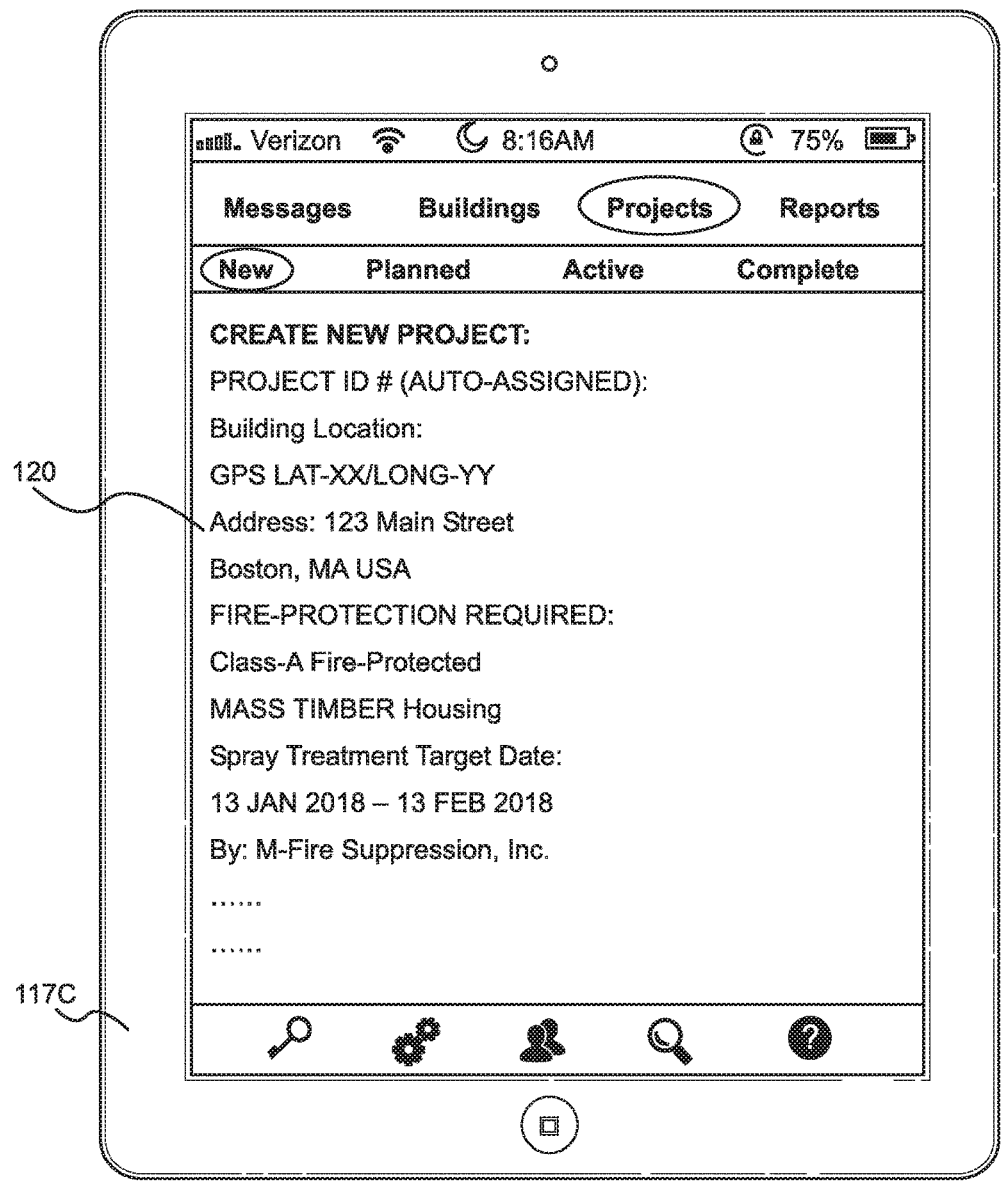
FIG. 33E is an exemplary wire frame model of a graphical user interface of the mobile application configured for use by on-site fire-protection spray administrators and technicians to create a new project for spray-based class-A fire-protection treatment of a mass timber building, using services supported by the system network of the present invention.
Figure 33F:
FIG. 33F is an exemplary wire frame model of a graphical user interface of the mobile application configured for use by on-site fire-protection spray administrators and technicians to review the status of a planned building fire-protection spray project, using services supported by the system network of the present invention.
Figure 33G:
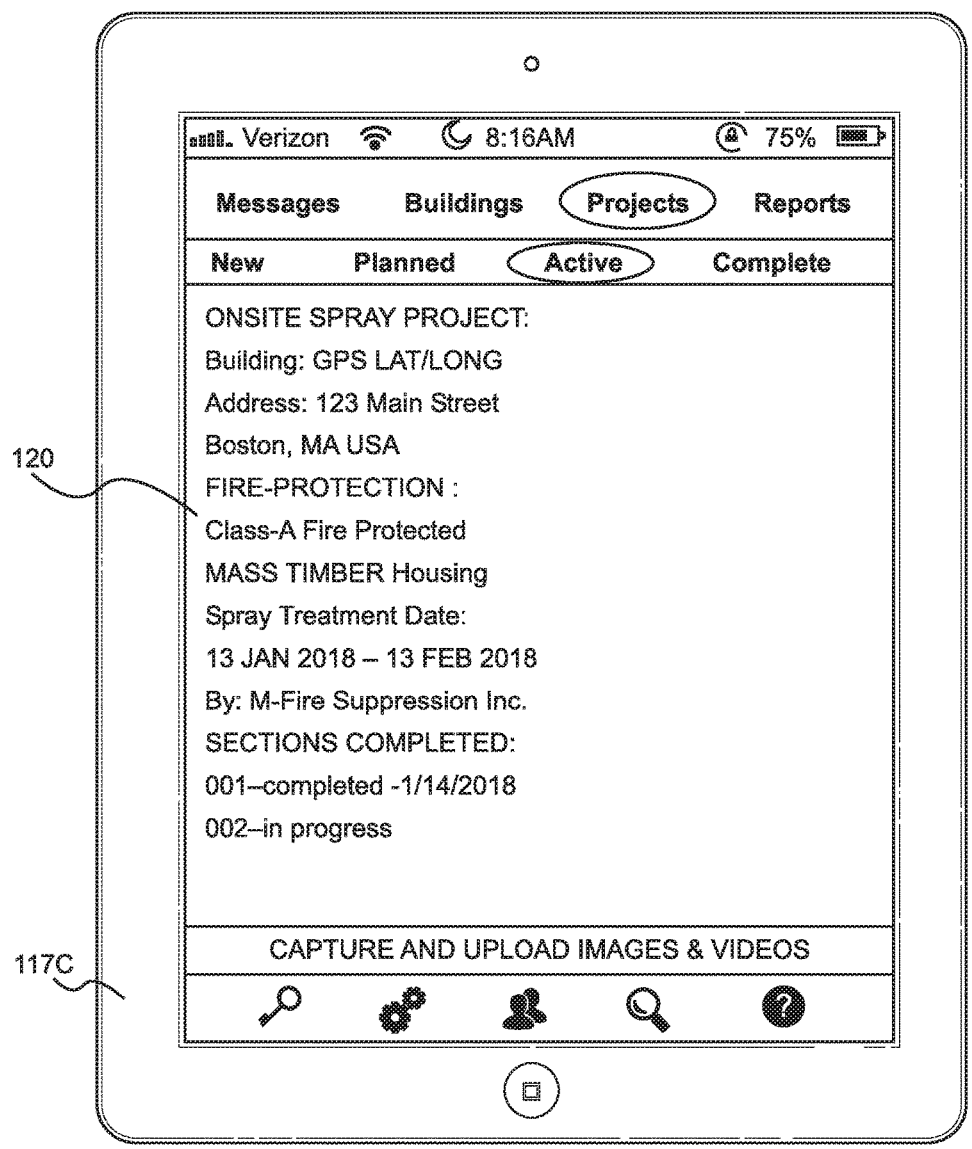
FIG. 33G is an exemplary wire frame model of a graphical user interface of the mobile application configured for use by on-site fire-protection spray administrators and technicians to review the status of an active in-progress building fire-protection spray project, using services supported by the system network of the present invention.
Figure 33H:
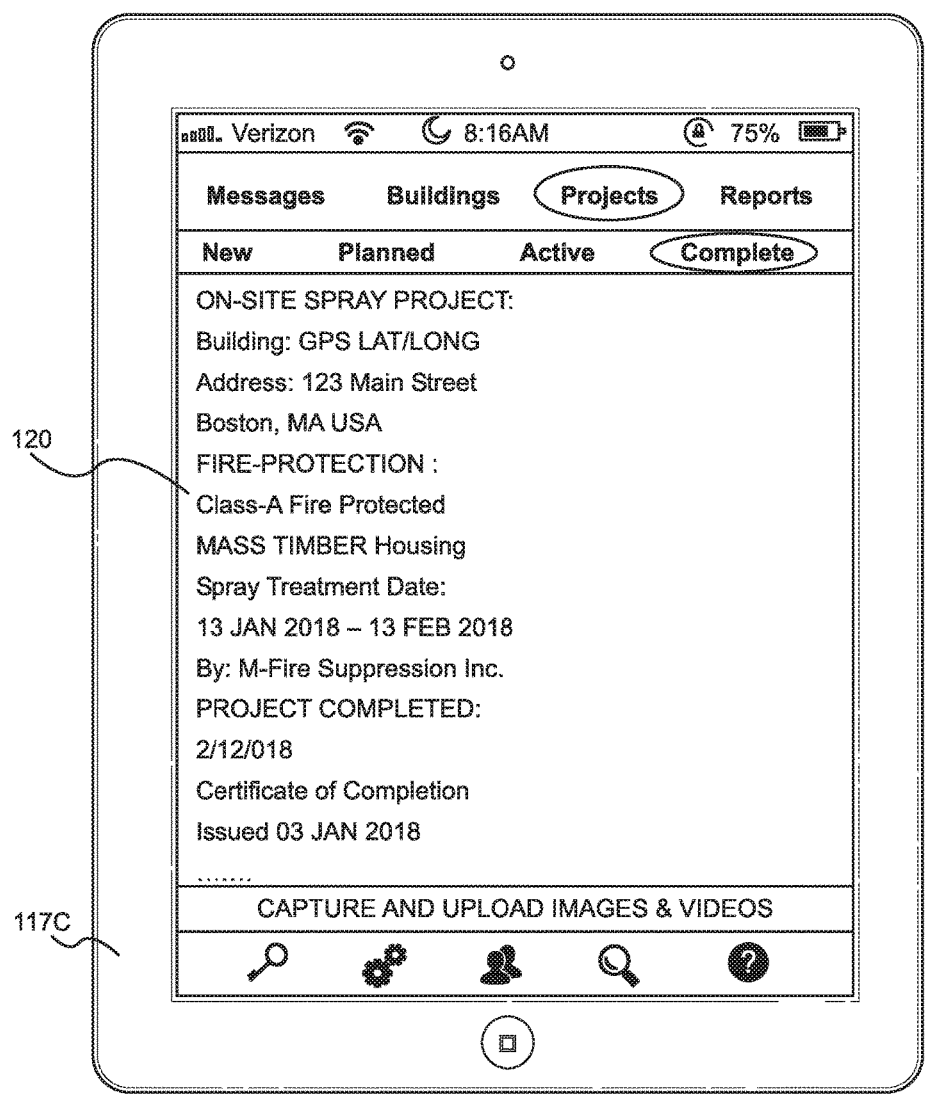
FIG. 33H is an exemplary wire frame model of a graphical user interface of the mobile application configured for use by on-site fire-protection spray administrators and technicians to review a completed mass timber (CLT/NLT) building fire-protection spray project, and all documents collected therewhile, using services supported by the system network of the present invention.
Figure 33I:
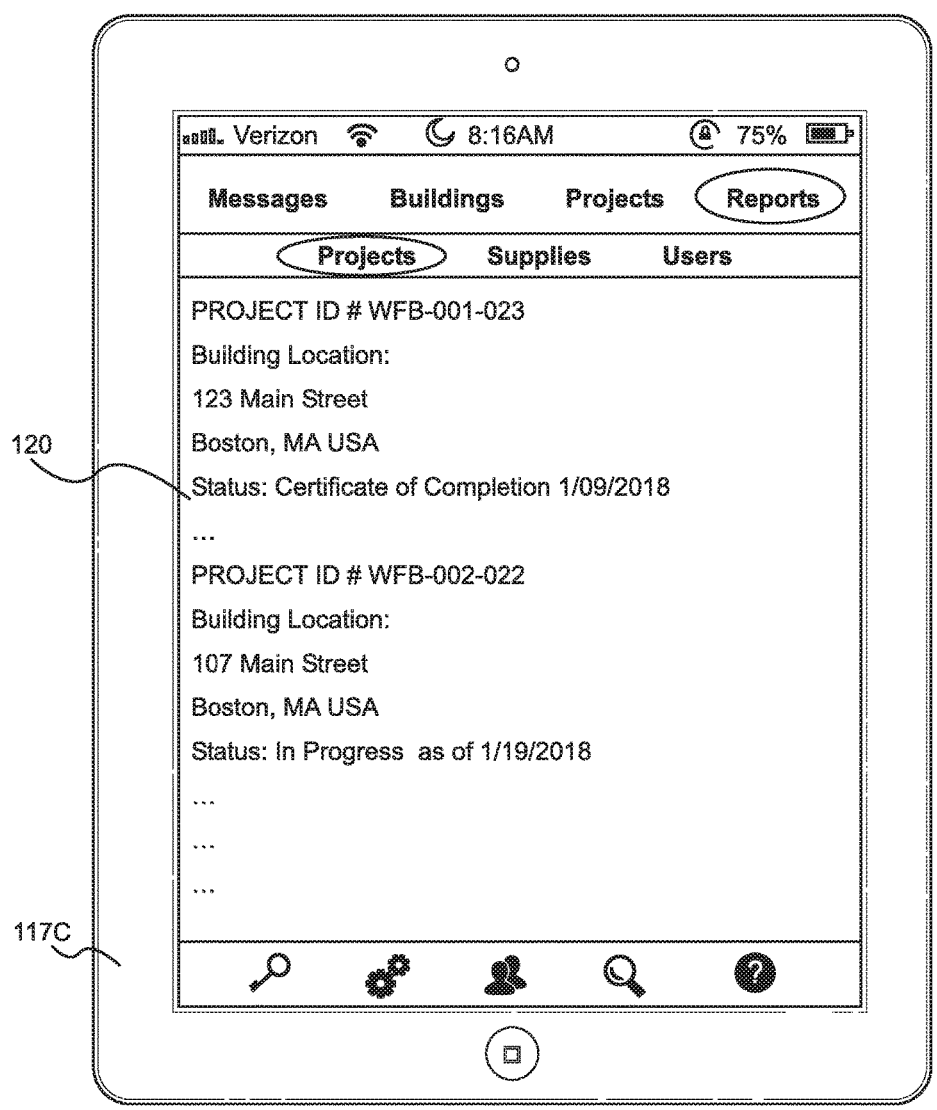
FIG. 33I is an exemplary wire frame model of a graphical user interface of the mobile application configured for use by on-site fire-protection spray administrators and technicians to generate and review reports on projects which have been scheduled for execution during a particular time frame, which have been already completed, or which are currently in progress, using the services of the system network of the present invention.
Figure 33J:
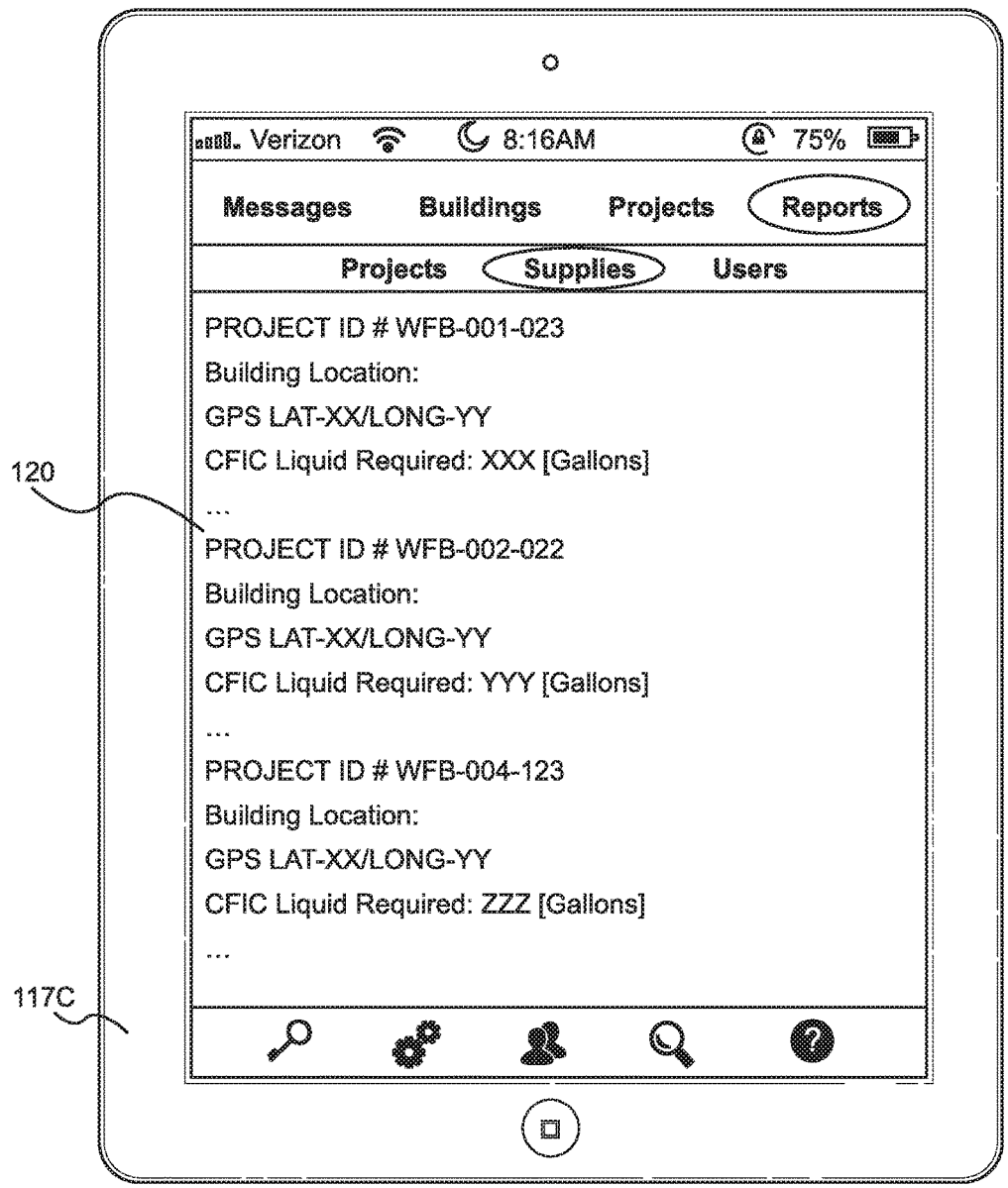
FIG. 33J is an exemplary wire frame model of a graphical user interface of the mobile application configured for use by on-site fire-protection spray administrators and technicians to generate and review reports on supplies used in fulfilling on-site class-A fire-protection building spray projects managed using the services of the system network of the present invention.
Figure 33K:
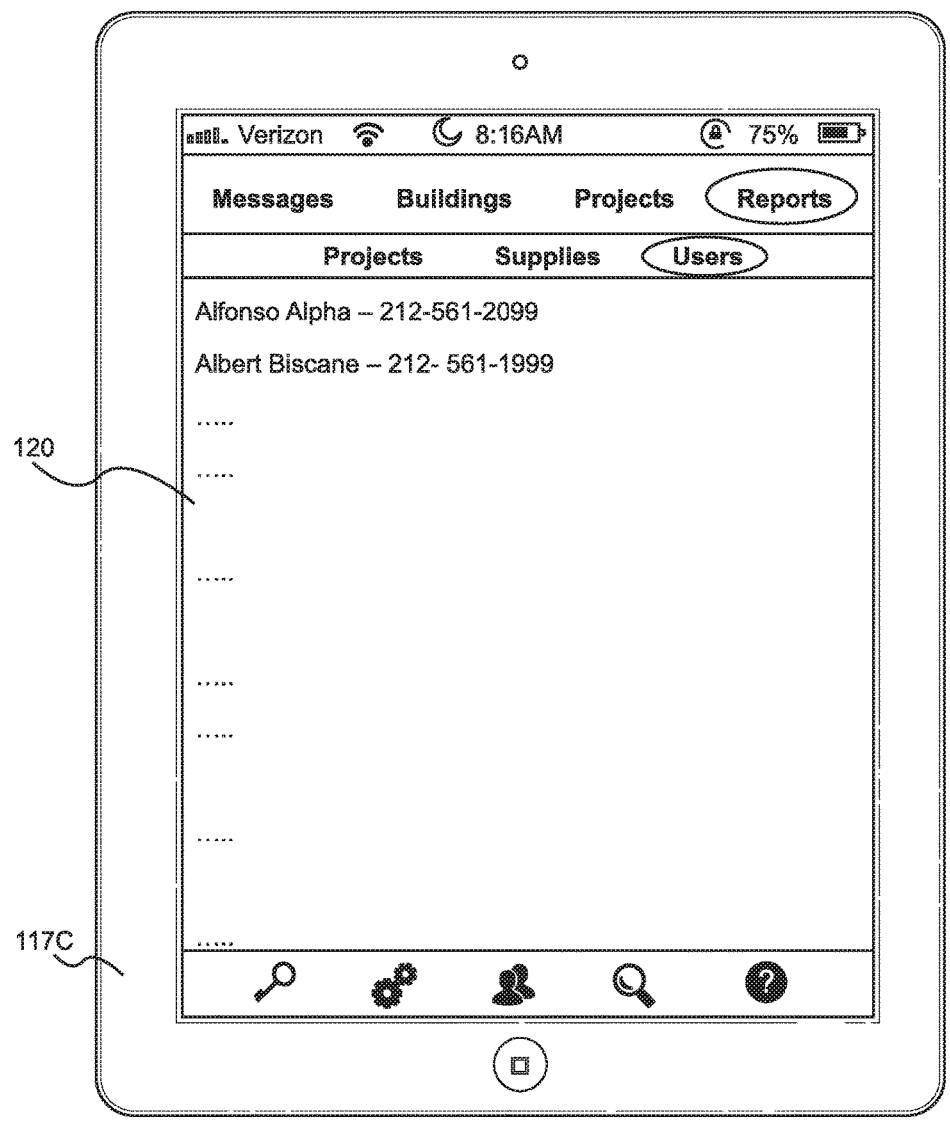
FIG. 33K is an exemplary wire frame model of a graphical user interface of the mobile application configured for use by on-site fire-protection spray administrators and technicians to generate and review reports on registered users associated with particular on-site class-A fire-protection building spray projects managed using the services of the system network of the present invention.

As shown in FIG. 28, the system network architecture further comprises many different kinds of users supported by mobile computing devices 117 running the mobile application 120 of the present invention, namely: a plurality of mobile computing devices 137 running the mobile application 120, and used by fire departments to access services supported by the system network 100; a plurality of mobile computing systems 117 running mobile application 120 and used by insurance underwriters to access services on the system network 145; a plurality of mobile computing systems 137 running mobile application 120 and used by architects and their firms to access the services supported by the system network 100 of the present invention; a plurality of mobile client machines 117 (e.g. mobile computers such as iPad, and other Internet-enabled computing devices with graphics display capabilities, etc) for use by spray-project technicians and administrators, and running a native mobile application 117 supported by server-side modules, and the various illustrative GUIs shown in FIGS. 32 through 33K, supporting client-side and server-side processes on the system network of the present invention; and a plurality of mobile GPS-tracked CFIC Liquid Spraying Systems 101 deployed in one or more mass timber buildings which are being constructed as Class-A fire-protected using the CFIC liquid spray treatment method of the present invention described in FIGS. 32 through 34B.

In general, the system network 100 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network 100 can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (OOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network 100 is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 120, described above.

Specification of System Architecture of an Exemplary Mobile Smartphone System Deployed on the System Network of the Present Invention FIG. 29A shows the mobile computing system 117 (117A, 117B, 117C) used in the system network 100 shown in FIG. 28, supporting the mobile application 120 installed on each registered mobile computing system 117. The purpose of the mobile application 120 is to provide a convenient tool for tracking and managing projects involving on-site clean fire inhibiting chemical (CFIC) liquid spray treatment of mass timber buildings during the construction phase, to ensure Class-A fire-protection of the interior exposed wood surfaces of the building. Using the custom-designed mobile application 120, property/building owners, builders, architects, insurance companies, and financial institutions can (i) track the progress being made while a mass timber building is being spray-treated with CFIC liquid during the construction project schedule, so that the spray-treatment process ensures that Class-A fire-protection is provided to all (100%) exposed interior surfaces within the mass timber building, and (ii) review all collected digital audio and visual evidence of certificates of completion signed by trained personnel during the course of the construction and fire-protection treatment project.

Figure 29B:
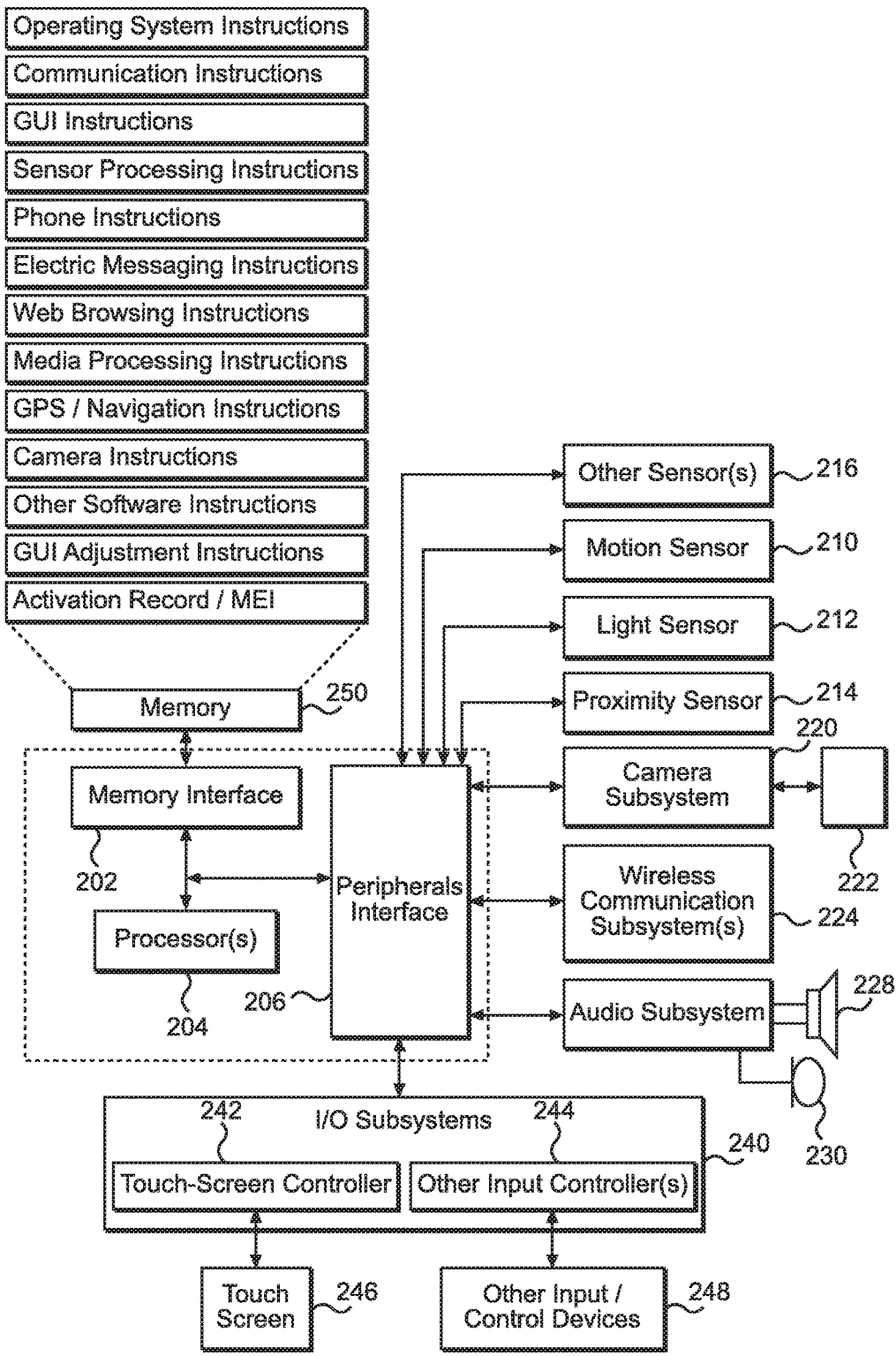
FIG. 29B is a system diagram for the mobile client computing system shown in FIG. 56A, showing the components supported by each client computing system.

FIG. 29B shows the system architecture of an exemplary mobile computing system 117 that is deployed on the system network 100 and supporting the many services offered by system network's servers 111, 112 and 113. As shown, the mobile smartphone device 117 (117A, 117B, 117C) can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 117 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 117 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 117 can be found in U.S. Pat. No. 8,631,358 incorporated herein by reference in its entirety.

Figure 30:
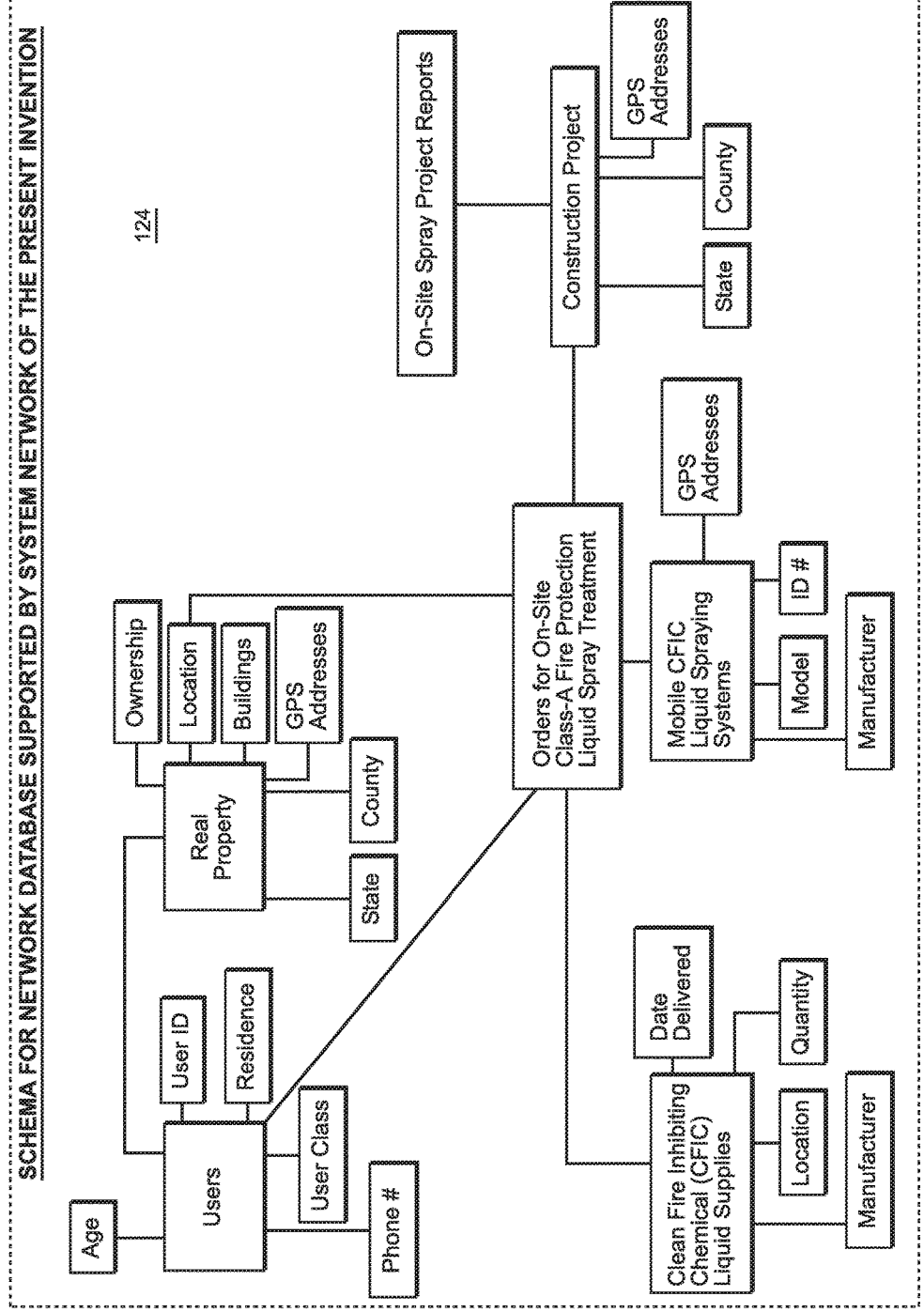
FIG. 30 is a schematic representation of an exemplary schema for the network database supported by the system network the present invention shown in FIG. 22, wherein each primary enterprise object is schematically represented as an object in the schema and represented in the data records created and maintained in the network database.

Specification of Network Database Supported on the System Network of the Present Invention FIG. 30 shows an exemplary schema 124 for the network database 113A supported by the system network 100 shown in FIG. 28. Each primary enterprise object is schematically represented as an object in the schema and represented in the data records created and maintained in the network database. As shown, the schema 124 includes objects such as, for example: Users of the system (e.g. property owners, builders, spray technicians, insurance companies, etc); Real Property; Orders For On-Site Class-A Fire-Protection Liquid Spray Treatment; Clean Fire Inhibiting Chemical (CFIC) Liquid Supplies; Construction Project; and Mobile CFIC Liquid Spraying Systems. Each of these objects have further attributes specified by other sub-objects indicated in FIG. 30.

Figure 31:
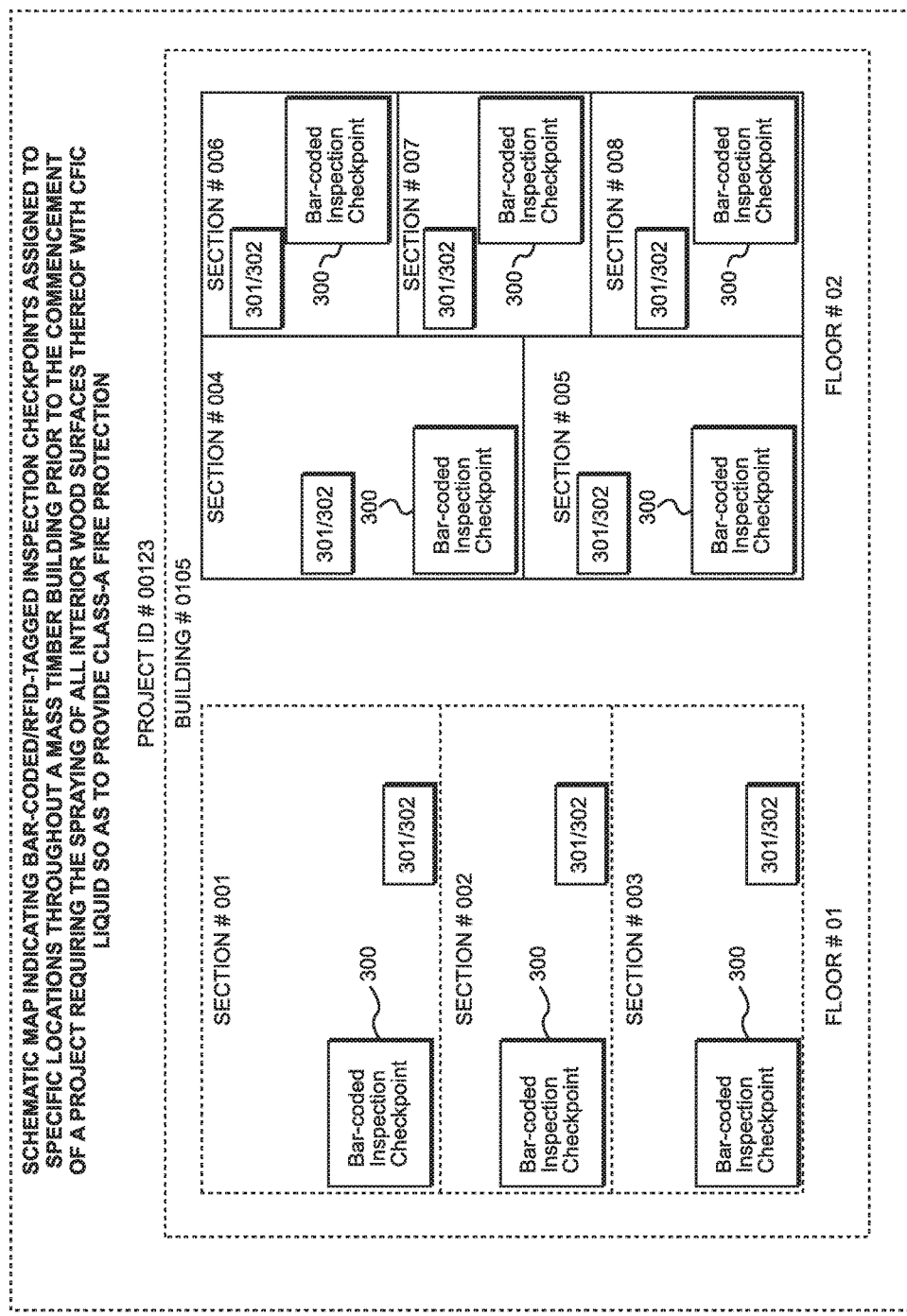
FIG. 31 is a schematic map indicating bar-coded/RFID-tagged inspection checkpoints assigned to specific locations throughout a mass timber building prior to the commencement of a project requiring the spraying of all interior wood surfaces thereof with CFIC liquid so as to provide Class-A fire protection.

Using Mobile Computing Devices Deployed on the System Network to Verify and Document CFIC Liquid Spray Certifications Made at Each Barcoded/RFID-Tagged Inspection Checkpoint Specified Throughout the Mass Timber Building being Spray-Treated to Provide Class-A Fire Protection FIG. 31 shows a schematic map indicating the bar-coded/RFID-tagged inspection checkpoints 300 assigned to specific locations throughout a mass timber building, by a spray project administrator, prior to the commencement of a project requiring the spraying of all interior wood surfaces thereof with CFIC liquid so as to provide Class-A fire-protection thereto. In this example, the building has two floors, and each floor has several sections requiring spray-treatment with CFIC liquid, to provide Class-A fire-protection, in accordance with the principles of the present invention.

In general, this map will be created at the commencement of each project for a specified mass timber building under construction, and its data structure will be stored in the network database 113A for the created project, to enable the organized capture of barcoded/RFID-tagged certifications 300, verifications and related documentation after spraying each completed mass timber section of the building under construction.

Each section of the mass timber building will be provided with at least one GPS-specified barcoded/RFID-tagged inspection checkpoint 300 (e.g. bearing certificates of spraying and inspection by spray technicians and site supervisors printed on a thin flexible plastic sheet, on which a barcode symbol/RFID-tag are mounted) indicated at 300 on the map. The map should clearly show the building/floor/section-specific locations of the barcoded/RFID-tagged inspection checkpoints 300, shown in FIGS. 24A, 24B and 36, on the floor plan of the mass timber building, where the bar-coded/RFID-tagged inspection checkpoints 300 will be mounted on spray-treated wood surfaces, at the completion of spray-treating each section of the mass timber building, and subsequently signed by the spray technician and spray supervisor, and possibly the building site superintendent, and thereafter digitally photographed and video-recorded with the individuals involved in each such event being verified and documented using the system network of the present invention 100 and its deployed mobile applications 120.

At each barcoded/RFID-tagged inspection checkpoint 300, the spray technician and/or site supervisor uses his mobile computing device 117 to read the bar code symbol and/or RFID tag at the inspection checkpoint, to automatically (or semi-automatically) open the project storage location on the network database 113A, and then capture and record digital images and AV-recordings of signed spray certifications and verifications by the spray technicians and/or site supervisor, and upload them to the network database 113A using the mobile computing device 117 and mobile application 120, in the case where native mobile applications have been deployed. The mobile application 120 will also capture the GPS coordinates of the mobile computing device 117, and enter these coordinates into the project file/folder in the network database 113A, for verification purposes. The mobile application 120 can also capture the IP address of the user's mobile computing device (e.g. Apple iPhone) and record such address information as well. Preferably, at each barcoded inspection checkpoint 300, a set of four bar-coded Class-A fire-protect test boards 301, and a pair of bar-coded UV-protected storage sleeve 302A and 302B, each adapted to store two test boards 301 after CFIC liquid has been spray thereupon to impart Class-A fire protection. One set of sprayed test sample boards will be provided to the building owner, or its professional engineer, to be held in custody for evidentiary purposes. The other set will go to spray contracting firm, typically its laboratory, for post-spray testing purposes, and also to hold for custodial reasons. Digital images of these spray-treated test boards 301 should also be captured and uploaded to the network database 113A in the project folder under the specific inspection checkpoint at which the sprayed test samples where made, at a specific time and date, and GPS-location. Thereafter, these sprayed test boards 301 can be stored in their respective bar-coded storage sleeves 302A, 302B and provided to their respective parties. After such sprayed test samples have been made, and documented, it may desired for the spray contracting firm to send its sprayed test boards 301 to a scientific and engineering laboratory and conduct some tests to ensure that the highest possible scientific and engineering standards have been attained during the on-site spray treatment process, associated with each and every on-site mass timber building fire-protection spray process. Laboratory technicians may also use the mobile application 120 and system network 100 to add any information they might have regarding the their testing of sprayed test boards 301 produced at each barcoded inspection checkpoint in the project.

Once all certifications and verifications have been made by the spray technician and his site supervisor, and digital photographic and AV-recording documentation (i.e. evidence) has been captured and uploaded to the network database 113A under the building-specific project, at a GPS-specified/barcoded inspection checkpoint 300, the spray technician will resume spraying other sections of the mass timber building requiring spray treatment with CFIC liquid.

When using the system network of the present invention 100, each certification and verification made by the spray technician and site supervisor at the barcoded inspection checkpoint, and captured and recorded in the network database 113A using the user's mobile computing device 117 (e.g. Apple iPad), should include a legal declaration that a specific CFIC liquid formulation (e.g. Hartindo AF31 anti-fire liquid) has been applied to the sprayed wood surfaces of the completed section of this specific mass timber building at a particular time and date, and in an active concentration sprayed onto the wood surfaces so as to provide the sprayed wood surfaces with Class-A fire-protected characteristics, as independently tested by a particular licensed engineering testing organization, which should be identified and incorporated therein by reference.

Specification of Services Supported by the Graphical User Interfaces Supported on System Network of the Present Invention for Use by Property/Building Owners, Architects, Builders, Insurance Companies and Other Stakeholders Supported by the System Network FIG. 32 illustrates an exemplary graphical user interface (GUI) 125 of the mobile application 120 used by property/building owners, architects, insurance companies, builders, and other stakeholders supported by the system network 100. As shown in this exemplary GUI screen 125, supports a number of pull-down menus under the titles: Messages 125A, where the user can view messages sent via messaging services supported by the application; Buildings 125B, where projects have been scheduled, have been completed, or are in progress; and Projects 125C, which have been have been scheduled, have been completed, or are in progress, and where uploaded authenticated certifications of completion can be reviewed, downloaded and forwarded as needed by authorized stakeholders.

Figure 32A:
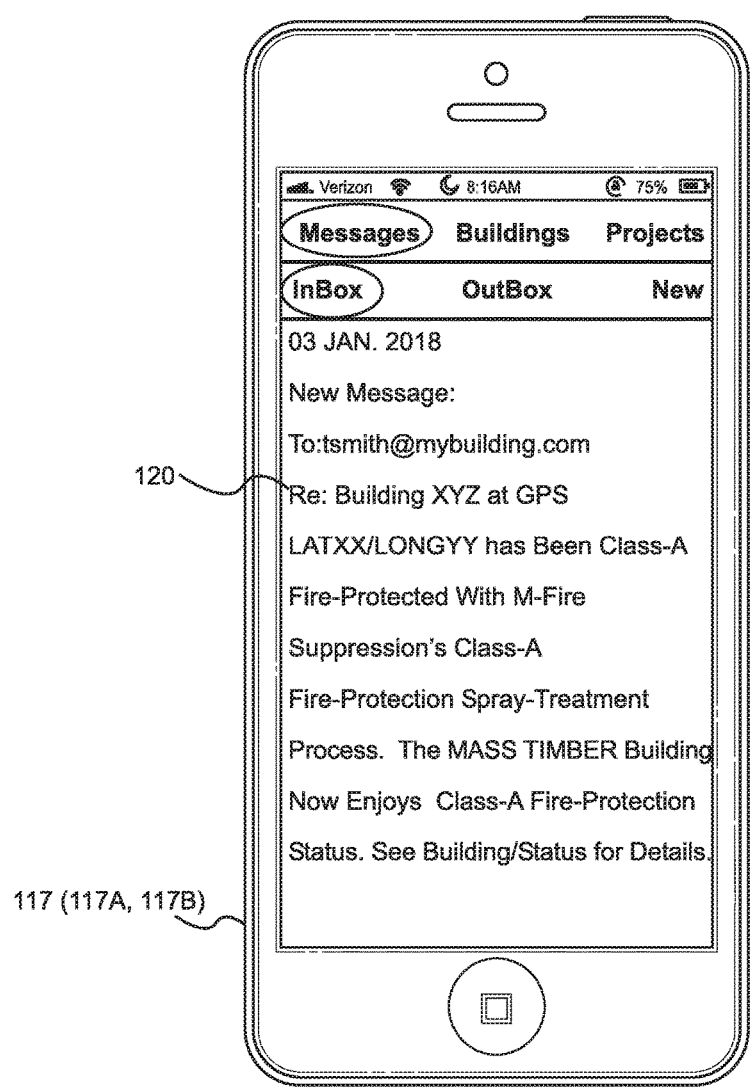
FIG. 32A is an exemplary wire frame model of a graphical user interface of the mobile application configured for use by building/property owners, insurance companies, and other stakeholders showing receipt of new message (via email, SMS messaging and/or push-notifications) relating to building status from messaging services supported by the system network of the present invention.

FIG. 32A shows a graphical user interface of the mobile application 120 configured for use by building/property owners, builders, architects, insurance companies, and other stakeholders showing receipt of new message (via email, SMS messaging and/or push-notifications) on building status from messaging services supported by the system network 100.

Figure 32B:
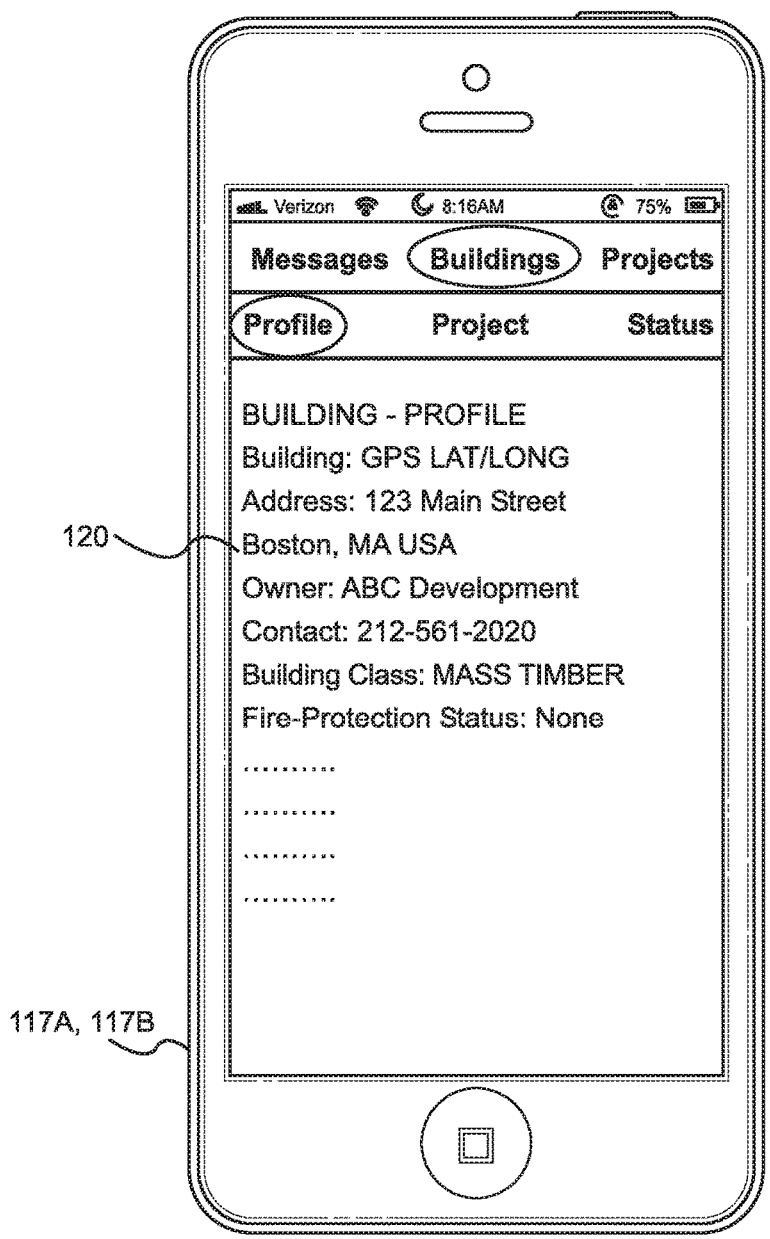
FIG. 32B is an exemplary wire frame model of a graphical user interface of the mobile application configured for use by building/property owners, insurance companies, and other stakeholders to update building profile using profile services supported by the system network of the present invention.

FIG. 32B shows a graphical user interface of the mobile application 120 configured for use by building/property owners, insurance companies, and other stakeholders to update building profile using profile services supported by the system network 100.

Figure 32C:
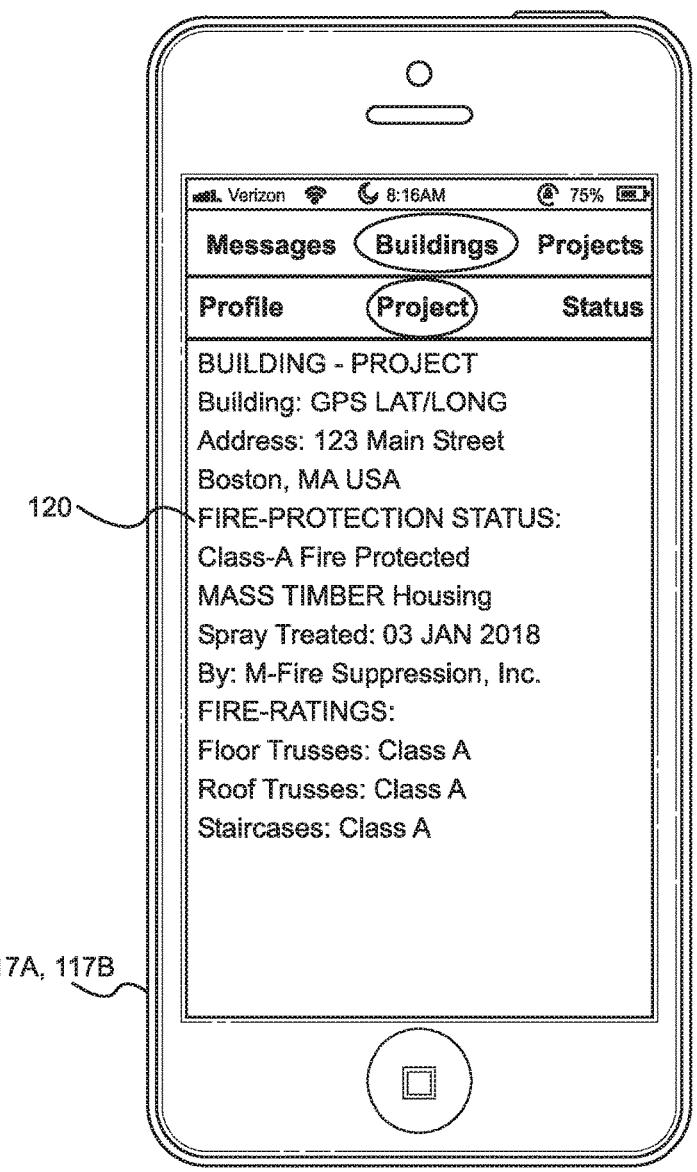
FIG. 32C is an exemplary wire frame model of a graphical user interface of the mobile application configured for use by building/property owners, insurance companies, and other stakeholders to review and monitor the Class-A fire-protection spray treatment project at a particular mass timber building supported by the system network of the present invention.

FIG. 32C shows a graphical user interface of the mobile application 120 configured for use by building/property owners, builders, architects, insurance companies, and other stakeholders to review and monitor the Class-A fire-protection spray treatment project at a particular mass timber building supported by the system network 100.

Figure 32D:
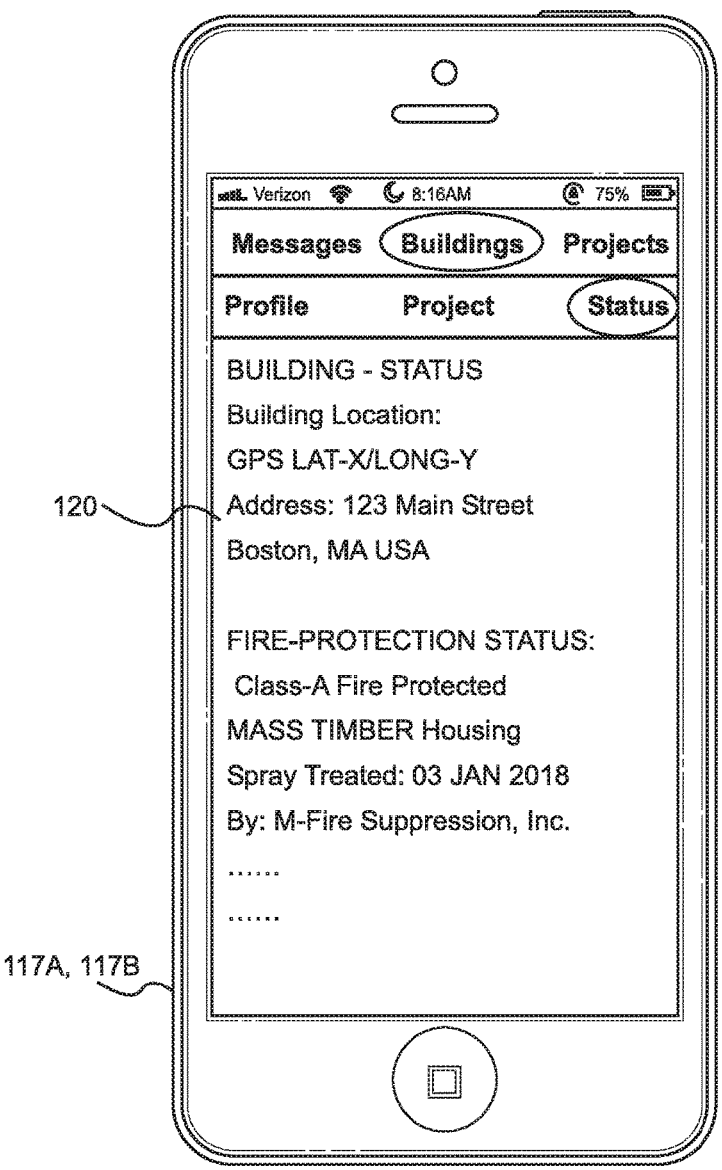
FIG. 32D is an exemplary wire frame model of a graphical user interface of the mobile application configured for use by building/property owners, insurance companies, and other stakeholders to review the fire-protection status of a mass timber building registered on the system network of the present invention.

FIG. 32D shows a graphical user interface of the mobile application 120 configured for use by building/property owners, insurance companies, and other stakeholders to review the fire-protection status of a mass timber building registered on the system network 100.

Figure 32E:
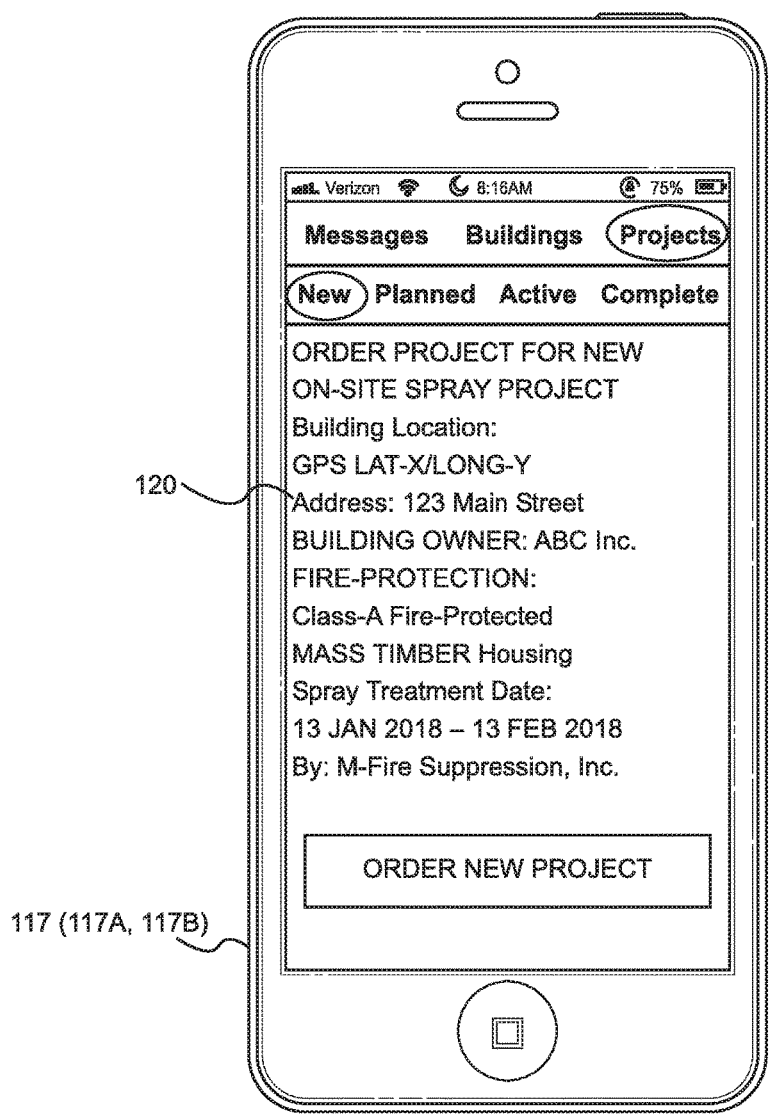
FIG. 32E is an exemplary wire frame model of a graphical user interface of a mobile application configured for use by building/property owners, insurance companies, and other stakeholders to place an order for a new on-site mass timber Class-A fire-protection spray treatment project, using the various services supported by the system network of the present invention.

FIG. 32E shows a graphical user interface of the mobile application 120 configured for use by building/property owners, builders, architects, insurance companies, and other stakeholders to place an order for a new on-site wood-building Class-A fire-protection spray treatment project, using the various services supported by the system network 100. Once the order is received by the system, the system automatically generates a new project in the system network database 113A for the on-site fire-protection spray treatment of the specified mass timber building. Also, the system automatically assigns a project manager the project. Thereafter, the project and workflow commences under the management of the system using the deployed mobile application 120 running on mobile computing systems 117 (e.g. Apple iPhones) and tablet computers (e.g. Apple iPads), for use by (i) building/property owners, builders, architects, insurance companies/agents as shown in FIGS. 32 through 32H, and also (ii) fire-protection building spray technicians and administrators as shown in FIGS. 33 through 33K.

Figure 32F:
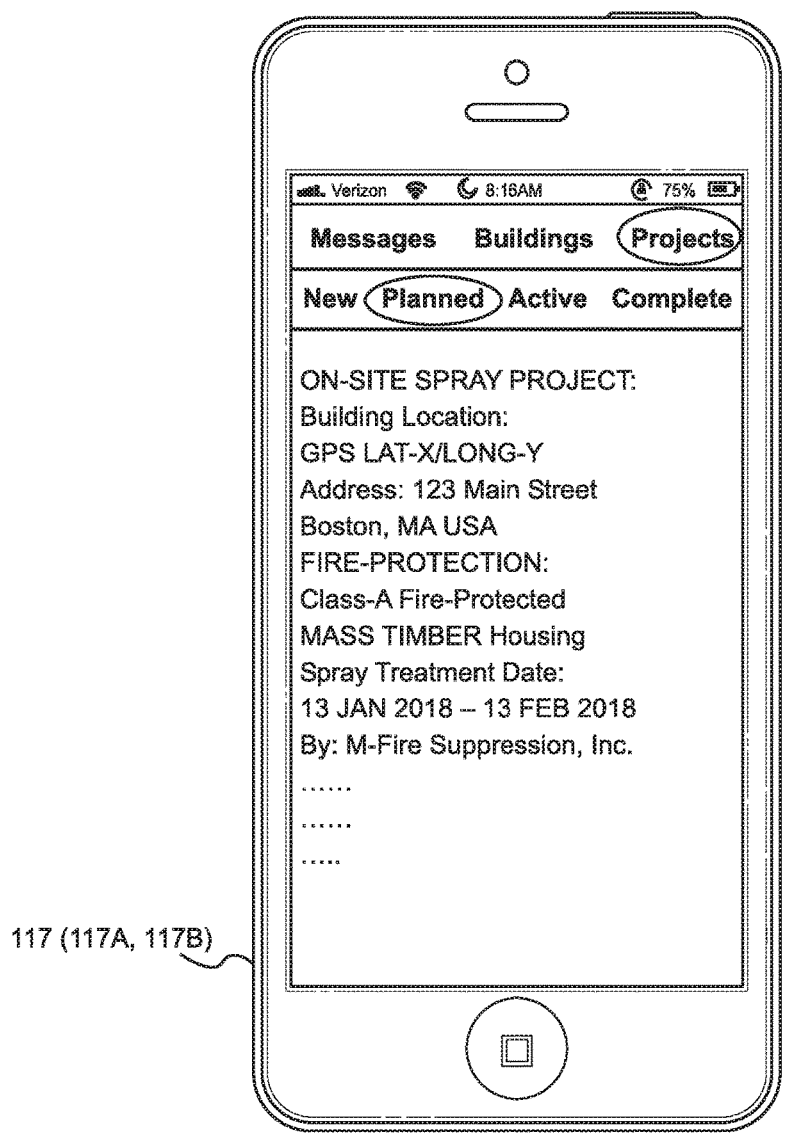
FIG. 32F is an exemplary wire frame model of a graphical user interface of the mobile application configured for use by building/property owners, insurance companies, and other stakeholders to review when a planned on-site mass timber Class-A fire-protection spray treatment project is planned, using the monitoring services supported by the system network of the present invention.

FIG. 32F shows a graphical user interface of the mobile application 120 configured for use by building/property owners, insurance companies, and other stakeholders to review when a planned on-site wood-building Class-A fire-protection spray treatment project associated with the user is planned, using the monitoring services supported by the system network 100.

Figure 32G:
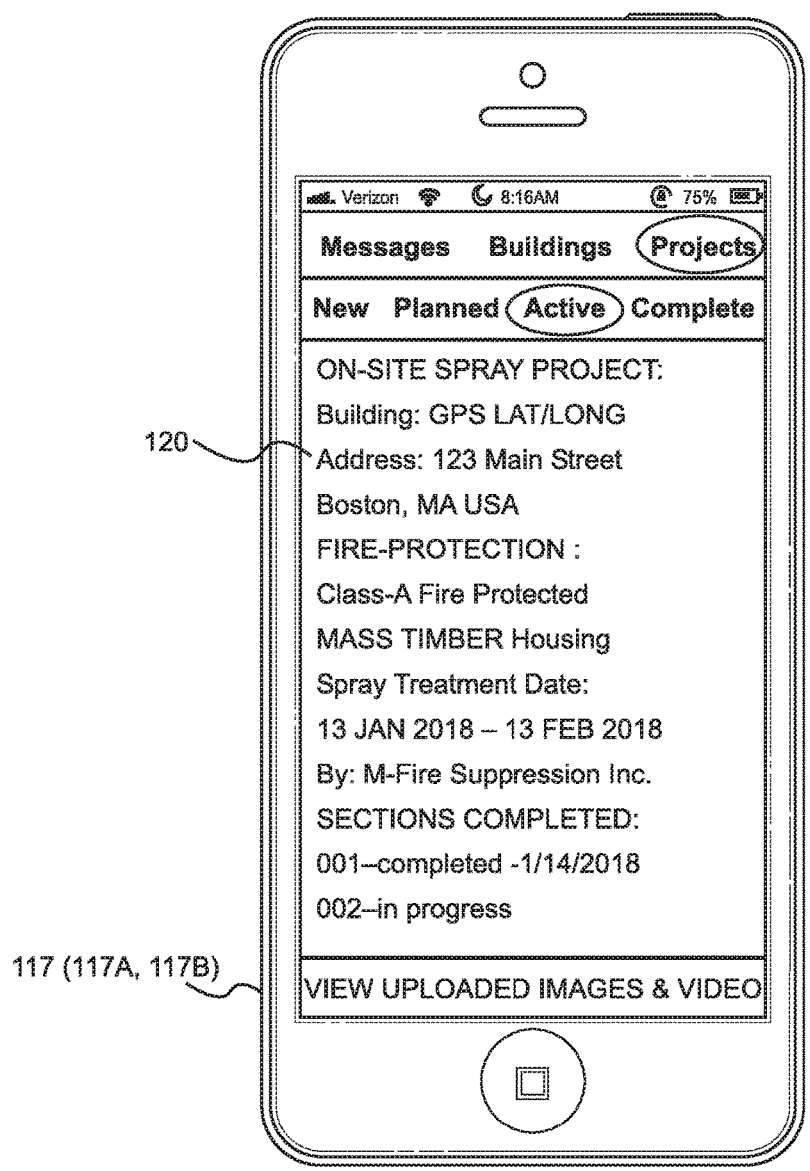
FIG. 32G is an exemplary wire frame model of a graphical user interface of the mobile application configured for use by building/property owners, insurance companies, and other stakeholders to review an active on-site mass timber Class-A fire-protection spray treatment project, using the monitoring services supported by the system network of the present invention.

FIG. 32G shows a graphical user interface of the mobile application 120 configured for use by building/property owners, insurance companies, and other stakeholders to review any active on-site wood-building Class-A fire-protection spray treatment project associated with the user, using the monitoring services supported by the system network 100.

Figure 32H:
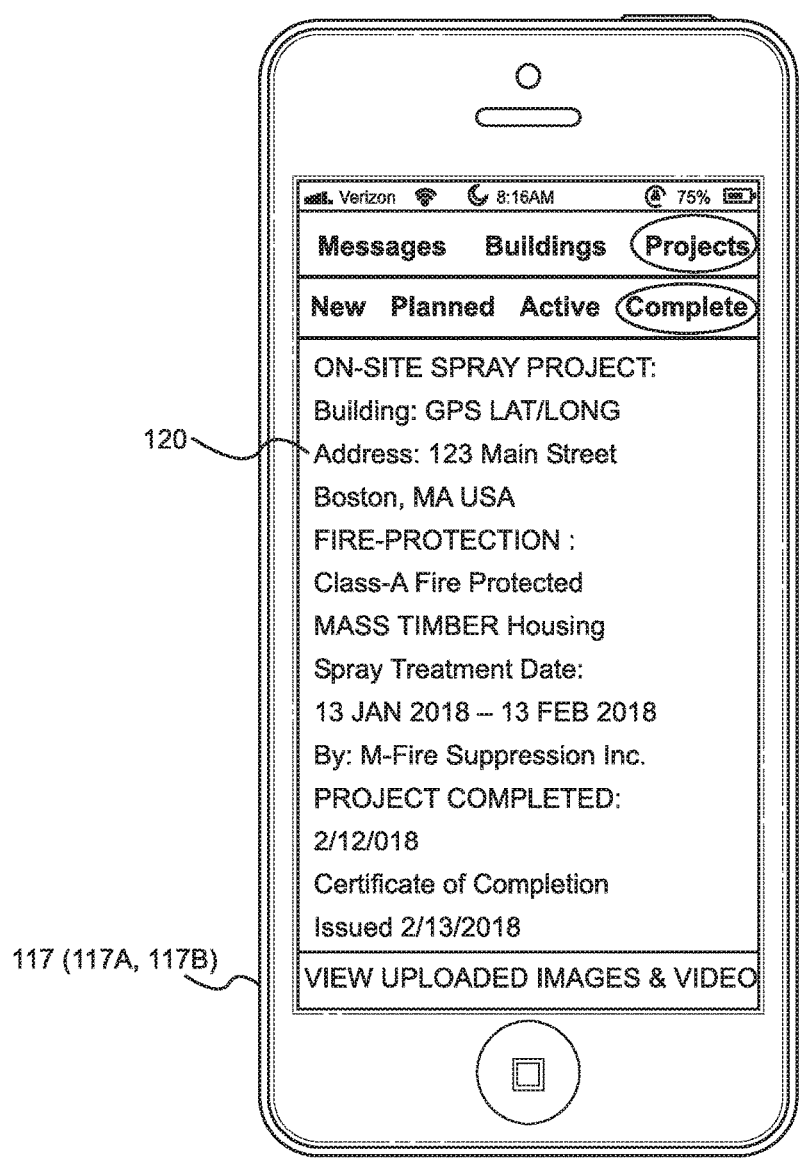
FIG. 32H is an exemplary wire frame model of a graphical user interface of the mobile application configured for use by building/property owners, insurance companies, and other stakeholders to review an completed on-site mass timber Class-A fire-protection spray treatment project, using the monitoring services supported by the system network of the present invention.

FIG. 32H shows a graphical user interface of the mobile application configured for use by building/property owners, insurance companies, and other stakeholders to review any completed on-site wood-building Class-A fire-protection spray treatment project associated with the user, using the monitoring services supported by the system network 100.

Specification of Services Supported by the Graphical User Interfaces Supported on System Network of the Present Invention for Use by On-Site Fire-Protection Spray Administrators and Technicians Supported by the System Network FIG. 33 shows an exemplary graphical user interface (GUI) 126 configured for the mobile application 120 used by on-site fire-protection spray administrators and technicians supported by the system network 100.

As shown in FIG. 33, this exemplary GUI screen 126 supports a number of pull-down menus under the titles: Messages 126A, where project administrator and spray technicians can view messages sent via messaging services supported by the mobile application 120; Buildings 126B, where projects have been scheduled, have been completed, or are in progress, with status notes, terms, conditions and other considerations made of record; Projects 126C, which have been have been scheduled, have been completed, or are in progress, and where uploaded authenticated certification of completions can be reviewed, downloaded and forwarded as needed; and Reports 126D, on on-site spray-applied fire-protection projects and buildings being managed by the mobile application 120 running on client computing systems 117 in operable communication with the web, application and database servers 111, 112 and 113 at the data center 110 shown in FIG. 22.

FIG. 33A shows a graphical user interface of the mobile application 120 configured for use by on-site fire-protection spray administrators and technicians to send and receive (via email, SMS messaging and/or push-notifications) with registered users, using messaging services supported by the system network 100.

FIG. 33B shows a graphical user interface of the mobile application 120 configured for use by on-site fire-protection spray administrators and technicians to update a building information profile associated with the user, using the building profile services supported by the system network 100.

FIG. 33C shows a graphical user interface of the mobile application 120 configured for use by on-site fire-protection spray administrators and technicians to review a building spray-based fire-protection project associated with the user, using services supported by the system network 100.

FIG. 33D shows a graphical user interface of the mobile application 120 configured for use by on-site fire-protection spray administrators and technicians to review the status of any building registered with the system network and associated with the user, using services supported by the system network 100.

FIG. 33E shows a graphical user interface of the mobile application 120 configured for use by on-site fire-protection spray administrators and technicians to create a new project for spray-based Class-A fire-protection treatment of a mass timber building, using services supported by the system network 100.

FIG. 33F shows a graphical user interface of the mobile application 120 configured for use by on-site fire-protection spray administrators and technicians to review the status of any planned building fire-protection spray project associated with the user, using services supported by the system network 100.

FIG. 33G shows a graphical user interface of the mobile application 120 configured for use by on-site fire-protection spray administrators and technicians to review the status of an active in progress building fire-protection spray project associated with the user, using services supported by the system network 100.

FIG. 33H shows a graphical user interface of the mobile application 120 configured for use by on-site fire-protection spray administrators and technicians to review any completed building fire-protection spray project associated with the user, and all documents collected therewhile, using services supported by the system network 100.

FIG. 33I shows a graphical user interface of the mobile application 120 configured for use by on-site fire-protection spray administrators and technicians to generate and review reports on projects which have been scheduled for execution during a particular time frame, which have been already completed, or which are currently in progress, using the services of the system network 100.

FIG. 33J shows a graphical user interface of the mobile application 120 configured for use by on-site fire-protection spray administrators and technicians to generate and review reports on supplies used in fulfilling on-site Class-A fire-protection building spray projects managed using the services of the system network 100.

FIG. 33K shows a graphical user interface of the mobile application 120 configured for use by on-site fire-protection spray administrators and technicians to generate and review reports on registered users associated with particular on-site Class-A fire-protection building spray projects managed using the services of the system network 100.

Figure 34B:
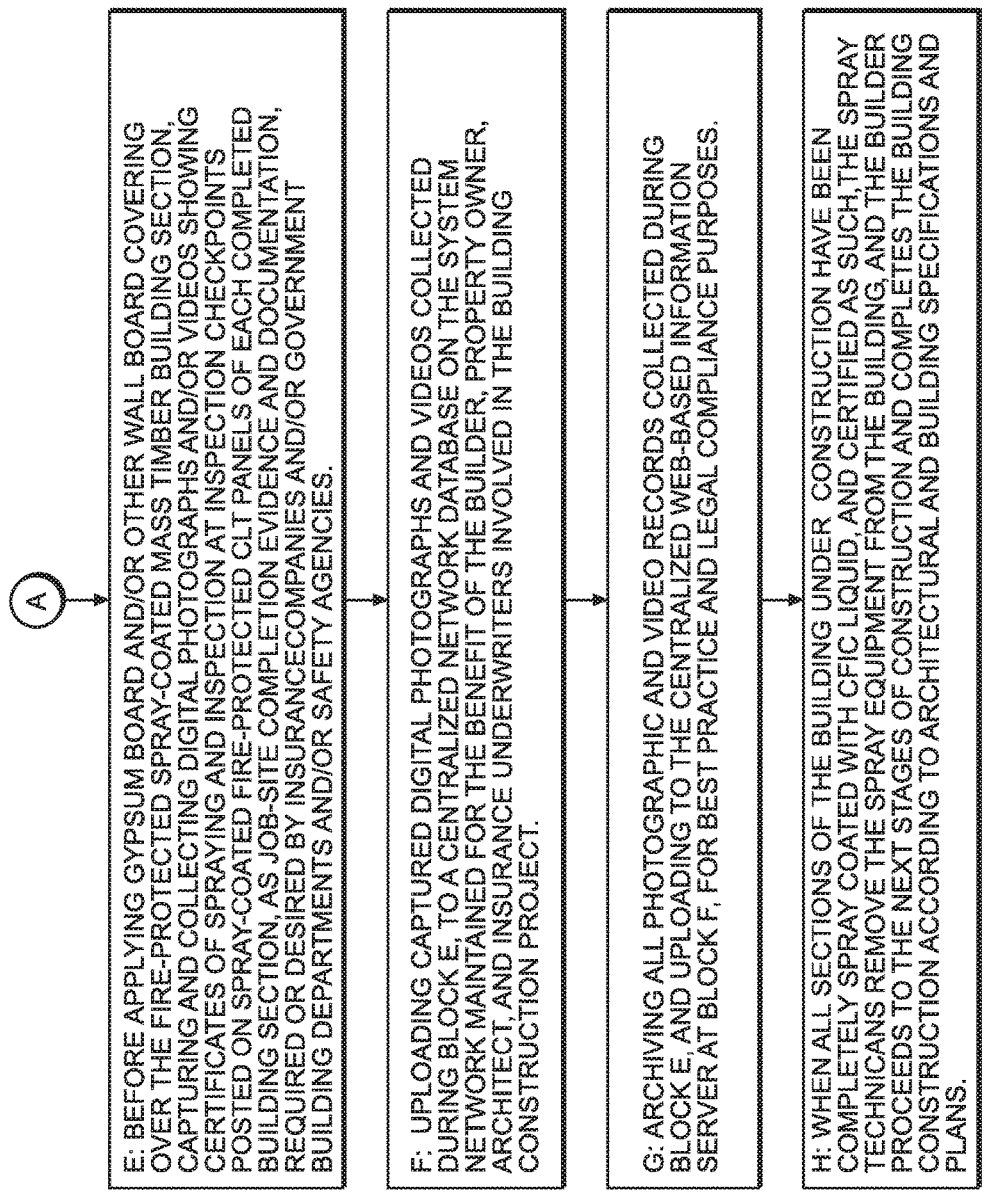

Specification of Method of Verifying and Documenting On-Site Spray-Applied Class-A Fire-Protection Over Mass Timber Buildings During Construction Using the On-Site Wood-Frame CFIC Liquid Spraying System FIGS. 34A and 34B describe a method of verifying and documenting on-site spray-applied Class-A fire-protection over mass timber buildings during construction using the on-site wood-frame CFIC liquid spraying system 100 shown in FIGS. 22A through 23C. A description of this method is appropriate at this juncture.

As indicated at Block A in FIG. 34A, after a builder completes each predetermined section of a mass timber building where wood-framing has been constructed and (plywood or OSB) sheathing installed, but before any wallboard has been installed, the spray technician uses an airless liquid spraying system 101 filled with clean fire inhibiting chemical (CFIC) liquid to spray the CFIC liquid over all exposed interior wood surfaces in the completed section of the mass timber building.

As indicated at Block B in FIG. 34A, when the completed section of the mass timber building is spray coated with CFIC liquid, the completed mass timber building section is certified and marked as certified, with a barcoded/RFID-tagged inspection checkpoint 300 (with certificates of spraying and inspection) mounted at checkpoint locations in the completed section of the building, then certified and verified with signatures by the spray applicator and on-site spray supervisor manager (and optionally building site superintendent), and digitally documented by scanning and data capturing photos and/or audio-video recordings of the signed inspection checkpoints/events 300, as shown in FIGS. 24A and 24B and FIG. 36, and using the mobile application 120 for uploading the captured documents to the barcoded-project folder in the network database 113A on the system network 100, for subsequent visual inspection and insurance documentation purposes, as shown FIG. 28.

As indicated at Block C in FIG. 34A, as each section of the mass timber building is constructed according to the construction schedule, the spray coating team continues to spray coat the completed section with CFIC liquid (e.g. Hartindo AF31), and certify and mark, using barcoded/RFID-tagged certificates of inspection (at inspection checkpoints) 300, each such completed spray coated section 118 (118A, 118B, 118C) of the building under construction.

As indicated at Block D in FIG. 34B, when the spray project is completed, the spray technician and supervisor then issue a time/date stamped "certificate of completion" certifying that clean fire inhibiting chemical (CFIC) liquid spray has been applied to all exposed interior wood surfaces on the interior of the mass timber building during its construction phase, thereby providing the sprayed mass timber building with Class-A fire-protection and defense against risk of total destruction by fire.

As indicated at Block E in FIG. 34B, before applying gypsum board and/or other wall board covering over the fire-protected spray-coated mass timber building section 118, the mobile application 120 on mobile computing device 117 is used to capture and collect digital photographs and/or videos showing certificates of inspection at inspection checkpoints 300 posted on spray-coated fire-protected sheathing and/or lumber used in the wood framing of each completed building section, as visual evidence and job-site completion documentation, required or desired by insurance companies and/or government building departments and/or safety agencies. Preferably, each completed section of the mass timber building should be assigned a section number by the builder, and if not by the builder, then by the spray application administrator, so that each certificate of completion, stamped on the wood surface of each section of the mass timber building, and signed and dated by the on-site CFIC liquid spray applicator and on-site manager, will be digitally captured as images and/or AV recordings, and then uploaded to the system network database under the project ID number for project verification and documentation purposes.

As indicated at Block F in FIG. 34B, uploading captured digital photographs and videos collected during Block E to the centralized network database 113A on the system network 100, maintained by the fire-protection spray coating technician company, or its agent, as a valued-added service provided for the benefit of the property/building owner, builder, architect, home-owner and/or insurance companies involved in the building construction project.

As indicated at Block G in FIG. 34B, archiving all photographic and video records collected during Block E and uploading to the centralized web-based information server 111 at Block F for best practice and legal compliance purposes.

As indicated at Block H in FIG. 34A, when all sections of the building under construction have been completely spray coated with CFIC liquid, and certified as such, the spray technicians remove the spray equipment from the building, and the builder proceeds to the next stages of construction and completes the building construction according to architectural and building specifications and plans.

By virtue of the Web-based system network 100 described above, it is now possible for professional fire-protection specialists to visually document the spraying of CFIC liquid over all exposed interior wood-surfaces of a mass timber building under construction so as to achieve Class-A fire-protection. After certifying with signatures, the proper on-site spray application of CFIC liquid, and Class-A fire-protection treatment of the mass timber building, these professional fire-protection specialists can capture and upload digital photographs and AV-recordings of certificates and related stamps, markings and signatures to a centralized website (e.g. system network database 113A). At such a centralize website hosted on by servers 111, 112 and 113, such uploaded and archived digital spray-project documents can be reviewed and downloaded when needed by architects, insurance companies, their inspectors, building owners, governmental officials, fire marshals and others who have a stake or interest in the matter of building fire-protection compliance and authentication. This remotely accessible facility, supported by the system network 100 provides a valuable and useful service to property/building owners, insurance underwriters, financial institutions (e.g. banks), and others who have great stakes in ensuring that particular mass timber buildings have been properly Class-A fire-protected using the spray-treatment methods of the present invention described in great detail hereinabove.

Specification of an Exemplary Embodiment of the System Network of the Present Invention Used During the Management of the Logistical Operations and Certifications Made and Documented During Class-A Fire-Protection Spray Treatment of Mass Timber Buildings During the Construction Phase The system network 100 of the present invention has been described in great detail above in connection with ways in which to verify and document the CFIC liquid spray treatment of mass timber buildings on job sites during the construction phase, so that the various stakeholders will have remote access to a secure database 113A containing photographic and audio-visual recording documentation, relating to certifications, verifications and documentation of each CFIC liquid spray project managed using the system network 100 of the present invention. However, when practicing the present invention, it is understood there will be many different ways to implement the useful concepts embraced by such inventions, when deploying and using a system network 100 to manage such operations across any enterprise of local, national or global scope. To help teach those with ordinary skill in the art to practice the present invention, an illustrative embodiment will be described at this juncture with reference to FIGS. 32 through 37.

Figure 35A:
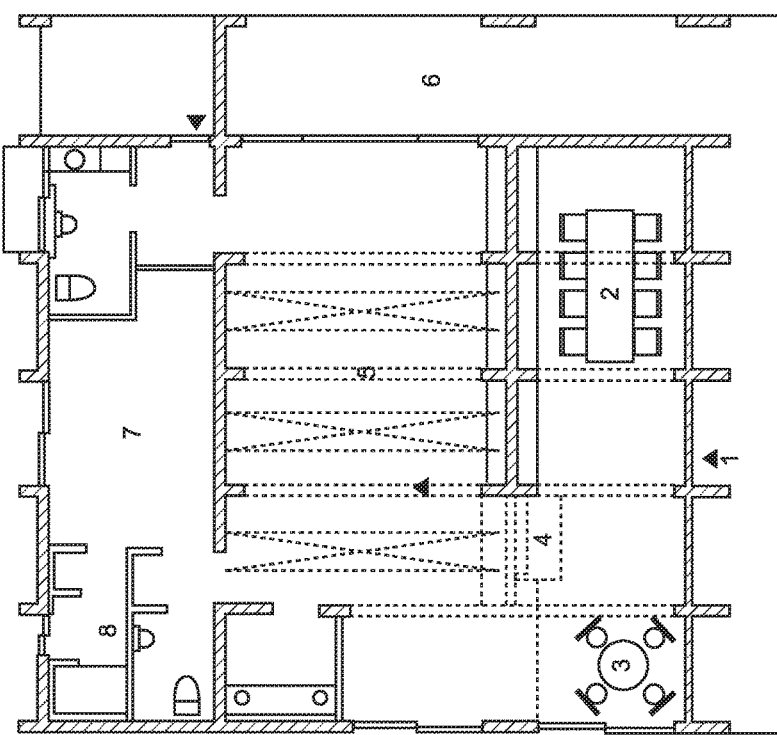
FIG. 35A is a schematic representation of architectural floor plans for a mass timber building scheduled to be sprayed with CFIC liquid to provide exposed interior surfaces with Class-A fire-protection.
Figure 35B:
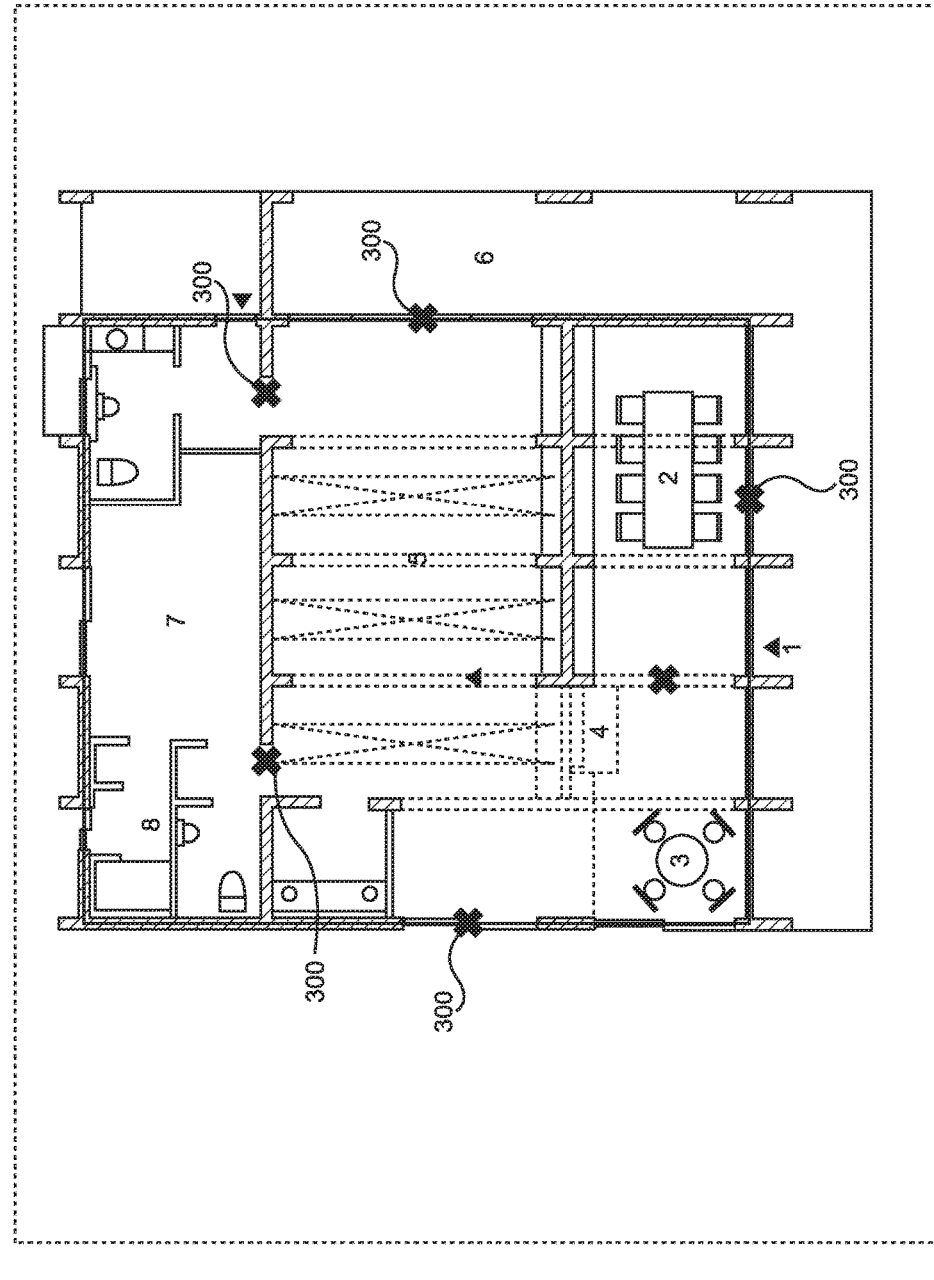
FIG. 35B is a schematic representation of architectural floor plans for a mass timber building, with a section marked up by the builder, and scheduled to be sprayed with CFIC liquid to provide Class-A fire-protection.
Figure 35C:
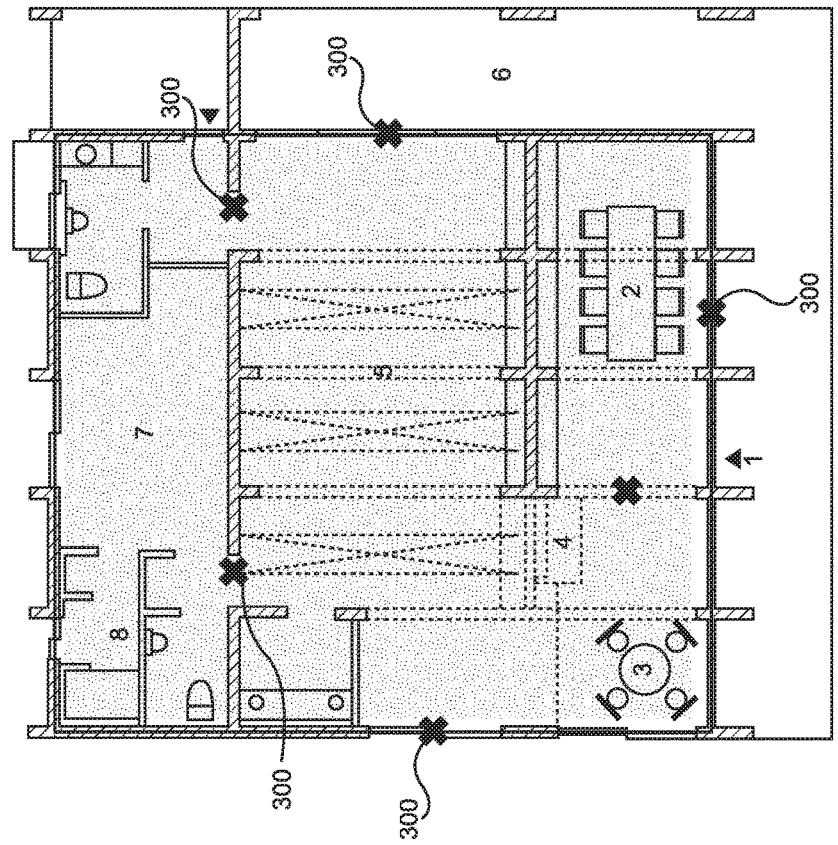
FIG. 35C is a schematic representation of marked-up architectural floor plans indicating a completed section that has been sprayed with CFIC liquid to provide exposed interior surfaces with Class-A fire-protection.

FIG. 35A shows architectural floor plans for a mass timber building scheduled to be sprayed with CFIC liquid to provide exposed interior surfaces with Class-A fire-protection. These floor plans will be uploaded and stored in the network database 113A in the document folder/directory of the project. FIG. 35B shows architectural floor plans for an exemplary mass timber building, with a section marked up by the builder (indicated in dark thick lines), and scheduled to be sprayed with CFIC liquid to provide Class-A fire-protection. FIG. 35C shows marked-up architectural floor plans indicating a completed section that has been sprayed with CFIC liquid to provide exposed interior surfaces with Class-A fire-protection. All such marked-up floor plans will also be stored in the network database 113A as part of the project's document package, as will be explained in greater detail herein below.

On the exemplary system network 100, the following stakeholders can use the mobile application 120 (or web-browser equivalent) during a spray project on a building construction site, for the indicated purposes:

Project Coordinator—To initiate the project and track progress of the projects

CFIC Supply Chain Manager—To start the chain of custody for the supply of CFIC materials in shipping CFIC totes (i.e. CFIC liquid concentrate in totes for diluting with water at job sites, or CFIC dry power in totes for mixing with water at job sites)

Site Spray Manager—To continue the chain of custody and electronically notify the site spray technician where they need to spray and then review to see if it has been sprayed Site Spray Technicians—To continue the chain of custody and indicate sprayed areas Spray Administrator Management—To review progress of the projects Building Owners (i.e. Customers or site superintendent)—To continue the chain of custody and to order the spray contractor to spray parts or sections of their buildings Insurance companies—To review real time progress on when their insured buildings are protected.

Fire fighters—To check if a building fire, to which they are responding, has been defended from fire using CFIC liquid spray treatment disclosed and taught herein.

The system network 100 and its distribution of mobile computing devices 117 (running mobile application 120 or web-browser equivalents) will have the capability to list all spray projects linked to the user, wherein each project contains numerous project details and information of different relevance to different stakeholders. In the illustrative embodiment, all projects will be searchable by customer name then project name. The building owners (often referred to as the "customer" with respect to the spray contractor)

will only be able to access their projects, not the projects of others which will be maintained confidential on the system network 100. The mobile application 120 will be able to send push-notifications where required, and users will choose what notifications they want to receive. For example, the customer's insurance company will have the option to only be notified when a portion of the building has been sprayed, or when only an entire floor has been sprayed.

Upon creating a new project on the system network 100, the spray project coordinator will use the mobile application 120 to add various information items regarding the project, in the network database 113A, including, for example: Customer Name (e.g. Building Owner Name); Project Name; Site Address; Superintendent's name and title, mobile number, email address; number of buildings associated with the project.

The mobile application 120 will then start with building 1 or building A, and prompt the user for the following information: Identify Building Type—by choosing a type from a drop down menu (i.e. apartment, townhouse, house, etc). If the Building Type is an apartment, then the user will be asked to describe the building (i.e. 3, 4 or 5 stories, square footage, total number of suites).

Mobile application 120 has the capability to import one or more pdf documents of each floor plan of the building into the project folder on the network database 113A, as shown in FIG. 28A. At this stage, the mobile application 120 will ask the user to import one or more pdf document(s) of the floor plan of each floor in the building, and will ask to identify the building, floor, and provide other information for subsequent use and marking. In particular, the application servers 112 will support advanced pdf document processing software enabling the users to index imported building floor plans to indicate the precise location where barcoded/RFID-tagged inspection checkpoints 300 (with integrated certificates of spraying, certificates of inspection) shown be posted during the project, as shown in FIG. 30 for purposes of illustration.

The mobile application 120 will also request from the spray project coordinator, a Project Start Date when spray technicians should be begin spraying, in coordination with the construction schedule. Once the project has been created, the mobile application 120 will automatically send a push notification to: CFIC supply manager; building site coordinator; and spray administrators. Each user will be invited to project, with certain rights and privileges as determined and set by the spray project administrator (i.e. fire-protection provider administrator).

When the CFIC totes are ready to be filled or shipped, the mobile application 120 will prompt the CFIC Supply Manager user for various items of information relating to CFIC material required on certain building sites, in connection with specific projects. The user will navigate to the project on the mobile application 120, and will store the CFIC tote information that multiple CFIC totes are required per project. For purposes of the present invention, the term "tote" shall mean any device fashioned to contain and hold a predetermined quantity of CFIC material, whether in dry power form, or concentrated liquid form, and may include bags, containers, bottles, or any other type of vessel capable of perform functions of containment and carrying. Estimates of CFIC material, based on the size of the building spray job, can be calculated using tables and other knowledge possessed by the CFIC supply chain manager, and may be automated using AI-based processes. In an illustrative embodiment, the user will select one of the following buttons; Add a CFIC Tote; Ship A CFIC Tote. If the user selects "add a CFIC tote" then they will be prompted for the following; the date (chosen from a calendar), the CFIC tote number, the size of the CFIC tote, dye (yes or no) mold protection (yes or no). If the user wants to "ship a CFIC tote", then the user navigates to the project and selects the "ship a CFIC tote" button and chooses the CFIC tote the user wants to ship from a drop-down menu. The user will then pick a date from a calendar. The user will have to enter the ship date and the arrival date and name of the shipping carrier.

Once the CFIC Tote arrives at building job-site, the building site supervisor will log into the system network via the mobile application 120, and perform the following system network operations. The building site supervisor (i.e. customer) will navigate to the project on the mobile application 120, and sign off that the CFIC tote has arrived at the job site, with its locks intact and that CFIC tote has not been tampered. The site supervisor will use his/her finger to sign this confirmation in the mobile application 120.

When the building owner (i.e. customer) wants to request a completed portion or section of a mass timber building to be sprayed-treated with CFIC liquid, the Building site supervisor will perform the following system network operations. The building site supervisor use the mobile application 120 to navigate to their project and enter the portion of their building they want sprayed with CFIC liquid. The building site supervisor will indicate the date the request was made, building number, the floor and the suites they want sprayed and date they want it sprayed. The mobile application 120 will send a notification via the mobile application 120 to the project coordinator, to let them know the request has been made. The spray project coordinator will use the mobile application 120 to either accept the requested spray date, or propose a new spray date to the building site supervisor. If the spray project coordinator (i.e. fire protection provider) accepts the proposed spray date, then a confirmation will be sent to the building site superintendent via the system network using the mobile application 120.

Once the spray contractors (i.e. fire protection providers) arrive on-site of the building and are ready to spray CFIC liquid as requested, the site spray technician will perform the following operations in the system network 100 using the mobile application 120. The site spray technician will mix a CFIC tote (e.g. by adding water to a tote contain CFIC liquid concentrate, or by adding water to the tote containing AAF31 powder and dye, if the project requires dye). If the project requires mold protection, then that will be added at the time the CFIC tote is mixed on site), and the spray technicians will sign in to the mobile application 120, navigate to the project page, and click on "on-site CFIC tote preparation". The spray technicians will choose the CFIC tote number from the drop-down list (previously created by the CFIC supply manager) and then enter the date, by clicking on a calendar date. The spray technicians will indicate if they have added dye, and or mold protection to the CFIC material.

When the spray date arrives, the building site superintendent will do a walk-through of the intended spray area (i.e. floor plan) and inspect to make sure the area is ready to spray all exposed interior wood surfaces with CFIC liquid. The building site superintendent will attach an RFID tag and/or bar code symbol at each inspection checkpoint 300 marked on the floor plans of the mass timber building to be spray-treated with CFIC liquid spray, indicated by X marks in FIG. 35B, and labeled with reference number 300. The RFID tag and/or bar code symbol applied to the flexible substrate of each inspection checkpoint 300 will be encoded with a unique code identifier that is marked on the floor plan shown in FIG. 35B, and uniquely associated with the project, and added to the network database 113A on the system network 100.

Preferably, the spray site superintendent will mount a barcoded/RFID-encoded inspection checkpoint 300 (bearing a certificate of spraying by the spray technician and a certificate of inspection by the spray supervisor and optionally the building site supervisor, printed on a thin flexible plastic sheet, on which a barcode symbol/RFID-tag are mounted) to (i) the entry door header of each room in each unit including the entrance to the unit, as illustrated in FIG. 36 and also (ii) a stud located at every 10' on one side of the hallway. Expectedly, the location of each barcoded/RFID-tagged inspection checkpoint 300 in any given project will vary. However, placement of such inspection checkpoints 300 should be selected to ensure that inspection is sufficient granular in resolution to not overlook significant areas of a sprayed mass timber building section under inspection.

Each barcoded/RFID-tagged inspection checkpoint 300 will include a bar code symbol and RFID tag 182 that has a unique project/inspection-checkpoint identifier (e.g. an alphanumeric character string) encoded into the symbology used in the barcode symbol and RFID tag identifier, and this project/inspection-checkpoint identifier will be used to identify subfolders or subdirectories where collection data, information and documents are stored in the project folder on the network database 113A, maintained on the system network 100. The project/inspection-checkpoint identifier will be read during each scan/read of the barcoded/RFID-tag inspection checkpoint 300, and used by the mobile application to access the appropriate inspection checkpoint folder in the project folder where all such certifications of spraying, inspection and oversight, and photos, and videos are stored and archived for posterity.

At the beginning of each spray session, the spray technician will log into the system network 100 using the mobile application 120, then navigate to the project page, select his name from a drop down or scrolling list, and indicate when he started spraying by clicking on a date and hour, minutes, seconds. The spray technician may also need to scan his barcoded ID card using the mobile application 120 for proper authentication and/or authorization purposes. He may also choose to record the presence of other members of his spray crew using the mobile application and their barcoded user ID cards and network ID numbers. The spray technician will then proceed to spray each assigned section of the building, and after spraying each mass timber building section, the spray technician will approach the barcoded/RFID-tagged inspection checkpoint 300 in the spray area, and read, sign and date the certification of spraying on the checkpoint substrate, mounted on the header surface illustrated in FIG. 36. The spray technician should diligently read, sign and date each and every certificate of spraying at the inspection checkpoint 300, and treated as a condition of professionalism, duty, and employment, given the responsibility being entrusted to the individual with such operations.

At the end of the day, the spray technician will log into the system network 100, if already logged out, using the mobile application 120, and indicate the time when he finished spraying and indicate which suites on the floor plan pdf were sprayed with CFIC liquid. This will be done by drawing on his mobile computing device 117 (e.g. Apple iPad or Apple iPhone), by shading the PDF of the floor plan, over the appropriate suites and hallways, as shown in FIG. 35C, which were in fact sprayed with CFIC liquid during his work session that date. This is the same floor plan that was previously loaded on the mobile application 120 by the customer/building owner, as shown in FIG. 35A, but with the spray technicians markings (e.g. shading) added to the floor plan to indicate sections which have been spray treated with CFIC liquid.

At the end of each day or during the course of the day, the spray site superintendent will review the CFIC liquid spraying work performed on the job site that date, to ensure that the spray work has been completed properly.

The spray supervisor will visit each checkpoint 300, and read, sign and date the certificate of inspection at the inspection checkpoint 300 after performing a diligent inspection at and around the checkpoint where spraying occurred earlier that day. At each barcoded/RFID-tagged inspection checkpoint 300 on the plan, the spray site supervisor will also scan each and every barcoded/RFID-tag inspection checkpoint 300, and confirm with the system network 100 that the spray work at each inspection checkpoint has been completed properly. This process will involve displaying GUI screens on the mobile application 120 and checking off all suites/units and hallways have been completed and sprayed with CFIC liquid, and uploading such information to the project folder on the network database 113A on the system network 100. The process can also include capturing digital photos and AV-recordings of the site in the vicinity of each barcoded/RFID-tagged inspection checkpoint, verifying and documenting the certifications at each inspection checkpoint signed by the spray-technician after CFIC liquid spraying, and then uploading these captured digital photos and AV recordings to the project under the inspection checkpoint ID #, within the network database 113A maintained by the system network 100.

Also, it is desired that the building site superintendent visits each inspection checkpoint 300 and reads, signs and dates the certificate of inspection/oversight on the job site on that date. The building site superintendent should also use the mobile application 120 to capture digital images and videos of this certificate and competed inspection checkpoint 300, and surrounding areas treated with CFIC liquid by the spray technician. Images and video recordings of the spray technician and supervisor can be included at each and every barcoded/RFID-tagged inspection checkpoint 300 and uploaded to the project folder, under the barcoded/RFID-tagged inspect checkpoints 300 assigned to the project.

The above steps above will be repeated every time the spray crew arrives at the building site until the project is complete.

Each time a CFIC tote is mixed at the job site by the spray technician, he/she will spray six 1-foot long 2×4's test boards (301A, 301B) covering all sides (e.g. 3 sprayed test boards for spray administrator and 3 sprayed test boards for the customer). The sample test boards 301 will be marked with the tote number. Alternatively, CFIC liquid sprayed test boards 301 can be made at or near barcode/RFID-tagged inspection checkpoints 300 in the building, and marked with the barcode/RFID ID number, and date they were sprayed. The fact that these sample test boards 301 were created will be recorded using the mobile application 120 in either the CFIC tote supply record section of each project, or under a barcode symbol/RFID-tag ID section of the project. Digital images and videos of these sprayed test boards 301 can be captured and uploaded to project folder in the network database 113A maintained on the system network 100.

At the completion of the project, the spray site superintendent will check the box that the project is complete. The spray site superintendent will request the building project superintendent to sign that the project has been completed, and such documentation will be made part of the project files stored in the network database 113A on the system network 100. A physical certificate of completion document can be signed and dated and scanned into pdf format and stored in the project file in the network database 113A, using the mobile application 120 deployed on the system network 100. Once the project has been completed, the system network 100 will send a notification to the local fire department, the insurance underwriting company, the building owner (i.e. customer), and the spray project coordinator. The system network will automatically organize all documents, data and information collected during the course of the project, and compile for presentation to various parties including the building owner, and property insurance underwriters.

The site spray technician will then collect all the sprayed samples 301A, 301B stored in barcoded storage sleeves 302A, 302B and deliver the first set of test samples 301A to the building site superintendent or the building's architect, while providing the second set of the sprayed test samples 301B to the spray supervisor to transport and archive in storage, as part of the fire protection provider's legal and business records. The spray technician will certify that he has provided the first set of sprayed test samples in storage sleeves to the building site superintendent, and the second set of sprayed test samples to the spray site superintendent. The building site superintendent will sign that he has received the sprayed test samples in their barcoded storage sleeves. The second set of sprayed test samples can be shipped to the fire protection provider's warehouse for archival purposes.

Figure 38:
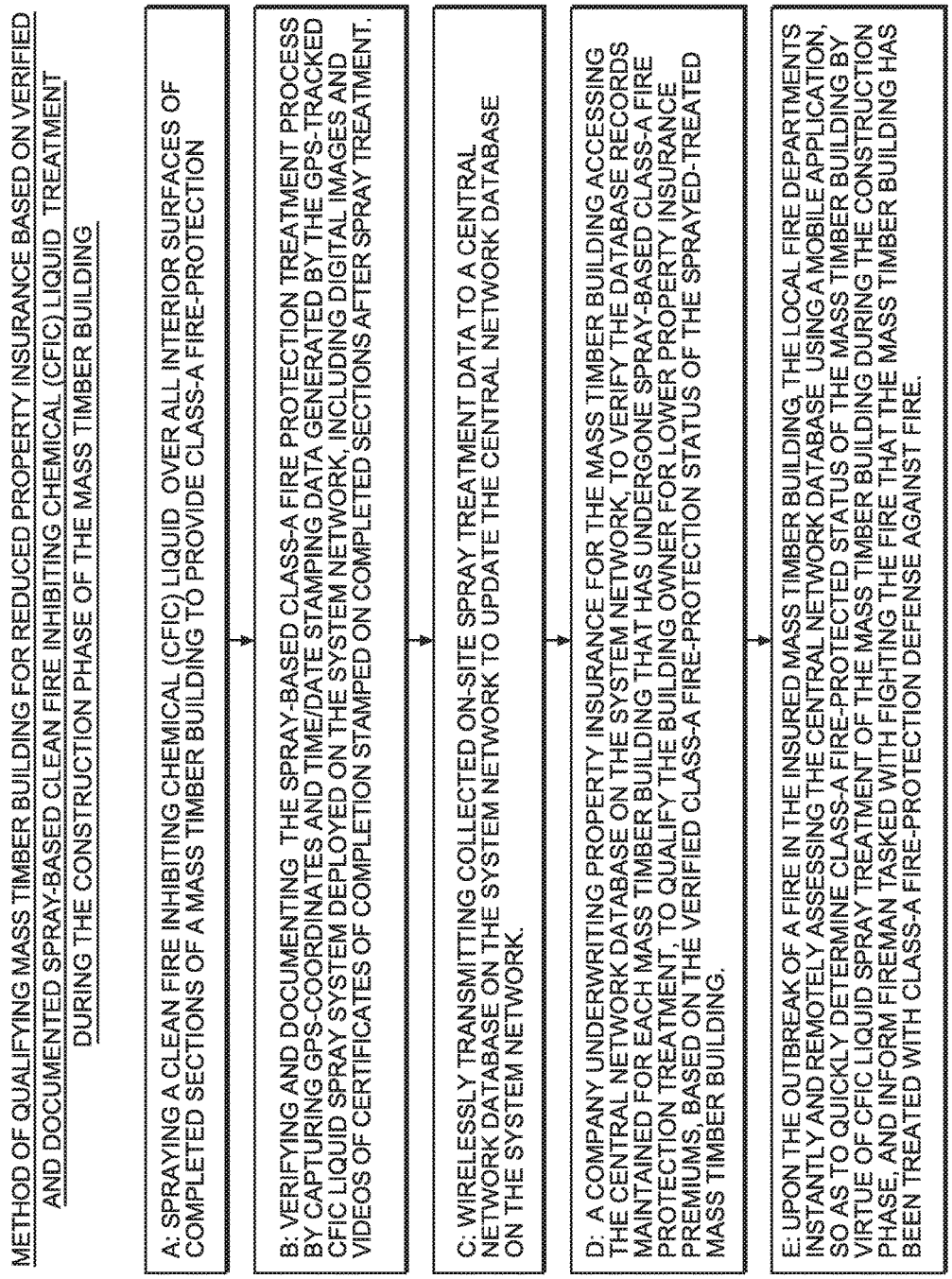
FIG. 38 is a flow chart describing the primary steps of the method of qualifying real property for reduced property insurance, based on verified on-site spraying of the exposed interior surfaces of mass timber buildings with clean fire inhibiting chemical (CFIC) liquid during the construction stage of the mass timber building, using the system network of the present invention.

Method of Qualifying a Mass Timber Building for Reduced Property Insurance Based on Verified and Documented Spray-Based Clean Fire Inhibiting Chemical (CFIC) Liquid Treatment of all Exposed Interior Wood Surfaces of the Mass Timber Building During the Construction Phase Thereof FIG. 38 shows the high-level steps required to practice the method of qualifying a mass timber building for reduced property insurance based on verified and documented spray-based clean fire inhibiting chemical (CFIC) liquid treatment of all of the exposed interior surfaces of the mass timber building, after each completed section.

As indicated at Block A in FIG. 38, a clean fire inhibiting chemical (CFIC) liquid is sprayed all over all interior surfaces of each completed sections of a mass timber building to provide Class-A fire-protection, as described above in FIGS. 25A and 25B, using the GPS-tracked mobile clean fire-inhibiting chemical (CFIC) liquid spraying system 101, as shown in FIGS. 22A, 22B, 23A and 23B.

As indicated at Block B in FIG. 38, the spray-based Class-A fire-protection treatment process is verified and documented by capturing (i) GPS-coordinates and time/date stamping data generated by the GPS-tracked CFIC liquid spraying system 101 deployed on the system network 100, and (ii) digital images and audio-video (AV) recordings of certificates of completion/inspection 181 stamped on completed sections after spray treatment, as illustrated in FIGS. 24A and 24B, using the mobile application 120 on mobile computing device 117.

As indicated at Block C in FIG. 38, the collected on-site spray treatment verification data is wirelessly transmitted to a central network database 113A on the system network 100 to update its network database 113A.

As indicated at Block E in FIG. 38, a company underwriting property insurance for the mass timber building accesses the central network database 113A on the system network 100, to verify the database records maintained for each mass timber building that has undergone spray-based Class-A fire protection treatment, to qualify the building owner for lower property insurance premiums, based on the verified Class-A fire-protection status of the sprayed-treated mass timber building.

As indicated at Block E in FIG. 38, upon the outbreak of a fire in the insured mass timber building/property, the local fire departments instantly and remotely assess the central network database 113A using a mobile application 120 installed on mobile computing device 117, so as to quickly determine Class-A fire-protected status of the mass timber building by virtue of CFIC liquid spray treatment of the mass timber building during the construction phase, and inform fireman tasked with fighting the fire that the mass timber building has been treated with Class-A fire-protection defense against fire.

Just-in-Time Wood-Framed Building Factory Method, System and Network Supporting Multiple Production Lines for Producing Pre-Fabricated Class-A Fire-Protected Wood-Framed Components as Needed to Construct Custom and Pre-Specified Wood-Framed Buildings Ordered by Customers FIG. 39A shows a just-in-time mass timber building factory system 130 supporting multiple production lines 131A, 131B, 131C, etc. for producing pre-fabricated Class-A fire-protected wood-framed components as needed to construct custom and pre-specified mass timber buildings ordered by customers, as the case may be, from anywhere around the globe. In accordance with the principles of the present invention, each production line includes a conveyor for conveying wood components (e.g. raw lumber, finger-jointed lumber, CLT components and/or LVL components) along at least a portion of the production line and through, into and out of an automated dipping tank 37B as described herein, filled with clean fire inhibiting chemical (CFIC) liquid (e.g. Hartindo AF21 Anti-Fire Chemical Liquid), and allowed to dry and attain Class-A fire-protection properties during the mass timber building component fabrication process.

FIG. 39B shows the just-in-time (JIT) factory system 130 of FIG. 39A in greater detail, with production lines shown for producing various kinds of prefabricated Class-A fire-protected wood-framed components (e.g. wood-framed walls, staircases, roof trusses, floor trusses, etc.) 132A, 132B, and 132C which are used in constructing custom and pre-specified mass timber buildings ordered by customers for production and delivery. As shown, each production line 131 requires inputs such as (i) an order for a customer or pre-specified mass timber building; (ii) raw lumber 141 of a certain type and in a certain quantity to build the ordered custom or prespecified mass timber building; as well as (iii) CFIC liquid 142 in sufficient supply to render the raw lumber Class-A fire-protected in accordance with the principles of the present invention disclosed herein. As shown in FIG. 39B, the outputs from the factory system 130 are Class-A fire-protected mass timber building components such as (i) wall panels 132A, (ii) floor panels 132B, (iii) floor trusses 132C, (iv) roof trusses 132D, and (v) stair panels 132E, manufactured using the dip-coating methods disclosed herein, for use in constructing custom and specified mass timber buildings.

FIG. 41 shows the just-in-time factory system network 135 shown in FIGS. 39A and 39B, shown comprising: (i) the just-in-time mass timber building factory 130, shown in FIGS. 39A and 39B and described above, with multiple production lines 131A through 131D for producing Class-A fire-protected building components as illustrated in FIG. 39B; (ii) RFID-tagged/coded ISO-shipping containers 136 shown in FIG. 39A, and mobile code symbol/RFID tag reading mobile computing systems 137 for reading optical code symbols (e.g. PDF 417, etc) 138A and RFID tags 138B well known in the shipment tracking art; a (iii) a data center 145, operably connected to the TCP/IP internet infrastructure 151 for supporting enterprise resource planning (ERP) related operations within the mass timber building factory system 130 shown in FIGS. 39A and 39B, and supporting a network of mobile computing devices 137 shown in FIG. 41, each running a mobile application 153 adapted to help track and manage (i) orders placed by customers for prefabricated Class-A fire-protected mass timber buildings, and (ii) projects within the factory system involving the placed customer orders. As shown, the data center 145 comprises: web (http and ftp) communication servers 146; application servers 147; database servers (RDBMS) 148; SMS servers 149; and email message servers 150, well known in the art.

As shown in FIG. 41, the system also includes a GPS system 139 for transmitting GPS reference signals transmitted from a constellation of GPS satellites deployed in orbit around the Earth, to GPS transceivers installed aboard each GPS-tracking ISO-shipping containers 136A, 136B, as part of the illustrative embodiments. From the GPS signals it receives, each GPS transceiver is capable of computing in real-time the GPS location of its host system, in terms of longitude and latitude. In the case of the Empire State Building in NYC, N.Y., its GPS location is specified as: N40° 44.9064', W073° 59.0735'; and in number only format, as: 40.748440, −73.984559, with the first number indicating latitude, and the second number representing longitude (the minus sign indicates "west").

Figure 42A:
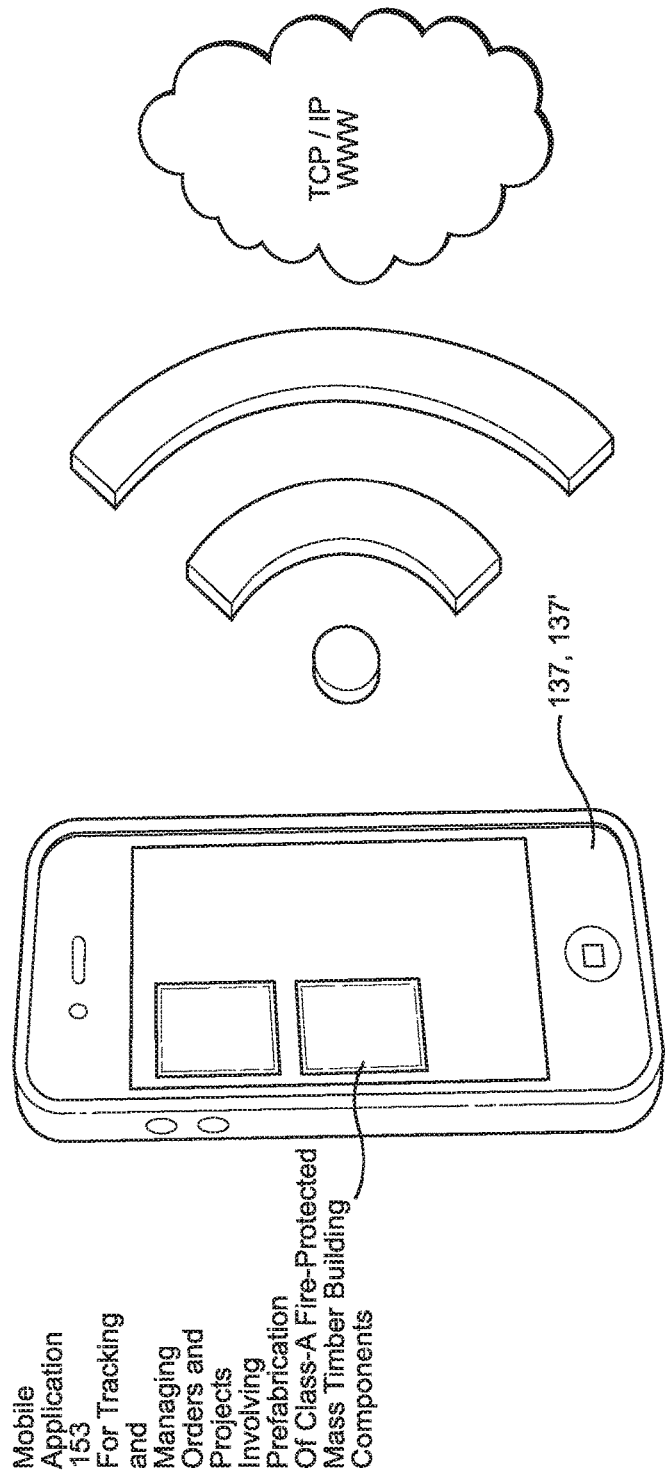
FIG. 42A is a perspective view of a mobile computing system used in the system shown in FIG. 41, supporting a mobile application installed on the mobile computing system for the purpose of tracking and managing projects involving just-in-time fabrication of Class-A fire-protected mass timber building components for ordered prefabricated mass timber buildings in accordance with the principles of the present invention.

FIG. 42A shows the mobile client computing system(s) 137, 137' used in the system network 135 shown in FIG. 41, supporting mobile application 153 installed on each registered mobile computing system 137, 137'. The purpose of the mobile application 153 is to provide a convenient tool for tracking and managing projects involving factory-applied clean fire inhibiting chemical (CFIC) liquid dip-coating treatment of timber laminations (i.e. wood pieces) during the prefabrication of Class-A fire-protected mass timber buildings within a factory system. In the event that CFIC liquid solution is mixed on site by adding water to preblended dry powder chemicals at a toll blender, the mobile application 153 can be used to track chain of custody from our toll blender to the factory site where the toted power mixture is added to water to produce an aqueous-based CFIC liquid solution, for high-speed dip-coating 100% of all wood/lumber used to fabricate Class-A fire-protected mass timber building components along production lines inside the factory 130 shown in FIGS. 39A, 39B and 41.

Using the custom-designed mobile application 153 of the present invention, prefabricated building purchasers, builders and architects alike can track the progress being made while an order for a prefabricated Class-A fire-protected mass timber building is being executed as a prefabricated mass timber building project. During the process, all wood pieces used to fabricate each mass timber building component is automatically dip-coated in a tank of CFIC liquid, as shown in FIGS. 10A, 14A and 18A, in a just-in-time manner, during the building fabrication schedule, so as to provide 100% Class-A fire-protected mass timber building components. These components can then be used in constructing Class-A fire-protected prefabricated mass timber buildings. The mobile application 153 can be used to review all collected digital images, and audio and visual evidence of certificates, stamps, signatures and verifications during the course of the just-in-time prefabrication building project.

Specification of the Network Architecture of the System Network of the Present Invention FIG. 41 illustrates the network architecture of the system network of the present invention 135 for the case where the system of the present invention is implemented as a stand-alone platform deployed on the Internet.

As shown in FIG. 41, the Internet-based system network comprises: cellular phone and SMS messaging systems 161; email servers 162; a network of mobile computing systems 136 (136A, 136B) running enterprise-level mobile application software; and one or more industrial-strength data center(s) 145, preferably mirrored with each other and running Border Gateway Protocol (BGP) between its router gateways.

As shown in FIG. 41, each data center 145 comprises: a cluster of communication servers 146 for supporting http and other TCP/IP based communication protocols on the Internet (and hosting Web sites); a cluster of application servers 147; a cluster of RDBMS servers 148 configured within a distributed file storage and retrieval ecosystem/system, and interfaced around the TCP/IP infrastructure of the Internet well known in the art; an SMS gateway server 149 supporting integrated email and SMS messaging, handling and processing services that enable flexible messaging across the system network, supporting push notifications; and a cluster of email processing servers 150.

Referring to FIG. 41, the cluster of communication servers 146 is accessed by web-enabled clients (e.g. smart phones, wireless tablet computers, desktop computers, computer workstations, etc) 137 (137A, 137B) used by stakeholders accessing services supported by the system network. The cluster of application servers 147 implement many core and compositional object-oriented software modules supporting the system network 145. The cluster of RDBMS servers 148 use SQL to query and manage datasets residing in its distributed data storage environment.

Figure 44:
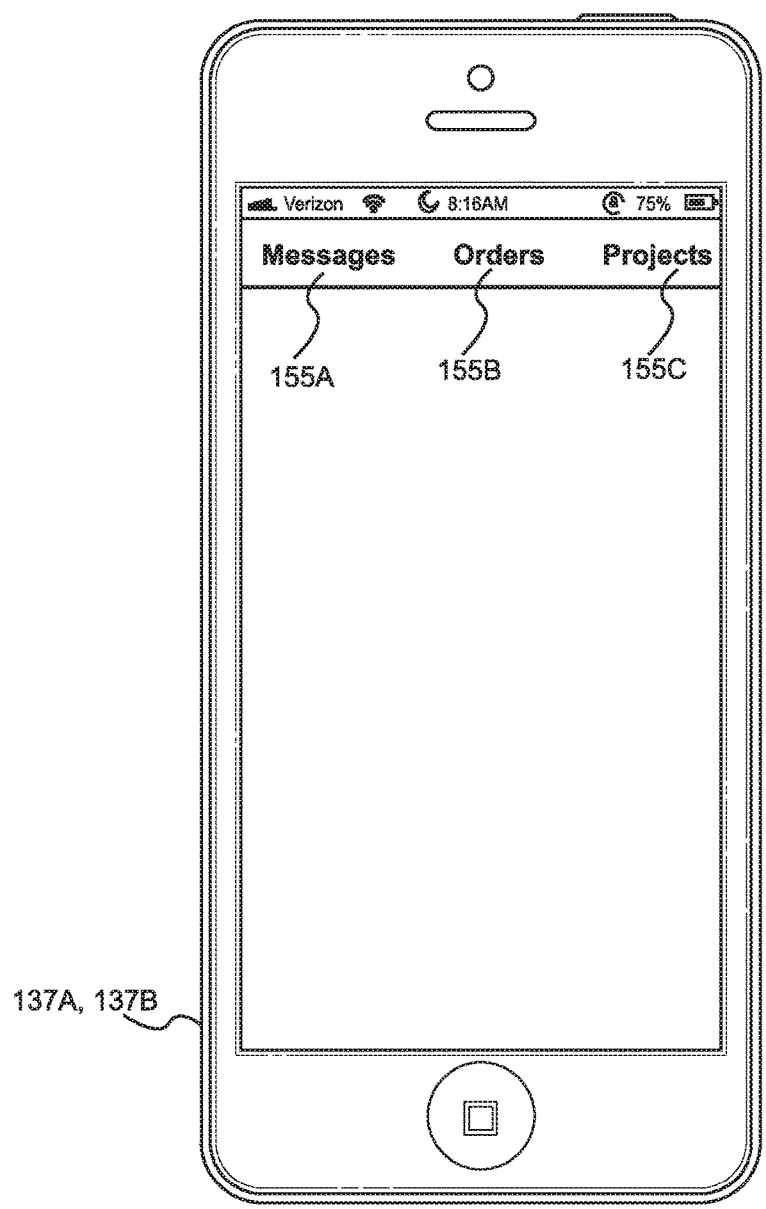
FIG. 44 is an exemplary wire frame model of a graphical user interface of a mobile application of the present invention configured used by customers who place orders for prefabricated Class-A fire-protected mass timber buildings, supported by the system of the present invention.
Figure 45:
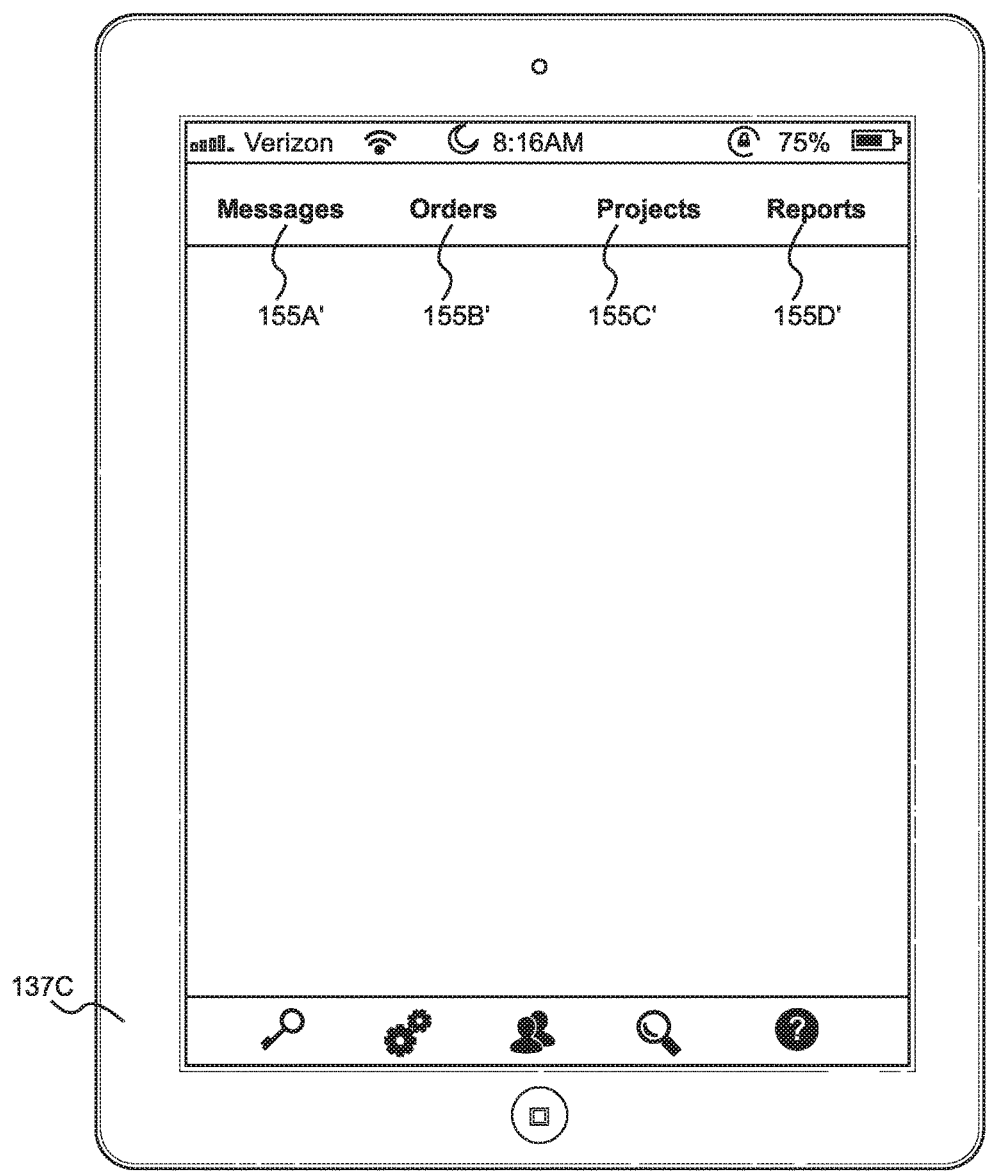
FIG. 45 is an exemplary wire frame model for a graphical user interface of a mobile application configured for use by project administrators, managers, fabricators and technicians showing a high-level menu of services supported by the system network of the present invention.
Figure 45A:
FIG. 45A is an exemplary wire frame model for a graphical user interface of the mobile application configured for use by project administrators and managers showing the creation of a new message about a specific project, using message services supported on the system network of the present invention.
Figure 45B:
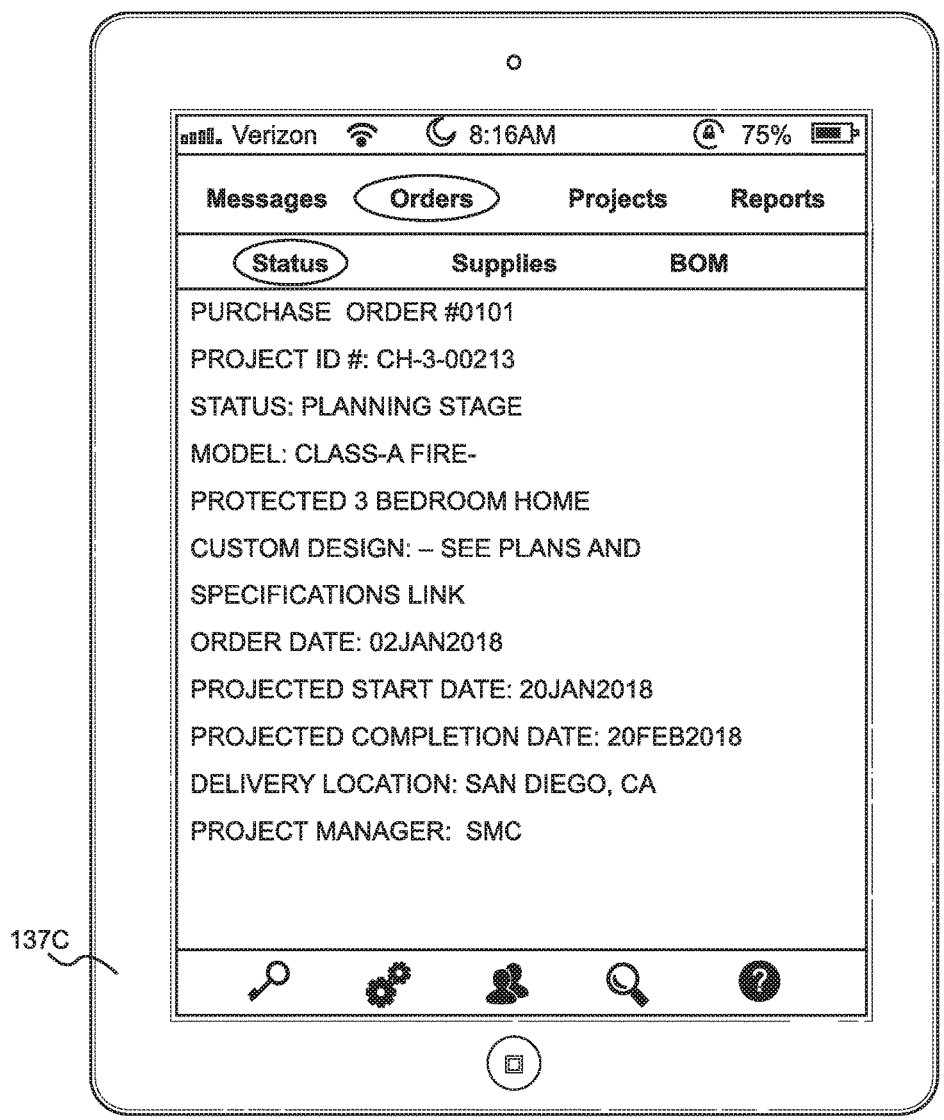
FIG. 45B is an exemplary wire frame model for a graphical user interface of the mobile application configured for use by project administrator showing the status of a purchase order for a prefabricated mass timber building, or CLT building component, using services supported by the system network of the present invention.
Figure 45C:
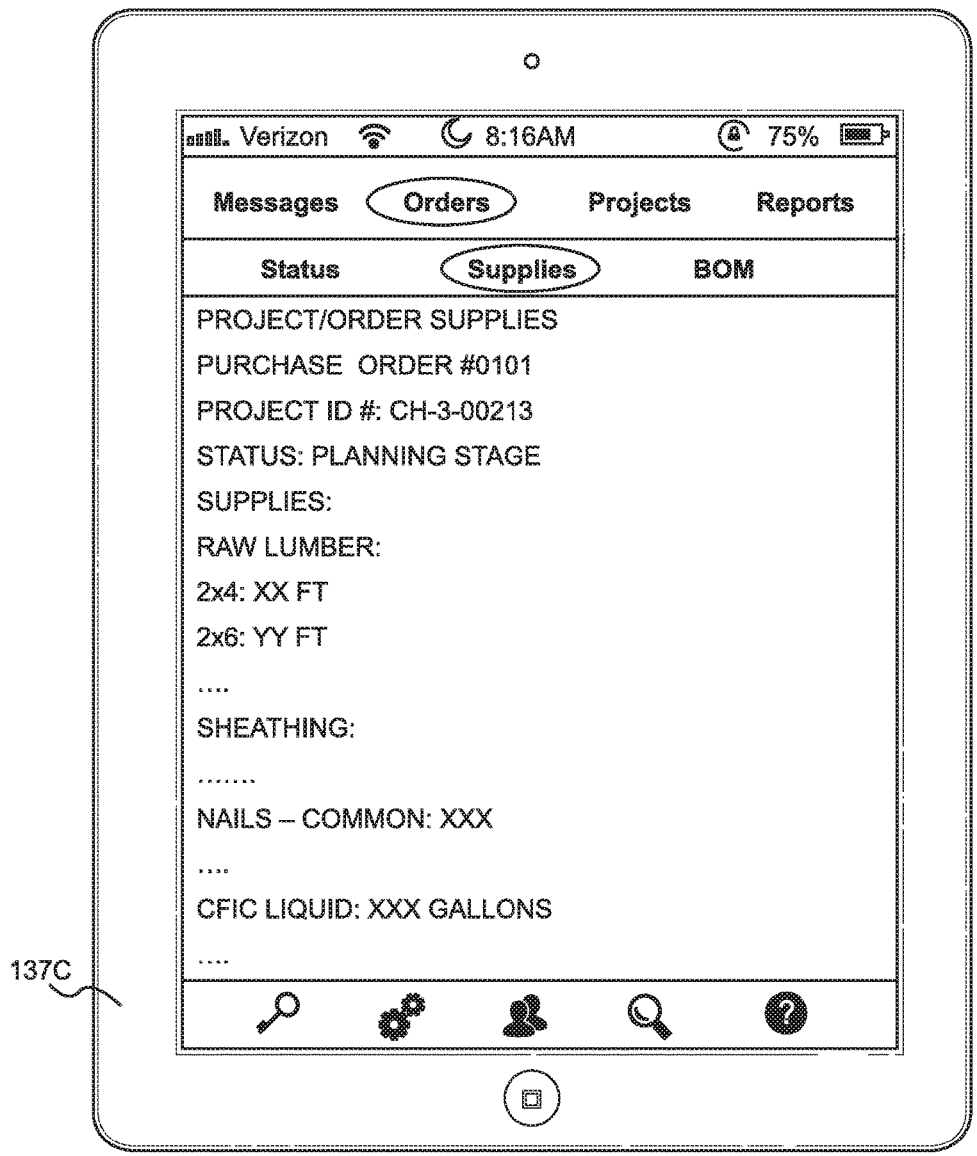
FIG. 45C is an exemplary wire frame model for a graphical user interface of the mobile application configured for use by project administrator showing the supplies required to fulfill a purchase order for a Class-A fire-protected prefabricated mass timber building, or Class-A fire-protected prefabricated CLT building component, using services supported by the system network of the present invention.
Figure 45D:
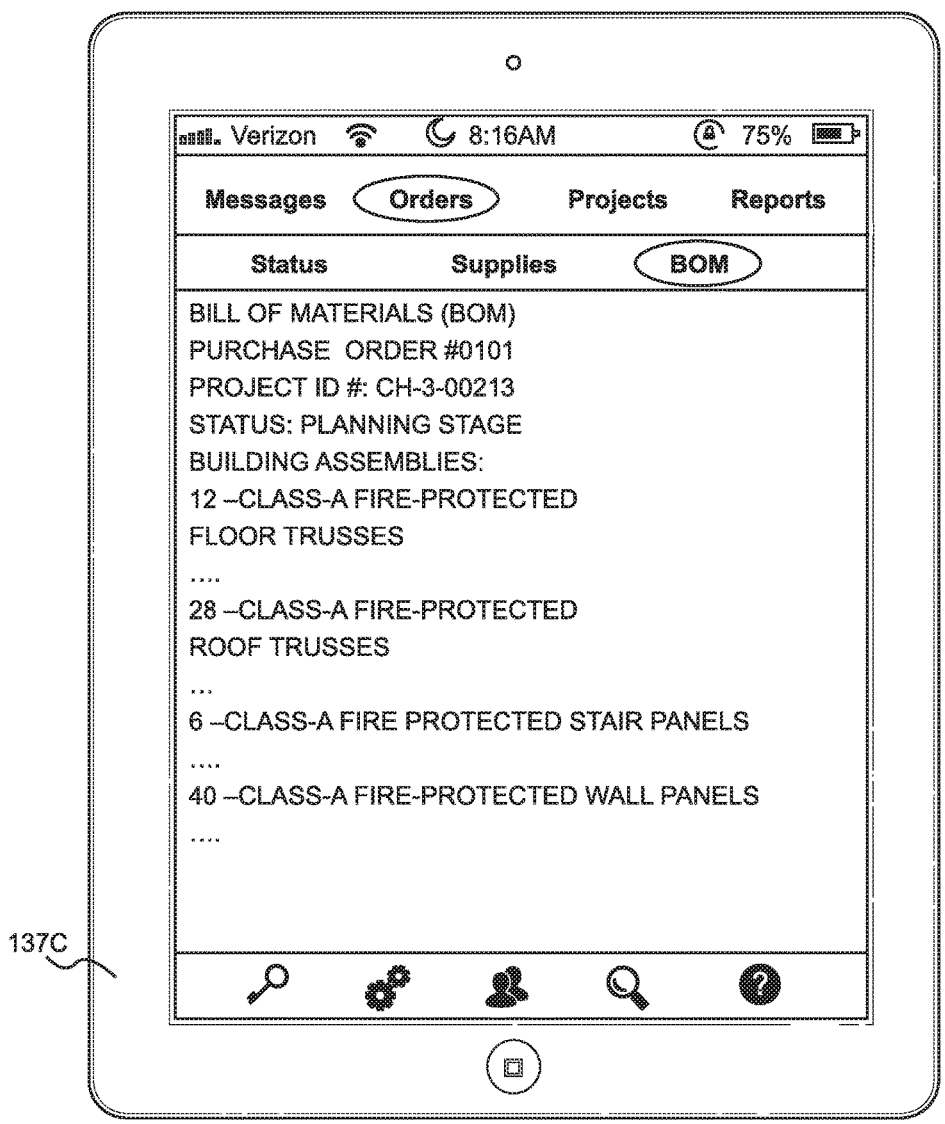
FIG. 45D is an exemplary wire frame model for a graphical user interface of the mobile application for use by project administrator showing the bill of materials (BOM) required to fulfill a purchase order for a prefabricated Class-A fire-protected mass timber building, or Class-A fire-protected CLT building component, using services supported by the system network of the present invention.
Figure 45E:
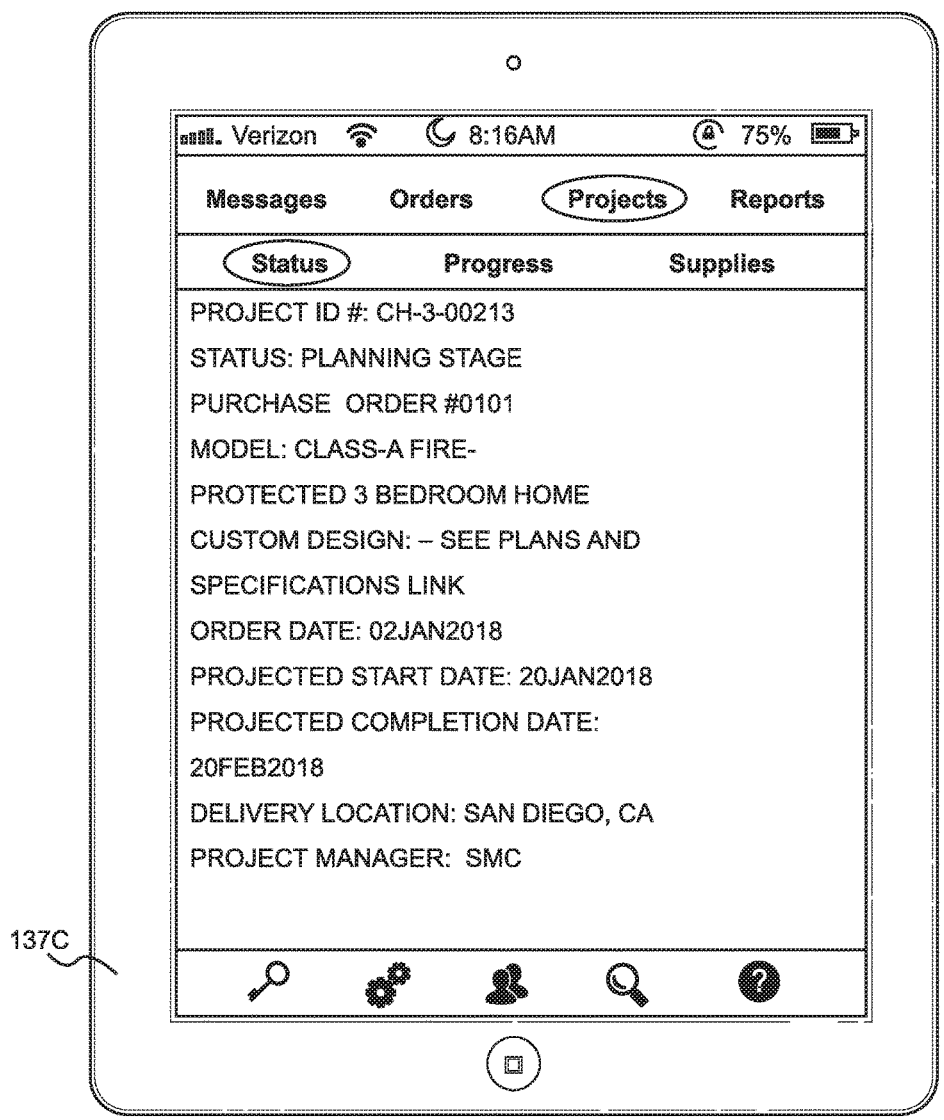
FIG. 45E is an exemplary wire frame model for a graphical user interface of the mobile application configured for use by project administrator showing the status of a factory project involving the prefabrication of a Class-A fire-protected mass timber building, or Class-A fire-protected CLT building component, using services supported by the system network of the present invention.
Figure 45F:
FIG. 45F is an exemplary wire frame model for a graphical user interface of the mobile application configured for use by project administrator showing the progress of a factory project involving the prefabrication of a Class-A fire-protected mass timber building, or Class-A fire-protected CLT building component, using services supported by the system network of the present invention.
Figure 45G:
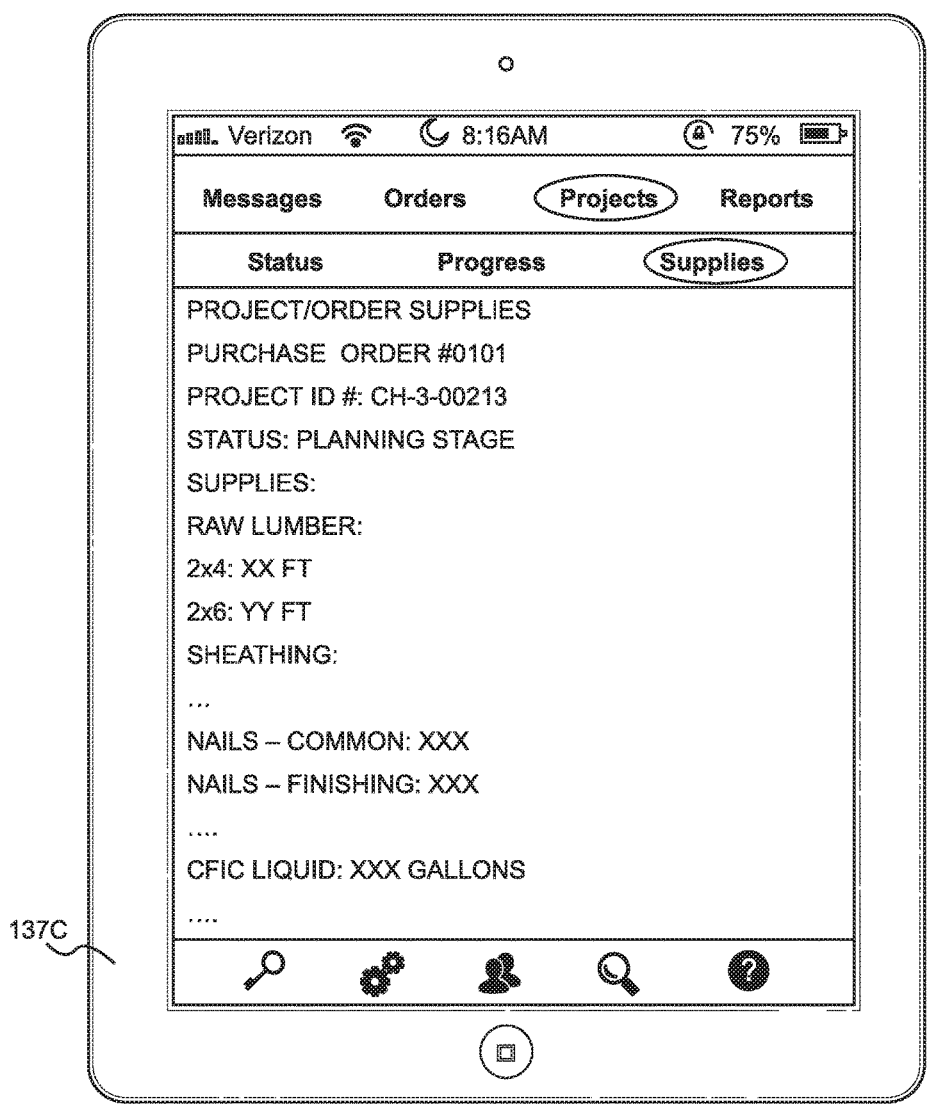
FIG. 45G is an exemplary wire frame model for a graphical user interface of the mobile application configured for use by project administrator showing the supplies required by a factory project involving the prefabrication of a Class-A fire-protected mass timber building, or Class-A fire-protected CLT building component, using services supported by the system network of the present invention.
Figure 45H:
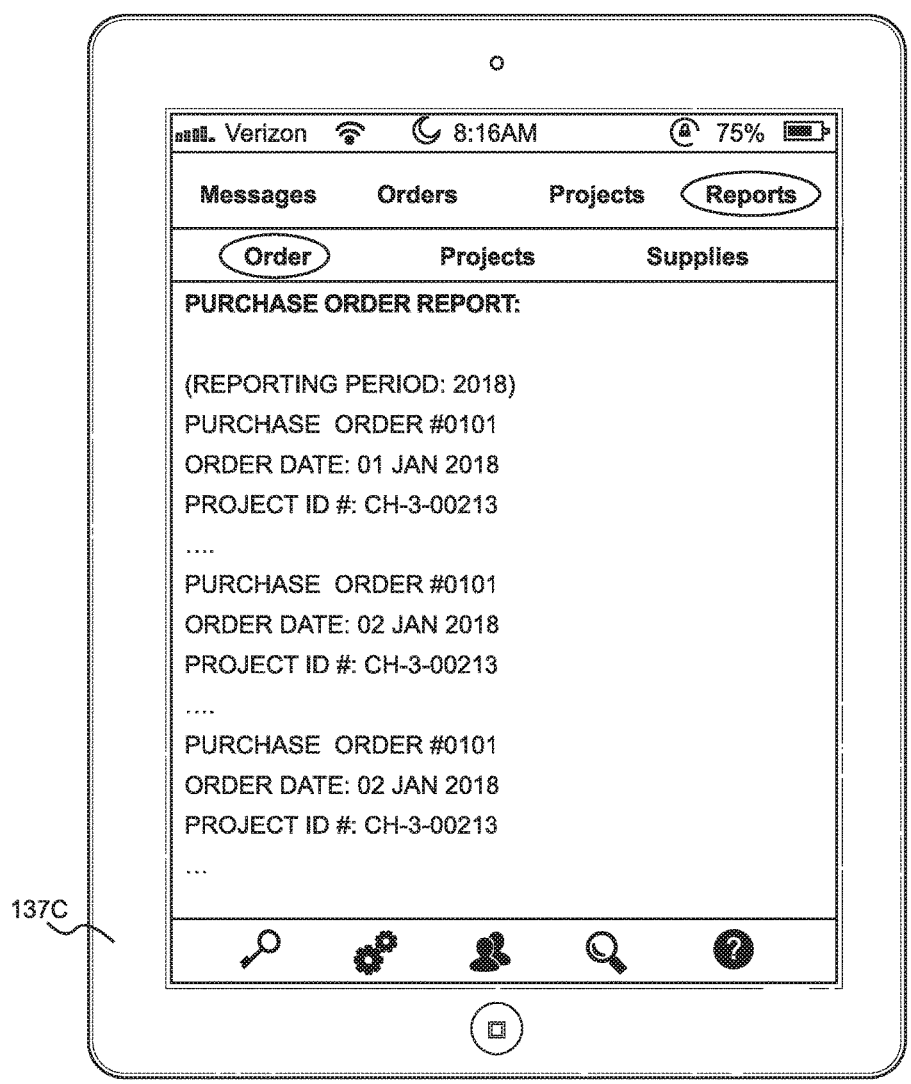
FIG. 45H is an exemplary wire frame model for a graphical user interface of the mobile application configured for use by project administrator showing a report on purchase orders placed for the prefabrication of a Class-A fire-protected mass timber building, or Class-A fire-protected CLT building component, using services supported by the system network of the present invention.
Figure 45I:
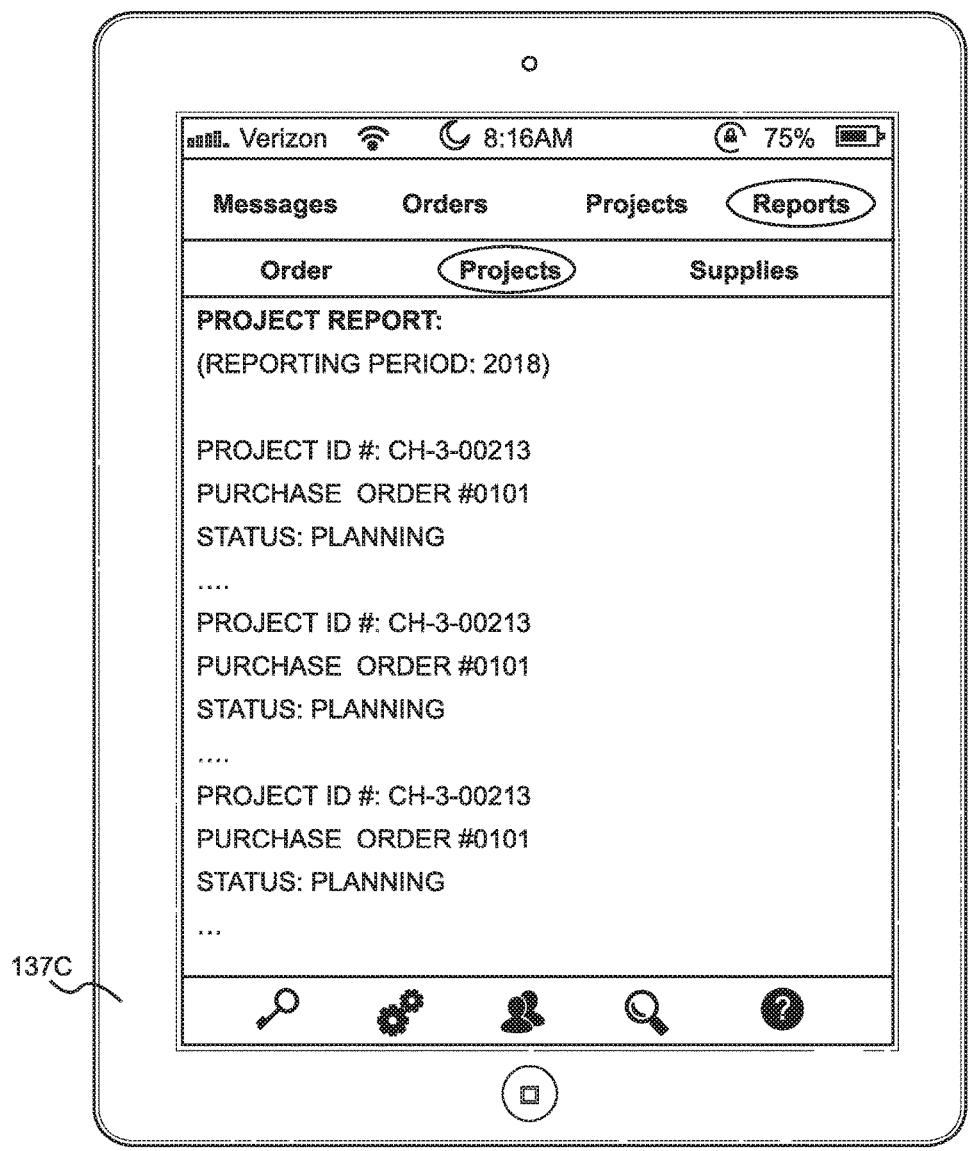
FIG. 45I is an exemplary wire frame model for a graphical user interface of the mobile application configured for use by project administrator showing a report on projects involving the prefabrication of a Class-A fire-protected mass timber building, or Class-A fire-protected CLT building component, using services supported by the system network of the present invention.
Figure 45J:
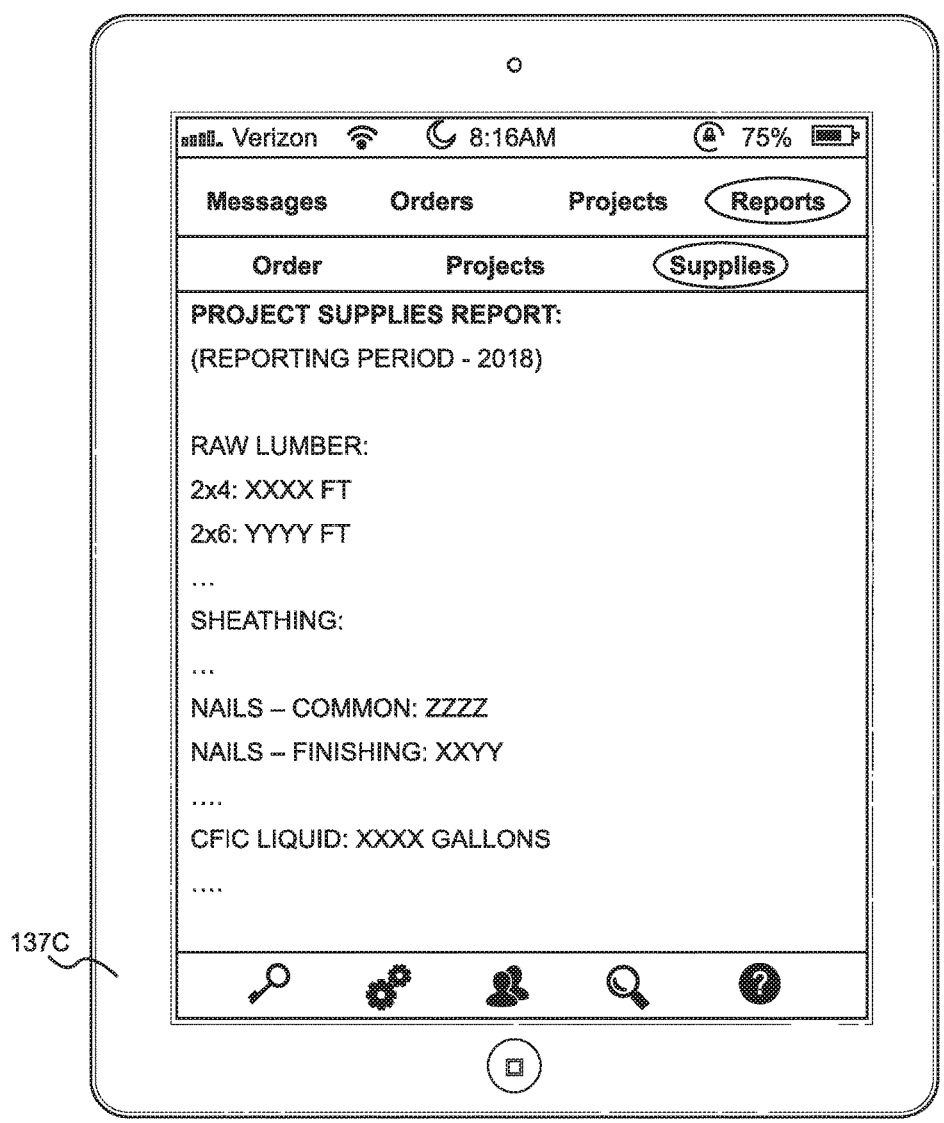
FIG. 45J is an exemplary wire frame model for a graphical user interface of the mobile application configured for use by project administrator showing a report on supplies required for the prefabrication of a Class-A fire-protected mass timber building, or Class-A fire-protected CLT building component, using services supported by the system network of the present invention.

As shown in FIG. 41, the system network architecture further comprises many different kinds of users supported by mobile computing devices 137 running the mobile application 153 of the present invention, namely: a plurality of mobile computing devices 137 running the mobile application 153, and used by fire departments to access services supported by the system network 145; a plurality of mobile computing systems 137 running mobile application 153 and used by insurance underwriters to access services on the system network 145; a plurality of mobile computing systems 137 running mobile application 153 and used by architects and their firms to access the services supported by the system network 145 of the present invention; a plurality of mobile client machines 137 (e.g. mobile computers such as iPad, and other Internet-enabled computing devices with graphics display capabilities, etc) for use by spray-project technicians and administrators, and running a native mobile application 137 supported by server-side modules, and the various illustrative GUIs shown in FIGS. 44 through 45J, supporting client-side and server-side processes on the system network of the present invention; and a GPS-tracked GSM-linked digital camera 163 installed over each CFIC liquid dip-coating tank, installed along a production line 131, for capturing digital images and video recordings of the CFIC liquid dip-coating process, along the production line, where wood pieces are dip-coated and Class-A fire-protected prior art to use in fabricating Class-A fire-protected mass timber building components.

In general, the system network 135 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 153 of the present invention, described above.

Figure 42B:
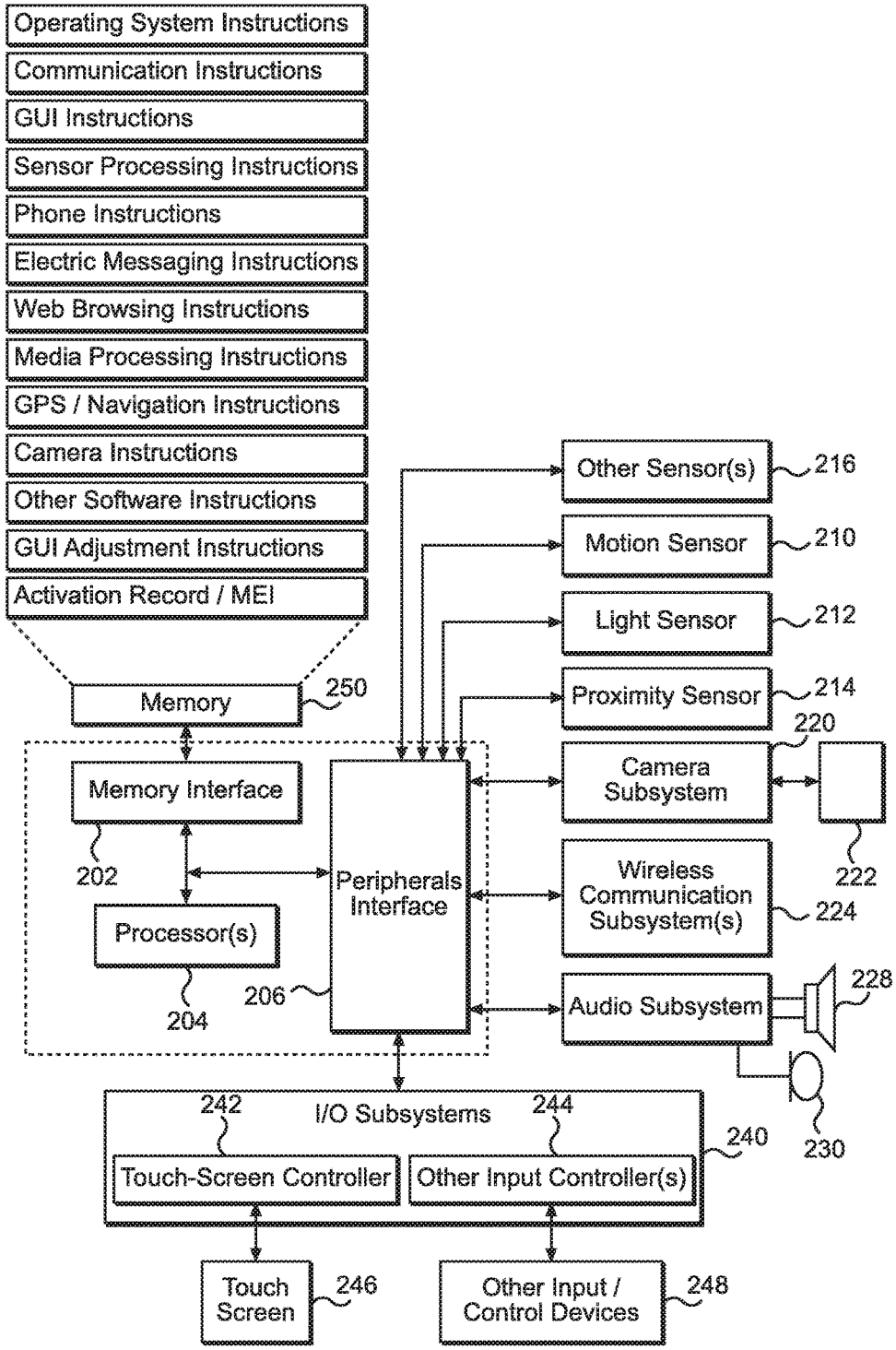
FIG. 42B is a system diagram for the exemplary mobile computing system showing the various subcomponents and subsystems used to construct the mobile computing system.

Specification of System Architecture of an Exemplary Mobile Smartphone System Deployed on the System Network of the Present Invention FIG. 42A shows an exemplary mobile the mobile client computing system (e.g. client device) 137 that is deployed on the system network 135 and supporting the many services offered by system network servers of the present invention. As shown in FIG. 42B, the mobile computing device 137 (137') can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 137 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 137 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 137 can be found in U.S. Pat. No. 8,631,358 incorporated herein by reference in its entirety.

Different Ways of Implementing the Mobile Client Machines and Devices on the System Network of the Present Invention In one illustrative embodiment, the enterprise-level system network 135 is realized as a robust suite of hosted services delivered to Web-based client subsystems 137 using an application service provider (ASP) model. In this embodiment, the Web-enabled mobile application 153 can be realized using a web-browser application running on the operating system (OS) (e.g. Linux, Application IOS, etc) of a mobile computing device 137 to support online modes of system operation, only. However, it is understood that some or all of the services provided by the system network 135 can be accessed using Java clients, or a native client application, running on the operating system of a client computing device, to support both online and limited off-line modes of system operation. In such embodiments, the native mobile application 153 would have access to local memory (e.g. a local RDBMS) on the client device 137, accessible during off-line modes of operation to enable consumers to use certain or many of the system functions supported by the system network during off-line/off-network modes of operation. It is also possible to store in the local RDBMS of the mobile computing device 137 most if not all relevant data collected by the mobile application for any particular fire-protection spray project, and to automatically synchronize the dataset for user's projects against the master datasets maintained in the system network database 148A, within the data center 145 shown in FIG. 41. This way, when using an native application, during off-line modes of operation, the user will be able to access and review relevant information regarding any building spray project, and make necessary decisions, even while off-line (i.e. not having access to the system network).

As shown and described herein, the system network 135 has been designed for several different kinds of user roles including, for example, but not limited to: (i) building purchasers, builders, and architects who might or will have the authority to place or make purchase orders online to commence a Class-A fire-protected mass timber building project; and (ii) prefabrication building project administrators and technicians registered on the system network. Depending on which role, for which the user requests registration, the system network will request different sets of registration information, including name of user, address, contact information, information about mass timber buildings, builders, architects, etc. In the case of a web-based responsive application on the mobile computing device 137, once a user has successfully registered with the system network, the system network will automatically serve a native client GUI, or an HTML5 GUI, adapted for the registered user. Thereafter, when the user logs into the system network, using his/her account name and password, the system network will automatically generate and serve GUI screens described below for the role that the user has been registered with the system network.

In the illustrative embodiment, the client-side of the system network 135 can be realized as mobile web-browser application, or as a native application, each having a "responsive-design" and adapted to run on any client computing device (e.g. iPhone, iPad, Android or other Web-enabled computing device) 137 and designed for use by anyone interested in managing, overseeing and/or monitoring on-site CFIC liquid spray projects involving owners of specific mass timber buildings seeking Class-A fire-protection.

Figure 43:
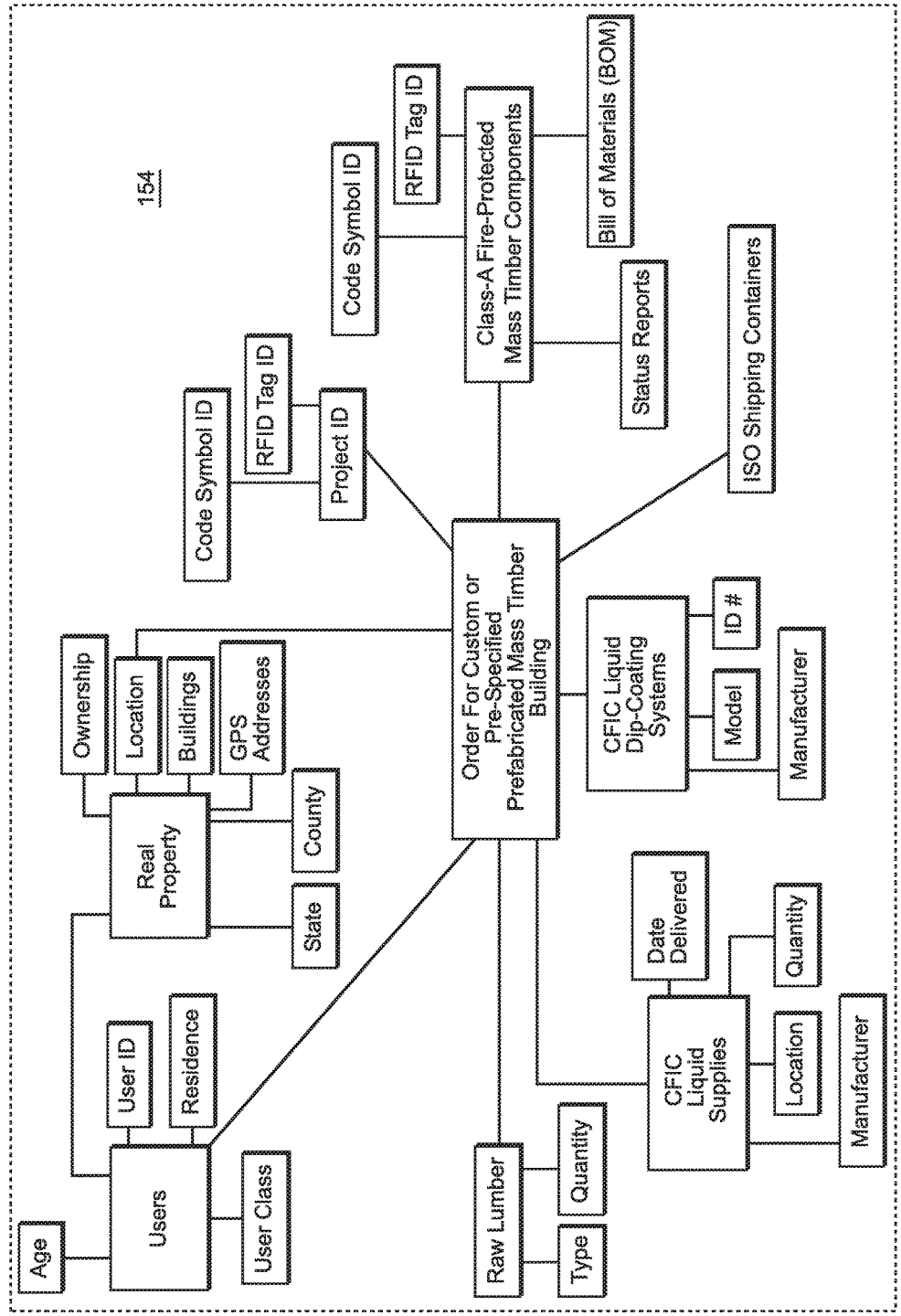
FIG. 43 is a schematic representation of an exemplary schema for the network database supported by the system the present invention shown in FIG. 41, wherein each primary enterprise object is schematically represented as an object in the schema and represented in the data records created and maintained in the network database.

Specification of Database Schema for System Network Database Supported on the System Network of the Present Invention As shown in FIG. 43, the schema 154 includes objects such as, for example: users of the system (e.g. property owners, builders, insurance companies, etc); real property on which the building will be constructed (if known at the time of ordering); orders for custom or pre-specified prefabricated mass timber building; and construction project. Each of these objects have further attributes specified by other sub-objects indicated in FIG. 43, including, for example: project ID; raw lumber; CFIC liquid; CFIC liquid dip coating systems; Class-A fire-protected wood-framed components; and ISO-shipping containers.

Specifications of Services Supported by the Graphical User Interfaces Supported on System Network of the Present Invention for Building Purchasers, Builders, Architects, Property Insurers and Other Stakeholders FIG. 44 illustrates an exemplary graphical user interface (GUI) 155 of the mobile application 153 used by customers who place orders for prefabricated Class-A fire-protected mass timber buildings, supported by the system of the present invention. As shown in this exemplary GUI screen, a number of pull-down menus are supported under the titles: Messages 155A, where the user can view messages sent via messaging services supported by the application; Orders 155B, where orders for prefabricated buildings have been placed and scheduled, have been completed, or are in progress; and Projects 155C, which have been have been scheduled, have been completed, or are in progress, and where uploaded authenticated certifications can be reviewed, downloaded and forwarded as needed by authorized stakeholders, to the appropriate parties and authorities.

Notably, the GUIs shown in FIGS. 38 through 38J have been designed and configured for use by the prefabricated building administrators and technicians who will be responsible for (i) taking orders for prefabricated Class-A fire-protected wood buildings, and (ii) managing each prefabricated fire-protected building project, from start to finish, so that building owners, builders, architects, property insurance agents and financial institutions (e.g. banks) may rely on the prefabrication company managing each and every step of each project using the system network 135.

Figure 44A:
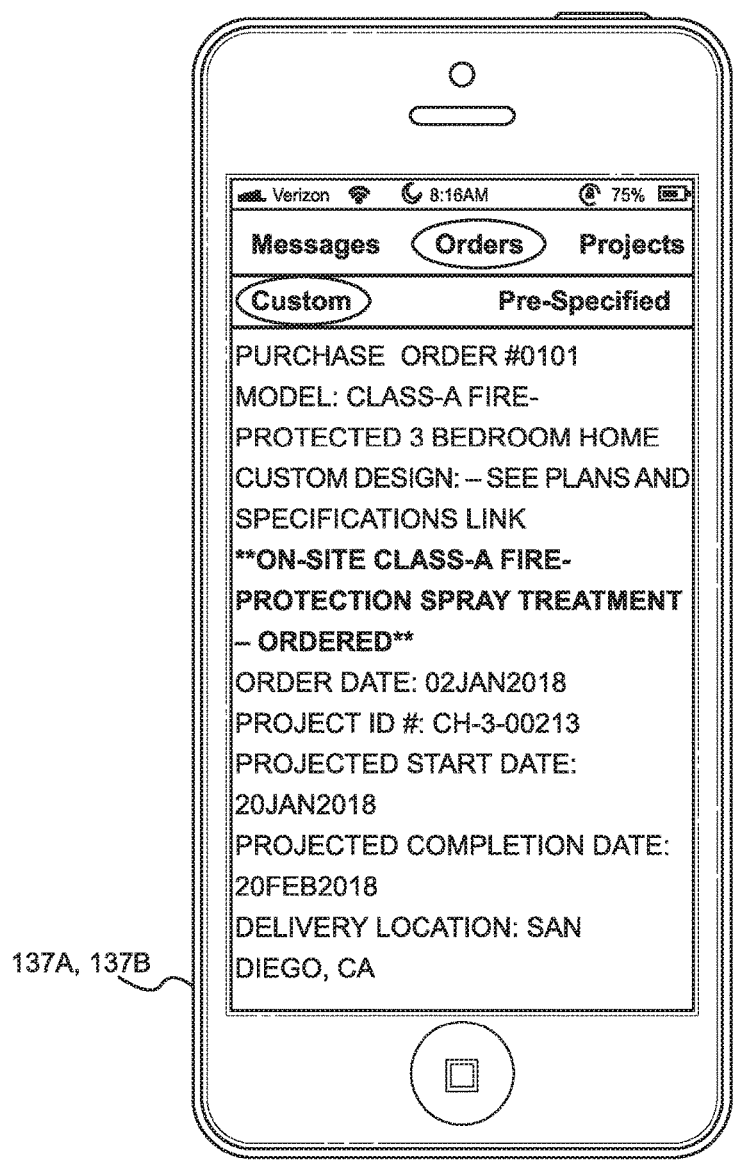
FIG. 44A is an exemplary wire frame model for a graphical user interface of the mobile application configured for use by customers showing details for an order for a custom prefabricated mass timber building, or CLT or NLT building component using services supported by the system network of the present invention.

FIG. 44A shows a graphical user interface of mobile application configured for use by consumers showing details for an order for a custom prefabricated mass timber building, or mass timber building component using services supported by the system network 135.

Figure 44B:
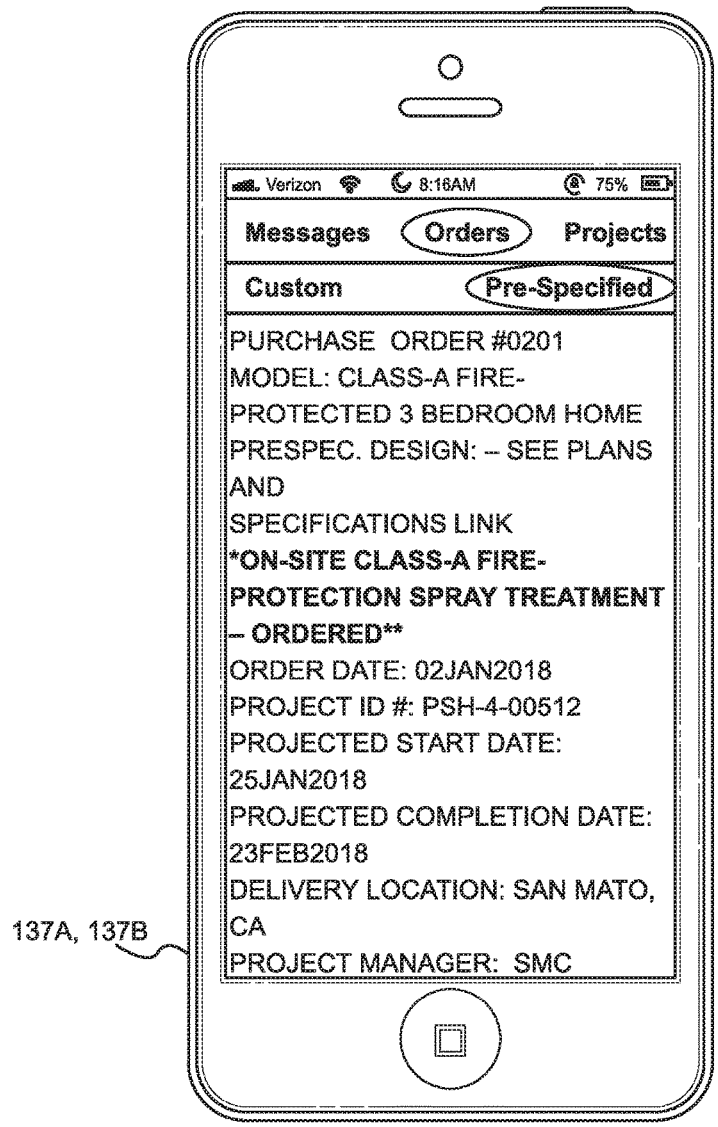
FIG. 44B is an exemplary wire frame model for a graphical user interface of the mobile application configured for use by customers showing details for an order for a pre-specified prefabricated mass timber building, or CLT or NLT building component, using services supported by the system network of the present invention.

FIG. 44B shows a graphical user interface of mobile application configured for use by consumers showing details for an order for a pre-specified prefabricated mass timber building, or mass timber building component, using services supported by the system network 135.

Figure 44C:
FIG. 44C is an exemplary wire frame model for a graphical user interface of the mobile application configured for use by customers showing status details for a project for a custom prefabricated mass timber building, or mass timber building component, using services supported by the system network of the present invention.

FIG. 44C shows a graphical user interface of mobile application configured for use by consumers showing status details for a project for a custom prefabricated mass timber building, or mass timber building component, using services supported by the system network 135.

Figure 44D:
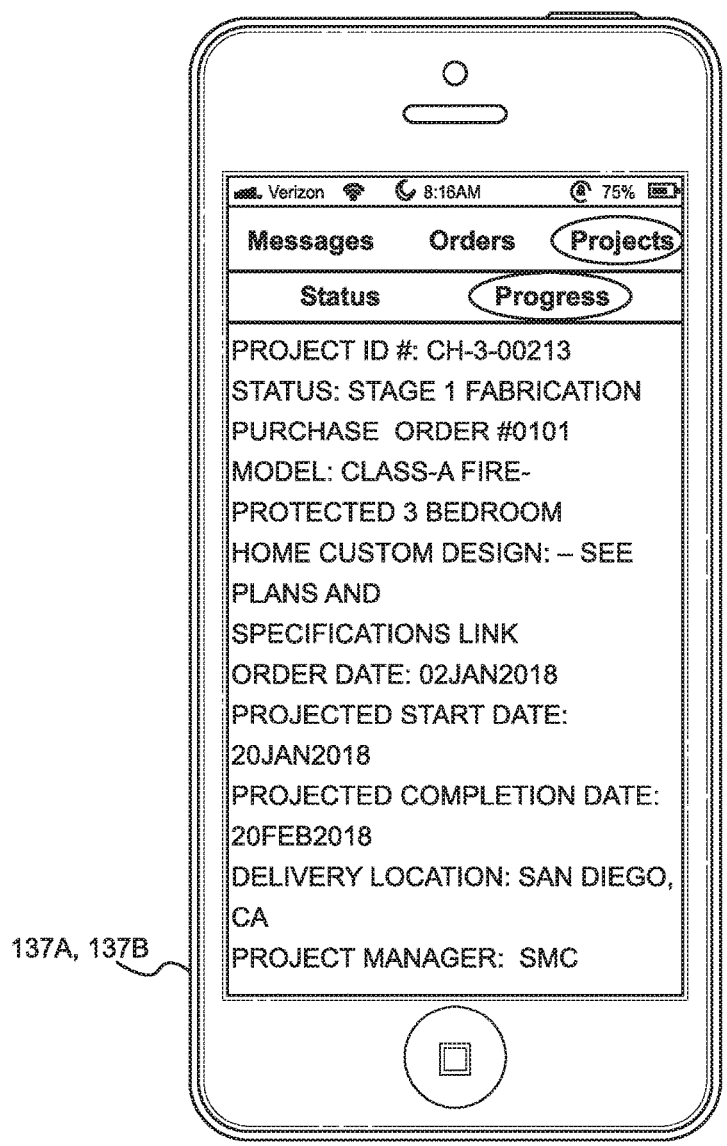
FIG. 44D is an exemplary wire frame model for a graphical user interface of the mobile application configured for use by customers showing progress details for a project relating to the factory-fabrication of a prefabricated mass timber building, or prefabricated mass timber building component, using services supported by the system network of the present invention.

FIG. 44D shows a graphical user interface of mobile application configured for use by consumers showing progress details for a project relating to the factory-fabrication of a prefabricated mass timber building, or prefabricated mass timber building component, using services supported by the system network 135.

Figure 44E:
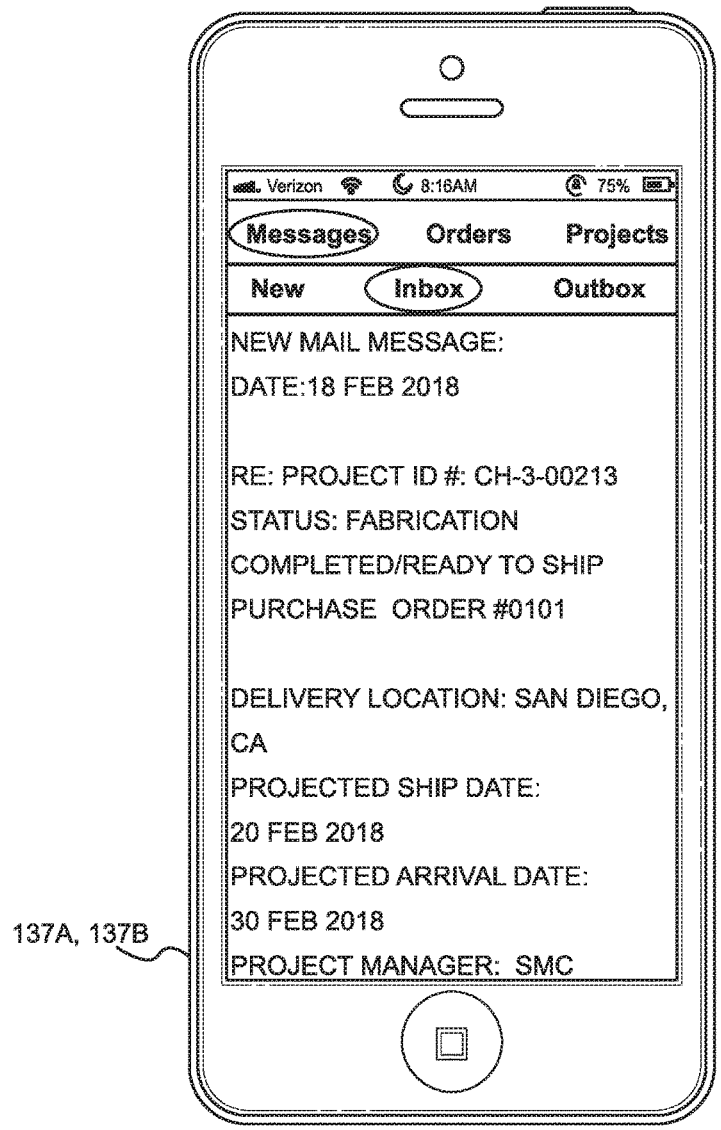
FIG. 44E is an exemplary wire frame model for a graphical user interface of the mobile application configured for use by customers showing a message (via email, SMS messaging and/or push-notifications) received indicating that the project relating to a prefabricated mass timber building is completed and ready for shipment to destination shipping location, using services supported by the system network of the present invention.

FIG. 44E shows a graphical user interface of mobile application configured for use by consumers showing a message (via email, SMS messaging and/or push-notifications) received indicating that the project relating to a prefabricated mass timber building is completed and ready for shipment to destination shipping location, using services supported by the system network 135.

Specification of Services Supported by the Graphical User Interfaces Supported on System Network of the Present Invention for Use by Fabricators, Administrators and Technicians Involved in the Production of Prefabricated Class-A Fire-Protected Mass Timber Buildings and Components FIG. 45 shows an exemplary graphical user interface 156 for the mobile application 153 configured for use by JIT mass timber building administrators and supervisors supported by the system network 135. As shown in this exemplary GUI screen 156, supports a number of pull-down menus under the titles: Messages 156A, where project administrators and supervisors can view messages sent via messaging services supported by the application; Orders 156B, where orders for prefabricated mass timber buildings have been placed and/or scheduled, have been completed, or are in progress, with status notes, terms, conditions and other considerations made of record; Projects 156C, which have been have been scheduled, have been completed, or are in progress; and Reports 156D, which are generated for Orders, Projects and Supplies, on prefabricated mass timber building projects are managed by the mobile application 153 running on the mobile client system 137C in operable communication with web, application and database servers 146, 147, 148 at the JIT factory data center 145.

Notably, the GUIs shown in FIGS. 38 through 38J have been designed and configured for use by the prefabricated building administrators and technicians who will be responsible for (i) taking orders for a prefabricated Class-A fire-protected mass timber building, (ii) managing the entire prefabricated fire-protected building project, from start to finish, so that building owners, builders, architects, property insurance agents and financial institutions (e.g. banks), as well as local, state and federal authorities, may rely on their services and work product of the prefabrication company managing each and every step of project using the system network 135.

FIG. 45A shows a graphical user interface of the mobile application 153 configured for use by project administrators and managers showing the creation of a new message about a specific project, using message services supported on the system network 135.

FIG. 45B shows a graphical user interface of the mobile application 153 configured for use by project administrators showing the status of a purchase order (PO) for a prefabricated Class-A fire-protected mass timber building, or Class-A fire-protected mass timber building component(s), using services supported by the system network 135.

FIG. 45C shows a graphical user interface of the mobile application 153 configured for use by project administrators showing the supplies required to fulfill a purchase order for a Class-A fire-protected prefabricated mass timber building, or Class-A fire-protected prefabricated mass timber building component(s), using services supported by the system network 135.

FIG. 45D shows a graphical user interface of the mobile application 153 configured for use by project administrators showing the bill of materials (BOM) required to fulfill a purchase order for a prefabricated Class-A fire-protected mass timber building, or Class-A fire-protected mass timber building component, using services supported by the system network 135.

FIG. 45E shows for a graphical user interface of the mobile application 153 configured for use by project administrators showing the status of a factory project involving the prefabrication of a Class-A fire-protected mass timber building, or Class-A fire-protected mass timber building component(s), using services supported by the system network 135.

In one illustrative embodiment, the mobile application 153 and/or digital camera systems can be used to review digital images and audio-video (AV) recordings taken of CFIC liquid dipped-coated wood pieces along the production line, relating to prefabricated mass timber building components being fabricated, and uploaded to the system network database 148A under the project ID # of the prefabricated building project. All captured documents and evidence of CFIC liquid dip-coated wood can be uploaded, logged and time/date-stamped and stored into the project-specific document folder maintained on the system network database 148A of the system network 135 using document capture, time/date-stamping and cataloguing capabilities.

Alternatively, Class-A fire-protected lumber, and/or engineered wood products (EWPs), that are dip-coated in CFIC liquid, will be used to construct prefabricated Class-A fire-protected mass timber building components (e.g. wall panels, floor panels, roof panels, and stair assemblies). Once constructed in the factory on the production line, a barcoded/RFID-tagged inspection label 400 is applied to each and every prefabricated Class-A fire-protected mass timber building component produced on the production line 131. Each barcoded/RFID-tagged inspection label 400 will include a bar code symbol and RFID tag that has a unique building-component identifier (e.g. an alphanumeric character string) encoded into the symbology used in the barcode symbol and RFID tag identifier, and this building-component identifier will be used to identify subfolders or subdirectories where collection data, information and documents are stored in a building-component subfolder (indexed with the building-component identifier), in the building-project folder on the network database 113A, maintained on the system network 100. The building-component identifier will be read during each scan/read of the barcoded/RFID-tag label 400, and used by the mobile application 153 to access the appropriate building-component subfolder in the building project folder where all such certifications of dip-coating, inspection and oversight, and photos, and videos are stored and archived for posterity.

The mobile application 153 has access to all services supported in the mobile computing device 137 (e.g. Apple iPhone or iPad) as the case may be, for verifying and documenting the CFIC liquid spray treatment of each and every completed Class-A fire-protected mass timber building fabricated in the factory. Such documentation should include capturing and uploading digital images and AV-recordings of certificates of CFIC liquid dip-coating stamped and verified along the production line involved the fabrication process.

FIG. 45F shows a graphical user interface of the mobile application 153 configured for use by project administrator showing the progress of a factory project involving the prefabrication of a Class-A fire-protected mass timber building, or Class-A fire-protected mass timber building component, using services supported by the system network 135.

FIG. 45G shows for a graphical user interface of the mobile application 153 configured for use by project administrator showing the supplies required by a factory project involving the prefabrication of a Class-A fire-protected mass timber building, or Class-A fire-protected mass timber building component, using services supported by the system network 135.

FIG. 45H shows for a graphical user interface of mobile application configured for use by project administrator showing a report on purchase orders placed for the prefabrication of a Class-A fire-protected mass timber building, or Class-A fire-protected mass timber building component, using services supported by the system network 135.

FIG. 45I shows for a graphical user interface of the mobile application 153 configured for use by project administrator showing a report on projects involving the prefabrication of a Class-A fire-protected mass timber building, or Class-A fire-protected mass timber building component, using services supported by the system network 135.

FIG. 45J shows for a graphical user interface of the mobile application 153 configured for use by project administrator showing a report on supplies required for the prefabrication of a Class-A fire-protected mass timber building, or Class-A fire-protected mass timber building component, using services supported by the system network 135.

Figure 46:
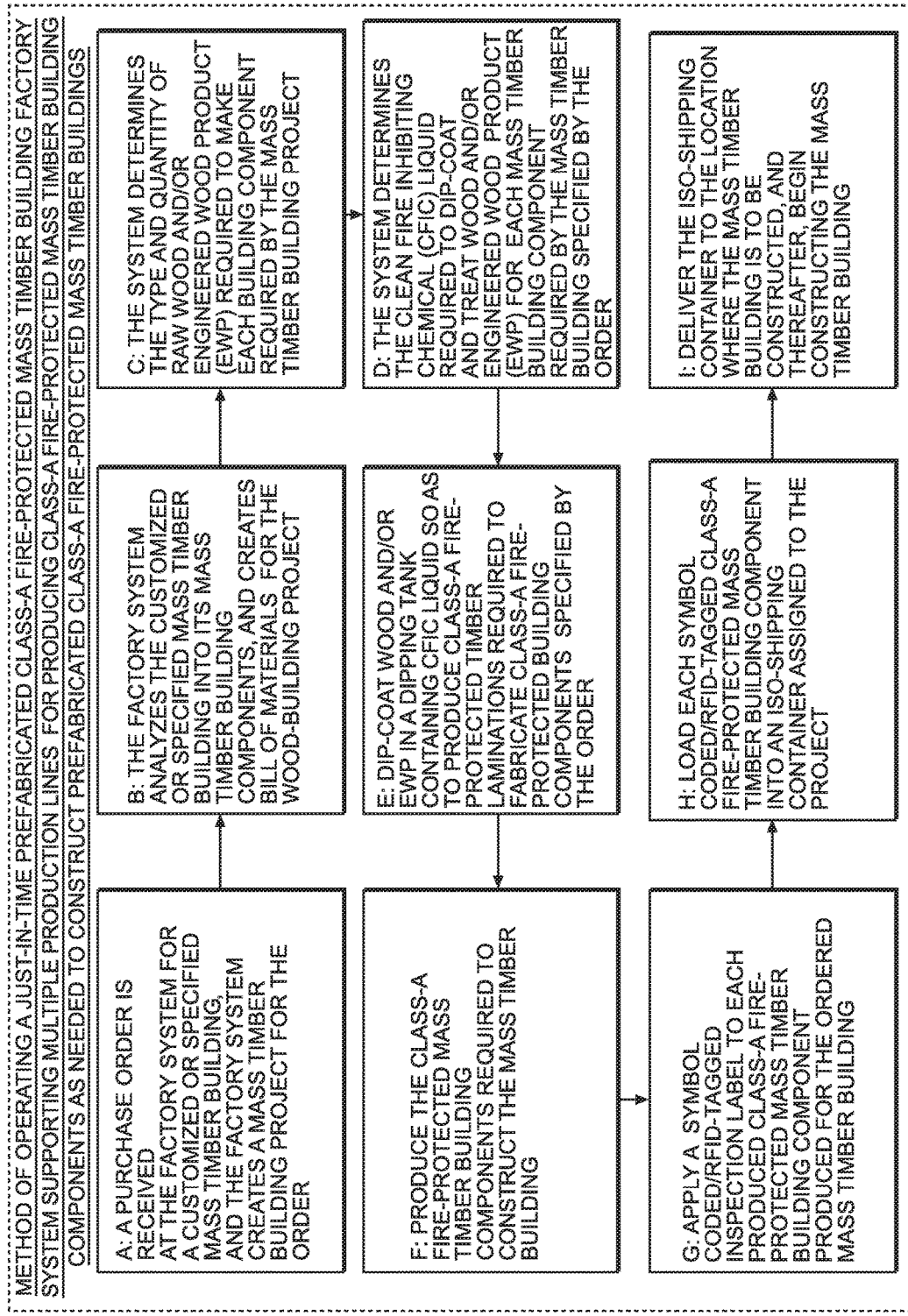
FIG. 46 is a flow chart describing the primary steps involved in carrying out the method of operating a just-in-time (JIT) prefabricated Class-A fire-protected mass timber building factory system supporting multiple production lines for producing Class-A fire-protected CLT components, as needed to construct purchase orders (POs) received for prefabricated Class-A fire-protected mass timber buildings.

FIG. 46 describes the primary steps involved in carrying out the method of operating a just-in-time prefabricated mass timber building factory system 130, supporting multiple production lines 131, as illustrated in FIGS. 39A and 39B, for producing prefabricated Class-A fire-protected mass timber building components, as needed to construct pre-fabricated Class-A fire-protected mass timber buildings ordered online using the mobile application 153 described herein.

As indicated at Block A in FIG. 46, in response to a purchase order (PO) received at the factory system 130 for a customized or specified mass timber building, the factory system automatically generates a prefabricated mass timber building project for the order placed by a customer using the mobile application 153 installed and running on mobile computing system 137A, 137B, or through an equivalent website.

As indicated at Block B in FIG. 46, the factory system 130 analyzes the customized or specified mass timber building into its wood-framed components, and creates bill of materials (BOM) for the wood-building project.

As indicated at Block C in FIG. 46, the system 130 determines the type and quantity of raw wood and/or engineered wood product (EWP) 141 required to make each wood-framed component required by the mass timber building project.

As indicated at Block D in FIG. 46, the system 130 determines the supply clean fire inhibiting chemical (CFIC) liquid 142 required to dip-coat and treat wood and/or engineered wood product (EWP) for each wood-framed component required by the mass timber building.

As indicated at Block E in FIG. 46, the system 130 automatically dip-coats the wood and/or the EWPs in a high-speed dipping tank installed along a production line, as shown in the FIG. 10A, each containing a controlled supply of CFIC liquid for dip-coating wood pieces at atmospheric pressure, to produce Class-A fire-protected wood required to fabricate Class-A fire-protected wood-framed components for the mass timber building, specified by the placed purchase order.

As indicated at Block F in FIG. 46, the system produces the Class-A fire-protected wood-framed components required to construct the ordered mass timber building.

As indicated at Block G in FIG. 46, a barcoded/RFID-tagged inspection label (with a code symbol and/or RFID tag) 400 is applied to each produced Class-A fire-protected mass timber building component 132A, 132B, 132C, 132D, 132E produced for the ordered mass timber building.

As indicated at Block H in FIG. 46, each symbol coded/RFID-tagged Class-A fire-protected wood-framed component 132A, 132B, 132C, 132D, 132E is loaded into an ISO-shipping container 136 assigned to the mass timber building project.

As indicated at Block I in FIG. 46, the ISO-shipping container 136 is delivered to the location where the mass timber building is to be constructed. Thereafter, construction of the Class-A fire-protected prefabricated mass timber building begins at the construction site.

In the event the purchaser of the prefabricated mass timber building requested on-site application of Class-A fire-protection spray treatment, using CFIC liquid (i.e. Hartindo AF31), a professional fire-protection spray treatment (provider) team will use the system network 100 shown in FIG. 28 to apply, certify, verify and document the Class-A fire protection liquid spray process as described in detail above, in synchronism with the prefabricated builder's schedule. As each predesignated section of the mass timber building is constructed by assembling pre-fabricated Class-A fire-protected mass timber building components (e.g. wall panels, floor and roof truss panels, stair components, etc.), the spray technicians will spray treat all exposed interior surface of the completed section of the mass timber building, and certify, verify and document the spray treatment using the mobile application 153 using mobile computing devices 137 and services supported by the system network 100. Once completed, the prefabricated Class-A fire-protected mass timber building will be double-protected with Class-A fire-protection, providing the building owner with many benefits, including potentially lower property insurance premiums, in view of the fact that significant risk of total destruction by fire has been significantly reduced or otherwise minimized.

By virtue of the JIT factory system 130, it is now possible to produce, as needed, a custom or pre-specified mass timber building made from Class-A fire-protected mass timber building components, thereby minimizing inventory and cost of manufacture, and improving the quality and precision of prefabricated Class-A fire-protected prefabricated mass timber buildings.

Method of Qualifying Mass Timber Building for Reduced Property Insurance Based on Verified and Documented Clean Fire Inhibiting Chemical (CFIC) Liquid Dip-Coating of Wood Pieces During Fabrication of Class-A Fire-Protected Mass Timber Building Components for Prefabricated Mass Timber Buildings FIG. 47 shows the high-level steps required to practice the method of qualifying a mass timber building for reduced property insurance based on verified and documented dip-coating of all wood pieces in clean fire inhibiting chemical (CFIC) liquid prior to the fabrication of Class-A fire-protected wood building components for used in constructing prefabricated Class-A fire-protected mass timber buildings.

As indicated at Block A in FIG. 47, dip-coating all wood in a clean fire inhibiting chemical (CFIC) liquid during the fabrication of Class-A fire-protected mass timber building components for constructing an ordered prefabricated building within a prefabricated mass timber building factory 130.

As indicated at Block B in FIG. 47, verifying and documenting the CFIC liquid dip-coating and Class-A fire protection treatment of all wood pieces used to construct mass timber building components for the prefabricated Class-A fire-protected mass timber building, by capturing time/date stamping data, and digital images and videos of certificates of CFIC liquid dip-coating within the factory 130.

As indicated at Block C in FIG. 47, the factory-collected Class-A fire-protection treatment verification data is wirelessly transmitted to a central network database 148A on the system network 135 to update the central network database 148A.

As indicated at Block E in FIG. 47, a company underwriting property insurance for the mass timber building accesses the central network database 148A on the system network 135, to verify the database records maintained for each mass timber building that has undergone spray-based Class-A fire protection treatment, to qualify the building owner for lower property insurance premiums, based on the verified Class-A fire-protection status of the sprayed-treated mass timber building.

As indicated at Block E in FIG. 47, upon the outbreak of a fire in the insured mass timber building/property, the local fire departments instantly and remotely assess the central network database 148A using a mobile application 153, so as to quickly determine Class-A fire-protected status of the mass timber building by virtue of CFIC liquid spray treatment of the mass timber building during the construction phase, and inform fireman tasked with fighting the fire that the mass timber building has been treated with Class-A fire-protection defense against fire.

Modifications to the Present Invention which Readily Come to Mind

The illustrative embodiments disclose the use of clean fire inhibiting chemicals (CFIC) from Hartindo Chemicatama Industri, particular Hartindo AAF21 and AAF31 and Dectan chemical, for applying and forming CFIC-coatings to the surface of wood, lumber, and timber, and other engineering wood products. However, it is understood that alternative CFIC liquids will be known and available to those with ordinary skill in the art to practice the various methods of Class-A fire-protection according to the principles of the present invention.

These and other variations and modifications will come to mind in view of the present invention disclosure.

While the on-site applied spray of CFIC liquid was shown for newly constructed prefabricated Class-A fire-protected mass timber buildings, it is understood that this method of Class-A fire-protection treatment also can be practiced on older buildings having: (i) open unfinished attic spaces disposed above roof-trusses with open, unfinished ceiling surfaces, wall and floor surfaces, where bare interior wood surfaces are exposed and at high-risk to fire; and (ii) open unfinished basement spaces, where wall panels are open, exposed and at high-risk to fire. In such environments, the Class-A fire-protection spray-treatment method of the present invention can be practiced with excellent results.

While several methods have been disclosed for providing Class-A fire-protection to the spray-treated surfaces of mass timber building components, such as CLT, NLT and GLT, it is understood that the same methods can be practiced for the purpose of reducing charring of mass timber building components in a mass timber building. Such methods will involve applying to exteriorly exposed surfaces of mass timber building component, a clean fire inhibiting chemical (CFIC) liquid so as to form an added layer of CFIC providing Class-A fire-protection to the sprayed surface. Then, in the presence of a fire in the mass timber building, the layer(s) of the CFIC coating will interfere with the free radical chemical reactions in the combustion phase of the fire, thereby preventing significantly less charring of timber on the exterior surfaces of the sprayed mass timber building components. Spray-applied as well as brush-applied methods can be used to apply a coating of clean fire inhibiting chemical (CFIC) liquid to the exteriorly exposed surfaces of mass timber building component in accordance with the principles of the present invention. Such methods can offer great value is reducing damage to mass-timber buildings in the event of building fires because repairing char damage to mass timber building components is almost impossible in most instances without replacing fire-damaged mass-building components, which can be time-consuming, complex, and very expensive.

Also, it is understood that there will be a great need to apply the fire-protection spray methods of the present invention, disclosed in Applicant's pending U.S. patent application Ser. No. 15/866,451, and incorporated herein by reference in its entirety, to protect mass timber buildings from wild fires by automatically spraying water-based environmentally clean fire inhibiting chemical (CFIC) liquid over the exterior surfaces of the building, surrounding ground surfaces, shrubs, decking and the like, prior to wild fires reaching such buildings.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A method of producing a pre-fabricated Class-A fire-protected mass-timber building in a factory environment supporting one or more production lines for producing prefabricated Class-A fire-protected mass-timber building components designed for construction of said pre-fabricated Class-A fire-protected mass-timber building on a building construction site, said method comprising the steps of:

(a) receiving an order for a prefabricated Class-A fire-protected mass-timber building characterized by a set of design specifications;

(b) analyzing the set of design specifications for said pre-fabricated Class-A fire-protected mass-timber building, into a set of design specification for prefabricated Class-A fire-protected mass-timber building components to be fabricated in said factory environment in accordance with a prefabricated mass-timber building project;

(c) determining the type and quantity of wood required to fabricate each said prefabricated Class-A fire-protected mass-timber building component specified by said prefabricated mass-timber building project;

(d) determining a supply of clean fire inhibiting chemical (CFIC) liquid required to treat wood to be used to fabricate each said Class-A fire-protected mass-timber building component;

(e) fabricating each said prefabricated Class-A fire-protected mass-timber building component in said factory environment, using the type and quantity of wood determined in step (c);

(f) during fabrication of each said mass-timber building component in said factory environment, applying said CFIC liquid to the wood of said mass-timber building component being treated, so as to fabricate a Class-A fire-protected mass-timber building component for use in constructing said prefabricated Class-A fire-protected mass-timber building;

(g) after applying said CFIC liquid to the wood of each said treated mass-timber building component in said factory environment so as to produce said Class-A fire-protected mass-timber building component, certifying and marking each said Class-A fire-protected mass-timber building component as being applied with said CFIC liquid, for inspection and documentation purposes;

(h) during fabrication of each pre-fabricated Class-A fire-protected mass-timber building component in said factory environment, applying an identifying tag to each produced Class-A fire-protected mass-timber building component being produced for use in the ordered prefabricated Class-A fire-protected mass-timber building;

(i) during fabrication of each said prefabricated Class-A fire-protected mass-timber building component in said factory environment, capturing and collecting digital photographs and/or videos visually showing an indication of Class-A fire-protection stamped or posted on each said pre-fabricated Class-A fire-protected mass-timber building component;

(j) uploading said digital photographs and/or videos including wood-treatment and fire-protection information with time/date and location stamping, to an information server maintained on a computer network; and (k) during construction of said prefabricated Class-A fire-protected mass-timber building on a building construction site, remotely located from said factory environment, accessing said digital photographs and/or videos, including wood-treatment and fire-protection status information with time/date and location stamping, from said information server maintained on said computer network, so as to provide visual evidence for entities involved in said prefabricated Class-A fire-protected mass-timber building, that said CFIC liquid has been applied to each said prefabricated Class-A fire-protected mass-timber building component and provided with Class-A fire-protection while being fabricated in said factory environment.

2. The method of claim 1, wherein said identifying tag is selected from a group consisting of a bar code identifier, an RFID tag, and a barcoded/RFID tag; and when reading said identifying tag with a mobile tag reader, said digital photographs and/or video information including wood-treatment and fire-protection status information, relating to the corresponding prefabricated Class-A fire-protected mass-timber building component, is automatically accessed from said information server for review and consideration.

3. The method of claim 1, wherein step (f) comprises dip-coating pieces of wood in a dipping tank containing said supply of said CFIC liquid, at atmospheric pressure, so as to produce pieces of Class-A fire-protected wood required to fabricate said prefabricated Class-A fire-protected mass-timber building components for use in said prefabricated Class-A fire-protected mass-timber building.

4. The method of claim 1, wherein step (f) comprises spraying said CFIC liquid over the surfaces of said mass-timber building component being treated, so as to fabricate said prefabricated Class-A fire-protected mass-timber building components for use in said prefabricated Class-A fire-protected mass-timber building.

5. The method of claim 1, wherein said prefabricated Class-A fire-protected mass-timber building components comprise mass-timber building components selected from the group consisting of cross-laminated timber (CLT) panels, nail-laminated timber (NLT) panels, glue-laminated timber (GLT) panels, and mass-timber engineered wood product (EWP) building components.

6. The method of claim 1, wherein said entities comprise a group consisting of builders, property owners, building inspectors, and insurance companies.

7. The method of claim 1, wherein said CFIC liquid comprises an aqueous solution having chemical molecules that infuse into the surface of said wood so that, when said aqueous solution dries, the chemical molecules in said CFIC liquid are present on the surface of the coated wood and ready to interfere with free radicals driving combustion in any fire that may break out about said treated wood during construction of said prefabricated Class-A fire-protected mass-timber building using said prefabricated Class-A fire-protected mass-timber building components.

8. The method of claim 1, wherein said digital photographs and/or videos, including wood-treatment and fire-protection status information with time/date and location stamping, provide factory-collected Class-A fire-protection treatment certification data to said entities for certifying that said CFIC liquid has been applied to said prefabricated Class-A fire-protected mass-timber building components and provided with Class-A fire-protection.

9. The method of claim 1, wherein upon the outbreak of a fire during the construction of said prefabricated Class-A fire-protected mass-timber building on said building construction site, a mobile computing device is used to remotely access said information server, and retrieve information to quickly confirm the Class-A fire-protected status of said prefabricated Class-A fire-protected mass-timber building components provided by CFIC liquid treatment of said wood and/or EWPs during fabrication in said factory environment.

10. The method of claim 1, wherein each identifying tag comprises a barcoded/RFID-tagged inspection label including a bar code symbol and RFID tag that has a unique building-component identifier encoded into the barcode symbol and RFID tag identifier, and wherein said building-component identifier is used to access said digital photographs and/or videos, including wood-treatment and fire-protection status information with time/date and location stamping, stored in said information server on said computer network.

11. A method of producing pre-fabricated Class-A fire-protected mass-timber building components in a factory environment for use in constructing Class-A fire-protected mass-timber buildings on building construction sites, said method comprising the steps of:
(a) specifying a set of prefabricated Class-A fire-protected mass-timber building components to be fabricated in a factory environment supporting one or more production lines;
(b) determining the type and quantity of wood required to fabricate each said prefabricated Class-A fire-protected mass-timber building component;
(c) determining the supply of clean fire inhibiting chemical (CFIC) liquid required to treat wood to be used to fabricate each said prefabricated Class-A fire-protected mass-timber building component;
(d) fabricating each said prefabricated Class-A fire-protected mass-timber building component in said factory environment, using the type and quantity of wood determined in step (b);
(e) during fabrication of each said prefabricated Class-A fire-protected mass-timber building component in said factory environment, applying said CFIC liquid to the wood of said mass-timber building component being treated, so as to fabricate a Class-A fire-protected mass-timber building component for use in constructing a Class-A fire-protected mass-timber building;
(f) after applying said CFIC liquid to the wood of each said treated mass-timber building component in said factory environment so as to produce said prefabricated Class-A fire-protected mass-timber building component, certifying and marking each said Class-A fire-protected mass-timber building component as being applied with said CFIC liquid, for inspection and documentation purposes;
(g) during fabrication of each said prefabricated Class-A fire-protected mass-timber building component in said factory environment, applying an identifying tag to each said Class-A fire-protected mass-timber building component;
(h) during fabrication of each Class-A fire-protected mass-timber building component in said factory environment, capturing and collecting digital photographs and/or videos visually showing an indication of Class-A fire-protection stamped or posted on said prefabricated Class-A fire-protected mass-timber building component;
(i) uploading said digital photographs and/or videos including wood-treatment and fire-protection information with time/date and location stamping, to an information server maintained on a computer network; and
(j) during construction of a prefabricated Class-A fire-protected mass-timber building on a building construction site, remotely located from said factory environment, accessing said digital photographs and/or videos, including wood-treatment and fire-protection status information with time/date and location stamping, from said information server maintained on said computer network, so as to provide visual evidence for entities involved in said prefabricated Class-A fire-protected mass-timber building, that said CFIC liquid has been applied to each said prefabricated Class-A fire-protected mass-timber building component and provided with Class-A fire-protection while being fabricated in said factory environment.

12. The method of claim 11, wherein said identifying tag is selected from a group consisting of a bar code identifier, an RFID tag, and a barcoded/RFID tag; and when reading said identifying tag with a mobile tag reader, said digital photographs and/or video information including wood-treatment and fire-protection status information relating to the corresponding prefabricated Class-A fire-protected mass-timber building component, is automatically accessed from said information server for review and consideration.

13. The method of claim 11, wherein step (e) comprises dip-coating pieces of wood in a dipping tank containing said supply of said CFIC liquid at atmospheric pressure, so as to produce Class-A fire-protected wood required to fabricate said prefabricated Class-A fire-protected mass-timber building components.

14. The method of claim 11, wherein step (e) comprises spraying said CFIC liquid over surfaces of said mass-timber building component being treated, so as to fabricate said prefabricated Class-A fire-protected mass-timber building components.

15. The method of claim 11, wherein said Class-A fire-protected mass-timber building components comprise mass-timber building components selected from the group consisting of cross-laminated timber (CLT) panels, nail-laminated timber (NLT) panels, glue-laminated timber (GLT) panels, and mass-timber engineered wood product (EWP) building components.

16. The method of claim 11, wherein said entities comprise a group consisting of builders, property owners, building inspectors, and insurance companies.

17. The method of claim 11, wherein said CFIC liquid comprises an aqueous solution having chemical molecules that infuse into the surface of said wood so that, when said aqueous solution dries, the chemical molecules in said CFIC liquid are present on the surface of the coated wood and ready to interfere with free radicals driving combustion in any fire that may break out about said prefabricated Class-A fire-protected mass-timber building components installed in a mass-timber building under construction on a building construction site.

18. The method of claim 11, wherein said digital photographs and/or videos, including wood-treatment and fire-protection status information with time/date and location stamping, provide factory-collected Class-A fire-protection treatment certification data to said entities for certifying that said CFIC liquid has been applied to said prefabricated Class-A fire-protected mass-timber building components and provided with Class-A fire-protection.

19. The method of claim 11, wherein upon the outbreak of a fire during the construction of said prefabricated Class-A fire-protected mass-timber building on said building construction site, a mobile computing device is used to remotely access said information server, and retrieve information from said information server to quickly confirm the Class-A fire-protected status of said prefabricated Class-A fire-protected mass-timber building components provided by CFIC liquid treatment in said factory environment.

20. The method of claim 11, wherein each identifying tag comprises a barcoded/RFID-tagged inspection label including a bar code symbol and RFID tag that has a unique building-component identifier encoded into said bar code symbol and said RFID tag identifier, and wherein said building-component identifier is used to access said digital photographs and/or videos, including wood-treatment and fire-protection status information with time/date and location stamping, stored in said information server on said computer network.

* * * * *